US008712858B2

(12) United States Patent
Blair et al.

(10) Patent No.: US 8,712,858 B2
(45) Date of Patent: Apr. 29, 2014

(54) SUPPLIER CAPABILITY METHODS, SYSTEMS, AND APPARATUSES FOR EXTENDED COMMERCE

(75) Inventors: William R. Blair, Gibsonia, PA (US); Richard P. Berlin, Cranberry Twp., PA (US); Venkata Paparao Gummadapu, Wexford, PA (US); John E. Allamon, Sr., Erie, PA (US); David A. Gee, Los Angeles, CA (US)

(73) Assignee: Directworks, Inc., Wexford, PA (US)

( * ) Notice: Subject to any disclaimer, the term of this patent is extended or adjusted under 35 U.S.C. 154(b) by 1391 days.

(21) Appl. No.: 11/209,091

(22) Filed: Aug. 21, 2005

(65) Prior Publication Data
US 2006/0041518 A1 Feb. 23, 2006

Related U.S. Application Data

(60) Provisional application No. 60/603,401, filed on Aug. 21, 2004.

(51) Int. Cl.
*G06Q 30/00* (2012.01)

(52) U.S. Cl.
USPC .......................................... 705/26.1; 705/27.2

(58) Field of Classification Search
USPC ..................... 705/26, 27, 26.1–27.2
See application file for complete search history.

(56) References Cited

U.S. PATENT DOCUMENTS

| | | | |
|---|---|---|---|
| 5,712,989 A | 1/1998 | Johnson et al. | |
| 5,796,614 A | 8/1998 | Yamada | |
| 5,815,395 A | 9/1998 | Hart et al. | |
| 5,842,178 A | 11/1998 | Giovannoli | |
| 5,905,975 A | 5/1999 | Ausubel | |
| 6,006,221 A | 12/1999 | Liddy et al. | |
| 6,058,379 A | 5/2000 | Odom et al. | |
| 6,101,484 A * | 8/2000 | Halbert et al. | 705/26.2 |
| 6,141,653 A | 10/2000 | Conklin et al. | |
| 6,199,050 B1 | 3/2001 | Alaia et al. | |
| 6,216,114 B1 | 4/2001 | Alaia et al. | |
| 6,223,167 B1 | 4/2001 | Alaia et al. | |
| 6,230,146 B1 | 5/2001 | Alaia et al. | |
| 6,230,147 B1 | 5/2001 | Alaia et al. | |
| 6,260,043 B1 | 7/2001 | Puri et al. | |
| 6,285,989 B1 | 9/2001 | Shoham | |
| 6,324,544 B1 | 11/2001 | Alam et al. | |
| 6,401,080 B1 | 6/2002 | Bigus et al. | |
| 6,408,283 B1 | 6/2002 | Alaia et al. | |
| 6,434,536 B1 | 8/2002 | Geiger | |
| 6,499,018 B1 | 12/2002 | Alaia et al. | |
| 6,526,423 B2 * | 2/2003 | Zawadzki et al. | 715/235 |

(Continued)

FOREIGN PATENT DOCUMENTS

CN   1178948 A   4/1998

OTHER PUBLICATIONS

Ko, D. B. (2000). 3D CAD systems and cost engineering. AACE International Transactions, , IT3.1-IT3.5.*

(Continued)

*Primary Examiner* — Resha Desai
(74) *Attorney, Agent, or Firm* — The Webb Law Firm

(57) ABSTRACT

A first file is received. The first file has a first format. The first file includes information associated with an item. The information is extracted from the first file. The extracted information is mapped to a capability profile.

14 Claims, 54 Drawing Sheets

(56) References Cited

U.S. PATENT DOCUMENTS

| | | |
|---|---|---|
| 6,564,192 B1 | 5/2003 | Kinney, Jr. et al. |
| 6,584,451 B1 | 6/2003 | Shoham et al. |
| 6,606,603 B1 | 8/2003 | Joseph et al. |
| 6,662,186 B1 | 12/2003 | Esquibel et al. |
| 6,691,123 B1 | 2/2004 | Gulliksen |
| 6,952,682 B1 | 10/2005 | Wellman |
| 6,993,559 B2 | 1/2006 | Jilk, Jr. et al. |
| 7,047,215 B2 | 5/2006 | Seaman et al. |
| 7,089,203 B1 | 8/2006 | Crookshanks |
| 7,117,165 B1 | 10/2006 | Adams et al. |
| 7,130,815 B1 | 10/2006 | Gupta |
| 7,146,331 B1 | 12/2006 | Young |
| 7,152,043 B2 | 12/2006 | Alaia et al. |
| 7,162,697 B2 | 1/2007 | Markel |
| 7,225,145 B2 | 5/2007 | Whitley et al. |
| 7,225,152 B2 | 5/2007 | Atkinson et al. |
| 7,249,085 B1 | 7/2007 | Kinney, Jr. et al. |
| 7,283,979 B2 | 10/2007 | Tulloch et al. |
| 7,283,980 B2 | 10/2007 | Alaia et al. |
| 7,296,001 B1 | 11/2007 | Ephrati et al. |
| 7,346,574 B2 | 3/2008 | Smith et al. |
| 7,346,838 B2 | 3/2008 | Martyn et al. |
| 7,383,206 B2 | 6/2008 | Rupp et al. |
| 7,395,238 B2 | 7/2008 | Alaia et al. |
| 7,401,035 B1 | 7/2008 | Young |
| 7,467,111 B2 | 12/2008 | Ausubel |
| 7,558,793 B1 | 7/2009 | Topolovac et al. |
| 7,617,144 B2 | 11/2009 | Madoff et al. |
| 7,685,517 B2 | 3/2010 | Tomita et al. |
| 2002/0007324 A1 | 1/2002 | Centner et al. |
| 2002/0059349 A1 | 5/2002 | Wakita et al. |
| 2002/0069164 A1 | 6/2002 | Adam et al. |
| 2002/0077954 A1 | 6/2002 | Slaight et al. |
| 2002/0087440 A1 | 7/2002 | Blair et al. |
| 2002/0161678 A1 | 10/2002 | Jaffe |
| 2002/0174060 A1 | 11/2002 | Friedland et al. |
| 2003/0009410 A1 | 1/2003 | Ramankutty et al. |
| 2003/0037302 A1 | 2/2003 | Dzienis |
| 2003/0040823 A1 | 2/2003 | Harm et al. |
| 2003/0041007 A1 | 2/2003 | Grey et al. |
| 2003/0048301 A1 | 3/2003 | Menninger |
| 2003/0069818 A1 | 4/2003 | Menninger |
| 2003/0069824 A1* | 4/2003 | Menninger ............ 705/37 |
| 2003/0069825 A1 | 4/2003 | Hoffman et al. |
| 2003/0070146 A1 | 4/2003 | Sato et al. |
| 2003/0074301 A1 | 4/2003 | Solomon |
| 2003/0093760 A1 | 5/2003 | Suzuki et al. |
| 2003/0139995 A1 | 7/2003 | Farley |
| 2003/0145057 A1 | 7/2003 | Throop |
| 2003/0182210 A1* | 9/2003 | Weitzman et al. ............ 705/27 |
| 2003/0187763 A1 | 10/2003 | Jordan et al. |
| 2004/0019853 A1 | 1/2004 | Takizawa et al. |
| 2004/0039680 A1 | 2/2004 | Horch et al. |
| 2004/0044591 A1* | 3/2004 | Gilliland et al. ............ 705/27 |
| 2004/0098672 A1 | 5/2004 | Belcher et al. |
| 2004/0187075 A1 | 9/2004 | Maxham et al. |
| 2004/0205014 A1 | 10/2004 | Kaltner |
| 2004/0205453 A1 | 10/2004 | Mortensen |
| 2005/0033655 A1 | 2/2005 | Woolston |
| 2005/0034060 A1 | 2/2005 | Kotler et al. |
| 2005/0066265 A1 | 3/2005 | Kotler et al. |
| 2005/0091122 A1 | 4/2005 | Kiefer et al. |
| 2005/0125311 A1 | 6/2005 | Chidiac et al. |
| 2005/0141848 A1 | 6/2005 | Deguchi et al. |
| 2005/0190405 A1 | 9/2005 | Tomita |
| 2005/0203936 A1 | 9/2005 | Moriwaki |
| 2005/0257129 A1 | 11/2005 | Kreiner et al. |
| 2005/0268216 A1 | 12/2005 | Hayes et al. |
| 2005/0273708 A1 | 12/2005 | Motyka et al. |
| 2005/0278418 A1 | 12/2005 | Rathakrishnan et al. |
| 2006/0015805 A1 | 1/2006 | Humenansky et al. |
| 2006/0026505 A1 | 2/2006 | Mani et al. |
| 2006/0026513 A1 | 2/2006 | Eschbach et al. |
| 2006/0123228 A1 | 6/2006 | Tsunoda et al. |
| 2006/0179012 A1 | 8/2006 | Jacobs |
| 2006/0218070 A1 | 9/2006 | Lange |
| 2007/0055606 A1 | 3/2007 | Ausubel et al. |
| 2008/0046334 A1 | 2/2008 | Lee et al. |

OTHER PUBLICATIONS

Paul Maglio and Rob Barrett, "Intermediaries Personalize Information Stream"; Communications of the ACM, Aug. 3000/vol. 43, No. 8; pp. 96-101.

Collard et al., "Supporting Document and Data Views of Source Code"; ACM 2002, pp. 34-41.

* cited by examiner

FIG. 3E

| | Input File Format | Raster | Vector | CAD | Int Doc | Forms | Source Format | Int. Conv. | Int. Conv | Int. Conv. | Int. Conv | Conv. | Dest. Format |
|---|---|---|---|---|---|---|---|---|---|---|---|---|---|
| 1110-1 | Windows Bitmap | X | | | | | BMP | | | | | DjVu | SNFF |
| 1110-2 | Graphics Interchange Format | X | | | | | GIF | | | | | DjVu | SNFF |
| 1110-3 | JPEG File Interchange Format | X | | | | | JPEG | | | | | DjVu | SNFF |
| 1110-4 | Portable Network Graphics | X | | | | | PNG | | | | | DjVu | SNFF |
| 1110-5 | Tagged Image File Format | X | | | | | TIFF | | | | | DjVu | SNFF |
| 1110-6 | Portable Gray Map File | X | | | | | PGM | | | | | DjVu | SNFF |
| 1110-7 | Portable Bit Map File | X | | | | | PBM | | | | | DjVu | SNFF |
| 1110-8 | Portable Pixel Map File | X | | | | | PPM | | | | | DjVu | SNFF |
| 1110-9 | Portable Any Map File | X | | | | | PNM | | | | | DjVu | SNFF |
| 1110-10 | Adobe Portable Document Format | | | | | | PDF | | | | | DjVu PDF | SNFF |
| 1110-11 | Hewlett Packard Graphics Language File Format | | X | | | | HPGL | | | Spatial | TIFF | DjVu | SNFF |
| 1110-12 | Initial Graphics Exchange Specification (2D) | | | X | | | IGES 2D | | | Spatial | TIFF | DjVu | SNFF |
| 1110-13 | Initial Graphics Exchange Specification (3D) | | | X | | | IGES 3D | | | | | Model Press | SNFF |
| 1110-14 | Computer Graphics Metafile | | X | | | | CGM | | | Spatial | TIFF | DjVu | SNFF |
| 1110-15 | AutoCAD File | | X | | | | DWG | Auto CAD | HPGL | Spatial | TIFF | DjVu | SNFF |
| 1110-16 | AutoCAD Drawing Exchange Format | | X | | | | DXF | Auto CAD | HPGL | Spatial | TIFF | DjVu | SNFF |
| 1110-17 | Drawing Exchange Format | | X | | | | DXF | Auto CAD | HPGL | Spatial | TIFF | DjVu | SNFF |
| 1110-18 | AutoDesk Design Web Format | | X | | | | DWF | DWF | HPGL | Spatial | TIFF | DjVu | SNFF |
| 1110-19 | AutoDesk Inventor Part File | | | X | | | IPT | Inventor | 3DF | | | Model Press | SNFF |
| 1110-20 | AutoDesk Inventor Assembly File | | | X | | | IAM | Inventor | 3DF | | | Model Press | SNFF |
| 1110-21 | AutoDesk Inventor Drawing File | | X | | | | IDW | Inventor | HPGL | Spatial | TIFF | DjVu | SNFF |
| 1110-23 | SolidWorks Part File | | | X | | | SLDPRT | SolidWorks | 3DF | | | Model Press | SNFF |
| 1110-24 | SolidWorks Assembly File | | | X | | | SLDASM | SolidWorks | 3DF | | | Model Press | SNFF |
| 1110-25 | SolidWorks Drawing File | | X | | | | SLDDRW | SolidWorks | HPGL | Spatial | TIFF | DjVu | SNFF |
| 1110-26 | SolidEdge Part File | | | X | | | PAR | SolidEdge | 3DF | | | Model Press | SNFF |
| 1110-27 | SolidEdge Assembly File | | | X | | | ASM | SolidEdge | 3DF | | | Model Press | SNFF |

FIG. 11A

| | Input File Format | Raster | Vector | CAD | Int. Doc | Forms | Source Format | Int. Conv. | Int. Conv | Int. Conv | Int. Conv | Conv. | Dest. Format |
|---|---|---|---|---|---|---|---|---|---|---|---|---|---|
| 1110-28 | SolidEdge Draft File | | X | | | | DFT | SolidEdge | HPGL | Spatial | TIFF | DJVu | SNFF |
| 1110-29 | SolidEdge Sheet Metal Part | | | X | | | PSM | SolidEdge | 3DF | | | Model Press | SNFF |
| 1110-30 | SolidEdge Weldment File | | | X | | | PWD | SolidEdge | 3DF | | | Model Press | SNFF |
| 1110-31 | Pro/Engineer Part File | | | X | | | PRT | ProE | 3DF | | | Model Press | SNFF |
| 1110-32 | Pro/Engineer Assembly File | | | X | | | ASM | ProE | 3DF | | | Model Press | SNFF |
| 1110-33 | Pro/Engineer Drawing File | | X | | | | DRW | ProE | HPGL | Spatial | TIFF | DJVu | SNFF |
| 1110-34 | STEP | | X | | | | STEP-2D | | | Spatial | TIFF | DJVu | SNFF |
| 1110-35 | STEP | | | X | | | STEP-3D | | | | | Model Press | SNFF |
| 1110-36 | JPEG-2000 Code Stream bitmap | | X | | | | JPC | | | Lead Tools | TIFF | DJVu | SNFF |
| 1110-37 | JPEG-2000 JP2 File Format | | X | | | | JP2 | | | Lead Tools | TIFF | DJVu | SNFF |
| 1110-38 | Windows Metafile | X | | | | | WMF | | | Net Converter | TIFF | DJVu | SNFF |
| 1110-39 | Windows Metafile (old Win 3.x format) | X | | | | | WMF | | | Lead Tools | TIFF | DJVu | SNFF |
| 1110-40 | Windows Icon File | X | | | | | ICO | | | Net File Converter | TIFF | DJVu | SNFF |
| 1110-41 | 3D Studio File | | | X | | | 3DS | | | | | Model Press | SNFF |
| 1110-42 | HOOPS Stream File | | | X | | | HSF | | | | | Model Press | SNFF |
| 1110-43 | Stereolithography Interface Format | | | X | | | STL | | | Spatial | TIFF | DJVu | SNFF |
| 1110-44 | Verband der Automobilindustrie (German Automobile Industry Association) | | X | | | | VRL | | | Spatial | TIFF | DJVu | SNFF |
| 1110-45 | Virtual Reality Modeling Language | | X | | | | WRL | | | Spatial | TIFF | DJVu | SNFF |
| 1110-46 | Extensible Graphics Language File | | | X | | | XGL | | | | | Model Press | SNFF |
| 1110-47 | Scaleable Vector Graphics File | | | X | | | SVG | | | BankFile | TIFF | DJVu | SNFF |
| 1110-48 | Targa bitmap | X | | | | | TGA | | | Lead Tools | TIFF | DJVu | SNFF |
| 1110-49 | Adobe Photoshop Image | X | | X | | | PSD | | | | | DJVu | SNFF |
| 1110-50 | Apple Macintosh File | | X | | | | PICT | | | | | DJVu | SNFF |
| 1110-51 | Computer Aided Acquisition and Logistics Support Raster Format | X | | | | | CALS | | | Lead Tools | TIFF | DJVu | SNFF |

FIG. 11B

| | 1110 | 1112 | 1114 | 1116 | 1118 | 1120 | 1130 | 1140 | 1142 | 1144 | 1146 | 1148 | 1150 |
|---|---|---|---|---|---|---|---|---|---|---|---|---|---|
| | Input File Format | Raster | Vector | CAD | Int. Doc | Forms | Source Format | Int. Conv. | Int. Conv | Int. Conv | Int. Conv | Conv. | Dest. Format |
| 1110-53 | Graphics Multipage PCX bitmap | X | | | | | DCX | | | Lead Tools | TIFF | DjVu | SNFF |
| 1110-54 | ZSoft PCX bitmap | X | | | | | PCX | | | Lead Tools | TIFF | DjVu | SNFF |
| 1110-55 | Kodak PhotoCD bitmap | X | | | | | PCD | Image Magic File Coverter | | | | | SNFF |
| 1110-56 | Sun Raster bitmap | X | | | | | RAS | Image Magic File Coverter | | | | | |
| 1110-57 | Encapsulated PostScript | | X | | | | EPS | | | Lead Tools | TIFF | DjVu | SNFF |
| 1110-58 | Adobe PostScript File | | X | | | | PS | | | | | DjVu PDF | SNFF |
| 1110-59 | Microsoft Word Document | | | | X | | DOC | Black ICE Printer Drive | EMF | Lead Tools | TIFF | DjVu | SNFF |
| 1110-60 | Microsoft Excel File | | | | X | | XLS | Black ICE Printer Drive | EMF | Lead Tools | TIFF | DjVu | SNFF |
| 1110-61 | Microsoft PowerPoint document | | | | X | | PPT | Black ICE Printer Drive | EMF | Lead Tools | TIFF | DjVu | SNFF |
| 1110-62 | Microsoft Project File | | | | X | | MPP | Black ICE Printer Drive | EMF | Lead Tools | TIFF | DjVu | SNFF |
| 1110-70 | ACIS File | | | X | | | ACIS | | | | | Model Press | SNFF |

CBOM 3300

| | Top Level Items | LVL | Qty | Ext Qty | Unit Cost | Asm Labor | Total $ | Bid Cpt |
|---|---|---|---|---|---|---|---|---|
| 1 | TopAssembly1 | 0 | 1 | 1,000 | $263,000 | $11,000 | $274,000 | Y |
| 2 | SubAsm1 | 1 | 1 | 1,000 | $24,000 | $10,000 | $34,000 | Y |
| 3 | CommonPart1 | 2 | 2 | 2,000 | $2,000 | $20,000 | $22,000 | Y |
| 4 | UniquePart1 | 2 | 1 | 1,000 | $2,000 | $0 | $2,000 | Y |
| 5 | SubAsm2 | 1 | 1 | 1,000 | $6,000 | $11,000 | $17,000 | Y |
| 6 | CommonPart1 | 2 | 2 | 2,000 | $2,000 | $0 | $2,000 | Y |
| 7 | UniquePart2 | 2 | 1 | 1,000 | $4,000 | $0 | $4,000 | Y |
| 8 | SubAsm3 | 1 | 1 | 1,000 | $84,000 | $12,000 | $96,000 | Y |
| 9 | CommonPart1 | 2 | 2 | 2,000 | $2,000 | $0 | $2,000 | Y |
| 10 | UniquePart3 | 2 | 4 | 4,000 | $42,000 | $40,000 | $82,000 | Y |
| 11 | SubAsm4 | 1 | 1 | 1,000 | $27,000 | $13,000 | $40,000 | Y |
| 12 | CommonPart1 | 2 | 2 | 2,000 | $2,000 | $0 | $2,000 | Y |
| 13 | UniquePart4 | 2 | 5 | 5,000 | $25,000 | $0 | $25,000 | Y |
| 14 | SubAsm5 | 1 | 1 | 1,000 | $62,000 | $14,000 | $76,000 | Y |
| 15 | CommonPart1 | 2 | 2 | 2,000 | $2,000 | $0 | $2,000 | Y |
| 16 | UniquePart5 | 2 | 10 | 10,000 | $60,000 | $0 | $60,000 | Y |

| | End Items Items | Total Qty | T | Unit Cost | Asm Labor | Extended $ |
|---|---|---|---|---|---|---|
| 1 | CommonPart1 | 10,000 | P | $1.00 | X | $10,000 |
| 2 | SubAsm1 | 1,000 | A | X | $10.00 | $10,000 |
| 3 | SubAsm2 | 1,000 | A | X | $11.00 | $11,000 |
| 4 | SubAsm3 | 1,000 | A | X | $12.00 | $12,000 |
| 5 | SubAsm4 | 1,000 | A | X | $13.00 | $13,000 |
| 6 | SubAsm5 | 1,000 | A | X | $14.00 | $14,000 |
| 7 | UniquePart1 | 2,000 | P | $2.00 | X | $4,000 |
| 8 | UniquePart2 | 1,000 | P | $3.00 | X | $3,000 |
| 9 | UniquePart3 | 4,000 | P | $4.00 | X | $16,000 |
| 10 | UniquePart4 | 5,000 | P | $5.00 | X | $25,000 |
| 11 | UniquePart5 | 10,000 | P | $6.00 | X | $60,000 |

FIG. 33B

SUPPLIER CAPABILITY METHODS, SYSTEMS, AND APPARATUSES FOR EXTENDED COMMERCE

This application claims the benefit of U.S. Provisional Application No. 60/603,401 filed Aug. 21, 2004, which is incorporated herein by reference.

RELATED APPLICATIONS

The present application is related to the following applications which are assigned to the same assignee as the present application and which were filed on even date herewith: Ser. No. 11/208,693, entitled "FILE TRANSLATION METHODS, SYSTEMS, AND APPARATUSES FOR EXTENDED COMMERCE"; Ser. No. 11/209,090, entitled "COLLABORATIVE NEGOTIATION METHODS, SYSTEMS, AND APPARATUSES FOR EXTENDED COMMERCE"; and Ser. No. 11/208,693, entitled "COST MANAGEMENT FILE TRANSLATION METHODS, SYSTEMS, AND APPARATUSES FOR EXTENDED COMMERCE."

BACKGROUND

The process of developing and manufacturing products requires cooperation between multiple functional groups in separate corporate enterprises. Original Equipment Manufacturers (OEM) must cooperate with suppliers, vendors, contract engineers, and distributors to deliver products to market on time and on budget. Collaboration is the interaction between multiple parties to achieve a common goal through a cooperative effort. Collaboration between OEM and suppliers, vendors, contract engineers, and distributors to deliver products involves sharing common goal oriented information such as engineering design documents, procurement documents, project management schedules, and production schedules. Collaboration enables a corporate enterprise to manage product design, sourcing, and manufacturing.

Today, collaboration is more challenging due to globally distributed corporate engineering, sourcing, and manufacturing operations for one or more buying and supplying companies. The global distribution of engineering, sourcing, and manufacturing resources makes it more difficult to collaboratively share information in a timely, efficient, and controlled manner. The advent of the Internet has enabled corporate enterprises to communicate using computers. The affiliation and/or collaboration of multiple resources in separate corporate enterprises forms an extended enterprise. Conventional collaboration software applications focus on individual functions like design engineering. The software generally does not link multi-discipline resources throughout the extended enterprise to enable collaboration on a project. This shortcoming has forced the resources to revert to conventional forms of communication. It is difficult to collaborate on a project using conventional telephone, fax, and/or electronic mail (e-mail) without the benefit of a collaboration tool that integrates multiple functional resources working toward a common goal.

BRIEF DESCRIPTION OF THE DRAWINGS

FIGS. 3B, 3C, 3D, 3E, and 3F illustrate various embodiments of representative graphical user interfaces.

FIGS. 11A-C is a diagram of one embodiment of a native format file conversion process flow.

FIG. 16 is a graphical user interface of one embodiment of one instance of an application framework.

FIG. 17A is a graphical user interface of one embodiment of one instance of an application framework.

FIG. 19 is a graphical user interface of one embodiment of one instance of an application framework.

FIG. 21 is a graphical user interface 2100 of one embodiment of one instance of an application framework.

FIG. 22 is a graphical user interface of one embodiment of one instance of an application framework.

FIG. 23 is a graphical user interface of one embodiment of one instance of an application framework.

FIG. 24 is a graphical user interface of one embodiment of one instance of an application framework.

FIG. 33A is a graphical user interface of one embodiment of a CBOM assembly view.

FIG. 33B is a graphical user interface of one embodiment of a CBOM end items view.

SUMMARY

Figure 1:
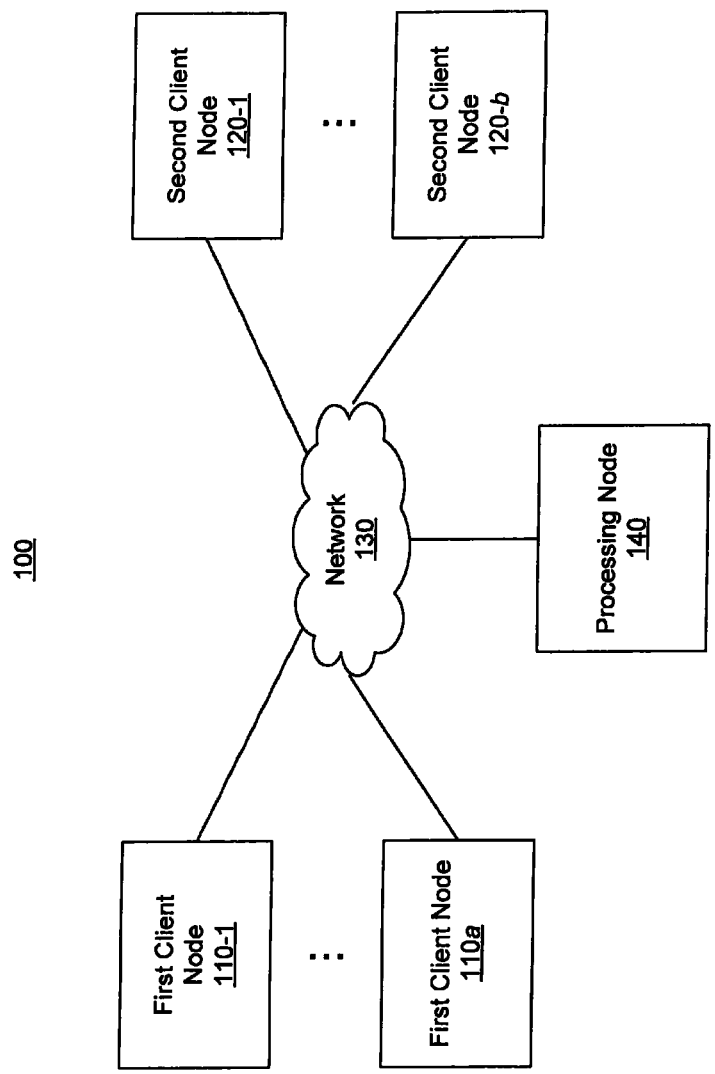
FIG. 1 illustrates one embodiment of a system for distributed collaboration and negotiation.

In one embodiment, a method comprises receiving a first file in a first format. The first file comprises information associated with an item. The information is extracted from the first file. The extracted information is mapped to a capability profile.

DETAILED DESCRIPTION

The various embodiments described herein enable collaboration between resources distributed throughout an extended enterprise. In one embodiment, the collaboration throughout the extended enterprise may occur over the Internet via web-based collaboration tools. An extended enterprise is the affiliation and/or collaboration of multiple functional resources distributed in separate corporate enterprises. As previously stated, collaboration is the interaction between multiple parties to achieve a common goal through a cooperative effort. In one embodiment, the functional resources of a buying organization and its suppliers form an extended enterprise. Functional resources may comprise purchasing (buying), engineering, sales, marketing, management, operations, and financing resources of the buying organization or the supplier. As used herein, a supplier may comprise: vendors, contract engineers, distributors, and manufacturers that have a relationship with the organization. Further, a supplier may supply items or services to the organization. Items and/or services provided by a supplier may comprise stamping, casting, circuit board fabrication, packaging, general fabrication, machining, molding, welding, among various other services normally associated with the design, manufacture, and distribution of an item. The functionality for web-based collaboration is provided by various embodiments of computer hardware and software modules forming a distributed platform. The modules enable distributed resources to collaborate while working on a common project. In one embodiment, a project may encompass any activity from new product design engineering to item sourcing to product manufacturing phases. The term "item" refers to any mechanism, device, product, instrument, machine, machinery, assembly, sub-assembly, component, element, section, material, service, process, and/or any other material goods or services required to design, build, source, construct, manufacture, assemble and/or fabricate a product.

Sourcing is the strategic process of selecting a supplier and entering into an agreement to purchase and supply items. Sourcing also may comprise negotiating prices for an item at a given volume with the supplier over a fixed period of time from the time an item is introduced throughout the life cycle of the item. The negotiation element of sourcing may be addressed with one or more sourcing methods. One example of a sourcing method is a reverse auction which may utilize the Internet (an e-auction) and involves one buyer and many sellers. The general idea is that the buyer specifies what it wants to purchase and invites two or more suppliers to submit offers (bids) regarding the buyer specified item. To make sure the awarded supplier is suitable, the buyer may pre-qualify those suppliers who are allowed to participate in the negotiation. The process will usually produce the lowest possible price. Embodiments of the modules described herein provide item management, sourcing management, project management, and collaboration tools for the extended enterprise. The modules address strategic sourcing activities from the design costing phase of a new item, through production sourcing and item approval, and product life cycle management.

Various embodiments of the modules described herein enable electronic sourcing (e-sourcing) of items over a web-based environment. The modules provide a platform for selecting a supplier and awarding a contract to the supplier, and entering into an agreement to purchase items from the supplier. In one embodiment, these functions occur over a wide area network (WAN) enabled environment, such as the Internet. E-sourcing enables an organization to rapidly and globally deploy a variety of electronic files to one or more of its extended enterprise partners for the purpose of negotiating prices of items. The electronic files can include any proprietary, patented, and/or copyrighted information including engineering design drawings in a variety of two-dimensional (2-D) and three-dimensional (3-D) computer aided design (CAD) formats, technical specifications, item specifications, manufacturing drawings, manufacturing plans, and intellectual property (IP). The electronic file also can include comprehensive requests for quotes (RFQs), requests for proposals (RFP), and requests for information (RFI) associated with an item.

Organizations within an extended enterprise network may collaborate to complete a project using the electronic files to address technical or commercial issues associated with supply chain management. Embodiments of the modules provide a collaborative negotiation environment to negotiate with multiple suppliers the total cost value of items and services taking into account price and non-price factors and efficiently arrive at the best negotiated contract award decision.

Digital rights management (DRM) technology may be applied to any electronic files transmitted throughout the extended enterprise to preserve the proprietary nature of the electronic files that may be exchanged during collaboration and negotiation. User viewing permissions are embedded within an electronic file. If a user lacks permission, the user cannot view the file. DRM technology encrypts the electronic files for safe distribution across the extended enterprise over the Internet to prevent unauthorized access, copying, and distribution. Encrypted electronic files may be freely distributed as they are exchanged between collaborating and negotiating parties throughout the extended enterprise. Embodiments of DRM technology enable the publishers to protect, control, track, and audit the digital content of the electronic files. In one embodiment, DRM technology limits viewing of the electronic files to licensed subscribers. In one embodiment, DRM technology prevents republication and/or redistribution of the electronic files to non-subscribers. In one embodiment, DRM technology may point to an unauthorized user via a link to a publisher subscription service. In one embodiment, DRM technology may provide granular control and tracking of unauthorized distribution by identifying for the publisher all unauthorized users who attempted to view illegally distributed copies of an electronic file, and all licensed users that illegally forward a file. DRM technology allows a user to limit access to an electronic file. In one embodiment, post award of a sourcing contract to one or more suppliers, a buyer may utilize DRM technology to limit access to confidential electronic files to the one or more suppliers that were awarded the contract. As used herein, utilization of DRM technology enables a secure collaboration environment throughout the extended enterprise. In one embodiment, a secure collaboration environment may comprise encryption, authentication, authorization, and auditing of content by use of the DRM technology. In addition, a secure collaboration environment may comprise security in transport of media information throughout the extended enterprise; security in storage of media information; authentication of the sender; authentication of the recipient; authorization; non-repudiation where only that sender may have sent a message and no one else; tamper-proofing the media information to maintain integrity of the original; time-stamping; tracking and archiving transmissions of media information; restricted authorization privileges to access the media information; and creating audit trails.

FIG. 1 illustrates one embodiment of a system 100 for distributed collaboration and negotiation. The system 100 includes multiple nodes 110-1-*a*, 120-1-*b* (where a and b are any number), and 140 that communicate over a network 130. In one embodiment, the system 100 represents an extended enterprise network with a seamless integration between nodes 110-1-*a*, 120-1-*b*, 140. In one embodiment, the extended enterprise network includes resources ranging from individuals to functional groups within nodes 110-1-*a* and 120-1-*b*. The resources at nodes 110-1-*a* and 120-1-*b* can collaborate via node 140 over network 130 after being granted permission to access the collaboration/negotiation system 100 by a system administrator that may be located at any one of the nodes 110-1-*a*, 120-1-*b*, and 140. In one embodiment, the system administrator may grant resources at nodes 110-1-*a*, 120-1-*b* access to the collaboration/negotiation system 100 by registering each resource on the system 100 and identifying each resource by a resource name, functional position, company and/or specific division within a company, e-mail address, phone number, facsimile number, and/or physical address. Upon registering a resource, the administrator may transmit an e-mail notification to the resource. In one embodiment, the e-mail includes a hyperlink to access the system 100 and the resource user identification number and/or password to provide the resource access to the system 100. Throughout the description, functional resources, users, and subscribers are used interchangeably to refer to resources that may be located at any one of the nodes 110-1-*a*, 120-1-*b*, and 140. In various embodiments, the functional resources, users, and subscribers may be located the nodes 110-1-*a*, 120-1-*b*.

Nodes 110-1-*a* may be referred to as first client nodes. Nodes 120-1-*b* may be referred to as second client nodes. Node 140 may be referred to as a host processing node that enables secure collaboration between the first client nodes 110-1-*a* and the second client nodes 120-1-*b*. In one embodiment, the system 100 may include, for example, one or more first client nodes 110-1-*a* and one or more second client nodes 1201-*b*. The host processing node 140 provides the platform and functionality to seamlessly integrate electronic transactions between the first client nodes 110-1-*a* and the second client nodes 120-1-*b* via the network 130. The host processing node 140 provides functionality in the form of a plurality of hardware and software modules running on a dedicated platform to enable the exchange of electronic files and managing project activities. In an item development example, the electronic files may include computer aided design (CAD) files that describe a mechanical design (design) or model of an engineered item. CAD files may include 2-D or 3-D images and descriptive data (as defined herein). In one embodiment, the descriptive data describes the item and is embedded in the electronic file. In a collaborative item development environment, the host processing node 140 may enable the exchange of a plurality of electronic CAD files across network 130 between the first client nodes 110-1-*a* and the second client nodes 120-1-*b*.

In one embodiment, the first client nodes 110-1-*a* may represent one or more buyer organizations whose function is to purchase items from suppliers within system 100. The first client nodes 110-1-*a* may include OEM enterprises that design, develop, manufacture, and source items. These OEM enterprises have a need to procure items and deliver products to their customers. In this context, the first client nodes 110-1-*a* may be referred to as "customer" or "buyer" nodes. The second client nodes 120-1-*b* may represent a supplier organization whose function is to sell items to the buyer organization. The second client nodes 120-1-*b* may be associated with one or more enterprises that can supply items to the OEM enterprises associated with the first client nodes 110-1-*a*. In this context, therefore, the second client nodes 120-1-*b* may be referred to as "supplier" or "supply chain" nodes. In this example, the host processing node 140 enables the electronic exchange of information associated with designing, manufacturing, and sourcing items (e.g., digital form) between any of the fist client nodes 110-1-*a* and any one of the second client nodes 120-1-*b*. Collaborative electronic exchange of information across the extended enterprise system 100 replaces conventional forms of information exchange over a plurality of communication mediums such as telephone, facsimile, e-mail, file transfer protocol (FTP) from a web portal site, and paper, and provides a single medium for exchanging electronic files in a collaborative environment.

The host processing node 140 provides the functionality to enable the collaboration between resources at the first and second client nodes 110-1-*a*, 120-1-*b*. Collaboration may include collaborative project management and communicating design, sourcing, and manufacturing information related to an item.

As used herein, each one of the first and second client nodes 110-1-*a*, 120-1-*b*, and the host processing node 140 may include any physical or logical entity for communicating information in the system 100 and may be implemented as hardware, software, or any combination thereof, as desired for a given set of design and/or system parameters or performance constraints. Although the system 100 may show a limited number of nodes by way of example, it can be appreciated that additional or fewer nodes may be employed for a given implementation.

A node may include any physical or logical entity having a unique address in the system 100. The unique address may include, for example, a network address such as an Internet Protocol (IP) address, a device address such as a Media Access Control (MAC) address, and so forth. The embodiments are not limited in this context.

The first and second client nodes 110-1-*a*, 120-1-*b*, and the host processing node 140 of the system 100 may include and/or form part of the network 130, such as an Internet network, a Local Area Network (LAN), a Metropolitan Area Network (MAN), a Wide Area Network (WAN), a Wireless LAN (WLAN), the World Wide Web, a telephony network (e.g., analog, digital, wired, wireless, PSTN, ISDN, or xDSL), a radio network, a television network, a cable network, a satellite network, and/or any other wired or wireless communications network configured to carry data. The network 130 may include one or more elements, such as, for example, intermediate nodes, proxy servers, firewalls, routers, switches, hubs, adapters, sockets, and wired or wireless data pathways, configured to direct and/or deliver data to other networks. The embodiments are not limited in this context.

The first and second client nodes 110-1-*a*, 120-1-*b*, and the host processing node 140 of the system 100 may be arranged to communicate one or more types of information such as media information. Media information refers to any data representing content meant for a user, such as image information, video information, graphical information, audio information, voice information, textual information, numerical information, alphanumeric symbols, character symbols, and so forth. Other examples of media information communicated over the system 100 may include, for example, electronic files that include proprietary, patented, and/or copyrighted information including engineering drawings, mechanical design, design information, drawings, and/or CAD files that describe a design or model of an engineered item, images of the item, descriptive data describing, for example, attributes, properties, and features of the item, 2-D and 3-D CAD models, technical specifications, product and item specifications, manufacturing drawings, manufacturing plans, bills of material comprising one or more items (BOM), intellectual property (IP), and other proprietary business documents, including, for example, comprehensive documents defining an RFQ, RFP, RFI, among other documents associated with the lifecycle of an item. The media information may be referred to herein as customer information, project information, and/or supplier information. Customer/buyer information may include, for example, drawings, parts lists, material specifications, finish specifications, process specifications, heat treatment specifications, quality procedures, quality forms, quoting forms, and any other information that defines an item and its properties. Project information may include, for example, tasks, due dates, person responsible to complete a task, commitment dates associated with a project, list of items, documents that define items and/or item trees (e.g., a list of items and their product structural relationship and/or a relationship to another project). In one embodiment, such project information may relate to, for example, RFQ, new product introduction (NPI), cost-out, quality improvement, and product line rationalization. Supplier information may include, for example, first article inspection, equipment specifications, capacity documents, quoting documents, tolerance capabilities, jig/fixturing documents, and control charts. CAD information may include information formatted in any CAD format including, but not limited to raster and/or vector formats, such as AutoDesk Inventor, Bentley, AutoCAD, Catia, Ideas, Unigraphics, Solid Works, Solid Edge, Pro-Engineer files, among others described herein. Media information also may include, for example, information formatted in intelligent documents. In one embodiment, intelligent documents may comprise meta data and/or meta tags that are read by the authoring program. In one embodiment, the meta data and/or meta tags may represent, for example, document formats, tracking, and/or animation. In one embodiment, such intelligent documents may include, for example, MS-Word files, MS-Excel files, MS-Power Point files, Word perfect files, Lotus files, and printer document format (PDF) files. Media information also may include extensible markup language (XML) forms, among others described herein. Media information may originate from or be destined to any one of the first client nodes 110-1-*a* and/or the second client nodes 120-1-*b* as enabled by the platform of the host processing node 140. The embodiments are not limited in this context.

The first and second client nodes 110-1-*a*, 120-1-*b*, and the host processing node 140 of the system 100 may be arranged to communicate one or more types of information such as control information. Control information refers to any data representing commands, instructions or control words meant for an automated system. For example, control information may be used to route media information throughout the system 100, or instruct the first and second client nodes 110-1-*a*, 120-1-*b*, the host processing node 140 to process the media information in a predetermined manner. The control information may be communicated from and to a number of different devices or networks. The embodiments are not limited in this context.

The first and second client nodes 110-1-*a*, 120-1-*b*, the host processing node 140 of the system 100 may communicate media and control information in accordance with one or more protocols. A protocol may include a set of predefined rules or instructions to control how the nodes communicate information between each other. The protocol may be defined by one or more protocol standards as promulgated by a standards organization, such as the Internet Engineering Task Force (IETF), International Telecommunications Union (ITU), the Institute of Electrical and Electronics Engineers (IEEE), and so forth. For example, the system 100 may include a packet network communicating information in accordance with one or more packet protocols, such as one or more Internet protocols, such as the Transport Control Protocol (TCP) and Internet Protocol (IP), TCP/IP, X.25, Hypertext Transfer Protocol (HTTP), and User Datagram Protocol (UDP). In another example, the system 100 may communicate packets using a medium access control protocol such as Carrier-Sense Multiple Access with Collision Detection (CSMA/CD), as defined by one or more IEEE 802 Ethernet standards. In yet another example, the system 100 may communicate packets in accordance with one or more Asynchronous Transfer Mode (ATM) protocols, Frame Relay, Systems Network Architecture (SNA), and so forth. In one embodiment, system 100 may communicate packets using secure hypertext transfer protocol (S-HTTP) and secure socket layer (SSL) protocol, for example. In one embodiment, system 100 may communicate encrypted information, such as, for example, using advanced encryption standard (AES) Federal Information Processing Standards (FIPS) Publication 197 (FIPS-197) encryption, for example. The embodiments are not limited in this context.

In various implementations, the host processing node 140 may be illustrated and described as including several separate functional elements, such as modules and/or blocks. Although certain modules and/or blocks may be described by way of example, it can be appreciated that a greater or lesser number of modules and/or blocks may be used and still fall within the scope of the embodiments. Further, although various embodiments may be described in terms of modules and/or blocks to facilitate their description, such modules and/or blocks may be implemented by one or more hardware components (e.g., processors, DSPs, PLDs, ASICs, circuits, registers), software components (e.g., programs, subroutines, logic) and/or combinations thereof.

In one embodiment, the host processing node 140 may include multiple modules connected by one or more communications media. Communications media generally may include any medium capable of carrying information signals. For example, communications media may include wired communications media, wireless communications media, or a combination of both, as desired for a given implementation. Examples of wired communications media may include a wire, cable, printed circuit board (PCB), backplane, semiconductor material, twisted-pair wire, co-axial cable, fiber optics, and so forth. An example of a wireless communications media may include portions of a wireless spectrum, such as the radio-frequency (RF) spectrum. The embodiments are not limited in this context.

The modules may include, or may be implemented as, one or more systems, subsystems, devices, components, circuits, logic, programs, or any combination thereof, as desired for a given set of design or performance constraints. For example, the modules may include electronic elements fabricated on a substrate. In various implementations, the electronic elements may be fabricated using silicon-based IC processes such as complementary metal oxide semiconductor (CMOS), bipolar, and bipolar CMOS (BiCMOS) processes, for example. The embodiments are not limited in this context.

Figure 2:
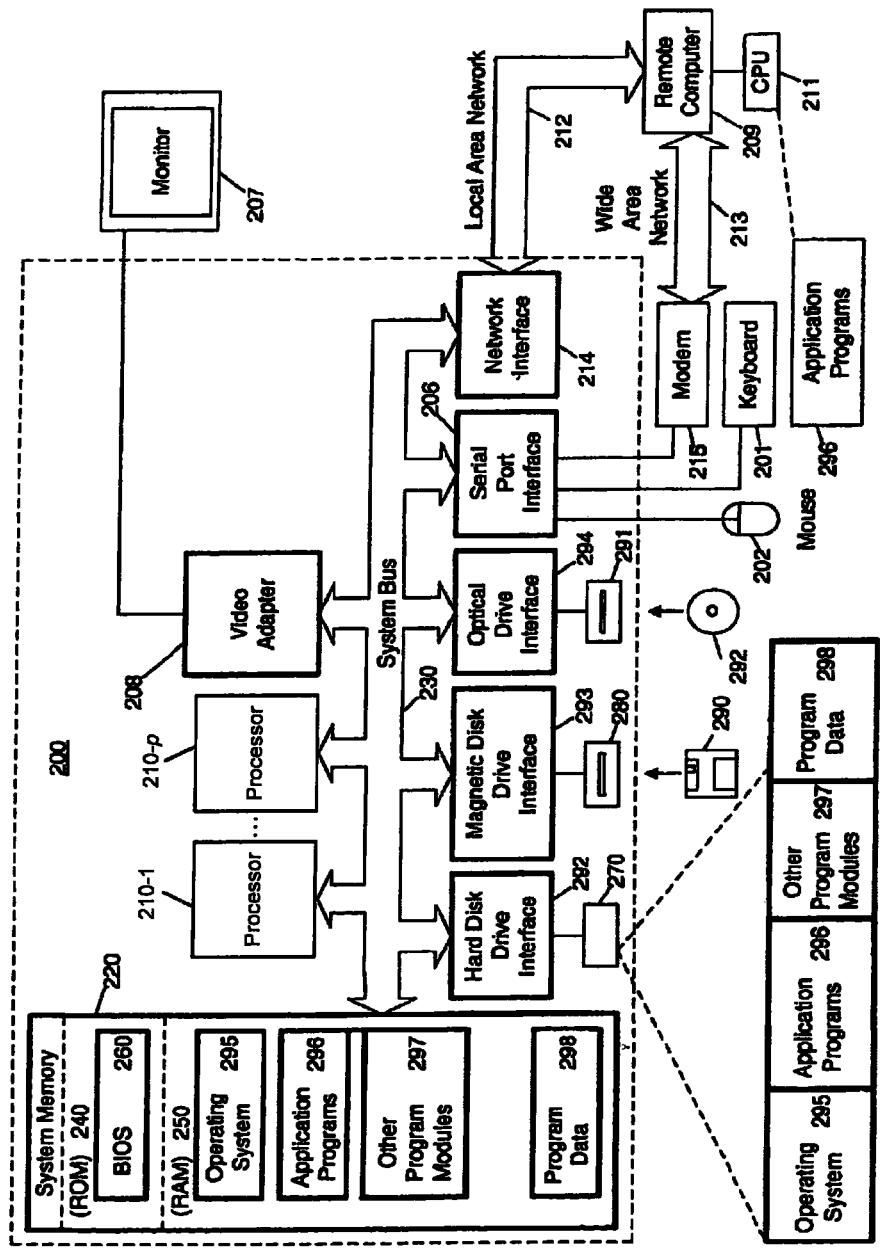
FIG. 2 is a schematic diagram of one embodiment of a computing environment.

In one embodiment, each of the first and second client nodes 110-1-a, 120-1-b, and the host processing node 140 may include modules in the form of executable code implemented in a general purpose computing device. FIG. 2 is a schematic diagram of one embodiment of a computing environment in which the various modules and submodules of the first and second client nodes 110-1-a, 120-1-b, and the host processing node 140 may be implemented. Those skilled in the art will appreciate that the computing environment may include all the components shown in FIG. 2, a subset of these components or additional components as may be required by a specific implementation and the embodiments are not limited in this context. In various embodiments, a general purpose computing device 200 may be in the form of a personal computer (PC), a server, a router, a switch, a network PC, a peer device or other common network node that includes one or more processing units 210-1-p, a system memory 220, and a system bus 230 that couples various system components including the system memory 220 to the one or more processing units 210-1-p. The system bus 230 may be any of several types of bus structures including a memory bus or memory controller, a peripheral bus, and a local bus using any of a variety of bus architectures. The system memory includes read only memory 240 (ROM) and random access memory 250 (RAM).

A basic input/output system 260 (BIOS), containing the basic routines that help to transfer information between elements within the general purpose computing device 200, such as during start-up, is stored in the ROM 240. The general purpose computing device 200 further includes a hard disk drive 270 for reading from and writing to a hard disk, a magnetic disk drive for reading from or writing to a removable magnetic disk 290, and an optical disk drive 291 for reading from or writing to a removable optical disk 299 such as a CD ROM or other optical media. The hard disk drive 270, magnetic disk drive 280, and the optical disk drive 291 are connected to the system bus 230 by a hard disk drive interface 292, a magnetic disk drive interface 293, and an optical disk drive interface 294, respectively. The drives and their associated computer-readable media provide nonvolatile storage of computer readable instructions, data structures, program modules and other data for the general purpose computing device 200.

Although the exemplary environment described herein employs a hard disk, a removable magnetic disk 290, and a removable optical disk 299, it should be appreciated by those skilled in the art that other types of computer readable media which can store data that is accessible by a computer, such as magnetic cassettes, flash memory cards, digital video disks, Bernoulli cartridges, RAM, ROM, and the like, may also be used in the exemplary operating environment.

A number of modules may be stored on the hard disk, the magnetic disk 290, the optical disk 299, the ROM 2400 or the RAM 250, including an operating system 295 (OS), one or more application program modules 296, other modules 297, and program data 298. The OS 295, the one or more application program modules 296, the other modules 297, and the program data 298 may include various firmware components such as software, programs, data, drivers, application program interfaces (APIs), and so forth. The OS 295, the one or more application program modules 296, the other modules 297, and the program data 298 may be stored in nonvolatile (NV) memory of the processing node 102, such as in bit-masked read-only memory (ROM) or flash memory. The NV memory may include other types of memory including, for example, programmable ROM (PROM), erasable programmable ROM (EPROM), electrically erasable programmable ROM (EEPROM), or battery backed random-access memory (RAM) such as dynamic RAM (DRAM), Double-Data-Rate DRAM (DDRAM), and/or synchronous DRAM (SDRAM). The embodiments are not limited in this context.

In various embodiments, the OS 295 may include, but are not limited to, the Cisco Internetwork Operating System (IOS), Juniper JUNOS, Microsoft® Windows® OS (e.g., 95, 98, NT, ME, 2000, XP, CE, Longhorn), Apple Macintosh OS, IBM OS, Linux, Unix, Solaris, 3Com Palm OS, and the like. The embodiments are not limited in this context.

A user may enter commands and information into the general purpose computing device 200 through input devices such as a keyboard 201 and pointing device 202, such as, for example, a mouse. Other input devices (not shown) may include a microphone, joystick, game pad, satellite dish, scanner, or the like. These and other input devices are often connected to the one or more processing units 210-1-p through a serial port interface 206 that is coupled to the system bus, but may be connected by other interfaces, such as a parallel port, game port or a universal serial bus (USB). A monitor 207 or other type of display device is also connected to the system bus 230 via an interface, such as a video adapter 208. In addition to the monitor 207, personal computers typically include other peripheral output devices (not shown), such as speakers and printers.

The general purpose computing device 200 may operate in a networked environment using logical connections to the one or more remote computers 209. The remote computer 209 may be another general purpose computing device, personal computer, a server, a router, a network PC, a peer device or other common network node, and typically includes many or all of the elements described above relative to the general purpose computing device 200, although only a memory storage device 211 has been illustrated in FIG. 2. The logical connections depicted in FIG. 2 may include a LAN 212 and a WAN 213. Such networking environments are commonplace in offices, enterprise-wide computer networks, intranets, and the Internet.

When used in a LAN networking environment, the general purpose computing device 200 is connected to the local network 212 through a network interface or adapter 214. When used in a WAN networking environment, the general purpose computing device 200 typically includes a modem 215 or other means for establishing a communications over the WAN, such as the Internet. The modem 215, which may be internal or external, is connected to the system bus 230 via the serial port interface 206. In a networked environment, program modules depicted relative to the general purpose computing device 200, or portions thereof, may be stored in the remote memory storage device. It will be appreciated that the network connections shown are exemplary and other means of establishing a communications link between the computers may be used.

Figure 3A:
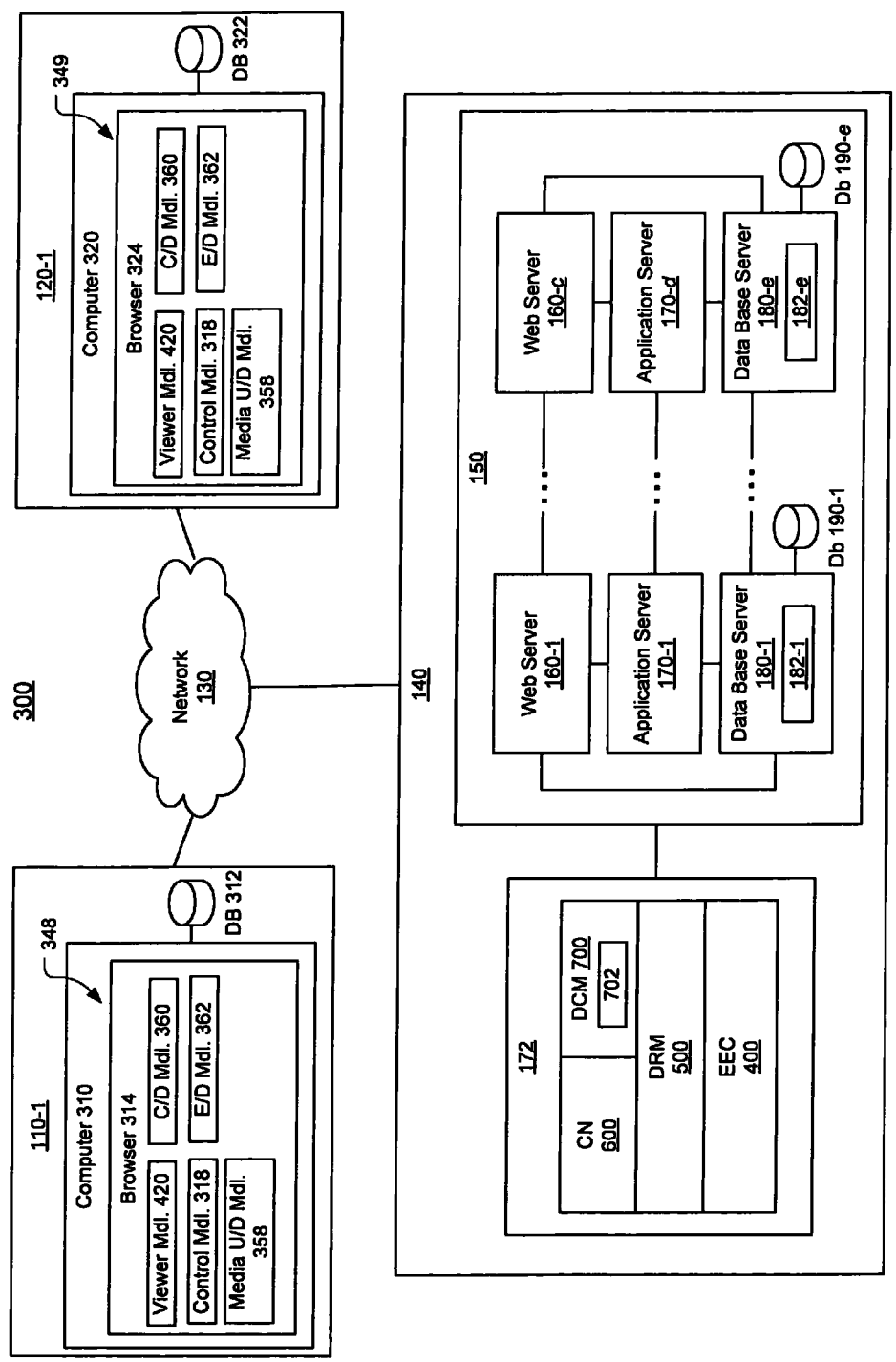
FIG. 3A illustrates one embodiment of an extended enterprise network.
Figure 3B:
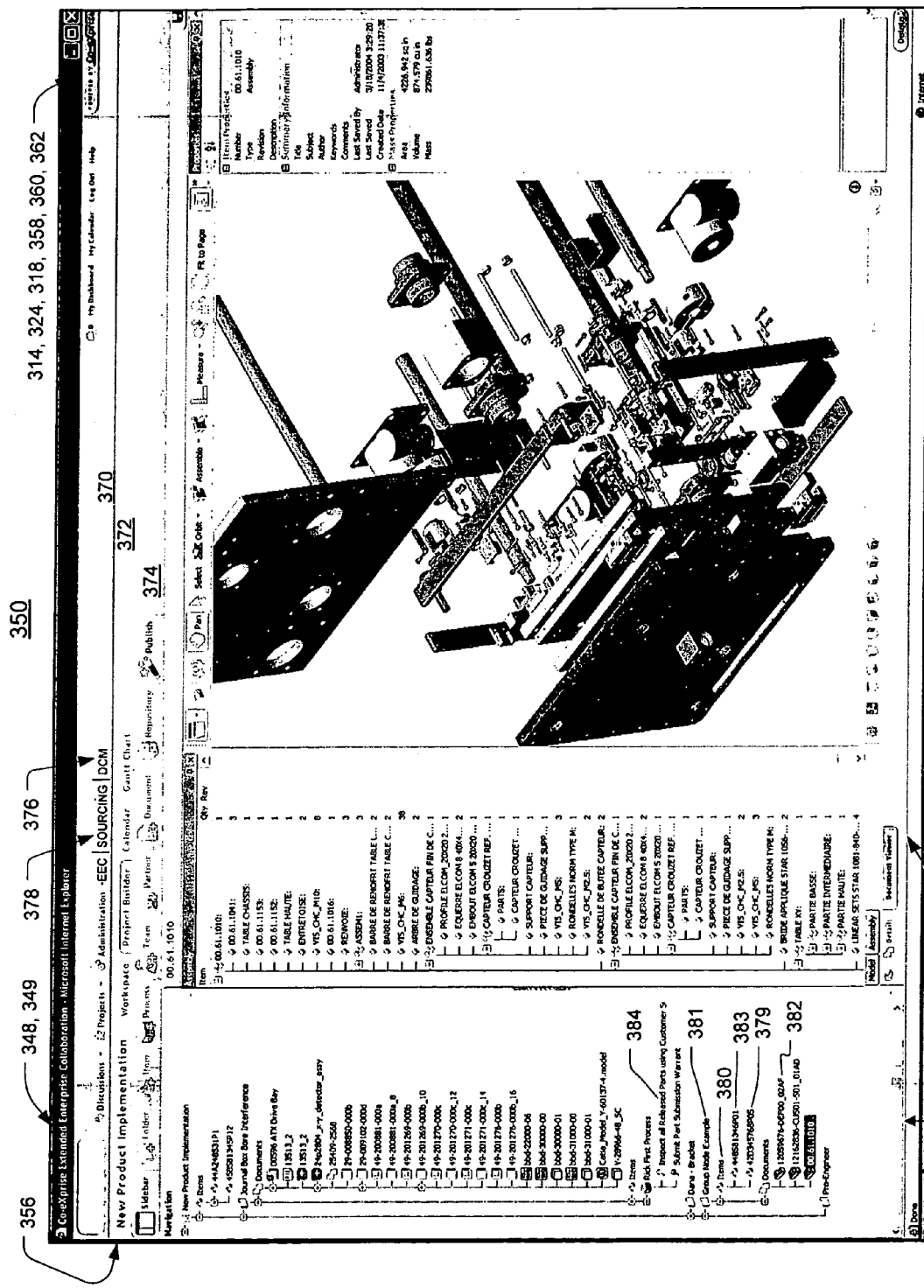

FIG. 3A illustrates one embodiment of an extended enterprise network 300 that is representative of one embodiment of the system 100 shown in FIG. 1. In one embodiment, the extended enterprise network 300 supports communication between the first and second client nodes 110-1 and 120-1 as enabled by the host processing node 140. To simplify the description, the extended enterprise network 300 is shown including a single first client node 110-1 and a single second client node 120-1. As shown in FIG. 1, however, the client nodes may include a plurality of first client nodes 110-1-a and a plurality of second client nodes 120-1-b. The embodiments are not limited in this context.

In one embodiment, the first client node 110-1 includes a computer 310 and a database 312, for example. In one embodiment, the second client node 120-1 includes a computer 320 and a database 322. In one embodiment, the computers 310, 320 each may include an application framework 348, 349 (described herein) that comprises a control module 318 and a web browser 314, 324. In one embodiment, the computers 310, 320 may represent a plurality of computers interconnected over a LAN or WAN. In one embodiment, the computers 310, 320 are representative of the general purpose computing device 200 shown in FIG. 2 and may include all or a sub-set of the elements described with respect thereto. In one embodiment, the network 130 is the Internet, and the application framework 348, 349 is a graphical user interface to the collaboration/negotiation system 100 and the extended enterprise network 300. According to this embodiment, the application framework 348, 349 is in communication with the processing node 140 and the functional modules 172 and the host computing platform 150 comprised therein.

In one embodiment, a functional resource such as a buyer at the first client node 110-1 may create one or more extended enterprise accounts for functional resources (i.e., users) located at the first and second client nodes 110-1, 120-1. The accounts grant users access to the processing node 140 and the software modules comprised therein. A user will not be enabled to gain access to the processing node 140 unless the user receives valid login user identification and password from the processing node 140 and the processing node 140 has successfully authenticated the computers 310, 320 on the extended enterprise network 300. Upon successful authentication, the processing node 140 initiates execution (e.g., launches) a digital rights management (DRM) module 500 to determine if a viewer module 420 is currently installed on the computer 310, 320. If the viewer module 420 is not installed on the computer 310, 320, the processing node 140 transmits a dialogue to the computer 310, 320 requesting to install the viewer module 420 on the computer 310, 320. If the user elects not to install the viewer module 420 on the computer 310, 320, the computer 310, 320 will gain access to the application framework 348, 349 but will not gain access to the viewer module 420 and thus will not gain access to media information presented by the viewer module 420. If the user elects to install the viewer module 420, the processing node 140 downloads the viewer module 420 onto the computer 310, 320. If the viewer module 420 is installed on the computer 310, 320, the processing node 140 executes a check on the viewer module 420 and determines whether a mandatory and/or optional upgrade to the viewer module 420 is required. In one embodiment, a mandatory upgrade may involve uninstalling one or more previous versions of the viewer module 420 and installing a newer version of the viewer module 420 on the computer 310, 320. In another embodiment, the processing node 140 may transmit a dialogue to the computer 310, 320 querying if the user desires to add functionality to the existing viewer currently residing on the computer 310, 320.

In one embodiment, the application frameworks 348, 349 on the computers 310, 320 each may comprise a control module 318. The web browser 314, 324 enables the first and second client nodes 110-1, 120-1 to view one or more web pages. Each web page may be segmented into two or more frames that function independently of each other. With reference to FIGS. 3B, 3C, 3D, 3E, and 3F, various embodiments of representative graphical user interfaces associated with various instances of one embodiment of the application framework 348, 349 are illustrated. One embodiment of a specific instance of the application framework 348, 349 is described with reference to graphical user interface 350. The application framework 348, 349 may include one or more navigation frames 352, one or more command and control frames 354, and one or more tool bar frames 356. The control module 318 manages the inter-process communication and synchronizes the events between the navigation frames 352, the command and control frames 354, and the tool bar frames 356. In one embodiment, the control module 318 may be written in a scripting language that runs on computers 310, 320 to manage web pages such as, for example JavaScript. The control module 318 may be configured to save, store, and/or recall a user session in the application framework 348, 349 to and from a client side session cookie. A user session may include, for example, the last navigation made by the user and/or the position and sizing of windows set by the user.

In one embodiment, the navigation frames 352 may include a tree control of hierarchical objects called tree nodes. In one embodiment, each tree node is user definable and extensible. Each tree node includes a graphical representation and a programmed behavior such as, for example, expand/minimize sub nodes, present the tree node contents in the navigation frame 352 and/or the command and control frame 354, initiate communication between the frames of the application framework 348, 349 and/or enable/disable an application 370, application view 372, and/or application component 374 in the toolbar frame 356. The programmed behavior of a tree node also may include executing business logic to manage parametric inputs. The parametric inputs are associated with a selected application 370, application view 372, and/or application component 374. For example, if a DCM tab 376 is selected, a design cost management (DCM) module 700 application is launched and the tree node may receive forecasted annual usage data and price data (e.g., quotes, current price, should-cost price) for an item and execute algorithms that involve such data. In another embodiment, if a sourcing tab 378 is selected, a sourcing module 600 application is launched and the tree node may receive actual annual usage data and price data (e.g., quotes, current price, should-cost price) for an item and execute algorithms that involve such data.

Tree nodes may be in the form of one or more (1) individual nodes 379, (2) group nodes 380, and/or (3) folder nodes 381. A folder node 381 is a user defined node to organize one or more individual nodes and/or group nodes 380. A group node 380 is a node that is automatically created when two or more individual nodes 379 exist of the same type. An individual node 379 is a node containing a specific type of data and/or content.

In one embodiment, the types of individual nodes may include document nodes 382; item nodes 383; program, project, process, task, and/or subtask nodes 384; functional resource nodes 385; message nodes 386; line item nodes 387; lot nodes 388; and/or collaborative BOM (CBOM) nodes 389. A document node 382 is a node that includes one or more media information files in various file formats such as, for example, a secure neutral format (SNF as defined herein). An item node 383 is a node that includes one or more identifiers. The identifier may represent an item such as, for example, a part number, storage keeping unit (SKU), service number and/or descriptive data. Program, project, process, task, and/or subtask nodes 384 are nodes that organize one or more actions of functional resources. The program node is a collection of project nodes. The project node is a collection of process nodes. The process node is a collection of task nodes. The task node is a collection of action nodes. The action node is an assigned unit of work that comprises a description of the assigned action, one or more functional resources assigned to complete the action, a target date in which the action is to be completed, and/or a commitment date that the assigned function resource committed to have the action completed. A functional resource node 385 is a node that includes one or more names of people who are located throughout the extended enterprise network 300 and have to be authorized to access the extended enterprise network 300 for a specific program, project, process, task, and/or subtask. A message node 386 is a node that includes one or more message threads regarding media information.

In one embodiment, line item node 387 is a node that is automatically created based on a user selection of items and/or assemblies he/she desires to quote. The user may select such items and/or assemblies in the command and control frame 354. The line item node 387 is a node that includes item pricing information. The users throughout the extended enterprise network 300 (e.g., external suppliers at second client nodes 120-1-$b$) submit pricing information for each item (line item price bid). The line item price bid is summarized at the line item node level for purposes of collaborating and/or negotiating a collection of items. A lot node 388 is a node that is automatically created based on a user selection of items and/or assemblies he/she desires to quote. The user may select such items and/or assemblies in the command and control frame 354. The lot node 388 is a node that includes the contents and/or behavior of the line item node 387, including: (1) the ability to receive an initial single price at a lot level (lot price bid) from users throughout the extended enterprise, wherein the lot level includes two or more line items; (2) the ability to subsequently receive line item price bids from users throughout the extended enterprise 300; and (3) the ability to receive extended enterprise user inputs that adjust line item price bids until the summation of all line item prices included in the lot equals the lot price bid.

In one embodiment, a CBOM node 389 is a node that is automatically created based on a user selection of items and/or assemblies he/she desires to quote. In one embodiment, the user may select such items and/or assemblies in the command and control frame 354. The CBOM node 389 contains two sub-nodes: (1) the first sub-node (top level items) 390 contains top level items and/or assemblies that the user selected and the items that are part of the product structure in which the top level items and/or assemblies call out; and (2) the second sub-node (end items) 391 contains an automatically generated list of only the end items that are to be quoted (omitting intermediate product structure levels that a buyer does not wish to quote); such end items are required to construct the top level items and/or assemblies that the user selected (e.g., the end items that are "called out" by the items and/or assemblies that the user selected). The CBOM node 389 also includes the contents and/or behavior of the lot node such as, for example, an end item sub-node 391 may be organized into lots and line items and quoted accordingly. After users throughout the extended enterprise network 300 submit pricing at the end item sub-node 391, the top level items sub-node 390 automatically calculates and rolls up the price inputs to arrive at a total price for the top level items and/or assemblies contained therein.

In one embodiment, the one or more command and control frames 354 may include an Active X control container object that comprises one or more Active X components (e.g., independent software applications) that execute within a designated frame in the browsers 314, 324. The Active X components may comprise: (1) a viewer module 420; (2) a media information upload/download module 358; (3) a compression/decompression module 360; and (4) an encryption/decryption module 362, for example. Active X controls are provided by Microsoft® Corporation (Microsoft®)

In one embodiment, the viewer module 420 includes a special purpose application program downloaded from the host processing node 140 that executes within the browsers 314, 324. In one embodiment, the viewer module 420 is a web-based or desktop viewing and mark-up tool that supports one or more files comprising data such as, for example, media information defined herein. For example, the viewer module 420 enables a user at the first and second client nodes 110-1, 120-1 with the computer 310, 320 and the application framework 348, 349 to access and view secure neutral format files 604-1-$f$ and/or other file formats, for example, commonly used raster, vector, CAD, intelligent documents, and/or XML forms throughout the extended enterprise network 300. As used throughout this application, "viewer module 420" shall mean viewer module 420 operating in conjunction with the computer 310, 320, the application framework 348, 349, and/or the host processing node 140. In one embodiment, the viewer module 420 displays mechanical designs, bills of material (BOM), and descriptive data associated with the mechanical designs and enables users to make annotations thereto. In one embodiment, the viewer module 420 provides a graphical user interface to display a BOM structure and relate a selected item of a mechanical design in a graphical manner. In one embodiment, the viewer module 420 displays images of media information such as, for example, images of mechanical designs in CAD files, whether or not the user, who is viewing such information, has access to the software that was used to create the image. In one embodiment, the viewer module 420 displays descriptive data of a mechanical design that is embedded in a CAD file. Further description of the viewer module 420 is provided below. In one embodiment, the viewer module 420 may be implemented in the C++ programming language due to its efficiency in managing and presenting graphics.

Figure 5:
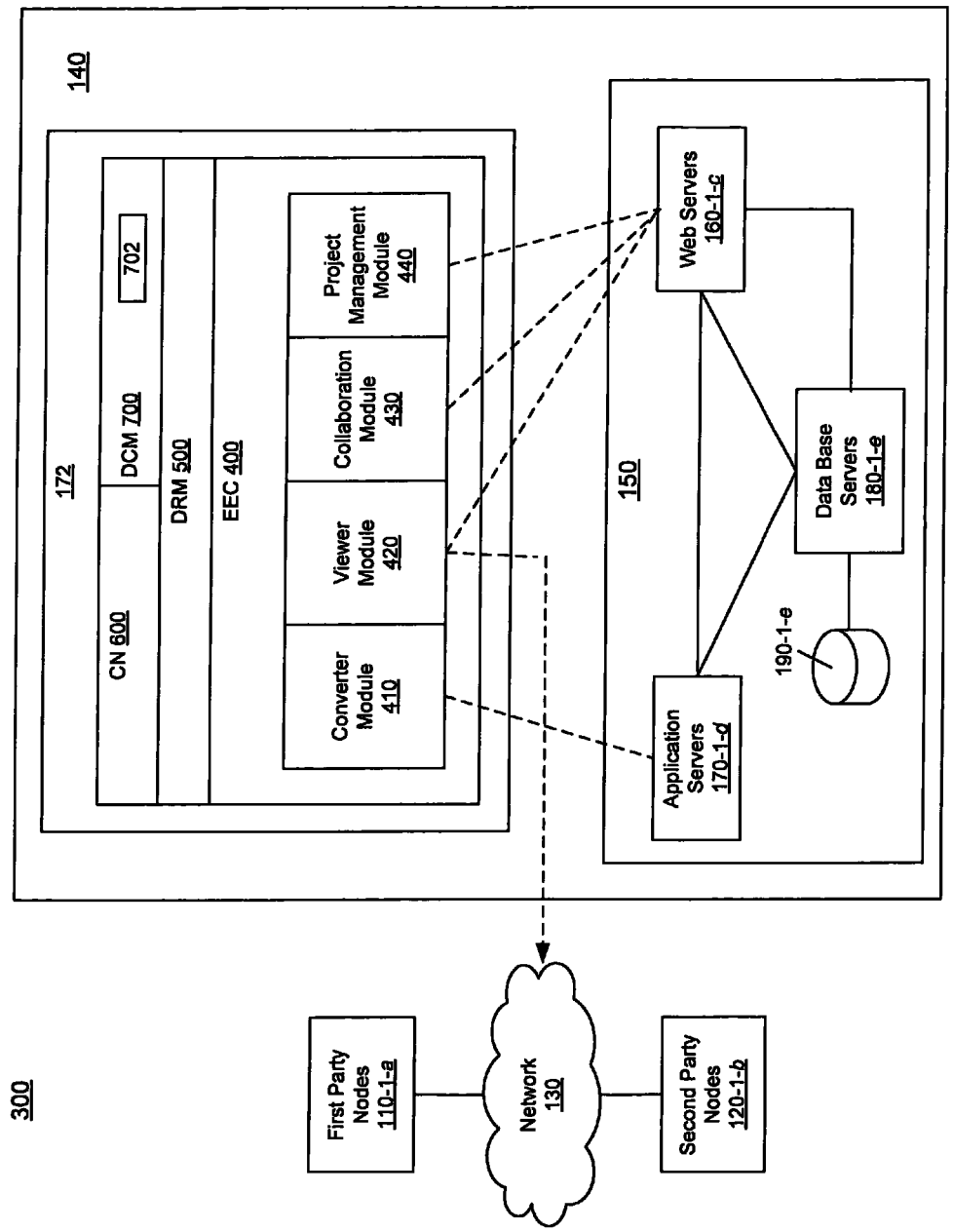
FIG. 5 is a diagram of one embodiment of the extended enterprise network.

In one embodiment, the media information upload/download module 358 enables upload/download processes between the first and second client nodes 110-1, 120-1 and the host processing node 140. These processes may comprise locating, selecting (e.g., "clicking on"), moving (e.g., "dragging"), and/or placing (e.g., "dropping") electronic files into the application framework 348, 349 hosted by one of the web servers 160-1-c (where c is any number) at the host processing node 140 and selecting the destination of the electronic files as any one of the web servers 160-1-c. In one embodiment, the application framework 348, 349 may include, communicate, and/or interface with any one of the DRM module 500, the CN module 600, the DCM module 700, and/or the EEC module 400. In one embodiment, the EEC module 400 includes the converter module 410, the viewer module 420, the collaboration module 430, and the project management module 440 as shown in FIG. 5, for example.

The compression/decompression module 360 enables the compression and decompression of files during the upload/download process. In one embodiment, files may be compressed using any known compression technique prior to or during the uploading process. In one embodiment, at the host processing node 140, the uploaded files may be de-compressed by any of the web servers 160-1-c and/or any one of the application servers 170-1-d (where d is any number).

The encryption/decryption module 362 enables the encryption/decryption of files during the upload/download process. In one embodiment, the files may be encrypted automatically prior to or during the uploading process. In one embodiment, the format files may be encrypted a using the FIPS-197 encryption. Other encryption methods may be applied to the files as the embodiments are not limited in this context. In one embodiment, at the host processing node 140, the uploaded files may be decrypted by any of the web servers 160-1-c and/or any one of the application servers 170-1-d.

Any view that is conditionally presented in the navigation frames 352, the control frames 354, and the tool bar frames 356 is determined by the selected application 370, the selected application view 372, the selected application component 374, the selected object within the navigation frame 352, and a particular user's permissions.

In one embodiment, the browsers 314, 324 are generally referred to as web browsers and include any software application that is used to locate and display web pages. The browsers 314, 324 run on the computers 310, 320, respectively, as a client program using the HTTP protocol to make requests of web servers throughout the Internet network 130 on behalf of a user. In one embodiment, the browsers 314, 324 may use the S-HTTP protocol to securely make requests of various web servers on the Internet network 130. The browsers 314, 324 enable their users to view and interact with resources available on the World Wide Web including the host processing node 140. In addition the browsers 314, 324 enable their users to download, upload, surf, or otherwise access document files (e.g., pages) on the World Wide Web including the host processing node 140. In various embodiments, the browsers 314, 324 may include Internet Explorer, Netscape, and Mozilla.

In one embodiment, the control module 318 includes a special purpose application program downloaded from the host processing node 140 that seamlessly incorporates pre-made modules such as the viewer module 420 embedded in the browsers 314, 324. In one embodiment, the control module 318 may include core technology elements of Active X controls provided by Microsoft®. The core technology elements of Active X controls may be licensed from the Open Group standards organization and may be implemented on multiple platforms and computing environments. In one embodiment, the Active X controls may be software modules based on Microsoft® Component Object Model (COM) architecture. On the Internet, Active X controls may be linked to web pages and downloaded by Active X-compliant browsers 314, 324. In one embodiment, the Active X control module 318 can provide full access to resources and application modules located at the host processing node 140.

In one embodiment, the host processing node 140 includes a host computing platform 150. In one embodiment, the host computing platform 150 provides a framework, either in hardware or software, to enable software application modules to execute. In one embodiment, the host computing platform 150 may include the computer architecture, operating system, programming languages, and associated runtime libraries to implement an extended enterprise platform. In one embodiment, the host computing platform 150 includes one or more web servers 160-1-c, one or more application servers 170-1-d, and one or more database servers 180-1-e, for example (where e is any number). The database servers 180-1-e each may include a database management system 182-1-e (DBMS). The web servers 160-1-c respond to requests from the browsers 314, 324. The application servers 170-1-d provide e-mail functionality and execute one or more functional modules 172 to process data. The database servers 180-1-e execute the DBMS systems 182-1-e. The database servers 180-1-e also store the data required by the functional modules 172, the web servers 160-1-c, and the application servers 170-1-d. The host computing platform 150 may be adapted to process one or more functional modules 172 to process information. In one embodiment, the functional modules 172 may include, for example, an extended enterprise collaboration (EEC) module 400, a digital rights management (DRM) module 500, a collaborative negotiation (CN) module 600, and a design cost management (DCM) module 700. In one embodiment, the DCM module 700 may comprise sub-module 702. These functional modules 172 may be executed individually or concurrently by various elements of host computing platform 150, for example. The embodiments are not limited in this context.

In one embodiment, the host computing platform 150 may be based on a three-tiered distribution structure, which provides separate physical tiers for functionality and scalability for the web servers 160-1-c, the application servers 170-1-d, and the database servers 180-1-e. In various embodiments, the EEC module 400 and the host computing platform 150 may be modular such that one tier may be modified or replaced without affecting the other tiers. Furthermore, each of the web servers 160-1-c, the application servers 170-1-d, and the database servers 180-1-e may be load balanced and scaled across all three tiers by separating the web services functions and the application functions from the database functions. In one embodiment, the three-tiered distribution host computing platform 150 may include a client/server architecture including three separate processes, each running on a different platform. The three separate processes execute on the web servers 160-1-c, the application servers 170-1-d, and the database servers 180-1-e. The embodiments are not limited in this context.

In one embodiment, the web servers 160-1-c may be implemented as a plurality of distributed load balanced and scalable web servers executing independently. In one embodiment, load balancing between two or more web servers 160-1-c may be implemented with network load balancing clusters. In one embodiment, the application servers 170-1-d may be implemented as a plurality of distributed load balanced and scalable application servers executing independently. In one embodiment, each of the one or more application servers 170-1-d may include two physical and two logical multithreaded processors for executing up to 20 parallel threads. In one embodiment, for example, the application servers 170-1-d each may be adapted to perform hyper-threading. Those skilled in the art will appreciate that hyper-threading is a threading technology implementation of the simultaneous multithreading technology on the Pentium 4 micro-architecture provided by Intel® Corporation (Intel®), for example. Hyper-threading refers generally to a form of super-threading provided by the Intel® Xeon processors and the Pentium 4 processors, for example. Multithreading technology may improve processor performance under certain workloads by providing useful work for execution units that would otherwise be idle.

In one embodiment, the database servers 180-1-*e* may be implemented as one or more structured query language (SQL) database servers running in a failover cluster as the database subsystem. A failover cluster implementation provides a backup operation that can automatically switch to a standby database, server or network if the primary system fails or is temporarily shut down for servicing. Failover is a fault tolerance function of systems that rely on constant accessibility. Failover automatically and transparently to the user redirects requests from a failed or disabled system to the backup system that mimics the operations of the primary system. In another embodiment, the data base servers 180-1-*e* may execute software comprising complex business logic that is applied to the data stored in the data bases 190-1-*e*. In one embodiment, the software may leverage the ability of SQL 2005 (provided by Microsoft®) to write queries in a higher level language other than SQL such as, for example, C#. In one embodiment the SQL database servers 180-1-*e* and network load balancing clusters may be provided by Microsoft® for example.

In one embodiment, the EEC module 400 includes multiple executable modules that may be executed either by the web servers 160-1-*c* or the application servers 170-1-*d*. The executable modules of the EEC module 400 perform various collaboration and sourcing processing operations at the host processing node 140. Host processing operations may include one or more operations, such as generating, managing, communicating, sending, receiving, storing forwarding, accessing, reading, writing, manipulating, encoding, decoding, compressing, decompressing, encrypting, filtering, streaming or other processing of media or control information. The embodiments are not limited in this context.

In one embodiment, the ECC module 400 includes sub-modules to facilitate sharing electronic files across the extended enterprise network 300 between collaborating resources at the first and second client nodes 110-1, 120-1. The EEC 400 sub-modules may be adapted to convert native files uploaded to the web servers 160-1-*c* in their native file format to a compressed neutral file format. With the viewer module 420, users across the extended enterprise network 300 can display the contents of files converted to the neutral file format. As used herein, a native file format refers to the format of any electronic file or document generated by a software application and stored in the unique format specified by the application. As used herein, a neutral file format refers to any electronic file or document in a format where the original content of the native file has been converted to be displayed using the viewer module 420 without the need for the original software application used to create the native file. The secure neutral format file also may be compressed to a smaller file size than the native file format and/or may be encrypted. Examples of native format files are illustrated below in the examples of Tables 1-5.

In one embodiment, the DRM module 500 is arranged to encrypt electronic files to digitally secure the contents of any electronic file prior to transmitting the file across the extended enterprise network 300. Both native format files and secure neutral format files may be encrypted with the DRM module 500. In one embodiment, user view permissions are embedded in the electronic file. Thus, an unauthorized user cannot view the content of the electronic file even if the unauthorized user has the file and the viewer module 420. In one embodiment, the encryption is FIPS-197, for example.

In one embodiment, the EEC module 400 is arranged to enable online sharing of media information such as, for example, documents including 2-D and 3-D CAD files of mechanical designs and descriptive data of the mechanical designs embedded in the CAD file. In one embodiment, the EEC module 400 may be arranged to enable annotation and markup of media information such as, for example, electronic image documents converted to the neutral file format and displayed by the viewer module 420 without modifying the original content of the electronic file. In one embodiment, the EEC module 400 enables collaboration between resources at the first and second client nodes 110-1, 120-1.

In one embodiment, the host processing node 140 of the extended enterprise network 300 is implemented as an application service provider (ASP). An ASP may be defined as an organization that offers individuals or enterprises access over the Internet (e.g., network 130) to application programs and related services that otherwise would reside in their own personal or enterprise computers (e.g., computers 310, 320). As an ASP, the host processing node 140 is arranged to provide a set of language-independent interoperability technologies that enable software components written in different programming languages to work together throughout the extended enterprise network 300. In one embodiment, the host processing node 140 provides the application framework 348, 349 to the first and second client nodes 110-1, 120-1. In one embodiment, the ASP implementation of the host processing node 140 can be realized using .NET technology provided by Microsoft®. Accordingly, the client node computers 310, 320 include a web presentation framework implemented into ASP.NET (Active Server Page) technology, also provided by Microsoft®. A built-in page controller mechanism in ASP.NET may be used to implement the presentation logic for the EEC module 400 within the ASP.NET framework. In one embodiment, the software code executing on the web servers 160-1-*c*, the application servers 170-1-*d*, and the database servers 180-1-*e* is rendered on the browsers 314, 324 (e.g., server side coding and paging).

As previously described, in one embodiment, the control module 318 includes Active X controls including COM core technology elements. When network 130 is an Internet network, the Active X control module 318 may be linked to web pages hosted by the web servers 160-1-*c*. The Active X control module 318 may be downloaded from the web servers 160-1-*c* by the Active X-compliant browsers 314, 324. The Active X control module 318 enables the browsers 314, 324 to access resources available at the host processing node 140.

Figure 4:
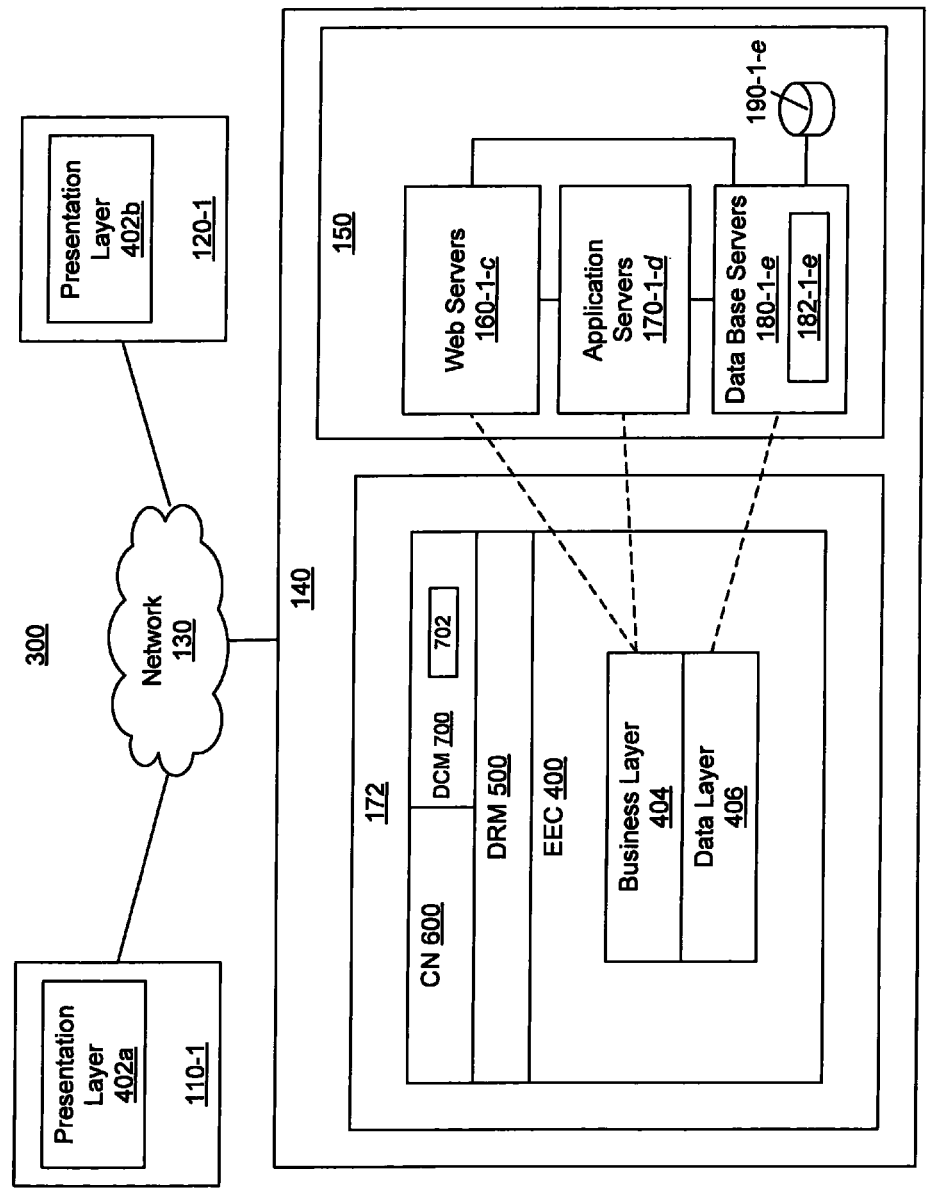
FIG. 4 is a diagram of one embodiment of the extended enterprise network.

FIG. 4 is a diagram of one embodiment of the extended enterprise network 300 illustrating the EEC module 400 logically structured as a three-layered services software application having presentation layers 402*a* and 402*b*, a business layer 404, and a data layer 406. In one embodiment, the EEC module 400 is implemented as an object-oriented application that combines data structures with functions to create re-usable objects. The term object-oriented is used to describe an application that processes different types of objects and the actions a user can take depend on what type of object the user is manipulating. In one embodiment, the presentation layers 402*a, b* may include a web presentation framework implemented into ASP.NET technology, also provided by Microsoft®. In one embodiment, the business layer 404 may include .NET business objects. In one embodiment, the data layer 406 may be based on the ADO.NET (Active X Data Objects for .NET) classes within the .NET framework to provide access to the databases 190-1-*e*.

Converter Module 410

FIG. 5 is a diagram of one embodiment of the extended enterprise network 300 illustrating multiple functional submodules of the EEC module 400 and their interaction with the web servers 160-1-*c* and the application servers 170-1-*d*. In one embodiment, the EEC module 400 includes a converter module 410, a viewer module (viewer) 420, a collaboration module 430, and a project management module 440. In one embodiment, the converter module 410 is implemented using .NET and a Message Queue Server provided by Microsoft®. The converter module 410 can be implemented with a set of .NET Microsoft® Windows® Services running in the background on the application servers 170-1-*d*. In one embodiment, the converter module 410 is arranged to convert (e.g., translate) different native files in different formats (e.g., as illustrated in the examples of Tables 1-5 illustrate examples of native files) to secure neutral format (SNF) files capable of being displayed by the viewer module 420. In one embodiment, the converter module 410 provides scalable and asynchronous messaging and supports large scale conversions of multiple native format files. The viewer module 420 provides the same functionality whether it is executed at the host processing node 140 or is downloaded to any of the first and second client nodes 110-1, 120-1. In one embodiment, the secure neutral format file may be encrypted and compressed after conversion, but before transmission to the first and second client nodes 110-1, 120-1.

Figure 6A:
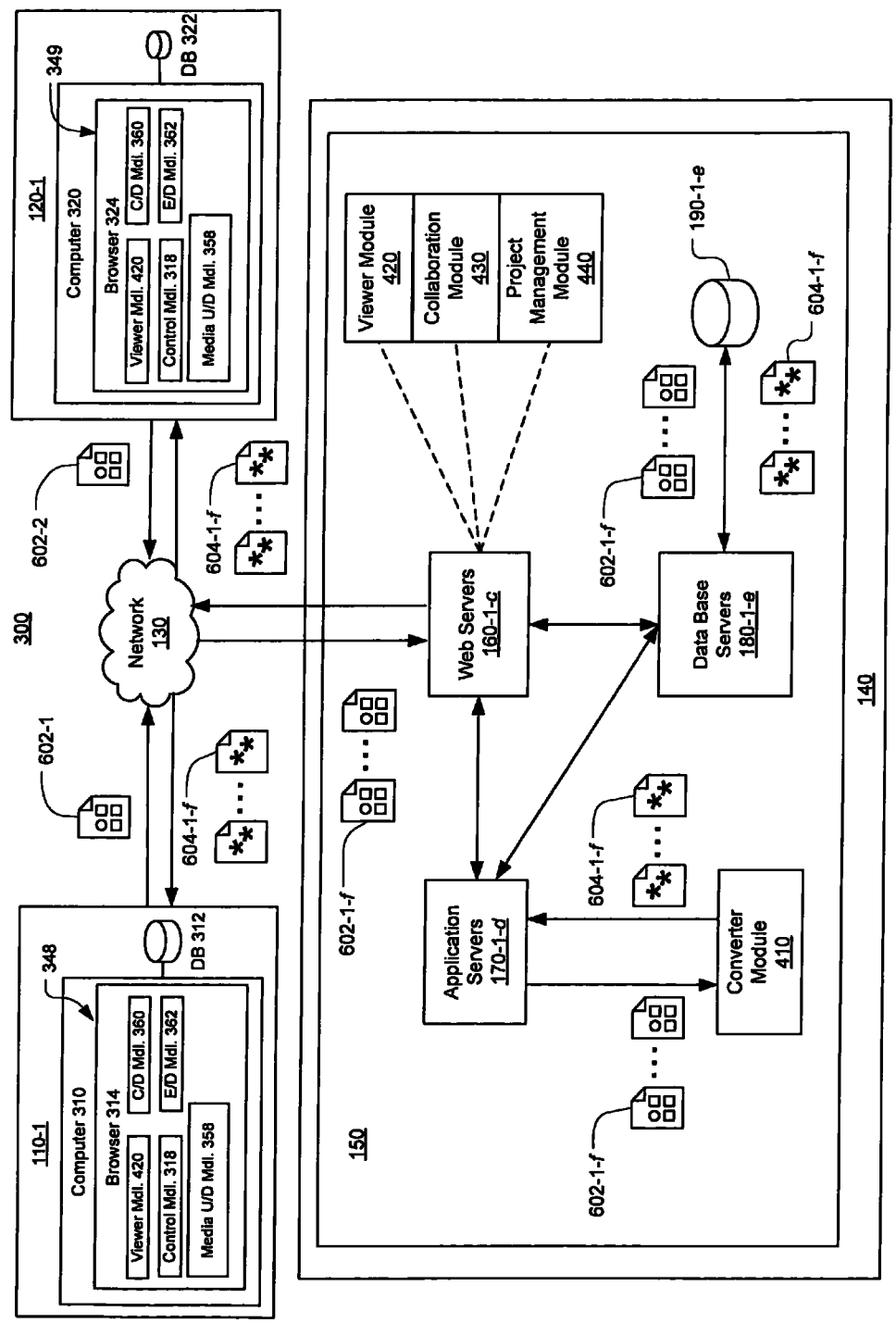
FIG. 6A is one embodiment of a transaction diagram illustrating the flow of native format files and secure neutral format files.

FIG. 6A is one embodiment of a transaction diagram illustrating the flow of native format files 602-1-*f* (where f is any number) and secure neutral format files 604-1 from and to the first and second client nodes 110-1, 120-1 and the host processing node 140 in one embodiment of the extended enterprise network 300. At the host processing node 140, the native format files 602-1-*f* are converted to the secure neutral format files 604-1-*f*, may be stored there, and made available for collaboration throughout the extended enterprise network 300. The native format files 602-1-*f* may be reside in the databases 312, 322 at the first and second client nodes 110-1, 120-1 or may reside at the host processing node 140. Native format files 602-1-*f* include media information in its native file format. Native file formats include any electronic file comprising content in various formats, including: Text (ASCII, SGML, HTML), Image (TIFF and GIF), Graphic (vectors such as DAD/CAM and GIS files), Audio (collections of bits structured according to sound wave theory), Video (MPEG), mechanical CAD design file formats, electrical/electronic CAD design (EDA/ECAD/PCB), vector based documents/graphics file formats, raster based graphics file formats, intelligent documents, and forms (XML, HTML).

Native format files 602-1-*f* may originate from repositories in any of the first and second client nodes 110-1, 120-1, and the host processing node 140. In one embodiment, a native format file 602-1 may originate from the database 312 repository located at the first client node 110-1. A native format file 602-2 may originate from the database 322 repository located at the second client node 120-1. Each of the first and second client nodes 110-1 and 120-1, and the host processing node 140 may include multiple native format files 602-1-*f* in various formats. Examples of multiple native format files 602-1-*f* and their corresponding native file formats, file extensions, versions, and file categories (e.g., CAD, Vector, Raster, intelligent office document, forms, etc.) are illustrated in the examples of Tables 1-5 below.

Figure 6B:
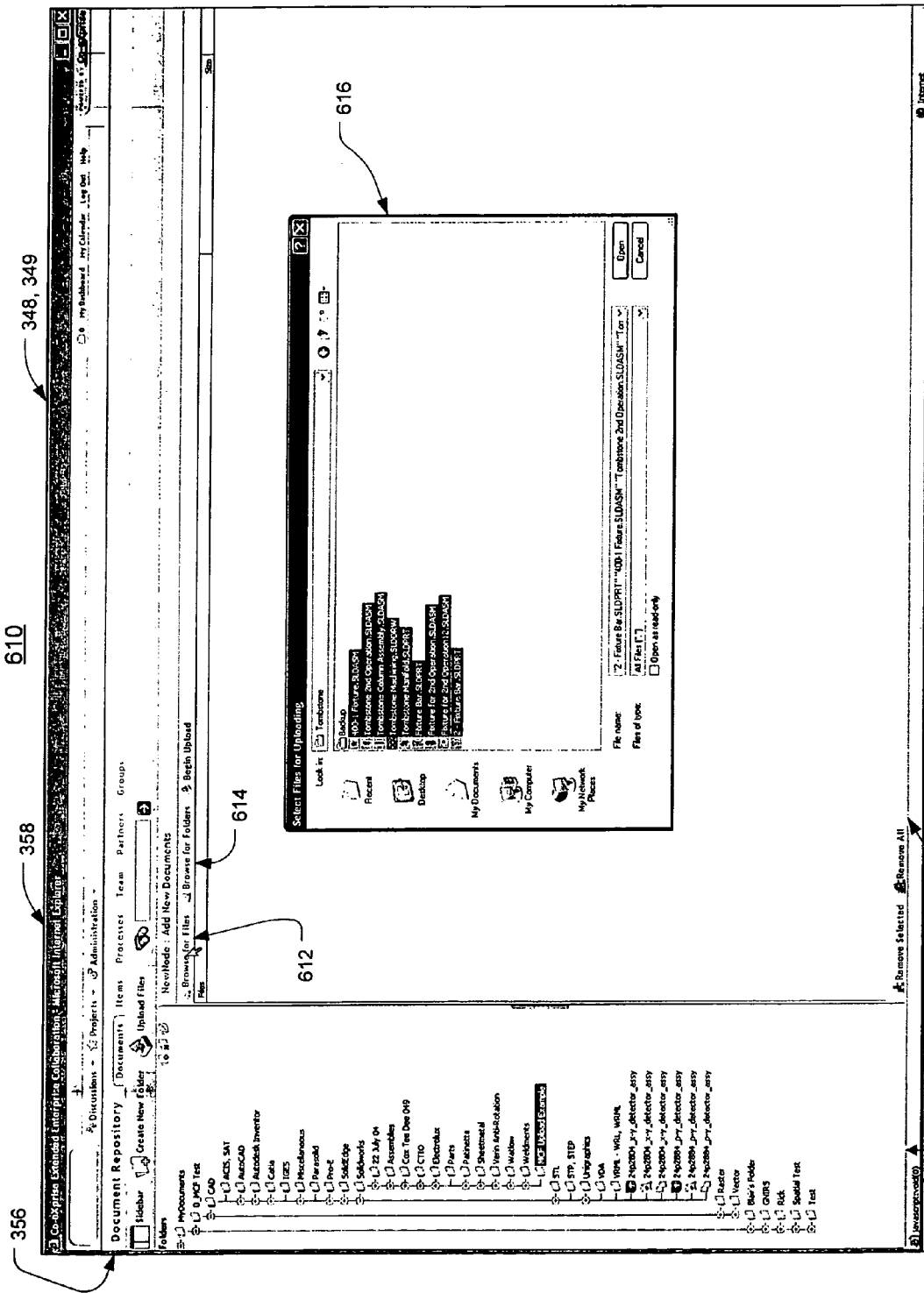
FIG. 6B is a graphical user interface of one embodiment of one instance of an application framework.
Figure 6C:
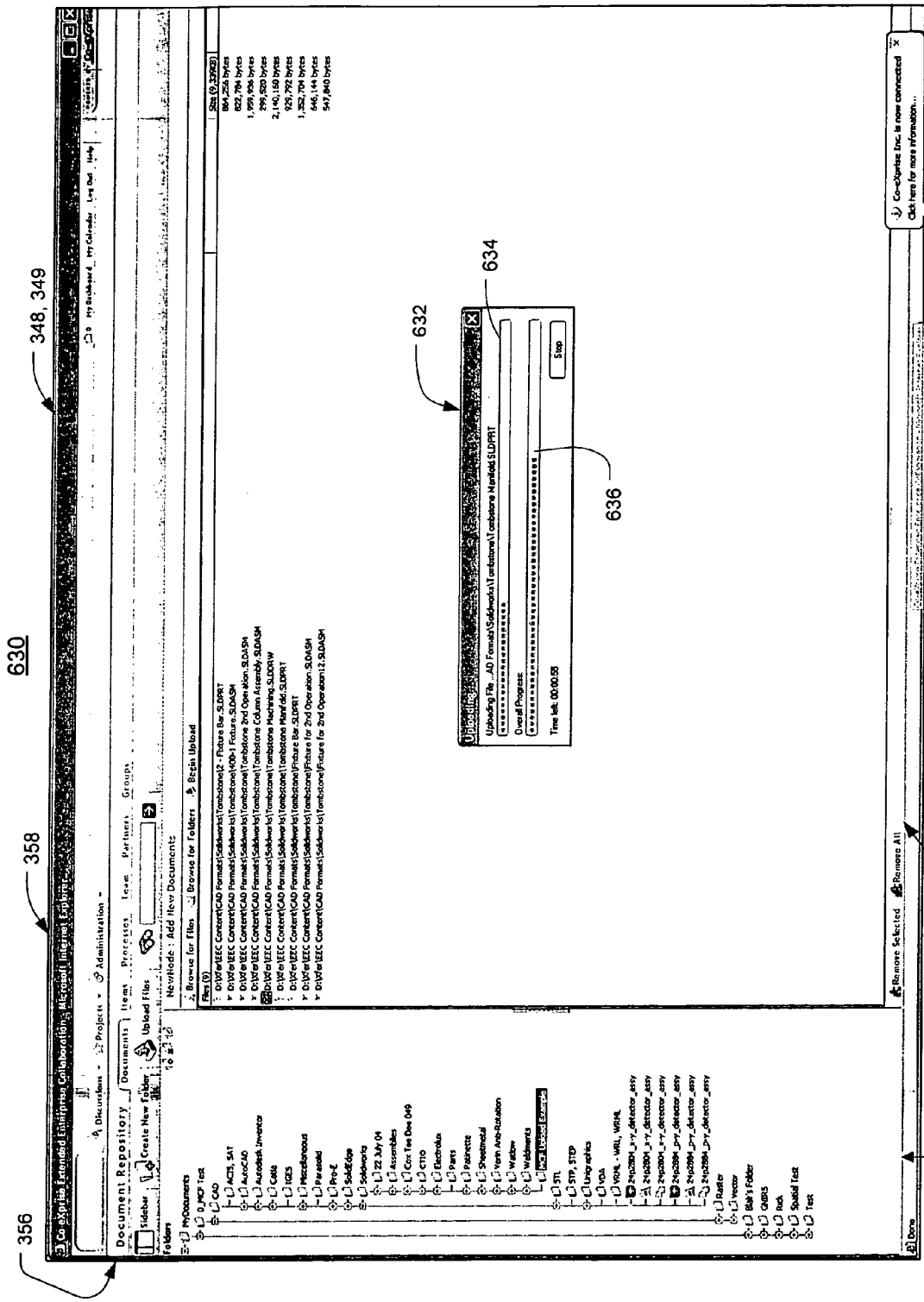
FIG. 6C is a graphical user interface of one embodiment of one instance of an application framework.
Figure 6D:
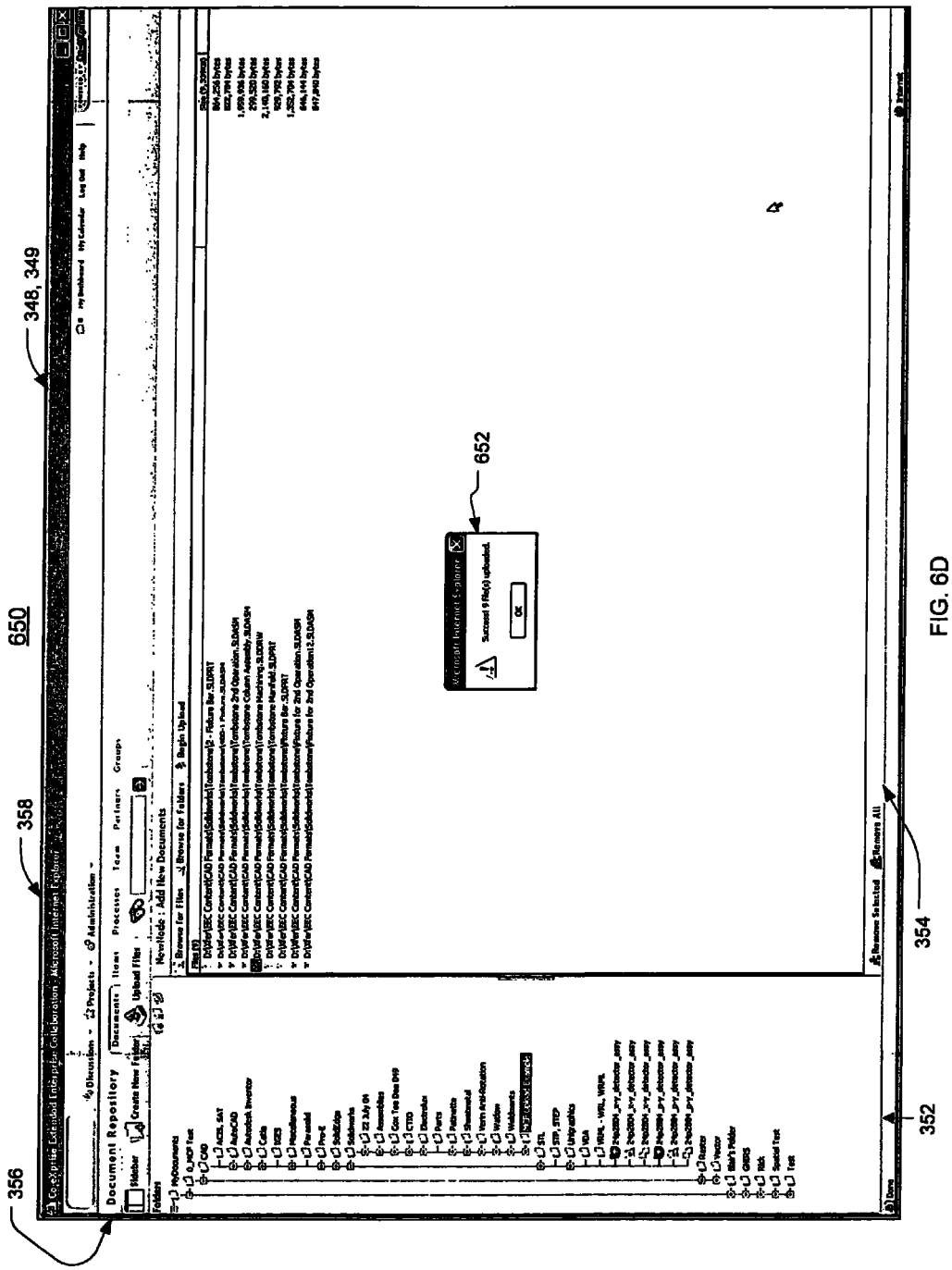
FIG. 6D is a graphical user interface of one embodiment of one instance of an application framework.

In one embodiment, an authorized user either at the first or second client nodes 110-1, 120-1 may initiate upload of native format files 602-1, 602-2 from their respective databases 312, 322. As illustrated in FIGS. 6B, 6C, and 6D, a user at the first client node 110-1 may, for example, initiate a native file upload using the application framework 348. Using the media information upload/download module 358, the upload process may include locating, selecting (e.g., "clicking on"), moving (e.g., "dragging"), and/or placing (e.g., "dropping") the native format file 602-1 into a web based application hosted by one of the web servers 160-1-*c* and selecting the destination of the native format files 602-1-*f* as any one of the web servers 160-1-*c* at the host processing node 140. In one embodiment, the web based application may include any one of the viewer module 420, the collaboration module 430, and the project management module 440. Using a similar upload process and the application framework 349, an authorized user at the second client node 120-1 may select a native format file 602-2 to upload to the host processing node 140 for conversion to a secure neutral format file 604-2. The user may select one or more native format files 602-1 to upload. Collectively, any one of or all users at the first and second client nodes 110-1, 120-1 may select and transfer a plurality of native format files 602-1-*f* to the host processing node 140 for conversion to corresponding secure neutral format files 604-1-*f*.

During the upload process, a user may provide additional input with the browser 314, 324 to indicate whether the native format files 602-1-*f* include additional information, content or association with other files. For example, the user may indicate whether the native format files 602-1-*f* include any assemblies or sub-assemblies. A user also may link the selected native format files 602-1-*f* in a business context associated with a project, item, repository, BOM or business communication. In one embodiment, the servers 160-1-*c* may host a web based application that provides a collaborative environment relating to a project-specific business context such as quoting, issue resolution, and/or new product introduction. In one embodiment, the native format files 602-1-*f* are associated with such a project specific business context.

In one embodiment, the native format files 602-1-*f* are encrypted prior to upload. In one embodiment, the files 602-1-*f* may be encrypted automatically prior to or during the uploading process. In one embodiment, the native format files 602-1-*f* may be encrypted a using the FIPS-197 encryption. Other encryption methods may be applied to the native format files 602-1-*f* as the embodiments are not limited in this context. In one embodiment, the native format files 602-1-*f* may be compressed sing any known compression technique prior to or during the uploading process.

The native format files 602-1-*f* are uploaded from any one of the client nodes 110-1, 120-1 over the network 130 (e.g., the Internet) to any one of the web servers 1601-*c* at the host processing node 140. In one embodiment, at the host processing node 140, the uploaded native format files 602-1-*f* may be decrypted and de-compressed by any of the web servers 160-1-*c* and/or any one of the application servers 170-1-*d*. If necessary, the web servers 160-1-*c* may manage broken uploads. The uploaded native format files 602-1-*f* may be stored in the databases 190-1-*e*. In one embodiment, the uploaded native format files 602-1-*f* may be transferred directly from the web servers 160-1-*c* to the application servers 170-1-*d* for format translation processing by the converter module 410.

As the extended enterprise network 300 expands, the web servers 160-1-c and the application servers 170-1-d may be load balanced to handle large volumes of incoming native format files 602-1-f for format translation processing. Thus, the one or more application servers 170-1-d may load one or more instances of the converter module 410 to translate the uploaded native format files 602-1-f. The converter module 410 translates each of the native format files 602-1-f to corresponding secure neutral format files 604-1-f. Once translated, the content of the secure neutral format file 604-1-f can be displayed by the viewer module 420 regardless of the native software application used to create the native format file 602-1-f. After conversion, the secure neutral format files 604-1-f are available for displaying and collaborating by users at the first and second client nodes 110-1, 120-1. The secure neutral format files 604-1-f may be stored in any one of the databases 190-1-e or may be downloaded to and/or stored at the first and second client nodes 110-1, 120-2 for displaying and collaborating.

Once invoked by the application servers 170-1-d, the converter module 410 automatically determines the native file format of the incoming native format files 602-1-f and translates them to corresponding secure neutral format files 604-1-f. In one embodiment, the converter module 410 automatically translates each of the native format files 602-1-f to corresponding secure neutral format files 604-1-f ready for displaying by the viewer module 420 and for collaborating. In one embodiment, the converter module 410 may be adapted to receive multiple native format files 602-1-f. Each of the multiple native format files 602-1-f may have a different native file format, as illustrated in the examples of Tables 1-5 below.

The converter module 410 also converts and populates web based applications running on any one of the one or more web servers 160-1-c with content that enables end users at the first and second client nodes 110-1, 120-1 to download the secure neutral format files 604-1-f into a context specific business applications with which the users may be collaborating. Downloading the secure neutral format files 604-1-f is generally within the context of a user-specific business application and thus does not require a user to exit an application to display and collaborate over the secure neutral format files 6041-f.

The converter module 410 provides the translation functionality to enable multiple end users at the first and second client nodes 110-1-a, 120-1-b to collaborate using the secure neutral format files 604-1-f. In one embodiment, collaboration may occur over within a project-specific business context. In one embodiment, the secure neutral format files 604-1-f also may be encrypted by the DRM module 500 for secure collaboration between the first and second client nodes 110-1, 120-1, the host processing node 140 throughout the extended enterprise network 300. The encrypted neutral file format may be referred to as a secure collaboration format, for example.

In operation, the converter module 410 reads the native format files 602-1-f. In one embodiment, the converter module 410 may process the one or more native format files 602-1-f either serially or in parallel. For simplicity, the operation of the converter module 410 is described with respect to processing a single native format file 602-1. The embodiments, however, are not limited in this context. The converter module 410 determines the native file format independent of the file extension. The native format may not be ascertained solely based on file extension alone because there may exist multiple files with the same file extension yet having different formats. Nevertheless, in one embodiment, the converter module 410 first may determine the file extension to narrow the selection of file interrogation templates to determine the native file format. Once a sub-set of possible native file formats is ascertained based on the file extension, in one embodiment, the converter module 410 verifies the structure and content of the native format file 602-1 using a template based file interrogation technique. Also, once the native file format is verified, the converter module 410 determines the actual format translation logic flow to convert the native format file 602-1 to a corresponding secure neutral format file 604-1. The converter module 410 then extracts metadata contained in the native format file 602-1. The metadata describes the file attributes of the native format file 602-1.

In one embodiment, the native format file 602-1 may be categorized into one of a 2-D graphics, raster, vector, 3-D vector, intelligent document, and/or forms (e.g., XML) file format. To determine the format of the native format file 602-1, a file format interrogation module parses the header and/or the body portion of the native format file 602-1 searching for format type indicators embedded in the file. The file format interrogation module parses the header searching for byte patterns, strings, and other format type indicators embedded in the native format file 602-1. If the native file format is a 3-D vector format, for example, the converter module 410 parses the contents of the body of the native format file 602-1 searching for key strings or byte patterns associated with 3-D CAD models.

Using the Application Program Interface (API) corresponding to the native software application used to create the native format file 602-1, the converter module 410 executes one or more sub-modules to translate the native format file 602-1 to a secure neutral format file 604-1. With the API, the one or more sub-modules extract descriptive data, which are associated with the item embedded in and/or defined by the contents of the native format file 602-1. The descriptive data may include attributes, physical properties, item features, and/or entities of the item. Item attributes may include whether the item is a sheet metal part, a circuit board, a wire harness, a weldment, and the like. Physical properties may include length, width, height, material, finish, and other properties that specify the item. Item features may associate the item with a manufacturing process used to manufacture, build, assemble or otherwise fabricate the item. Item entities may include identifiers that indicate whether the item is represented by a 2-D or 3-D CAD model. Once the item attributes, physical properties, and/or item features are extracted and/or created based on the extracted information, the converter module 410 searches a database to match the item attributes, physical properties, item features, and item entities with a supplier and/or manufacturer capable of sourcing and/or manufacturing the design. If the item includes one or more assemblies, the converter module 410 extracts the number of assemblies and the hierarchical relationship between multiple items within each assembly, and extracts the number of occurrences of a particular item that is common to one or more assemblies. Based on the extracted information, the converter module 410 may determine if all the native format files associated with the item were received in the upload and notifies the user if any files or data are missing. Once all the item attributes, physical properties, and item features are extracted from the native format file 602-1, the converter module 410 creates a corresponding secure neutral format file 604-1. The converter module 410 extracts the descriptive data from the native format file 602-1 to create an image of the item and a list of item attributes, physical properties, and item features that may be displayed with the viewer module 420 within the application framework 348, 349. If the native format file 602-1 contains an assembly, the secure neutral format file 604-1 includes a representation of the assembly views that are displayed as an assembly tree by the application framework 348, 349. The assembly tree view displays the relationship between each item within an assembly and may include a display of the item, description, revision, quantity roll-up, and other information. The secure neutral format file 604-1 contains embedded information about the item to enable the viewer module 420 to graphically display the item views as was originally intended to be displayed using the native CAD software application used to create the item. The graphics display information also may include information about whether an item is linked to a manufacturing process and may create additional multiple views and/or additional item attributes, physical properties, and/or item features of the item that may not have been contained in the native format file 602-1 as part of the original item. The additional views may include, for example, flattening and folding of sheet metal components, weldments, and other features. In one embodiment, the original view of the native format file 602-1-$f$ may be saved as one secure neutral format file 604-1-$f$ and the additional view of the native format file 602-1-$f$ may be saved as a separate secure neutral format file 604-1-$f$. Additional item attributes, physical properties, and/or item features may include, for example, the length, width, and/or thickness associated with the additional item views.

Tables 1-5 below illustrate several examples of native format files 602-1-$f$ that may be converted to secure neutral format files 604-1-$f$ by the converter module 410. For each of the native format files 602-1-$f$, the examples of Tables 1-5 illustrate the native software application used to generate it, a brief description of the file type, file extension, version, and file category. As used herein, a file category indicates whether the native format file is a CAD, vector or raster formatted file. It should be understood that the examples illustrated in Tables 1-5 are a non-exhaustive exemplary list of native format files 602-1-$f$ and is not intended to limit the scope of the embodiments in this context.

Table 1 below illustrates examples of mechanical CAD design native format files that may be supported in one embodiment of the converter module 410.

TABLE 1

| Native File Format Application | Description | File Extension | Versions | File Category (CAD, Vector Raster) |
|---|---|---|---|---|
| 3D Studio ™ | 3D Studio files | *.3ds | Any | CAD 2D/3D |
| AutoDesk DXF format | DXF (Drawing Exchange Format | *.dxf *.dxb | Autodesk Compliant DXF R12 to Autocad 2005 | CAD 2D/3D |
| AutoDesk DWG format | DWG drawing and models from Autodesk ™ | *.dwg | Autocad Compliant DWG. R12 to Autocad 2005 | CAD 2D/3D |
| AutoDesk DWF format | DWF (Drawing Web Format) drawing files from AutoDesk AutoCAD and AutoDesk Inventor | *.dwf | Any | CAD 2D |
| AutoDesk Mechanical Desktop ™ | Native Autodesk Mechanical Desktop ™ files from Autodesk Mechanical Desktop ™ | *.dwg | Up to v6 | CAD 2D/3D |
| AutoDesk Inventor ™ | Autodesk Inventor ™ parts, assemblies and drawings | *.ipt *.iam *.idw | Inventor R5, R5.3, R7, R8 | CAD 2D/3D |
| Auto-trol Raster | Auto-trol Raster Cad Storage | *.dx | Any | CAD Raster |
| Auto-trol Vector | Auto-trol Vector Cad Storage | *.dg | Any | CAD Vector |
| ACIS ™ SAT | SAT files generated by Spatial Technologies ACIS ™ Autodesk Autocad ™, Cadkey ™, IronCAD ™, Ashlar-Vellum, Alibre, Carl Zeiss, Futaba, IronCAD, Trace Software, | *.sat | Up to ACIS ™ v5 | CAD 2D/3D |
| Bentley Microstation ™ | Supports Native DGN Format and AutoCAD ™ DWG for parts, assemblies and drawings | *.cit *.dgn *.dwg *.rle | Up to MicroStation ™ V8 2004 Edition | CAD 2D/3D |
| CADKEY | Kubotek | *.prt | Any | CAD 2D/3D |

TABLE 1-continued

| Native File Format Application | Description | File Extension | Versions | File Category (CAD, Vector Raster) |
|---|---|---|---|---|
| Dassault Systèmes Catia ™ | Native Catia ™ 3D entities produced on Windows and Unix versions of Catia ™ | *.model *.exp | Export: V3R25 to V4.X Model: 4R11 to V5R13 | CAD 2D/3D |
| HP-CAD ME10 | HP CAD ME10 (through version 10) Co-Create File Format | *.cmi *.mi | Through version 10 | |
| IGES | (Initial Graphics Exchange Specifications) IGES 2D & 3D. All entities supported, including wireframe, trimmed surfaces, text, dimensions, colors, etc. | *.igs *.iges | Up to Ver. 5.3 | CAD 2D/3D |
| PTC Pro/Engineer ™ | Native PTC Pro/Engineer ™ part and assembly files | *.prt *.asm *.xpr *.xas | Parts and assemblies from rel. 18 to rel. 2001 | CAD 2D/3D |
| SolidWorks ™ | Native SolidWorks ™ parts, assemblies, drawings and sheet metal models | *.sldprt *.sldasm *.sldlfp *.slddrw | From v. 97+ to v. 2004 | CAD 2D/3D |
| STEP | STEP files compliant with AP203 and AP214 Standard for the Exchange of Product Model Data | *.stp *.step | AP203 AP214 ISO10303 | CAD 2D/3D |
| STL Stereolithography | STL files both binary and ASCII | *.stl | Any | CAD 3D |
| UGS SDRC I-DEAS ™ | I-DEAS ™ Web Access files are supported including assemblies. Crushed ASCII (*.MCA) files can also be exported from I-DEAS ™. | *.idi *.idz *.mca | Any | CAD 2D/3D |
| UGS Unigraphics ™ | Parasolid solids from native Unigraphics ™ parts and assemblies. | *.prt | From v. 13 to v. 18. Uncompressed format only | CAD 2D/3D |
| UGS SolidEdge ™ | Native SolidEdge ™ parts, sheet metal, assemblies and drawings. | *.par *.asm *.psm *.dft | Up to Ver. 13 | CAD 2D/3D |
| UGS Parasolid ™ | Parasolid X_T files as exported by Unigraphics ™, SolidEdge ™, SolidWorks ™, PTC Pro/Desktop ™, and several other CAD/CAM systems. | *.x_t *.xmt_txt | Up to v. 15. | CAD 3D |
| VDA-FS | VDA-FS (Verband Der Automobilindustrie Flachen Schnittstelle) | *.vda | V. 2.0 | CAD 2D/3D |
| VRML | All the VRML (Virtual Reality Modeling Language) 1.0 and 2.0 files | *.wrl *.wrml | V. 1.0 and V. 2.0 | CAD 3D |
| Wavesoft ™ | | *.mot | Any | CAD 3D |
| XGL/ZGL Extensible Graphics Language | Microstation, Rhino, Helix MicroCadam, Inventor, Okino | *.xgl *.zgl | Any | CAD 3D |

Table 2 below illustrates examples of electrical/electronic CAD design native format files that may be supported by the converter module 410.

TABLE 2

| Native Format File Application | Description | File Extension | Versions | File Category (CAD, Vector, Raster) |
|---|---|---|---|---|
| Accel, PCAD 200x Layout Read | PCAD2000, Accel EDA, Tango | *.pcb | Accel, PCAD up to 2002 | Electronics PCB |
| Cadence Allegro | Cadence Allegro, Print Circuit Board Layout | *.brd *.pad *.sym *.rte | All | Electronics PCB |
| Cadence Allegro | Print Circuit Board Layout | *.ipf | All | Electronics PCB |
| Calay Prisma Layout | Various, Print Circuit Board Layout Neutral Interchange Format | *.pcb | Prisma V05 | Electronics PCB |
| Dansk Electronics | DDE Layout Read SuperMax DDE | *.dde | All | Electronics PCB |
| EDIF V200 to 400 | Various, Print Circuit Board Layout Neutral Interchange Format | *.edif | All | Electronics Logic Design |
| Technomatix | FABmaster FATF Read | *.fatf | All | Electronics PCB |
| GenCAD Read | Genrad GenCAD Data | *.cad | All | Electronics PCB |
| GenCAM | Various Industry Standard | *.gcm | Industry Standard | Electronics PCB |
| Gerber | Industry Standard RS-274, RS-274D GerbTools, ViewMate and CamTastic | *.gbr *.plt *.plo | Industry Standard | Electronics PCB |
| IPC 350/356/356A Read | Various Industry Standard IPC-D-350 IPC-D-356 | *.ipc | Industry Standard | Electronics PCB |
| Mentor Board Station V8 Read | Mentor Graphics Board Station | *.prt *.net *.wir *.cmp | All | Electronics PCB |
| Mentor Neutral File Read | Mentor Graphics Board Station | *.neu | All | Electronics PCB |
| ODB++ Read | Valor | *.odb | Genesis 2000 Enterprise 3000 Trilogy 5000 | Electronics PCB |
| OrCAD (.min) Layout Plus Read | OrCAD, Masstek | *.min | All | Electronics PCB Layout |
| PADS (.asc) Layout Read | Innoveda | *.asc | PADS PCB PADS Pro PADS 2000 | Electronics PCB Layout |
| PCAD PDI Layout Read | Protel - PCAD Design | *.pdf | All | Electronics PCB Layout |
| Protel Text Read | Protel PCB | *.pcb | PCB V2.8/V3/V4 | Electronics PCB Layout |
| Scicards/Encore (CII) Layout Read | Harris EDA Encore Scicards | *.cii | All | Electronics PCB Layout |
| Theda (.tl) Layout, Panel Read | Zuken, Incases, Theda | *.tl | All | Electronics PCB Layout |
| UniCAM PDW Read | Technomatix UniCAM | *.pdw | All | Electronics PCB Layout |
| Veribest EIF Layout Read | Mentor Graphics | *.eif | Veribest 98 and Prior | Electronics PCB Layout |
| Zuken CR5000 Board Designer Read | Zuken-Redac Board Designer | *.ftf *.pcf | All | Electronics PCB Layout |

TABLE 2-continued

| Native Format File Application | Description | File Extension | Versions | File Category (CAD, Vector, Raster) |
|---|---|---|---|---|
| Zuken PWS (CR3000/CR5000) Layout Read | Zuken-Redac PWS | *.bsf<br>*.udf<br>*.mdf<br>*.wdf<br>*.wsf<br>*.ccf<br>*.pma | All | Electronics PCB Layout |

Table 3 below illustrates examples of vector based graphics native format files that may be supported by the converter module 410.

TABLE 3

| Native Format File Application | Description | File Extension | Versions | File Category (CAD, Vector, Raster) |
|---|---|---|---|---|
| CAD Overlay | Vector - Raster Hybrid for PDM Archive | *.rlc | All | CAD Vector Raster 2D |
| Calcomp Plotters | Calcomp 906/907 Plot File | *.906<br>*.907 | All | Vector 2D |
| Computer Graphics Metafile | CGM - Computer Graphics Metafile ANSI/ISO 8632.1-4: | *.cgm | All | Vector 2D |
| DRW | Micrografx Designer CAD/CAM/CAE | *.drw | | Vector 3D 2D |
| EPS | Encapsulated PostScript File | *.eps | All | Vector 2D |
| HPGL (Hewlett Packard) Plotter Format | HPGL (Hewlett-Packard Graphics Language) and HPGL/2 files. | *.000<br>*.gl<br>*.gl2<br>*.hp<br>*.hpg<br>*.hgl<br>*.hpgl<br>*.plt | All | Vector 2D |
| PCL (Hewlett Packard) | Printer Command Language Format (PCL) | *.pcl<br>*.prn<br>*.prt | Version 3.0 and 5.0 | Vector 2D |
| PDF - Adobe | Adobe - Portable Document Format | *.pdf | All | Vector 2D |
| VWPG | Vector Word Perfect Graphics (VWPG) is a Vector format created by Corel Supported in Corel Draw 8. | *.vwpg | All | Vector 2D |
| WMF | Microsoft Windows Metafile | *.wmf<br>*.emf | All | Vector 2D |

Table 4 below illustrates examples of raster based graphics native format files that may be supported by the converter module 410.

TABLE 4

| Native Format File Application | Description | File Extension | Versions | File Category (CAD, Vector, Raster) |
|---|---|---|---|---|
| Bitmap | (Microsoft Windows) | *.bmp | All | Raster |
| CALS (Group IV) | CCITT Group 4 (Compressed Tif) Navy Raster MIL-R-28002B | *.cal<br>*.cg4<br>*.gp4<br>*.mil | All | Raster |

TABLE 4-continued

| Native Format File Application | Description | File Extension | Versions | File Category (CAD, Vector, Raster) |
|---|---|---|---|---|
| CGM | Computer Graphics Metafile | *.cgm | All | Raster |
| DCX (multipage) | DCX = 3D multiple PCX files | *.dcx | All | Raster |
| EDCARS US Dept of Defense | Engineering Data Computer Automated Retrieval System | *.edc | All | Raster |
| Formtek Raster | Formtek Raster CALS compliant | *.ftk | All | Raster |
| GIF | CompuServe Graphic Interchange Format | *.gif | All | Raster |
| ISO-8613 CALS | Open Document Interchange Format ISO-8613 CALS | *.iso *.cal | All | Raster |
| JPEG Compressed Image | Joint Photographic Experts Group JPEG, JPEG-2000 | *.jpg *.jpeg | All | Raster |
| PCX - PC Paintbrush | ZSoft - Run Length Encoding (RLE). | *.pcx | All | Raster |
| PNG | Portable Network Graphic Format Lossless 48 Bit format with Compression | *.png | All | Raster |
| DIF | GSA - Raytheon G4/ Navy DIF | *.dif | All | Raster |
| TIF | Tagged Image File Format | *.tif *.tiff | All | Raster |
| RAS | Sun Raster File | | All | Raster |
| FAX | CITT Group 3 Fax | *.fax | All | Raster |
| EDMICS | Engineering Data Management Information and Control System EDMICs is also known as CALS4 | *.edm *.tg4 *.img | All | CAD Raster |
| GTX Group III, IV GTX Group IV Raster | Raster to Vector Cad Applications | *.g3 *.g4 *.cg4 | All | CAD Raster |
| GTX Runlength | Raster to Vector Cad Applications | *.rnl | All | Raster |

Table 5 below illustrates examples of intelligent document native format files that may be supported by the converter module 410.

TABLE 5

| Native Format File Application | Description | File Extension | Versions | File Category (CAD, Vector, Raster) |
|---|---|---|---|---|
| CDR | Corel Draw | *.cdr | All | Vector |
| SHW | Corel Presentations | *.shw | All | Vector |
| HTML | Hyper Text Markup Language | *.html *.htm | All | Vector |
| IAF - Interleaf | Broadvision - Interleaf Quicksilver | *.iaf | All | Vector |
| XLS | Microsoft Excel | *.xls | All | Vector |
| PPT | Microsoft PowerPoint | *.pps *.ppt | All | Vector |
| MPP | Microsoft Project | *.mpp | All | Vector |
| VSD | Microsoft Visio | *.vsd | All | Vector |
| DOC | Microsoft Word | *.doc | All | Vector |
| SXW | OpenOffice Text Document | *.sxw | All | Vector |
| SXC | OpenOffice Spreadsheet Document | *.sxc | All | Vector |
| SXI | OpenOffice Presentation Document | *.sxi | All | Vector |
| SXD | OpenOffice Drawing Document | *.sxd | All | Vector |

TABLE 5-continued

| Native Format File Application | Description | File Extension | Versions | File Category (CAD, Vector, Raster) |
|---|---|---|---|---|
| SXM | OpenOffice Word Document | *.sxm | All | Vector |
| PageMaker | | *.p65 | All | Vector |
| WB1 | Quattro Pro | *.wb1 *.wb2 *.wq1 | All | Vector |
| RTF | Rich Text Format | *.rtf | All | Vector |
| SAM | Samna Word, Lotus Ami-Pro | *.sam | All | Vector |
| WRI | Windows Write | *.wri | All | Vector |
| WPx | WordPerfect | *.wp5 *.wp6 *.wpd *.wpf | All | Vector |
| WS | WordStar | *.ws | All | Vector |

FIGS. 6B-D illustrate embodiments of various graphical user interfaces 610, 630, 650. Each of the graphical user interfaces 610, 630, 650 represents one embodiment of one instance of the application framework 348, 349. The application framework 348, 349 may include one or more navigation frames 352, one or more command and control frames 354, and one or more tool bar frames 356. The control module 318 manages the inter-process communication and synchronizes the events between the navigation frames 352, the command and control frames 354, and the tool bar frames 356.

FIG. 6B is a graphical user interface 610 of one embodiment of one instance of the application framework 348, 349 employing the media information upload/download module 358 for uploading native format files 602-1-$f$ from the first and second client nodes 110-1-$a$, 120-1-$b$ to the host processing node 140. Within the command and control frame 354 a user can browse for files using the browse for files tab 612 or may browse for folders using the browse for folders tab 614 to access the native format files 602-1-$f$ for uploading. A graphical user interface 616 is displayed within the command and control frame 354. The graphical user interface 616 is for selecting the native format files 602-1-$f$ files for uploading from the client side computer 310, 320, for example. In the illustrated embodiment, the user selected nine (9) native format files 602-1-9 for uploading. When the native format files 602-1-9 files are selected the user may initiate the uploading process by selecting the begin upload tab 618.

FIG. 6C is a graphical user interface 630 of one embodiment of one instance of the application framework 348, 349 employing the media information upload/download module 358 for uploading native format files 602-1-$f$ to the host processing node 140. Once the uploading process is initiated, the user can monitor the process of the upload on the user computer 310, 320. In one embodiment, a graphical user interface 632 is displayed within the command and control frame 354. A first indicator bar 634 within the graphical user interface 632 displays the uploading progress of a current native format file 601-1. A second indicator bar 636 within the graphical user interface 632 displays the overall uploading progress of all the native format files 602-1-9 selected for uploading.

FIG. 6D is a graphical user interface 650 of one embodiment of one instance of the application framework 348, 349 employing the media information upload/download module 358 for uploading native format files 602-1-$f$ to the host processing node 140. Once the uploading process is completed, the user can receive feedback as to whether the uploading process was successful. Accordingly, in one embodiment, when the uploading process completed successfully, a graphical user interface 652 is displayed within the command and control frame 354. In the illustrated embodiment, the graphical user interface 652 indicates that the nine (9) native format files 602-1-9 were successfully uploaded.

Figure 7:
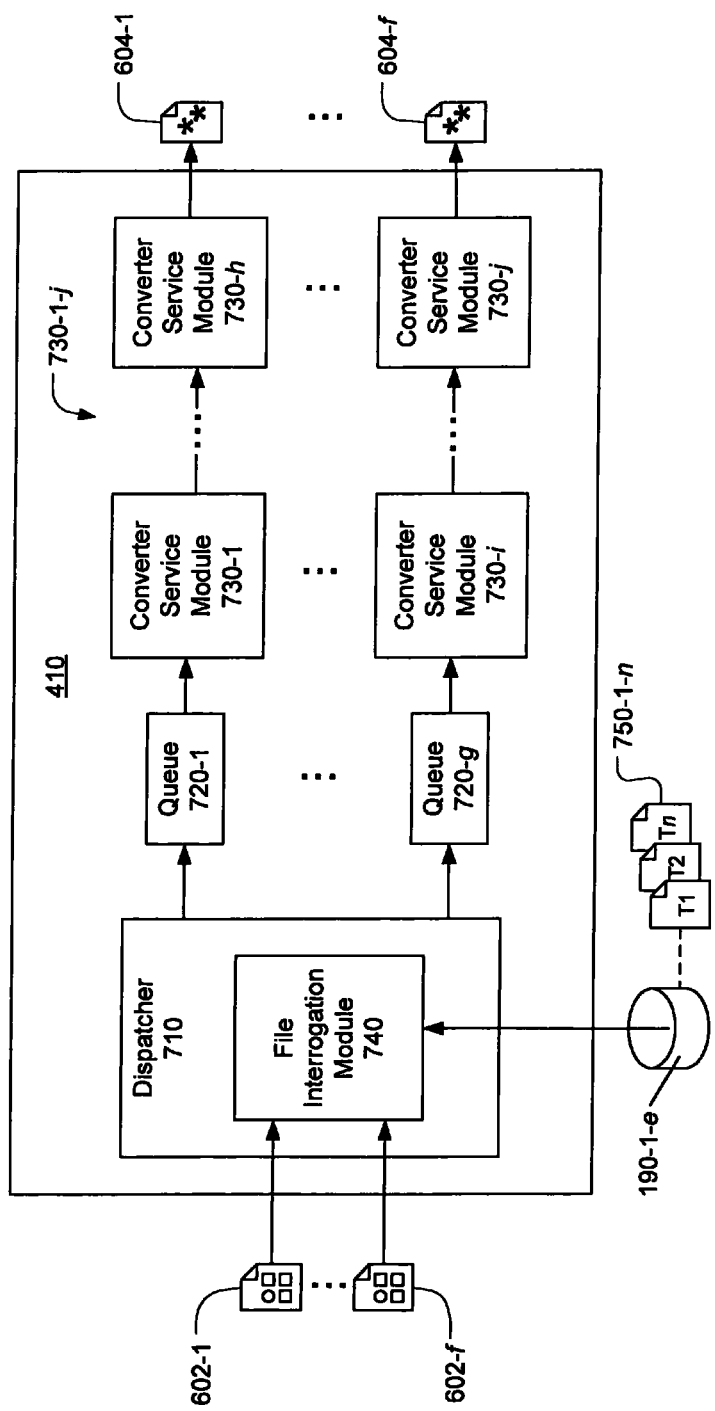
FIG. 7 is a diagram of one embodiment of a converter module.

FIG. 7 is a diagram of one embodiment of the converter module 410. As shown, the converter module 410 includes a dispatcher 710, one or more queues 720-1-$g$ (where g is any number), and one or more converter service modules 730-1-$j$ (where j is any number). In one embodiment, the converter service modules 730-1-$j$ may be executed by one or more of the load balanced application servers 170-1-$d$, for example. In one embodiment, the converter service modules 730-1-$j$ may represent multiple instances of a converter service module to translate native file formats to a neutral file format.

In one embodiment, the dispatcher 710 is a module to identify the format of the native format files 602-1-$f$ (e.g., as illustrated in the examples of Tables 1-5) to be translated and to select one or more converter service modules 730-1-$j$ to translate the native format to the secure neutral format. Once the native file format of an input native format file 602-1 is identified, the dispatcher 710 sends the native format file 602-1 to one or more converter service modules 730-1-$j$ to be translated to the corresponding secure neutral format file 604-1. In one embodiment, if there are multiple input native format files 602-1-$f$ the dispatcher 710 may send the files to the one or more queues 720-1-$g$, which may be adapted as first-in first-out data structures to process multiple demands from the dispatcher 710. In one embodiment, the queues 720-1-$g$ may be adapted such that later arriving native format files 602-1-$f$ are added to the tail of the queues 720-1-$g$ and the converter service modules 730-1-$j$ take the native format files 602-1-$f$ that arrived earlier from the head of the queues 720-1-$g$.

In one embodiment, the dispatcher 710 includes a file interrogation module 740. The file interrogation module 740 receives the native format files 602-1-$f$ and determines their native file formats. In one embodiment, determining the format of the native format file 602-1 may include applying one or more individual rule engines or combinations thereof to the native format file 602-1. The rule engines may include one or more executable modules collectively referred to herein as the file interrogation module 740. In one embodiment, the file interrogation module 740 applies a series of templates 750-1-*n* against the header and the body portions of the native format files 6021-*f* In one embodiment, the templates 750-1-*n* may reside in the databases 190-1-*e*. Once the native file format is determined, the file interrogation module 740 selects one or more of the converter service modules 730-1-*j* to translate the native format files 602-1-*f* to corresponding secure neutral format files 604-1-*f* In one embodiment, for each of the native format files 602-1-*f*, the converter service modules 730-1-*j* load the API of the software application used to create the native format files 602-1-*f*. The converter service modules 730-1-*j* use the facilities provided by the native software application to extract the contents of the native format files 602-1-*f*. For example, extract the image and the descriptive data of the design embedded in the native format files 602-1-*f*.

Figure 8:
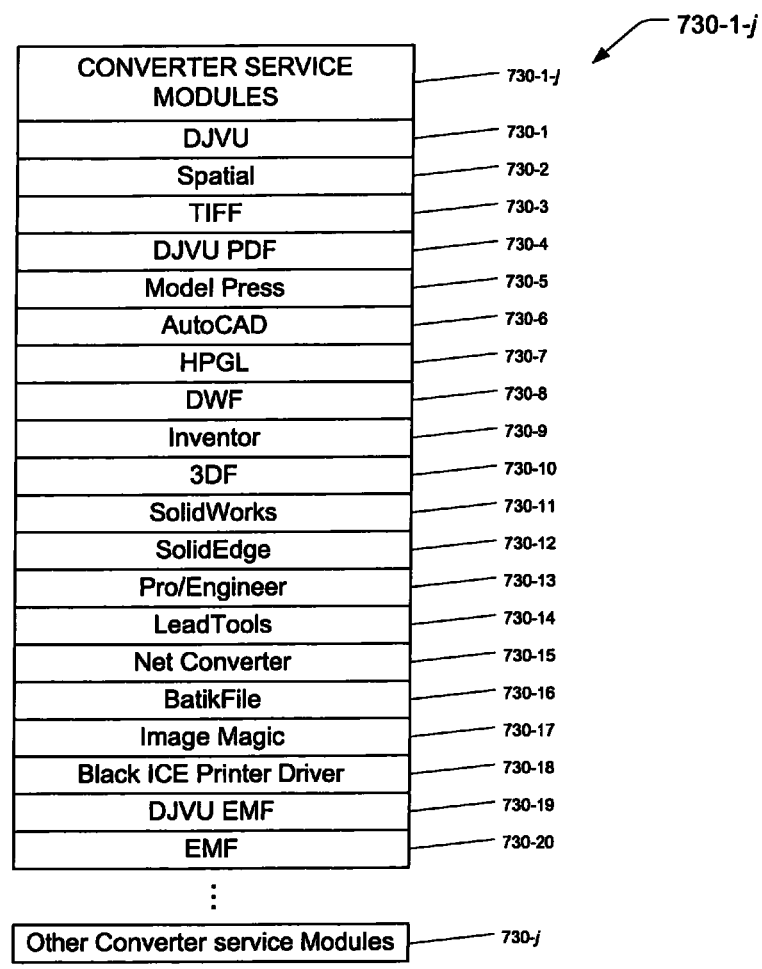
FIG. 8 illustrates embodiments of converter service modules.

FIG. 8 illustrates embodiments of converter service modules 730-1-*j* that may be used in the translation process, for example. It should be understood, however, that additional or fewer converter service modules 730-1-*j* may be provided without limiting the scope of the various embodiments of the converter module 410 described herein.

In one embodiment, the DJVU converter service module 730-1 may translate Windows Bitmap, Graphics Interchange Format (GIF), JPEG File Interchange Format, Portable Network Graphics, Tagged Image File Format (TIFF), Portable Gray Map File, Portable Bit Map File, Portable Pixel Map File, Portable Any Map File, Adobe Portable Document Format (PDF), and Apple McIntosh File native file formats to the secure neutral file format.

In one embodiment, the Spatial converter service module 730-2 may translate Hewlett Packard Graphics Language File Format (HPGL), Initial Graphics Exchange Specification (IGES 2-D) format, Computer Graphics Metafile, STEP 2-D, Stereolithography Interface Format, Verband der Automobilindustrie (German Automobile Industry Association), and Virtual Reality Modeling Language native file formats to the TIFF intermediate file format, which then may be processed by the TIFF converter service module 730-3.

In one embodiment, the TIFF converter service module 730-3 may translate Spatial 730-2, LeadTools 730-14, Net Converter 730-15, and Batik File 730-16 to the DJVu intermediate file format, which then may be processed by the DJVu converter service module 730-1.

In one embodiment, the DJVU PDF converter service module 730-4 may translate the TIFF and PDF formats to the secure neutral file format.

In one embodiment, the Model Press converter service module 730-5 may translate Initial Graphics Exchange Specification (IGES 3-D), the STEP 3-D, 3D Studio File, HOOPS Stream File, Extensible Graphics Language, and ACIS native file formats to the secure neutral file format.

In one embodiment, the AutoCAD converter service module 730-6 may translate AutoCAD, AutoCAD Drawing Exchange, and Drawing Exchange native file formats to the HPGL intermediate file format, which then may be processed by the TIFF converter service module 730-3.

In one embodiment, the HPGL converter service module 730-7 may translate AutoCAD 730-6, DWF 730-8, Inventor 730-9, SolidWorks 730-11, SolidEdge 730-12, and Pro/Engineer 730-13 formats to the Spatial intermediate file format, which then may be processed by the Spatial converter service module 730-2.

In one embodiment, the DWF converter 730-8 service module may translate the AutoDesk Design Web native file format to the HPGL intermediate file format, which then may be processed by the HPGL converter service module 730-7.

In one embodiment, the Inventor converter service module 730-9 may translate the AutoDesk Inventor Drawing native file format to the HPGL intermediate file format, which then may be processed by the HPGL converter service module 730-7. The Inventor converter service module 730-9 also may translate AutoDesk Inventor Part and AutoDesk Inventor Assembly native file formats to the 3DF intermediate file format, which then may be processed by the 3DF converter service module 730-10.

In one embodiment, the 3DF converter service module 730-10 may translate the Inventor 730-9, SolidWorks 730-11, SolidEdge 730-12, and Pro/Engineer 730-13 to the Model Press intermediate file format, which then may be processed by the Model Press converter service module 730-5 format input.

In one embodiment, the SolidWorks converter service module 730-11 may translate the SolidWorks Drawing native file format to the HPGL intermediate file format, which then may be processed by the HPGL converter service module 730-7. The SolidWorks converter service module 730-11 also may translate SolidWorks Part and SolidWorks Assembly native file formats to the 3DF intermediate file format, which then may be processed by the 3DF converter service module 730-10.

In one embodiment, the SolidEdge converter service module 730-12 may translate the SolidEdge Draft native file format to the HPGL intermediate file format, which then may be processed by the HPGL converter service module 730-7. The SolidEdge converter service module 730-12 also translates SolidEdge Part, SolidEdge Assembly, SolidEdge Sheet Metal Part, and SolidEdge Weldment native file formats to the 3DF intermediate file format, which then may be processed by the 3DF converter service module 730-10.

In one embodiment, the Pro/Engineer converter service module 730-13 may translate the Pro/Engineer Drawing native file format to the HPGL intermediate file format, which then may be processed by the HPGL converter service module 730-7. The Pro/Engineer converter service module 730-13 also translates the Pro/Engineer Part and Pro/Engineer Assembly native file formats to the 3DF intermediate file format, which then may be processed by the 3DF converter service module 730-10.

In one embodiment, the LeadTools converter service module 730-14 may translate JPEG-2000 Code Stream bitmap, JPEG-2000 JP2, Windows Metafile, Targa BitMap, Computer Aided Acquisition and Logistics Support Raster, Graphics Multipage PCX Bitmap, ZSoft PCX Bitmap, and Encapsulated Post Script native file formats to the TIFF intermediate file format, which then may be processed by the TIFF converter service module 730-3.

In one embodiment, the Net Converter converter service module 730-15 may translate Windows Metafile and Windows Icon native file formats to the TIFF intermediate file format, which then may be processed by the TIFF converter service module 730-3.

In one embodiment, the BatikFile converter service module 730-16 may translate the Scalable Vector Graphics native file format to the TIFF intermediate file format, which then may be processed by the TIFF converter service module 730-3.

In one embodiment, the Image Magic converter service module 730-17 may translate Kodak PhotoCD Bitmap and Sun Raster Bitmap native file formats to the secure neutral file format.

In one embodiment, the Black ICE Printer Driver converter service module 730-18 may translate the Microsoft Word, Excel, Power Point, Project, and VISIO native file formats to the EMF intermediate file format, which then may be processed by the EMF converter service module 730-20.

In one embodiment, the DJVU EMF converter service module 730-19 may translate the Windows Exchange Metafile native file format to the secure neutral format.

In one embodiment, the EMF converter service module 730-20 may translate the output from the Black Ice Printer Driver converter service module 730-18 to the LeadTools intermediate file format, which then may be processed by the LeadTools converter service module 730-14.

Any number of other converter service modules 730-$j$ may be employed to implement translations from any native or intermediate file format to the secure neutral file format. The embodiments are not limited in this context.

Figure 9A:
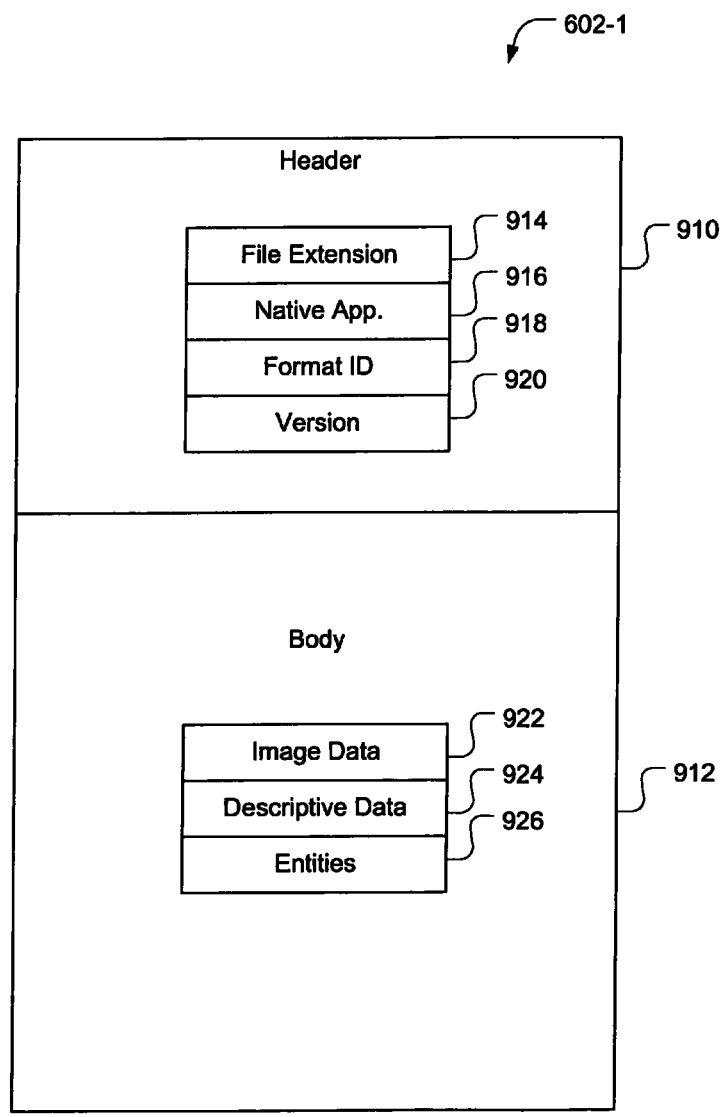
FIG. 9A is one embodiment of a structure of a native format file.
Figure 9B:
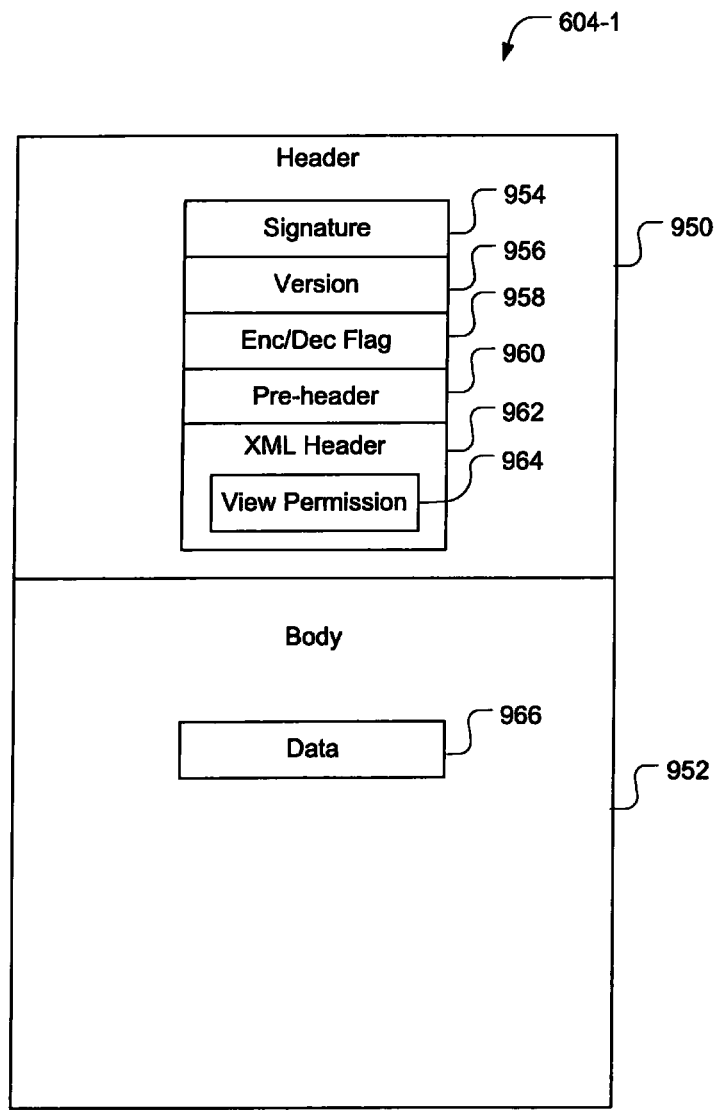
FIG. 9B is one embodiment of a structure of a secure neutral format file.

To simplify the description of the operation of one embodiment of the converter service modules 730-1-$j$ herein, reference is now made to FIGS. 9A, 9B, which are diagrams illustrating the file structures of a native format file 602-1 and a secure neutral format file 604-1, respectively. FIG. 9A is one embodiment of a structure of a native format file 602-1. As shown, the native format file 602-1 includes a header 910 and a body 912. The header 910 and the body 912 each may include multiple elements. The header 910 includes information in the form of byte patterns, strings, and/or a combination of both. Portions of the header 910 information may be associated with the format of the native format file 602-1 and may include the file extension 914, the name of the native application 916 used to create the native format file 602-1, an identifier 918 associated with the native application, and/or the version number 920 of the native application, among other information, for example. The body 912 may include information in the form of byte patterns, strings, and/or a combination of both. Portions of the body 912 information may be associated with the content of the native format file 602-1. For example, the body 912 may contain information about an image 922 and descriptive data 924 of a design object and/or entities 926 that indicate whether the design object is a 2-D or a 3-D CAD design.

FIG. 9B is one embodiment of a structure of a secure neutral format file 604-1. As shown, the secure neutral format file 604-1 includes a header 950 and a body 952. The header 950 and the body 952 each may include multiple elements. The header 910 includes a signature element 954, the file version number 956, an encryption/compression flag 958, a pre-header 960, an XML header 962, and the XML header 962 includes user view permissions 964. The body includes a data section 966. In the header 950 portion, the signature element 954 identifies that it is a secure neutral format file 604-1. The signature 954 is read by the viewer module 420 to ensure that it is reading a secure neutral format file 604-1. The encryption/compression flag 958 identify the type of encryption and compression used. The pre-header 960 describes instructions to read the file type and size of the data section 966 in the body 952. In one embodiment, the pre-header 960 may include the number of files contained in the secure neutral format file 604-1, the original native file type and format of the translated native format file 602-1, the type of secure neutral format file (e.g., 2-D, 3-D, XML, forms) and the start and size of each file contained in the data section 966. The XML header 962 describes attributes of the secure neutral format file 604-1 and may include the view state of the graphic image, file properties, image properties, and offline caching. In the body 952 portion, the data section 966 includes binary files contained in the secure neutral format file 604-1, the number of files and the starting address and length of each of the files.

Figure 10:
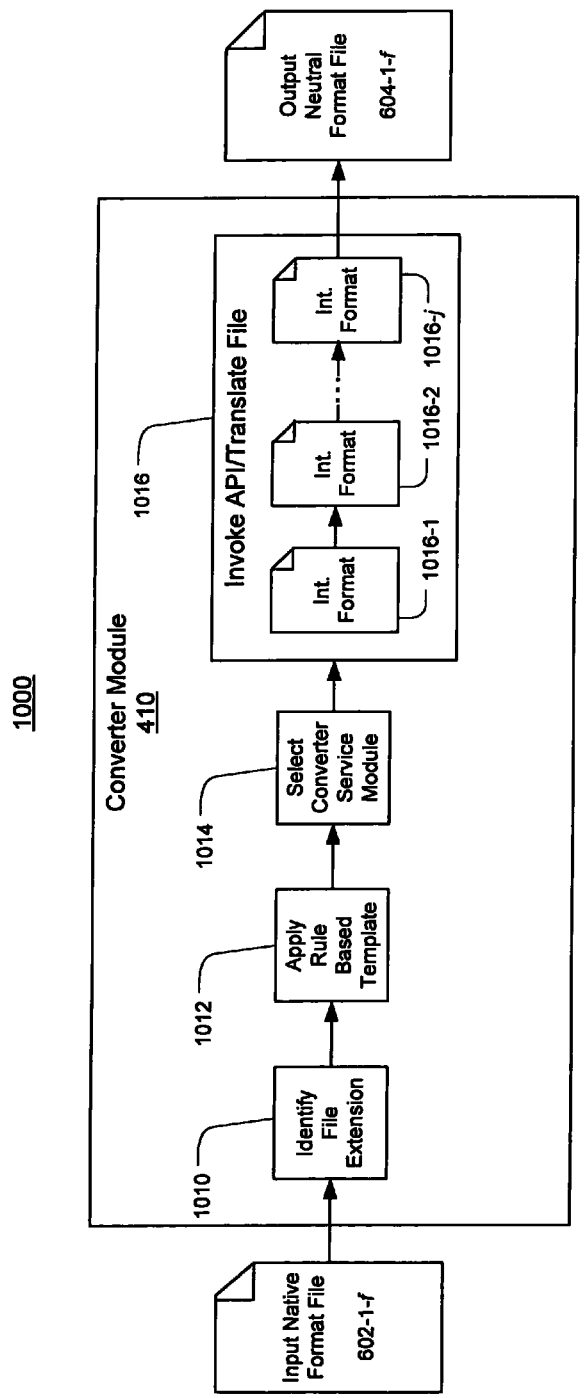
FIG. 10 is one embodiment of a file conversion flow diagram.

FIG. 10 is one embodiment of a file conversion flow diagram 1000 illustrating the process for converting input native format files 602-1-$f$ to the converter module 410 and providing output secure neutral format files 604-1-$f$. In one embodiment, the converter module 410 receives one or more native format files 602-1-$f$ to be converted, where each file may have a different native file format. For simplicity, the operation of the converter module 410 is described with respect to processing a single native format file 602-1. The remaining native format files 602-2-$f$ may be converted in parallel by invoking multiple execution threads of the converter module 410 in the application servers 170-1-$d$. In one embodiment, the remaining native format files 602-2-$f$ may be converted in the sequence they are received in, may be categorized for conversion, may be converted in any non-specific order, and/or any combination thereof.

The native format file 602-1 is received by the converter module 410 and, in one embodiment, the file interrogation module 740 identifies (1110) the file extension. Although the file extension is not required to translate the native format file 602-1, identifying the file extension reduces the number of predefined templates 750-1-$n$ to be applied to the header 910 and the body 912. It should be appreciated by those skilled in the art that the file extension alone may not be an adequate indicator for selecting one of the converter service module 730-1-$j$. There are many native format files 602-1-$f$ that have the same file extension, but have different native file formats. As an example, Cadence, Unigraphics, and ProEngineer CAD software applications each generate native CAD files with a *.PRT extension. Each of these native applications, however, has a different format and requires a different converter service module 730-1-$j$ to translate. Nevertheless, because the number of native format files 602-1-$f$ that have the same file extension is a sub-set of the population of native format files 602-1-$f$ supported by the converter service modules 730-1-$j$, identifying the file extension reduces the total number rule based templates 750-1-$n$ to be invoked to identify the file format. Thus, the file interrogation module 740 selects and invokes one or more rule templates 750-1-$n$ based on the file extension and selects the appropriate converter service modules 630-1-$j$. Once the file extension is identified, a sub-set number of rule templates 750-1-$n$ is identified based on the file extension and these rule templates 750-1-$j$ are applied to the native format file 602-1.

After reading the file extension of the native format file 602-1 and identifying a subset of the rule templates 750-1-$n$, the file interrogation module 740 invokes a multithreaded instantiation of the sub-set of the rule templates 750-1-$n$ on one or more of the application servers 170-1-$d$. In one embodiment, the multiple rule templates 750-1-$n$ may be parallel processed across the one or more application servers 170-1-$d$ or may be serially processed. In one embodiment, for example, each of the one or more application servers 170-1-$d$ may execute five threads against each processor unit 210-1-$p$ (FIG. 2) to expedite the conversion process. The file interrogation module 740 applies (1012) one or more predefined templates 750-1-$n$ and compares the contents of the header 910 and/or body 912 to the template. The file interrogation module 740 reads the contents of the header 910, the body 912, or both, of the native format file 602-1. The contents are then compared to the multiple predefined templates 750-1-$n$ to identify the native file format. In various embodiments, the file interrogation module 740 includes the application of multiple rule engines including using templates including at least some information about known native file formats and comparing the contents of the header 910 and the body 912 to the information defined in the templates 750-1-$n$. In general, a different template may be defined for each native file format. In one embodiment, the file interrogation module 740 processes the native format file 602-1 with the templates 750-1-*n* using various matching based rules such as byte pattern, global string, logical function such as a Boolean logic function, a content based identifier, and/or any combinations of these rules or all of these rules. In one embodiment, the template based rule engine may be an extensible markup language (XML) based file format interrogator, for example. It should be appreciated that these rules are merely provided as examples and the scope of the converter module 410 is not limited in this context.

In one embodiment, after the file interrogation module 740 determines the format of the native format file 602-1, it selects (1014) one or more of the converter service modules 630-1-*j* based on the identified native file format. The native format file 602-1 may be dispatched to one or more of the queues 720-1-*g* for further processing. The dispatcher 710 sends the file to the one or more selected converter service modules 730-1-*j* for translation to the corresponding secure neutral format file 604-1. In one embodiment, for example, the file interrogation module 740 may select a converter service module 730-1 to perform a direct translation. Accordingly, the converter service module 730-1 is invoked and executed in a single or multi-threaded manner to extract the desired content of the native format file 602-1 required to generate the corresponding secure neutral format file 604-1.

The service modules 630-1-*j* invoke the native API and translate (1016) the native format file 602-1 to the secure neutral format file 604-1. To perform the translation, the converter service module 730-1 invokes the API of the software application used to generate the native format file 602-1 and extracts the graphic image and descriptive data content of the native format file 602-1. The graphic image and descriptive data content of the native format file 602-1 may define an item having a certain structure with properties, attributes, and manufacturing features. As previously described the term "item" refers to any mechanism, device, instrument, machine, machinery or assembly or components, elements, sections, materials or resources needed to build, construct, manufacture, assemble or fabricate a product represented by digital information that forms a portion of the content of the native format file 602-1. For example, the converter service module 730-1-*j* may extract information associated with various properties of the item as may be defined by the content of the native format file 602-1. For example, the content may define an item structure. The structure may be defined by certain properties, attributes, and manufacturing features. In one embodiment, the converter service module 730-1-*j* also may extract information about features as may be defined by the content of the native format file 602-1. The features are associated with the manufacturing process employed to create the item. The manufacturing process may include, for example, stamping, casting, circuit board fabrication, packaging, general fabrication, machining, molding, welding, among various other services normally associated with the design, manufacture, and distribution of an item. Based on the identified file format, the service modules 630-1-*j* may translate (1016-1, 1016-2, 1016-*j*) the native format file 602-1 into one or more intermediate file formats prior to outputting the secure neutral format file 604-1 because there may not be a direct converter service module 630-1-*j* to perform a direct translation. The embodiments are not limited in this context.

Several examples of applying the rule based templates 750-1-*n* are now described. In one embodiment, the file interrogation module 740 may apply a byte pattern rule template 750-1 to the header 910 portion of the input native format file 602-1. Accordingly, the file interrogation module 740 reads the contents of the header 910 and compares the contents at predetermined positions within the header 910 to one or more predefined byte patterns that are characteristically associated with a particular native file format. For example, byte patterns that are characteristically associated with any one of the known native file formats as illustrated in the examples of Tables 1-5. The file interrogation module 740 identifies the format of the native format file 602-1 when there is a match between the byte pattern defined in the byte pattern rule template 750-1, for example, and the contents of the header 910 at the predetermined positions of the native format file 602-1. The conversion process then continues to one or more of the converter service modules 730-1-*j* that correspond to the particular identified format. As previously discussed, the translation process may include one or more intermediate translations before arriving at the output secure neutral format file 604-1 that corresponds to the input native format file 602-1.

An example XML based byte pattern rule template 750-1 to identify a "Windows Bitmap" type raster file with a *.BMP extension is shown below:

```
"Windows Bitmap (*.BMP) XML Template Rule"
<Rules>
<FrontBlock>
<Pattern><Bytes>424D</Bytes>
<ASCII>BM</ASCII>
<Pos>0</Pos>
</Pattern>
<Pattern><Bytes>0000000000</Bytes>
<Pos>5</Pos>
</Pattern>
<Pattern><Bytes>0000</Bytes>
<Pos>12</Pos>
</Pattern>
<Pattern><Bytes>000000</Bytes>
<Pos>15</Pos>
</Pattern>
<Pattern><Bytes>0000</Bytes>
<Pos>20</Pos>
</Pattern>
<Pattern><Bytes>00000100</Bytes>
<Pos>24</Pos>
</Pattern>
<Pattern><Bytes>0000000000</Bytes>
<Pos>29</Pos>
</Pattern>
<Pattern><Bytes>00</Bytes>
<Pos>37</Pos>
</Pattern>
<Pattern><Bytes>0000</Bytes>
<Pos>40</Pos>
</Pattern>
<Pattern><Bytes>0000</Bytes>
<Pos>44</Pos>
</Pattern>
<Pattern><Bytes>0000</Bytes>
<Pos>48</Pos>
</Pattern>
<Pattern><Bytes>0000</Bytes>
<Pos>48</Pos>
</Pattern>
<Pattern><Bytes>0000</Bytes>
<Pos>52</Pos>
</Pattern>
</FrontBlock>
</Rules>
```

If no match is found using the byte pattern rule template 750-1, in one embodiment, the file interrogation module 740 may apply a global string pattern rule template 750-2 to the header 910 and the body 920 portions of the input native format file 602-1. Accordingly, the file interrogation module 740 reads the contents of the header 910 and the body 920 and compares the contents against one or more predefined template string patterns characteristically associated with a particular native file format. These may include strings that are characteristically associated with any one of the known native file formats as illustrated in the examples of Tables 1-5. The file interrogation module 740 identifies the format of the native format file 602-1 when there is a match between the string pattern rule template 750-2 and the contents of the header 910 and/or body 920 of the native format file 602-1. The conversion process then continues to one or more of the converter service modules 730-1-*j* that correspond to the particular identified format. As previously discussed, the translation process may include one or more intermediate translations before arriving at the output secure neutral format file 604-1 that corresponds to the input native format file 602-1.

An example XML based global string pattern rule template 750-2 to identify a "SolidEdge Assembly" type vector file with a *.ASM extension is shown below:

```
"SolidEdge Assembly (*.ASM) XML Template Rule Engine"
<FrontBlock>
    <Pattern><Bytes>
D0CF11E0A1B11AE1000000000000000000000000000000
0003E000300FeFF090006000000000000000000000000</Bytes>
    <Pos>0</Pos>
    </Pattern>
</Frontblock>
<GlobalStrings>
<String>Solid Edge</String>
</GlobalStrings>
</Rules>
```

If no match is found using either the byte pattern rule template 750-1 or the global strings rule template 750-2, in one embodiment, the file interrogation module 740 may apply a Boolean logic function, such as a logic "OR" function, rule template 750-3 to the header 910 and the body 920 portions of the native format file 602-1. Accordingly, the file interrogation module 740 reads the contents of the header 910 and the body 920 and performs a logic "OR" function against one or more specific byte or string patterns that are characteristically associated with a particular native file format. These may include bytes or strings that are characteristically associated with any one of the known native file formats as illustrated in the examples of Tables 1-5. The file interrogation module 740 identifies the format of the native format file 602-1 when the "OR" function produces a byte or string pattern match between the Boolean logic rule template 750-3 and the contents of the header 910 and/or body 920 of native format file 602-1. The conversion process then continues to one or more of the converter service modules 730-1-*j* that correspond to the particular identified format. As previously discussed, the translation process may include one or more intermediate translations before arriving at the output secure neutral format file 604-1 that corresponds to the input native format file 602-1.

An example XML based Boolean "OR" rule template 750-3 to identify an "AutoCAD" type vector file with a *.DWG extension is shown below:

```
"AutoCAD (*.DWG) XML Template Rule Engine"
<FrontBlock>
<Or Patterns>
```

-continued

```
<OrPattern>
<Bytes>4143312E3530</Bytes>
<ASCII>AC1.50</ASCII>
<Pos>0</Pos>
</OrPattern>
<OrPattern>
<Bytes>414331303036</Bytes>
<ASCII>AC1006</ASCII>
<Pos>0</Pos>
</OrPattern>
<OrPattern>
<Bytes>414331303039</Bytes>
<ASCII>AC1009</ASCII>
<Pos>0</Pos>
</OrPattern>
<OrPattern>
<Bytes>414331303132</Bytes>
<ASCII>AC1012</ASCII>
<Pos>0</Pos>
</OrPattern>
<OrPattern>
<Bytes>414331303134</Bytes>
<ASCII>AC1014</ASCII>
<Pos>0</Pos>
</OrPattern>
<OrPattern>
<Bytes>414331303135</Bytes>
<ASCII>AC1015</ASCII>
<Pos>0</Pos>
</OrPattern>
<OrPattern>
<Bytes>414331303138</Bytes>
<ASCII>AC1018</ASCII>
<Pos>0</Pos>
</OrPattern>
</OrPatterns>
</FrontBlock>
</Rules>
```

If no match is found using the byte pattern rule template 750-1, the global strings rule template 750-2 or the Boolean logic rule template 750-3, in one embodiment, the file interrogation module 740 may apply a 2-D content based identifier (code check) rule template 750-4 to the header 910 and the body 920 portions of the native format file 602-1. Accordingly, the file interrogation module 740 reads the contents of the header 910 and the body 920 and compares the contents against the 2-D content based identifiers in the form of specific byte or string patterns that are characteristically associated with a particular native file format. These may be bytes or strings that are characteristically associated with any one of the known native file formats as illustrated in the examples Tables 1-5. The file interrogation module identifies the format of the native format file 602-1 when the 2-D content based identifiers match a byte or string pattern in the header 910 and/or body 920 portion matches 2-D drawing specific content associated with a 2-D design in the native format file 602-1. The conversion process then continues to the one or more of the converter service modules 730-1-*j* that correspond to the particular identified format. As previously discussed, the translation process may include one or more intermediate translations before arriving at the output secure neutral format file 604-1 that corresponds to the input native format file 602-1.

An example XML 2-D content based identifier (referred to herein as code check) rule template 750-4 to identify a 2-D "Initial Graphics Exchange Specification (IGES)" type vector file with a *.IGES or *.IGS extension is shown below:

```
"Initial Graphics Exchange Specification 2-D (*.IGES) XML Template
Rule Engine"
    <FrontBlock>
    <Pattern>
    <Bytes>53</Bytes>
    <ASCII>S</ASCII>
    <Pos>72<Pos>
    </Pattern>
    <Pattern>
    <Bytes>31</Bytes>
    <ASCII>1</ASCII>
    <Pos>79<Pos>
    </Pattern>
    </FrontBlock>
    <CodeCheck>
    <AssemblyName>Function.2D </AssemblyName>
    <ObjectName>Function.2D. 2DRule</ObjectName>
    </CodeCheck>
    </Rules>
```

If no match is found using the byte pattern rule template 750-1, the global strings rule template 750-2, the Boolean logic rule template 750-3 or the 2-D content based identifier rule template 750-4, in one embodiment, the file interrogation module 740 may apply a 3-D content based identifier (code check) rule template 750-5 to the header 910 and the body 920 portions of the native format file 602-1. Accordingly, the file interrogation module 740 reads the contents of the header 910 and the body 920 and compares the contents against the 3-D content based identifiers in the form of specific byte or string patterns that are characteristically associated with a particular native file format. These may be bytes or strings that are characteristically associated with any one of the known native file formats as illustrated in the examples of Tables 1-5. The file interrogation module identifies the format of the native format file 602-1 when the 3-D content based identifiers match a byte or string pattern in the header 910 and/or body 920 portion matches 3-D drawing specific content associated with a 3-D design in the native format file 602-1. The conversion process then continues to the one or more of the converter service modules 730-1-j that correspond to the particular identified format. As previously discussed, the translation process may include one or more intermediate translations before arriving at the output secure neutral format file 604-1 that corresponds to the input native format file 602-1.

An example XML 3-D content based identifier (referred to herein as code check) rule template 750-5 to identify a 3-D "Initial Graphics Exchange Specification" type vector file with a *.IGES or *.IGS extension is shown below:

```
"Initial Graphics Exchange Specification 3-D (*.IGES) XML Template
Rule Engine"
    <FrontBlock>
    <Pattern>
    <Bytes>53</Bytes>
    <ASCII>S</ASCII>
    <Pos>72<Pos>
    </Pattern>
    <Pattern>
    <Bytes>31</Bytes>
    <ASCII>1</ASCII>
    <Pos>79<Pos>
    </Pattern>
    </FrontBlock>
    <CodeCheck>
    <AssemblyName>Function.3D </AssemblyName>
    <ObjectName>Function.3D. 3DRule</ObjectName>
    </CodeCheck>
    </Rules>
```

In the code check process, to determine whether the file is a 2-D or a 3-D file the file interrogation module 740 may look for content based identifier referred to as 3-D entities that may be associated with a 3-D file. If no 3-D entities are matched, the file interrogation module 740 defaults to a 2-D file. These 3-D entities may include, for example, the following IGES entity mapping for 2-D and 3-D geometry determination and attribute extraction. For example, the interrogation module 740 may parse the code for entity attributes associated with items such as: angular dimension, diameter dimension, general label, general note, linear dimension, radius dimension, general symbol, section, drawing, and view, for example. The file interrogation module 740 also may parse the code for 3-D entities associated with the item such as: parametric spline surface, ruled surface, surface of revolution, tabulated surface, rational bspline surface, curve on a surface, bounded surface, trimmed surface, plane surface, right circular conical surface, and toroidal surface, for example. The file interrogation module 740 also may parse the code for solid 3-D entities associated with the item such as a manifold solid object, for example.

Other rule templates 750-6-n may be applied to identify multiple format types not discussed above. The embodiments are not limited in this context.

Following are two additional examples of rule templates 750-6, 750-7 that may be applied once the file extension is identified. As previously described, Pro/Engineer and Unigraphics CAD applications each generate native files with a *.PRT extension even though the native file formats for these two CAD files are different and cannot be converted using the same converter service module.

An example XML rule based template 750-6 using a byte pattern and global string matching technique to identify a "Pro/Engineer Part File" with a *.PRT extension is shown below:

```
"Pro/Engineer Part File (*.PRT) XML Template Rule Engine"
    <FrontBlock>
    <Pattern><Bytes>235547433A322050415254</Bytes>
    <ASCII>#UGC:2 ASSEMBLY </ASCII>
    <Pos>0</Pos>
    </Pattern>
    </Frontblock>
    <GlobalStrings>
    <String>#END_OF_UGC</String>
    </GlobalStrings>
    </Rules>
```

An example XML rule based template 750-7 using a byte pattern and global string matching technique to identify a "Unigraphics Part File" with a *.PRT extension is shown below:

```
"Unigraphics Part File (*.PRT) XML Template Rule Engine"
    <FrontBlock>
    <Pattern><Bytes>
D0CF11E0A1B11AE1000000000000000000000000000000
0003E000300FeFF090006000000000000000000000000</Bytes>
        <Pos>0</Pos>
        </Pattern>
    </Frontblock>
    <GlobalStrings>
    <String>UGII</String>
    <String>folderContents</String>
    <String>folderProperties</String>
    </GlobalString>
    </Rules>
```

As previously described, the native format file 602-1 may take many forms, including: Text (ASCII, SGML, HTML), Images (TIFF and GIFF), Graphics (collections of vectors such as DAD/CAM, GIS files), Audio (collections of bits structured according to sound wave theory), Video (mpeg), CAD mechanical design file formats, CAD electronic design EDA/ECAD/PCB file formats, vector based documents/ graphics file formats, raster based graphics file formats, and intelligent office documents file formats, among others, for example. The descriptive data as defined by the content of the native format file 602-1 may include, for example, item properties, summary information, user defined properties, and mass properties of the item defined by the native format file 602-1-f for example. Table 7 below provides examples of the various properties that may be associated with an item defined by the content of the native format file 602-1 in its native file format.

TABLE 7

PROPERTIES

ITEM PROPERTIES

Number
Type
Revision
Description

SUMMARY INFORMATION

Title
Subject
Author
Keywords
Comments
Last Saved By
Last Saved
Created Date

USER DEFINED PROPERTIES

Designed By
Material
Next Assembly
Weight
Drawing Title
Revision
Project No.
Finish
Assembly
Design date

MASS PROPERTIES

Area
Volume
Mass

In one embodiment, in addition to item structural properties and attributes, the converter service module 730-1 may extract additional information associated with the item such as, for example, intelligence about any missing parts, assembly views, sheet metal flattening and additional properties related to flattening, welds, and sub-file types, for example.

FIGS. 11A-C is a diagram of one embodiment of a native format file conversion process flow 1100 for converting the native format files 602-1-f having various native file formats 1110 to corresponding secure neutral format files 604-1-f having a secure neutral file format 1150 (SNFF). Each native file format 1110 may be categorized in one of four file categories, such as, raster 1112, vector 1114, CAD 1116, intelligent documents 1118, and forms 1120. The native file formats 1112-1120 have a file extension 1130 associated with it. As previously described, the file extension 1130 cannot solely be used to ascertain the native file formats 1112-1120 because it is not a unique identifier of the native file format. Multiple native format files 602-1-f may have the same extension 1130 but different native file formats 1112-1120. The chart 1100 further illustrates the intermediate translation steps that may be required and the intermediate converter service modules 730-1-j that may be required to translate the native file formats 1112-1120 to the neutral file format 1150. As previously discussed, the converter service module 730-1-j may perform any number of intermediate translations to arrive at the secure neutral file format 1150.

Some native file formats are directly translatable to the neutral file format 1150. For example, in one embodiment native file formats 1110-1-10 are directly translatable to the neutral file format 1150. Thus, the Windows Bitmap (1110-1), Graphics Interchange Format (1110-2) (GIF), JPEG File Interchange Format (1110-3), Portable Network Graphics (1110-4), Tagged Image File Format (1110-5) (TIFF), Portable Gray Map File (1110-6), Portable Bit Map File (1110-7), Portable Pixel Map File (1110-8), Portable Any Map File (1110-9), Adobe Portable Document Format (1110-10) (PDF), and Apple McIntosh File (1110-50) are directly translated to the neutral file format 1150 by the DJVu converter service module 730-1. Accordingly, the file interrogation module 740 may select the DJVu converter service module 730-1 to translate these formats directly to the secure neutral file format 1150.

In one embodiment, the Initial Graphics Exchange Specification (IGES 3-D) (1110-13), the STEP 3-D (1110-35), 3D Studio File (1110-41), HOOPS Stream File (1110-42), Extensible Graphics Language File (1110-46), and ACIS File (1110-70) native file formats are directly translated to the neutral format 1150 by the Model Press converter service module 730-5.

As previously discussed, however, there may be one or more intermediate translations from one format to another if a single converter service module 730-1-j cannot perform a direct translation. The number of intermediate translations depends on the input native file format 1110. The converter module 410 may perform one or more intermediate translations using the various converter service modules 730-1-j shown in FIG. 8.

Accordingly, the Hewlett Packard Graphics Language File Format (1110-11) (HPGL), Initial Graphics Exchange Specification (2-D)(1110-12), Computer Graphics Metafile (1110-14), STEP 2-D (1110-34), Stereolithography Interface Format (1110-43), Verband der Automobilindustrie (German Automobile Industry Association) (1110-44), and Virtual Reality Modeling Language (1110-45) native file formats are translated by the Spatial converter service module 730-2. In one embodiment, the output of the Spatial converter service module 730-2 is translated by the TIFF converter service module 730-3. In one embodiment, the output of the TIFF converter service module 730-3 is translated by the DJVu PDF converter service module 730-4 and/or the DJVu converter service module 730-1 to the secure neutral file format 1150.

In one embodiment, the AutoCAD File (1110-15), AutoCAD Drawing Exchange Format (1110-16), and Drawing Exchange Format (1110-17) native file formats are first translated with the AutoCAD converter service module 730-6 to an HPGL intermediate file format. In one embodiment, the HPGL converter service module 730-7 output is translated by the Spatial converter service module 730-2. In one embodiment, the output of the Spatial converter service module 730-2 is translated by the TIFF converter service module 730-3. In one embodiment, the output of the TIFF converter service module 730-3 is translated by the DJVu converter service module 730-1 to the secure neutral file format 1150.

In one embodiment, the AutoDesk Design Web Format (1110-18) native file format is first translated by the DWF converter service module 730-8. In one embodiment, the output of the DWF converter service module 730-8 is translated by the HPGL converter service module 730-7. In one embodiment, the output is translated by the Spatial converter service module 730-2. In one embodiment, the output is then translated by the TIFF converter service module 730-3. In one embodiment, the output of the TIFF converter service module 730-3 is translated by the DJVu converter service module 730-1 to the secure neutral file format 1150.

In one embodiment, the AutoDesk Inventor Part File (1110-19) and AutoDesk Inventor Assembly File (1110-20) native file formats are first translated by the Inventor converter service module 730-9. In one embodiment, the output is translated by the 3DF converter service module 730-10. In one embodiment, the output of the 3DF converter service module 730-10 is translated by the Model Press converter service module 730-5. In one embodiment, the output is then translated to the neutral file format 1150.

In one embodiment, the AutoDesk Inventor Drawing File (1110-21) native file format is first translated by the Inventor converter service module 730-9. In one embodiment, the output is translated by the HPGL converter service module 730-7. In one embodiment, the output is translated by the Spatial converter service module 730-2. In one embodiment, the output is then translated by the TIFF converter service module 730-3. In one embodiment, the output of the TIFF converter service module 730-3 is translated by the DJVu converter service module 730-1 to the neutral file format 1150.

In one embodiment, the SolidWorks Part File (1110-23) and SolidWorks Assembly File (1110-24) native file format are translated by the SolidWorks converter service module 730-11. In one embodiment, the output is then translated by the 3DF converter service module 730-10. In one embodiment, the output is translated by the Model Press converter service module 730-5 to the neutral file format 1150.

In one embodiment, the SolidWorks Drawing File (1110-25) native file format is first translated by the SolidWorks converter service module 730-11. In one embodiment, the output is then translated by the HPGL converter service module 730-7. In one embodiment, the output of the HPGL converter service module 730-7 is translated by the Spatial converted service module 730-2. In one embodiment, the output is translated by the TIFF converter service module 730-3. In one embodiment, the output of the TIFF converter service module 730-3 is translated by the DJVu converter service module 730-1 to the neutral file format 1150.

In one embodiment, the SolidEdge Part File (1110-26), SolidEdge Assembly File (1110-27), SolidEdge Sheet Metal Part (1110-29), and SolidEdge Weldment File (1110-30) native file formats are translated by the SolidEdge converter service module 730-12. In one embodiment, that output is then translated by the 3DF converter service module 730-10. In one embodiment, the Model Press converter service module 730-5 then translates the output of the 3DF converter service module 730-10 to the secure neutral file format 1150.

In one embodiment, the SolidEdge Draft File (1110-28) native file format is converted to the HPGL intermediate file format by the SolidEdge converter service module 730-12. In one embodiment, that output is translated by the HPGL converter service module 730-7. That output is then translated by the Spatial converted service module 730-2. In one embodiment, the output of the Spatial converted service module 730-2 is translated by TIFF converter service module 730-3. In one embodiment, that output is then converted by the DJVu converter service module 730-1 to the secure neutral file format 1150.

In one embodiment, the Pro/Engineer Part File (1110-31) and Pro/Engineer Assembly File (1110-32) native file formats are first translated by the ProEngineer converter service module 730-13. In one embodiment, the output is then translated by the 3DF converter service module 730-10. In one embodiment, that output is translated by the Model Press converter service module 730-5 to the secure neutral file format 1150.

In one embodiment, the Pro/Engineer Drawing File (1110-33) native file format is translated by the Pro/Engineer converter service module 730-13. In one embodiment, the output is translated by the HPGL converter service module 730-7. In one embodiment, that output is then translated by the Spatial converted service module 730-2. In one embodiment, the output is translated by the TIFF converter service module 730-3. In one embodiment, that output is then translated by the DJVu converter service module 730-1 to the secure neutral file format 1150.

In one embodiment, the JPEG-2000 Code Stream bitmap (1110-36), JPEG-2000 JP2 File Format (1110-37), Windows Metafile (old Win 3.x format) (1110-39), Targa BitMap (1110-48), Computer Aided Acquisition and Logistics Support Raster Format (1110-51), Graphics Multipage PCX Bitmap (1110-53), ZSoft PCX Bitmap (1110-54), and Encapsulated Post Script (1110-57) native file formats are first translated by the LeadTools converter service module 730-14. In one embodiment, that output is then translated by the TIFF converter service module 730-3 and the DJVu converter service module 730-1 translates it to the secure neutral file format 1150.

In one embodiment, the Windows Metafile (1110-38) and Windows Icon File (1110-40) native file formats are first translated by the Net Converter converter service module 730-15. In one embodiment, the output is translated by the TIFF converter service module 730-3. In one embodiment, that output is then translated by the DJVu converter service module 730-1 to the secure neutral file format 1150.

In one embodiment, the Scalable Vector Graphics File (1110-47) native file format is first translated by the BatikFile converter service module 730-16. In one embodiment, the output is translated by the TIFF converter service module 730-3. In one embodiment, that output is then translated by the DJVu converter service module 730-1 to the secure neutral file format 1150.

In one embodiment, the Kodak PhotoCD Bitmap (1110-55) and Sun Raster Bitmap (1110-56) native file formats are translated directly to the neutral file format 1150 by the Image Magic converter service module 730-17.

In one embodiment, the Adobe PostScript (1110-58) native file format is translated directly to the neutral file format 1150 by the DJVu PDF converter service module 730-4.

In one embodiment, the Microsoft Word Document (1110-59), Microsoft Excel File (1110-60), Microsoft PowerPoint Document (1110-61), and the Microsoft Project File (1110-62) native file formats are translated by the Black Ice Printer Driver converter service module 730-18. In one embodiment, that output is translated by the EMF converter service module 730-20. In one embodiment, the output is then translated by the Lead Tools converter service module 730-14. In one embodiment, the output is translated by the TIFF converter service module 730-3. In one embodiment, that output is then translated by the DJVu converter service module 730-1 to the secure neutral file format 1150.

As previously described, the converter service modules 730-1-*j* illustrated in FIG. 8 are a representative example of possible converter service modules and is not an exhaustive list of converter service modules 730-1-*j* that may be used in any one application. Therefore, it should be understood that the converter module 410 is not limited in scope thereto. Furthermore, the conversion/translation process of selecting the appropriate converter service modules 730-1-*j* performing the translation is automatic and is based on the output of the file interrogation module 740.

Viewer Module 420

In various embodiments, the viewer module 420 enables users to view media information, includes functionality to enable collaboration between resources throughout the extended enterprise network 300, and enables XML data input capabilities. In one embodiment, the viewer module 420 displays 2-D and 3-D CAD graphic images contained in the secure neutral format files 604-1-*j*. The viewer module 420 receives the translated secure neutral format files 604-1-*f* from the host processing node 140 and displays the contents of the files 604-1-*f* on the monitor 207. The viewer module 420 may be adapted to accept and display multiple secure neutral format files 604-1-*f* with content that was originally generated using a variety of document, image, CAD and other native file type applications, each one with its own proprietary file format as illustrated in examples of Tables 1-5 above.

To view a graphic image in a secure neutral format file 604-1, the user can invoke the viewer module 420 on the client computer 310, 320 by selecting the image of the file 604-1 in a folder or on the computer desktop with the pointing device 202. This launches the viewer module 420 as a stand alone application in the web browser 314, 324. When the viewer module 420 is invoked, it reads the view state of the graphic image from the XML header 962 embedded in of the secure neutral format file 604-1. The viewer module 420 applies the current view state and displays the graphic image on the monitor 207.

In one embodiment, the viewer module 420 enables collaboration between resources at the first and second client nodes 110-1 and 120-1 over media information such as, for example, engineering design and office documents. In one embodiment, the viewer module 420 enables resources at the first and second client nodes 110-1 and 120-1 to exchange and collaborate over RFQ documentation to communicate item requirements from a buyer to a supplier. Item requirements include the items that make up a design. When the item represents an assembly, the requirements may include the individual elements that together form the item. For example, to procure items for a given design, a RFQ may include a dimensioned drawing, a 3-D solid model, and other documents that convey to the supplier all the necessary details of a technical specification that may be employed to adequately quote an item as requested by the buyer.

The viewer module 420 may include DRM technology enabled by the DRM module 500 to enable a secure exchange of such documents. In one embodiment, the secure neutral format files 604-1-*f* may be deployed throughout the extended enterprise network 300 in a secure collaboration format using the AES FIPS-197 Encryption Standard. The secure neutral format files 604-1-*f* may be implemented as a fully compressed file format to minimize file size. In one embodiment, the viewer module 420 enables annotations to images and drawings displayed on the monitor 207. Annotations include redline markup overlays on a user interface view with a message context to collaborate. Redline markup overlays are saved as XML in any one of the databases 190-1-*e* along with a collaboration message thread.

The viewer module 420 may be implemented using Microsoft® Visual C++, Microsoft® Foundation Class library (MFC), and Active Template Library (ATL). The viewer module 420 code can be executed on the user computer 310, 320. In one embodiment, the viewer module 420 may be implemented as an Active X Control for use in a variety of different containers, including, for example, Internet Explorer browser (e.g., browsers 314, 324) and other containers ranging from software development tools to end-user productivity tools. In one embodiment, the viewer module 420 also may be implemented as a XPCOM based Netscape Plugin to support Gecko Based Browsers (e.g., browsers 314, 324).

FIGS. 12A-D illustrate embodiments of various graphical user interfaces 1200, 1220, 1240, and 1260, respectively. Each of the graphical user interfaces 1200, 1220, 1240, and 1260 represents one embodiment of one instance of the application framework 348, 349. As previously discussed, the application framework 348, 349 may include one or more navigation frames 352, one or more command and control frames 354, and one or more tool bar frames 356. The control module 318 manages the inter-process communication and synchronizes the events between the navigation frames 352, the command and control frames 354, and the tool bar frames 356.

Figure 12A:
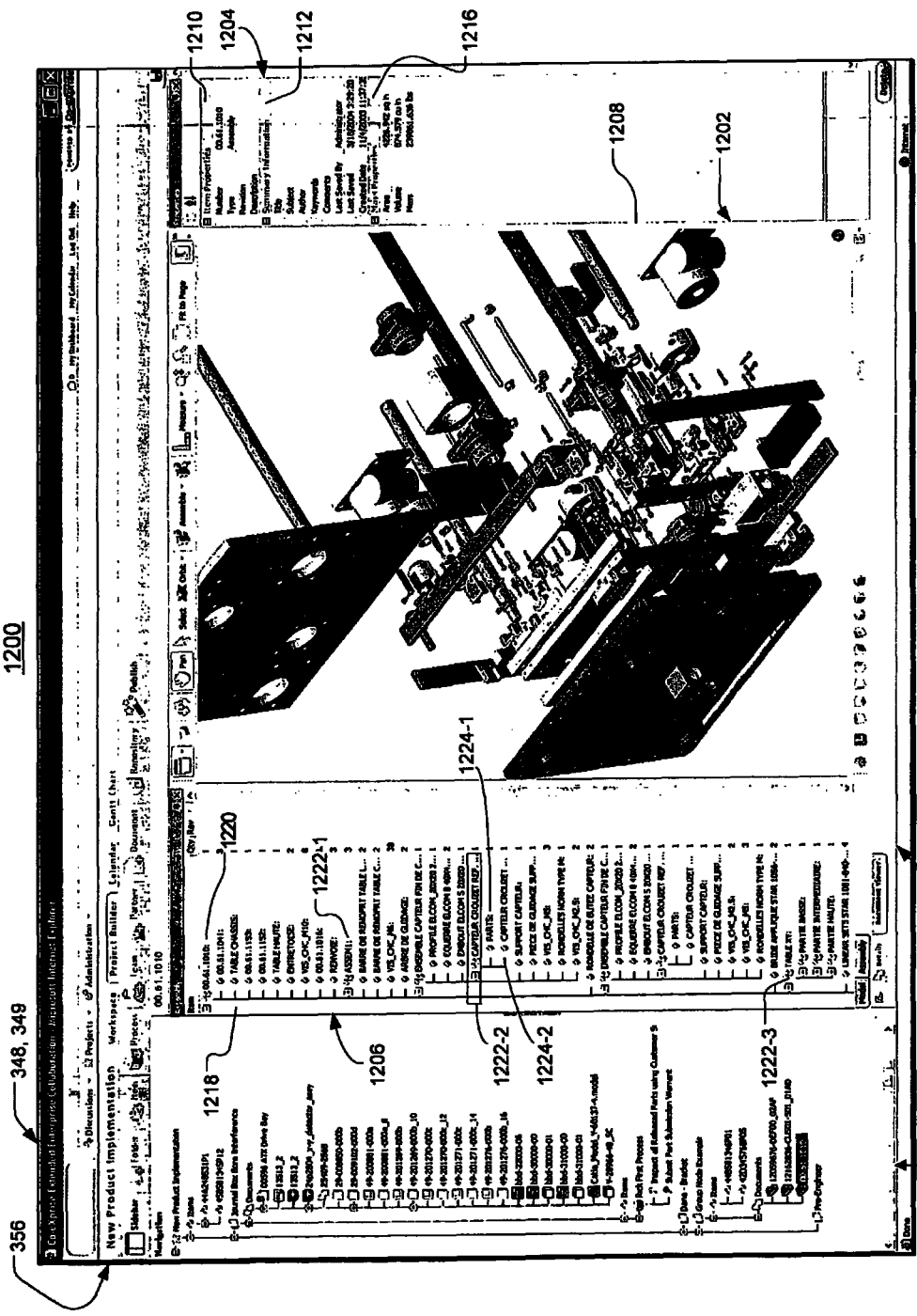
FIGS. 12A-D illustrate embodiments of various graphical user interfaces.

FIG. 12A illustrates a graphical user interface 1200 of one embodiment of one instance of the application framework 348, 349. The graphical user interface 1200 may be displayed on the computer monitor 207 of client node computers 310, 320, for example. The graphical user interface 1200 includes a graphic image pane 1202, a design properties pane 1204, an item structure pane 1206, and an item tree pane 1207. In the illustrated embodiment, the image pane 1202 displays a graphic image 1208 (e.g., a high resolution 3-D model of a mechanical design) of an assembly design embedded in a converted secure neutral format file 604-1. In one embodiment, the viewer module 420 can display multiple graphic images of designs and documents that are provided from the host processing node 140 in a neutral file format. Accordingly, the viewer module 420 is capable of displaying a plurality of graphic images originally created in a variety of formats with different CAD software tools such as, for example, 2-D drawings.

In one embodiment, the design properties pane 1204 displays descriptive data associated with the graphic image 1208. The descriptive data illustrated in the design properties pane 1204 is the descriptive data extracted form the native format file 602-1 and embedded in the converted secure neutral format file 604-1. The design properties pane 1204 may include, for example, item properties 1210, summary information 1212, and mass properties 1216. The information displayed in the properties pane 1204 is derived from the descriptive data 924 associated with the graphic image 1208. As previously discussed, the descriptive data 924 is extracted from the native format files 602-1 by the converter module 410 during the translation process as described above.

In the item structure pane 1206, the viewer module 420 displays an item structure tree 1218 that is associated with the graphic image 1208. A selected item 1222-2 on the item structure tree 1218 relates to a corresponding graphic image 1208 view of the selected item 1222-2. The item structure tree 1218 includes files that define an item associated with the graphic image 1208. The item may be a single stand alone object or may form a portion of an assembly including multiple items or an item may include multiple elements. In one embodiment, the files displayed in the item structure tree 1218 may define two or more items and a structural relationship between the two or more items. The files that define the item or the structural relationship between the two or more items include one or more viewable files in a neutral file format. In one embodiment, the files illustrated in the item structure tree 1218 are embedded within the data 966 portion of the secure neutral format file 604-1. The files illustrated in the item structure tree 1218 include the graphic image 1208 files capable of displaying the structural characteristics of the item in multiple views and all of the descriptive data associated with all the views for the graphic image 1208.

In the illustrated embodiment, the graphic image 1208 represents an assembly. Accordingly, the top level of the item structure tree 1218 is the assembly view 1220. The level below the assembly view is a subassembly level view of various assembly components 1222-1, 1222-2, and 1222-3. The level below subassembly view 1222-2 is an element level view of the various subassembly components 1224-1, 1224-2. Selecting a file in the item structure pane 1206 with the pointing device 202 launches the associated graphic image in the image pane 1202 associated with that file. The corresponding graphic image is displayed according to the view state saved in the XML header 962 of the secure neutral format file 604-1. In the illustrated embodiment, the pointing device 202 selection is the subassembly file 1222-2. The graphic image 1208 corresponding to the subassembly file 1222-2 is displayed in the image pane 1202 according to the most recently saved view state in the XML header 962.

The viewer module 420 enables the user, via a toolbar frame 356 and/or the navigation frame 352, for example, to interact with the graphic image 1208 in multiple ways. In various embodiments, the viewer module 420 coupled with one or more functional modules 172 (e.g., EEC module 400) may enable users at the first and second client nodes 110-1, 120-1 to save one or more view states in the XML header 962 of the secure neutral format file 604-1 in database 190 located at the processing node 140 and/or in databases 312, 322 located at client nodes 110, 120. In one embodiment, view states may include cropping the image 1208, applying a blotter to the image 1208, removing background layers from the image 1208 (e.g., remove a blue layer from a blue print image), applying a rubber stamp effect to the image 1208, and/or annotating the image 1208. The viewer module 420 extracts viewer directives from the XML header 962 of the secure neutral format file 604-1 and displays the graphic image 1208 accordingly. In other embodiments, the viewer module 420 can rotate the image 1208, explode the image 1208 of an assembly item into its components, assemble the image 1208 of components into an assembly item, auto-dimension the image 1208, toggle through parts of an assembly of the image 1208, skew/deskew the image 1208, and/or search for text in the image 1208 via optical character recognition (OCR). In yet other embodiments, the viewer module 420 can enable users at the first and second client nodes 110-1, 120-1 to collaborate. In one embodiment, the image 1208 is the subject matter of the collaboration. In one embodiment, the XML header 962 of the secure neutral format file 604-1 includes viewer directives that define a current view state of the graphic image 1208. The XML header 962 instructs the viewer module 420 on how to display the graphic image 1208. The viewer module 420 displays the graphic image 1208 in accordance with the most recent version of view state directives in the XML header 962. The view state directives modify the way the graphic image 1208 is displayed but does not modify the underlying data 966 portion of the secure neutral format file 604-1. Further, in one embodiment, if the view state is modified, the viewer module 420 does not modify the data 966, does not overwrite the current secure neutral format file 604-1 or previously saved view states and does not create and store a new copy of the secure neutral format file 604-1 with the modified view. The new view state is saved in the XML header 962 in one or more of the databases 190, 312, 322 in addition to the one or more other view states that were previously saved in the XML header 962 of the same secure neutral format file 604-1.

Figure 12B:
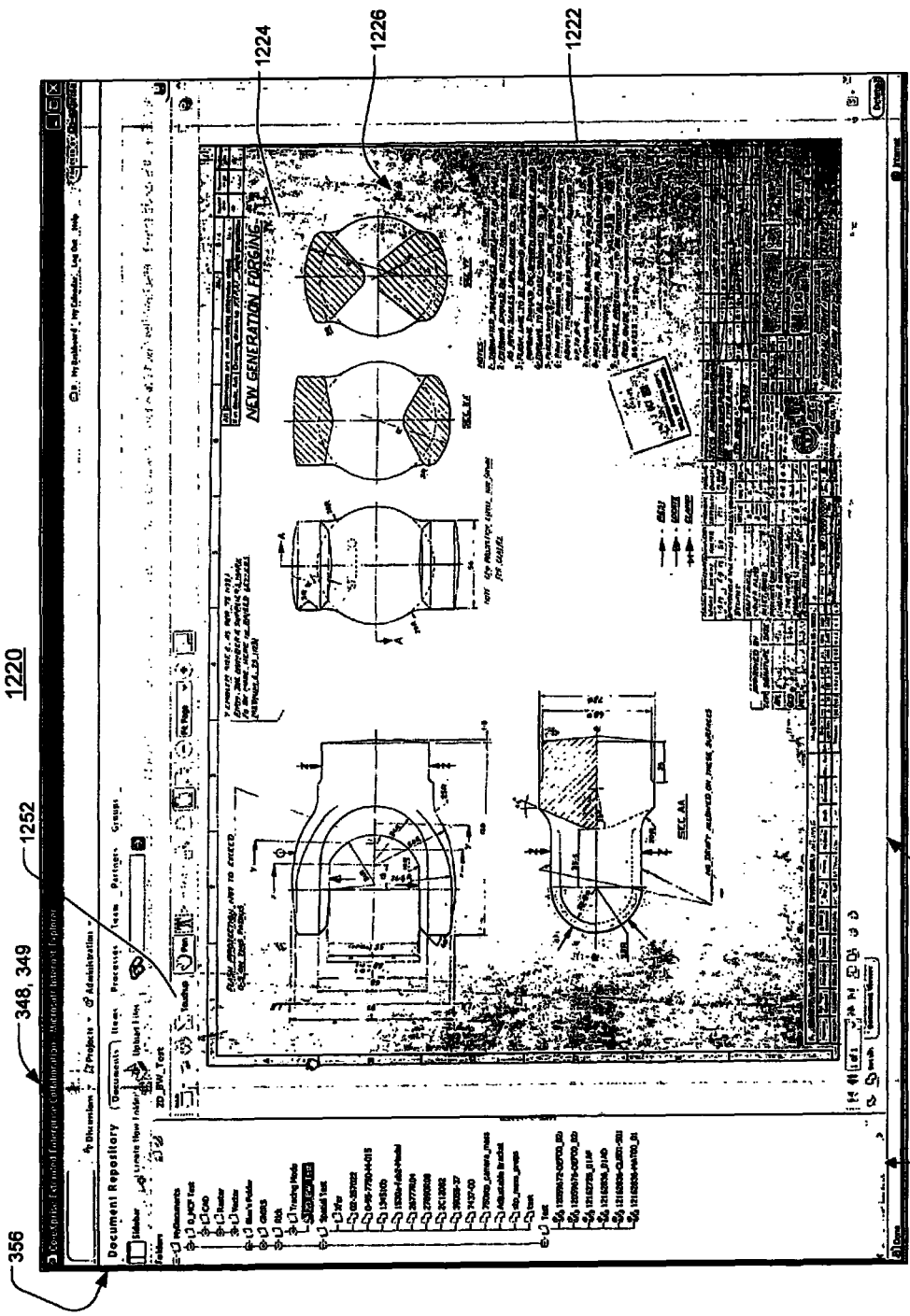

FIG. 12B illustrates a graphical user interface 1220 of one embodiment of one instance of the application framework 348, 349. The graphical user interface 1220 illustrates a bitonal graphic image 1222 of a mechanical device. The bitonal graphic image 1222 comprises a foreground layer 1224 with a first tone and one or more background layers 1226 with one or more tones. In the illustrated embodiment, the background layer 1226 of the bitonal graphic image 1222 is turned on and thus it is visible to the user. As previously discussed, with the viewer module 420, a user can remove any one of the background layers (e.g., remove blue from a blue print).

Figure 12C:
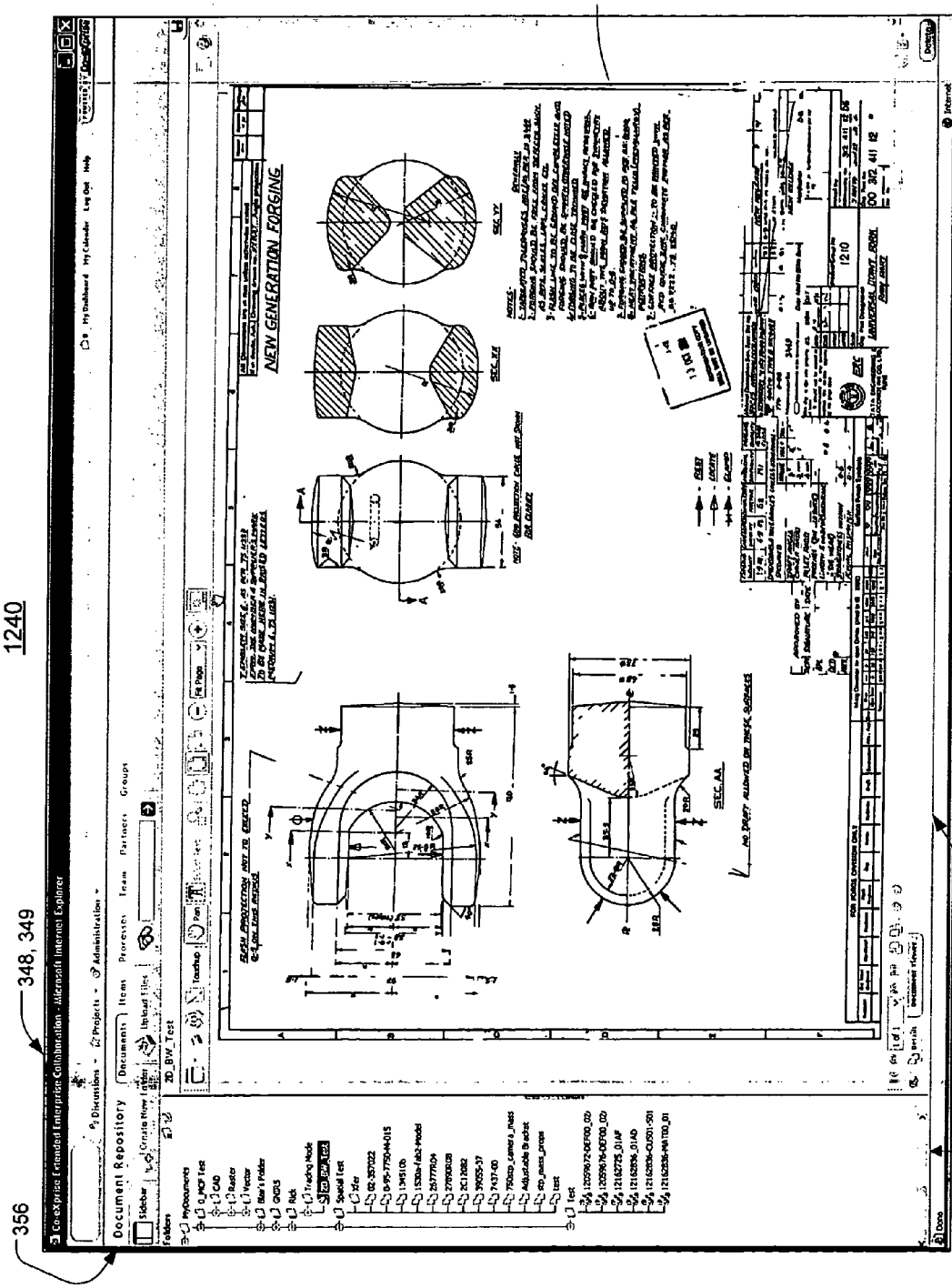

FIG. 12C illustrates a graphical user interface 1240 of one embodiment of one instance of the application framework 348, 349. The graphical user interface 1240 illustrates the bitonal graphic image 1222 with the background layer 1226 removed and only the foreground layer 1224 showing. In the illustrated embodiment, the graphic image 1242 is a blue print image with the "blue" background layer removed. Thus, when the graphic image 1242 is displayed, it is more clearly visible to the user.

With reference now to both FIGS. 12B and 12C illustrate one embodiment of a viewer module 420 view state graphical user interface 1250. According to this embodiment, the viewer module 420 in conjunction with the EEC module 400 may create and save a view state. In one embodiment, the view state involves removing background layers from the image 1222 (e.g., remove blue from a blue print). In one embodiment, by selecting the touch-up button 1252, a user at the first or second client nodes 110-1, 120-1 may initiate the application framework 348, 349 and the EEC module 400 to remove background layers from the image 1222. Scanned engineering drawings "Blue Prints" are treated as color documents and are partitioned into a foreground plane and a background plane. The foreground plane contains the text and the line drawings compressed as a bitonal or low-color image at maximum resolution, thereby preserving the sharpness and readability of the text. The background plane contains the paper textures and background color introduced via the drawing reproduction process in copying the Mylar master drawing document. The background is compressed at reduced resolution with IW44. Areas of the background covered by foreground components are smoothly interpolated so as to minimize the encoding cost of background areas occluded by foreground components. A foreground/background segmenter first detects objects that are sharply contrasted with their surroundings, and then classifies them into the foreground or the background planes using several criteria, such as their color uniformity, their geometry, and an estimate of their encoding cost. This intelligent separation into background and foreground layers enables the viewer module 420 to turn off the display of the segmented background layer, thereby removing the blue background and leaving a clear high resolution foreground image 1208 of the document without the annoying background color that reduces original drawing fidelity that makes it difficult to read.

Figure 12D:
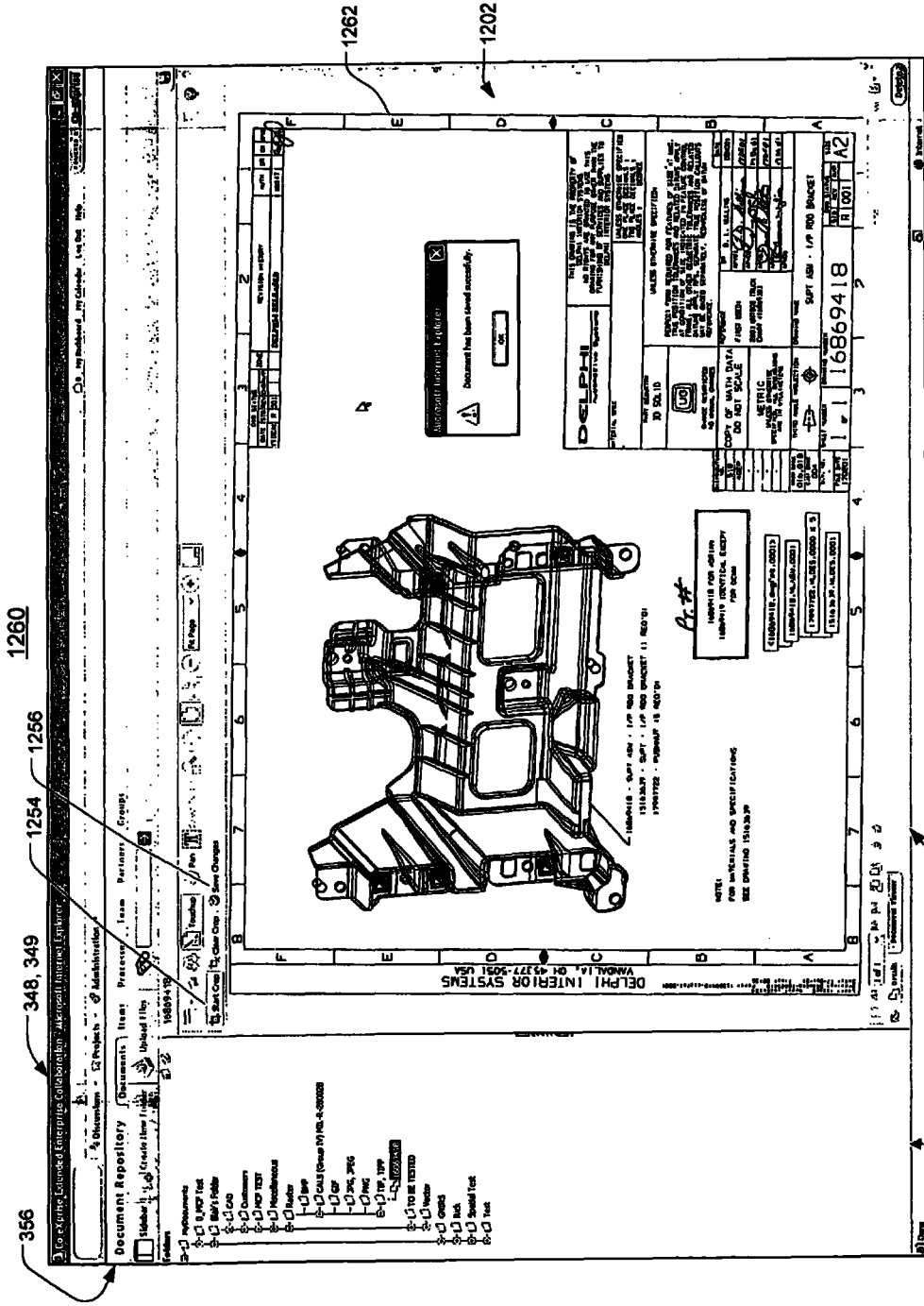

FIG. 12D illustrates a graphical user interface 1260 of one embodiment of one instance of the application framework 348, 349. The graphical user interface 1260 illustrates one embodiment of a graphic image 1262 that has been cropped to fit within the image pane 1202 of the command and control frame 354. Cropping is a method of removing unwanted areas from the graphic image 1262. Cropping also can be used to remove an unwanted subject or irrelevant portion from the graphic image 1262 to improve viewability for collaboration/negotiation processes described herein.

Another example of how view state directives get attached to the XML header 962 is when a user at either first or second client nodes 110-1, 120-1 of a document wishes to only publish a subset of the image 1262. In one embodiment, the user may utilize the viewer module 420 and the EEC module 400 to crop the image 1262. According to this embodiment, the user may (1) click "Start Crop" 1254 ("Start Crop" changes to "Apply Crop"), (2) drag a rectangle around the subset of the image 1208, (3) click on "Apply Crop" 1254, and then (4) click on "Save Changes"1256. Once "Save Changes" 1256 is clicked, the viewer module 420 generates the cropped view state to the XML header 962, which is transmitted to the processing node 140 and stored in the database 190-1-e. The one or more process node 140 servers 160, 170, 182 may then apply the new XML header 962 to the secure neutral format file 604-1. The next time the secure neutral format file 604-1 is displayed in the viewer module 420, the viewer module 420 reads the crop view state directives in the XML header 962 and applies the crop to the original secure neutral format file 602-1.

Figure 13A:
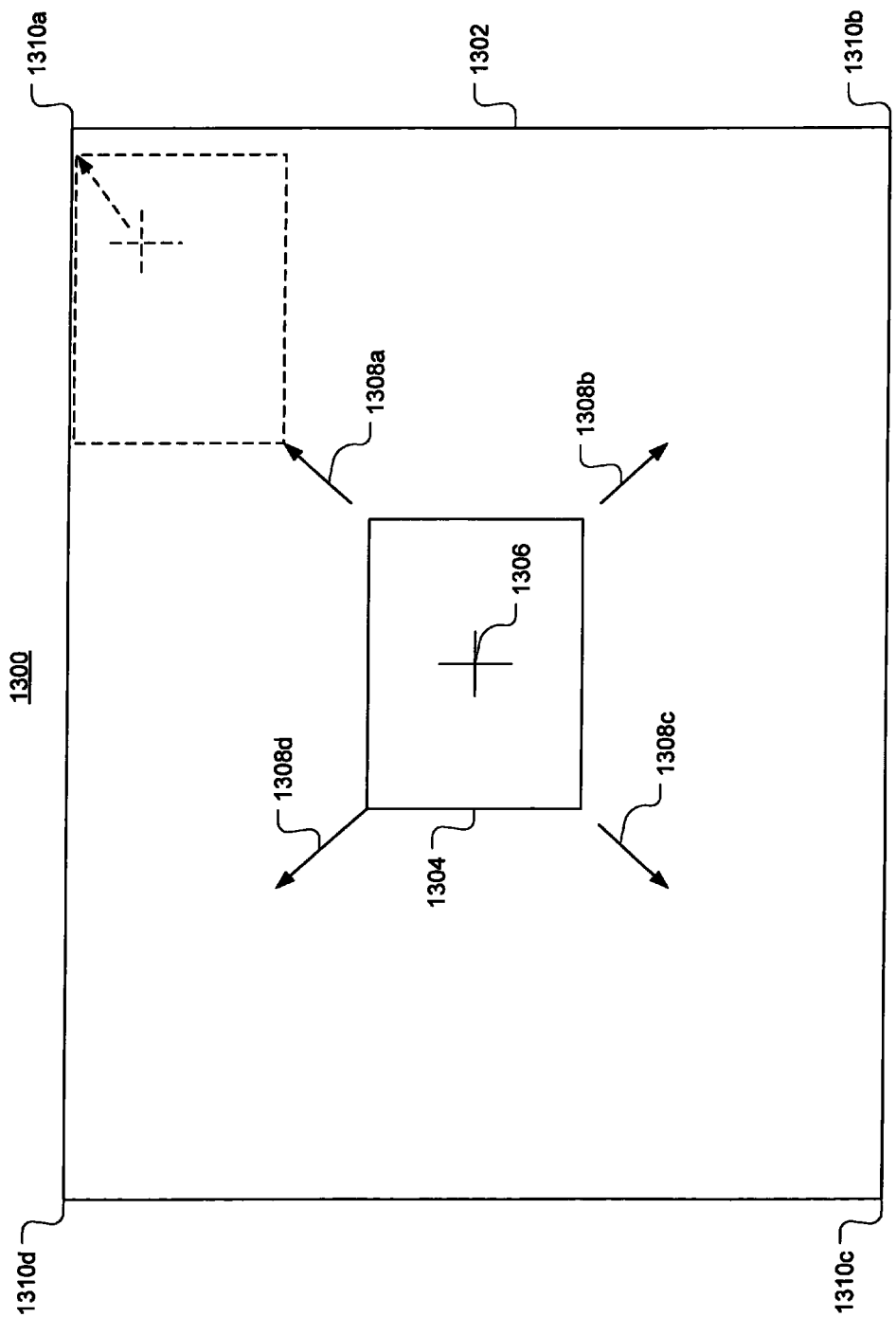
FIG. 13A is a schematic view of one embodiment of zoom/magnification (zoom) functionality of a viewer module.

FIG. 13A is a schematic view 1300 of one embodiment of zoom/magnification (zoom) functionality of the viewer module 420. The viewer module 420 displays a graphic image 1302. The user can invoke a zoom window 1304 which can be panned over the graphic image 1302 area on the display. The size of the zoom window 1304 is variable and resizing is anchored. The center of the zoom window 1304 is marked with a cross hair 1306. As the zoom window 1304 is panned over the graphic image 1302, the portions of the graphic image 1302 within the zoom window 1304 appear magnified by a factor. In one embodiment, the magnification factor is variable and is user selectable. The zoom window 1304 creates the best apparent resolution and does not introduce loss of resolution in the underlying zoomed portion of the graphic image 1302. In one embodiment, as the user zooms out, there is a reduction in the number of pixels in the current zoomed view portion of the graphic image 1302. In one embodiment, the zoom feature may provide pixel enhancement at certain full view states.

As the zoom window 1304 is panned along the directions indicated by arrows 1308a, b, c, d it will eventually end in the corners 1310a, b, c, d, respectively, of the graphic image 1302 display area. Once the zoom window 1304 is in any one corner 1310a, b, c, d the cross hair 1306 moves and aligns with to the respective corner 1310a, b, c, d. The zoom window 1304 and the cross hair 1306 now remain fixed. For example, as shown, the zoom window 1304 is placed against corner 1310a and the cross hair 1306 is aligned with the corner 1310a and is fixed. As the user continues to pan the zoom window 1304 into the corner 1310a, the zoom window 1304 does not disappear into the corner 1310a. Rather, the graphic image 1302 pans under the zoom window 1304 in a direction opposite to the intended panning direction of the zoom window 1304. This creates the visual effect to the user of scrolling within the graphic image 1302 instead of scrolling over it with the zoom window 1304. Thus, as the user attempts to move the zoom window 1306 further into the corner 1310a, the zoom window 1304 remains fixed in place, but now the graphic image 1302 pans underneath the fixed zoom window 1304 so that the corresponding corner 1310a of the graphic image 1302 becomes centered with the cross hair 1306. Accordingly, the user is able to magnify the corresponding corner 1310a of the graphic image 1302.

Figure 13B:
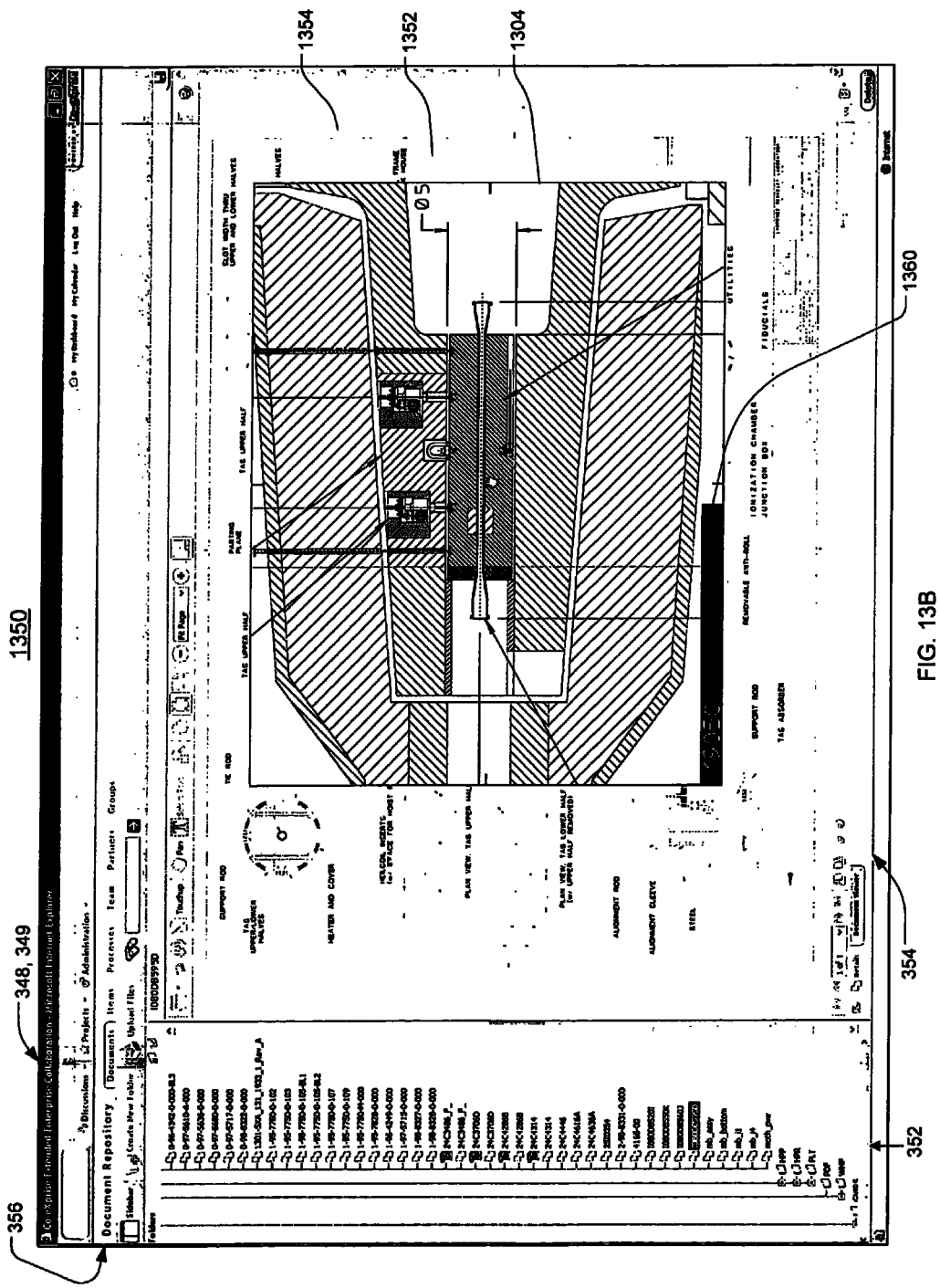
FIG. 13B illustrates a graphical user interface of one embodiment of zoom/magnification (zoom) functionality of one instance of an application framework.

FIG. 13B illustrates a graphical user interface 1350 of one embodiment of one instance of the application framework 348, 349 for zooming and magnifying (zooming) a graphical image 1352. The application framework 348, 349 may include one or more navigation frames 352, one or more command and control frames 354, and one or more tool bar frames 356. The control module 318 manages the inter-process communication and synchronizes the events between the navigation frames 352, the command and control frames 354, and the tool bar frames 356. The graphic image 1352 is displayed within the image pane 1354. The user can invoke a zoom window 1304 which can be panned over an area of the graphic image 1352 on the display. The size of the zoom window 1304 is variable and resizing is anchored. As the zoom window 1304 is panned over the graphic image 1352, the portion 1360 of the graphic image 1352 within the zoom window 1304 appears magnified by a factor. In one embodiment, the magnification factor is variable and is user selectable. The zoom window 1304 creates the best apparent resolution and does not introduce loss of resolution in the underlying zoomed portion 1360 of the graphic image 1352.

In one embodiment, the zoom window 1304 may include an enhanced zoom module 1362 that further magnifies the graphic image 1352 contained in the zoom window 1304. According to this embodiment, a user may direct the pointer 202 to prompt an enhanced zoom bar 1360, which when initiated causes the enhanced zoom module 1362 to execute.

Figure 14:
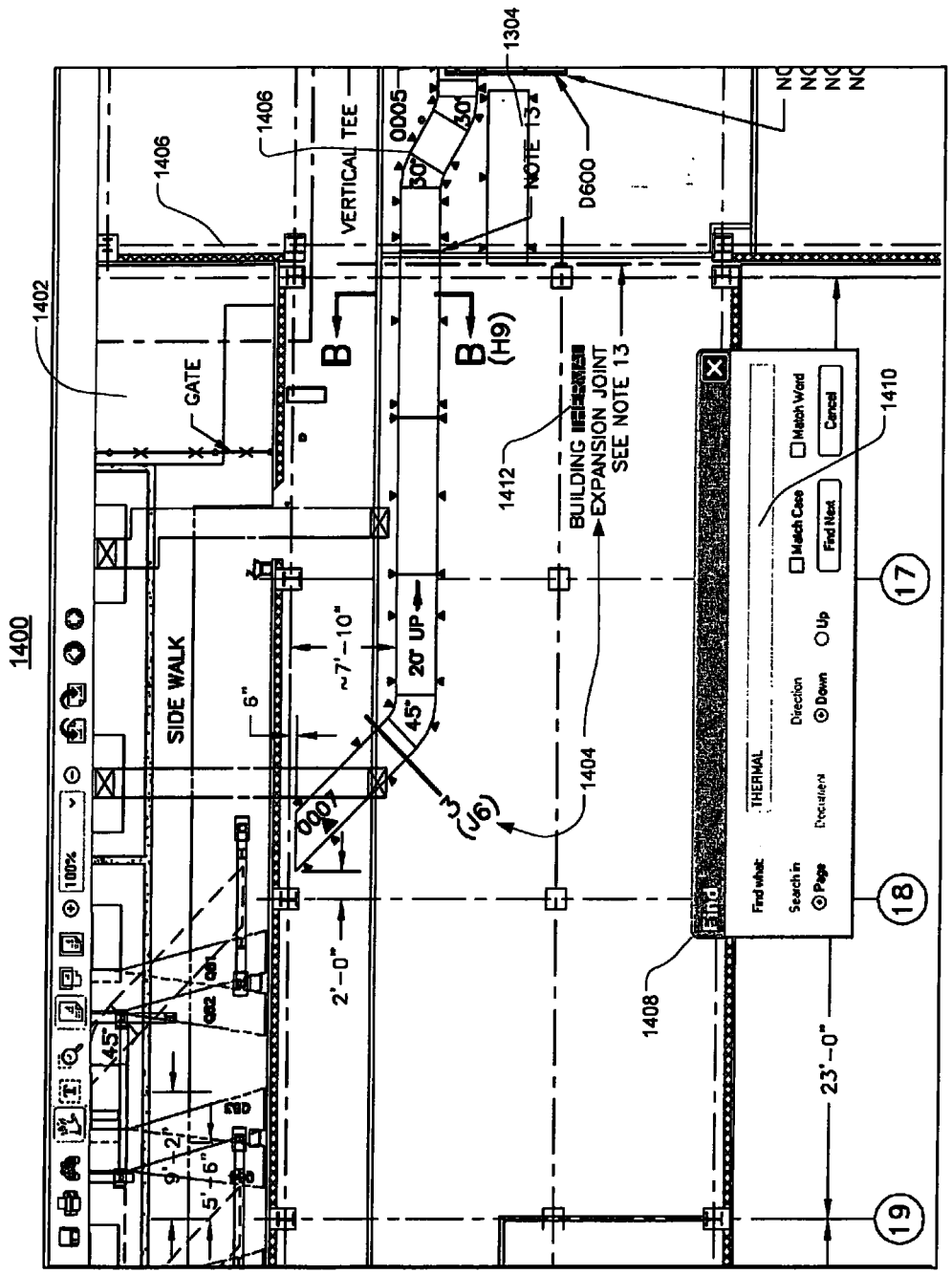
FIG. 14 is one embodiment of a viewer module graphical user interface.

FIG. 14 is one embodiment of a viewer module 420 graphical user interface 1400 to locate text in a graphic image 1402 using optical character recognition (OCR) techniques. The graphical user interface 1400 illustrates the design image 1402 that contains graphical images of text. The viewer module 420 provides an OCR technique to search for the location of text and the number of occurrences on the graphic image 1402. The viewer module 420 applies a multilingual OCR technique to the graphic image 1402 file to identify all text locations and occurrences in the scanned image 1402 file. The viewer module 420 converts the graphical images of the text to an ASCII string or a binary format, and indexes the relative location of the text on the graphic image 1402, and stores text and the indexes in a database.

In the illustrated embodiment, the graphical user interface 1400 illustrates a pixilated scanned image 1402 of a drawing that contains graphical images of printed text 1404 and geometric patterns 1406. To find occurrences of the text 1404, the user invokes a "FIND" user dialog box 1408 to search for the desired text 1404. The user types the text in the input line 1410 of the user dialog box 1408. As shown, the user wishes to search for the word "THERMAL" and has typed it in the input line 1410. The viewer module 420 takes the search directive from the user dialog box 1408 and highlights the occurrences of the text 1412 "THERMAL" on the scanned image 1402. By scanning the image 1402, indexing the text 1404, and storing the equivalent characters or strings in a database, a user can automatically search for dimensions, tolerances, limitations, and notes located on the image 1402. Further, once the text 1404 is recognized and converted to an ASCII string or binary data it can be downloaded to another database for cost estimating and manufacturing planning.

A blotter may be applied to a portion of the scanned pixilated image 1402 by taking a Gaussian sample to define a spectral distribution of the image 1402 in the vicinity of where the blotter is to be applied. Once the Gaussian sample is taken of the image area of interest, the blotter function allows a user to erase text or geometric shapes on the image 1402 and then apply the blotter which applies a blend of pixels in accordance with spectral distribution in the vicinity of the erased portion. The blotter pixels blend in the erased portion of the image 1402 to conceal that an erasure took place in that portion of the image 1402. For example, the blotter may be applied to conceal confidential information such as, trade secrets and/or costing information.

Figure 15A:
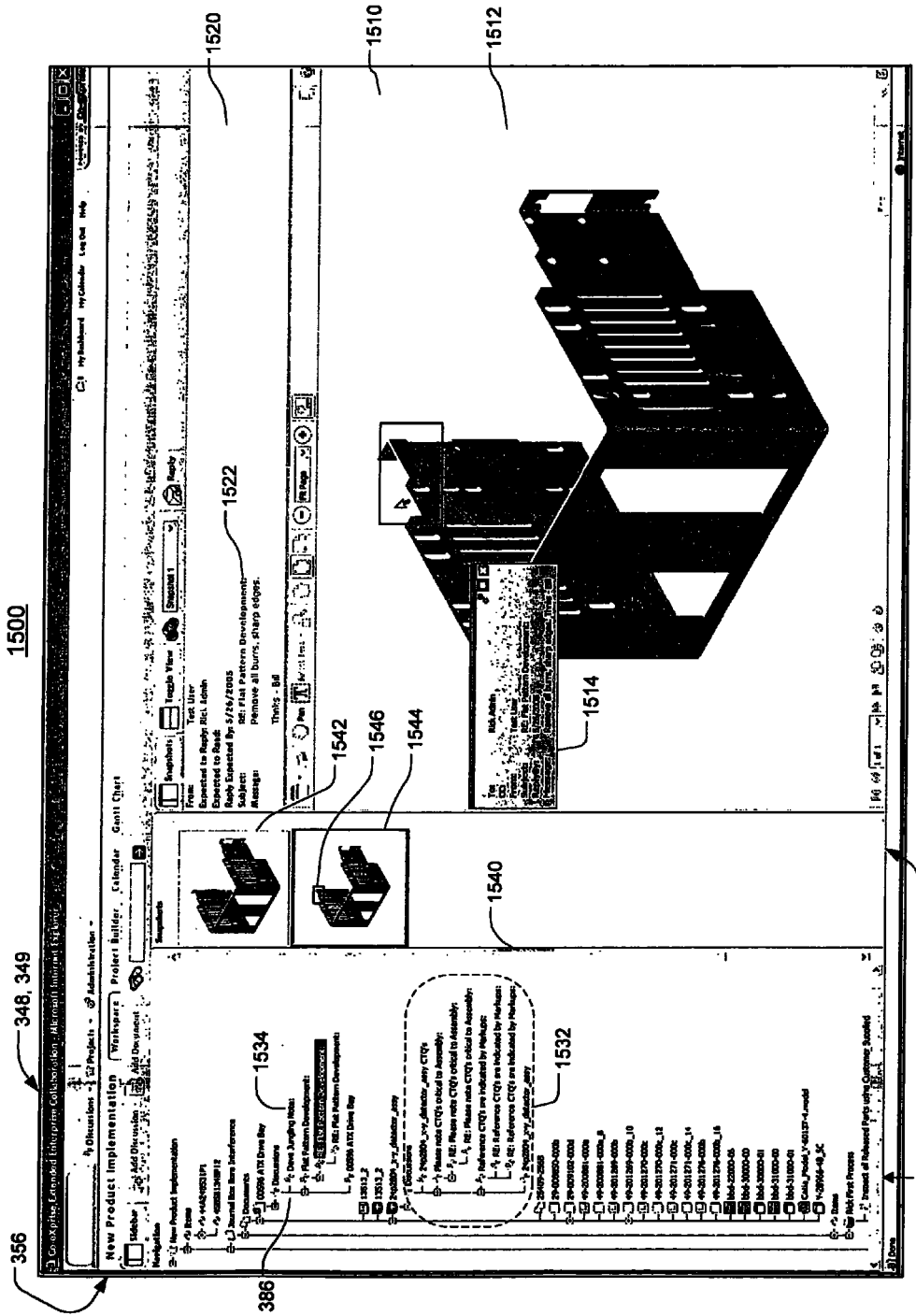
FIG. 15A is a graphical user interface of one embodiment of one instance of an application framework.
Figure 15B:
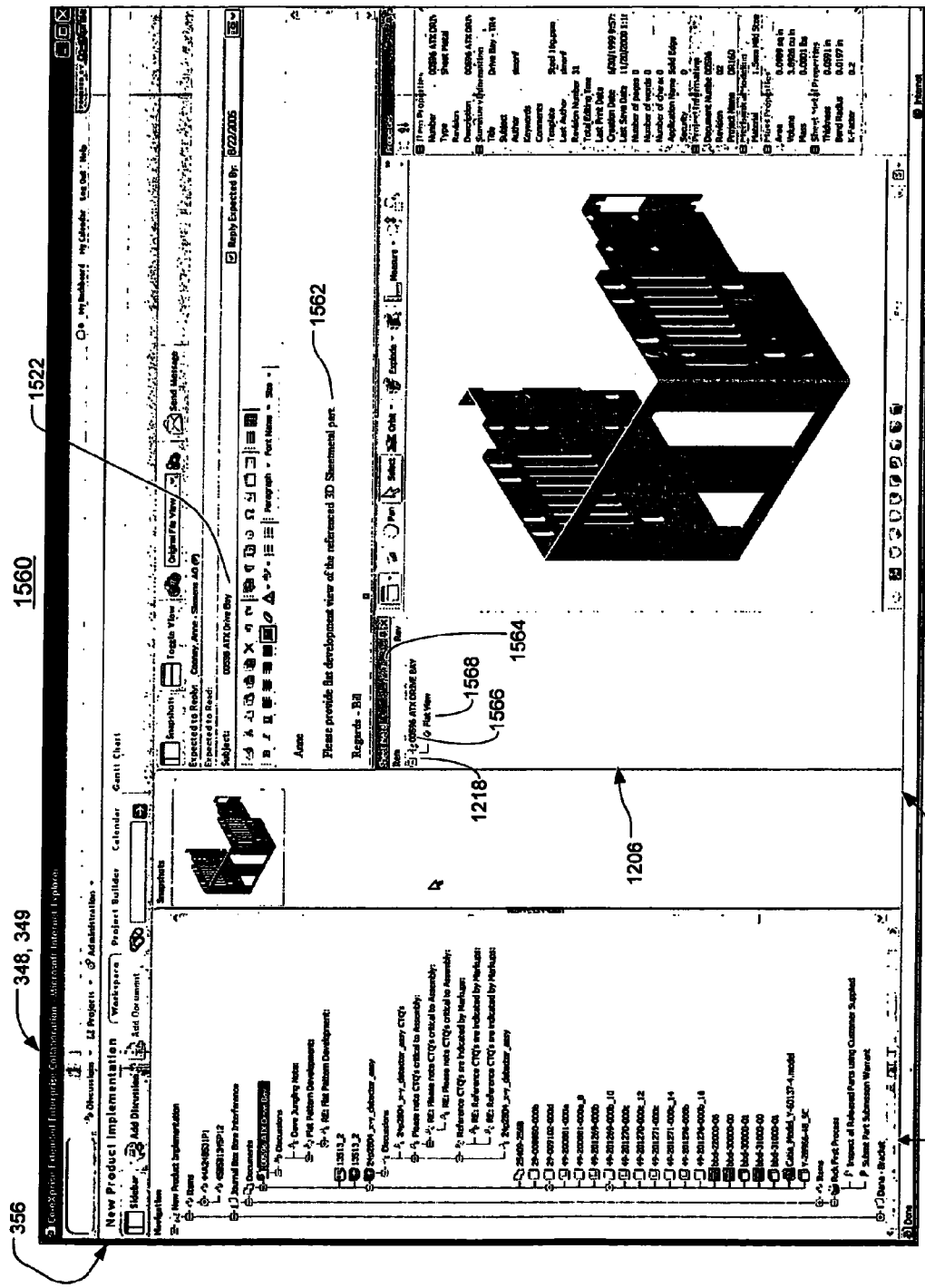
FIG. 15B is a graphical user interface of one embodiment of one instance of an application framework.
Figure 15C:
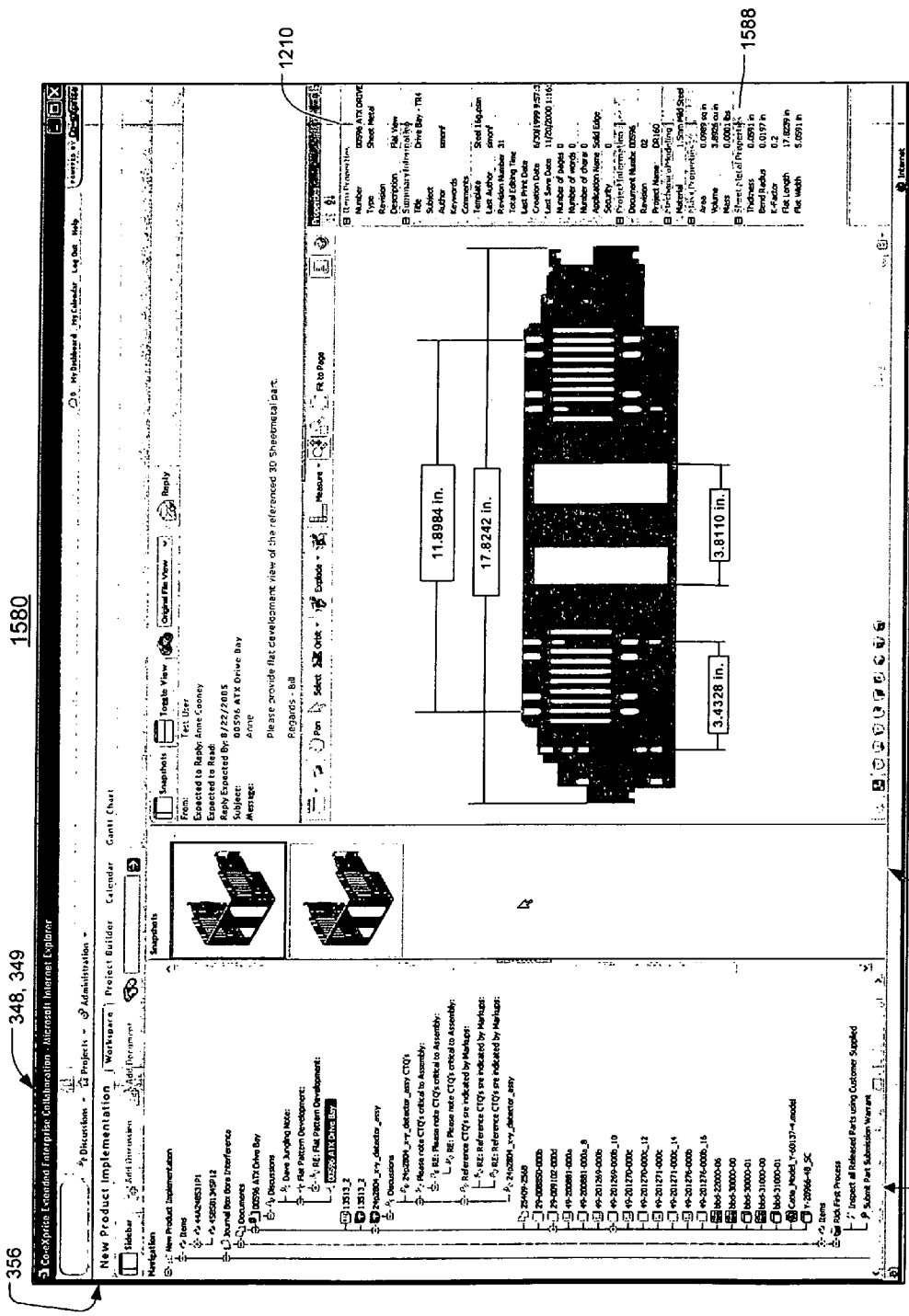
FIG. 15C is a graphical user interface of one embodiment of one instance of an application framework.

FIGS. 15A-C illustrate embodiments of various graphical user interfaces 1500, 1560, and 1580, respectively. Each of the graphical user interfaces 1500, 1560, and 1580 represents one embodiment of one instance of the application framework 348, 349. As previously discussed, the application framework 348, 349 may include one or more navigation frames 352, one or more command and control frames 354, and one or more tool bar frames 356. The control module 318 manages the inter-process communication and synchronizes the events between the navigation frames 352, the command and control frames 354, and the tool bar frames 356.

FIG. 15A is a graphical user interface 1500 of one embodiment of one instance of the application framework 348, 349 for enabling collaboration. Collaboration may include one or more annotations of one or more media information such as, for example, a design document and one or more message threads. The message threads contain the textual substance of the collaboration. Collaboration functionality is provided in the application framework 348, 349 to enable users to collaborate on media information as they work through a task. In one embodiment, the application framework 348, 349 enables annotation and markup directly on an image as it is displayed with the viewer module 420 without modifying the data 966 portion in the structure of the converted secure neutral format file 604-1. Collaboration is associated with the image and one or more messages.

The navigation frame 352 may comprise one or more message threads. The message threads may comprise one or more message nodes 386 between a user at the first or second client nodes 110-1, 120-1 that initiated the message and respondents at the first or second client nodes 110-1, 120-1 that replied to the initial message. The message nodes 386 are organized in a chronological sequence of discussions. In the illustrated embodiment, the graphical user interface 1500 includes an image display pane 1510, a collaboration pane 1520, and a navigation frame 352.

To initiate a collaboration session, the user may click on the message node 386 of the message thread in the navigation frame 352. Accordingly, the graphical context in the command and control frame 354 sequences to match the selected message node 386. The respondent may repurpose (e.g., rotate, explode, assemble, etc.) the initial view of the graphical context of the graphic image 1512 and save this repurposed image 1512 as an additional view state in the XML header 962 of the secure neutral format file 604-1 as previously described herein. The graphical context of the message may include a dialogue box 1514 that contains the text of the message thread. The dialogue box 1514 may fade in and out and/or appear transparent so that a user can view the portions of the graphic image 1512 behind the dialogue box 1514. In one embodiment, the dialogue box 1514 and other user interfaces described herein may be coded, for example, in dynamic HTML. In other embodiments, the collaboration pane 1520 may be enabled with a rich text editor such as, for example, a text editor provided by CUTESOFT.NET®.

During a collaboration session, users can annotate the graphic image 1512 as it appears in the image display pane 1510. In one embodiment, the viewer module 420 enables redline markup overlays on the image 1512 as it is displayed in the image display pane 1510 with a message context 1522 in the collaboration pane 1520. The navigation frame 352 illustrates a message tree 1532 including collaboration message threads 1534 related to a program, project, process, and/or task. The message context 1522 is associated with the highlighted user selected message thread 1536 in the message tree 1532. Annotations may be made using XML based highlighting, notation, and/or redline markup directly on the image 1512. The annotations appear on image 1512 in various colors selected by the user. The annotated image 1512 and the message context 1522 may form the subject of collaboration. Annotations overlays are saved as XML view state directives in the XML header 962 of the secure neutral format file 604-1 as previously described. Although FIG. 15 illustrates one message thread collaborating over one image, in other embodiments, the collaboration module 430 coupled with the application framework 348, 349 may involve one or more message threads collaborating over one or more images.

The command and control frame 354 also may comprise an image snapshot pane 1540. In one embodiment, the image snapshot pane 1540 displays an original thumbnail view 1542 of the originally transmitted graphic image 1512 and an annotated thumbnail view 1544 of the annotated image. The annotated thumbnail view 1544 includes a box 1546 that indicates where the annotation was made.

The image captured in the thumbnail view 1544 may be transmitted to each of the collaborating parties at the first and second client nodes 110-1, 120-1 via e-mail by selecting a reply message tab or a send message tab within the collaboration pane 1520. The e-mail recipient also receives the annotated image 1512, and using a local copy of the viewer module 420 can make additional annotations to the image 1512 and so forth. Collaborations are maintained in the navigation frame 352 to track communication history related to a project. In one embodiment, the message threads 1534 are saved in XML along with the annotation overlays.

FIG. 15B is a graphical user interface 1560 of one embodiment of one instance of the application framework 348, 349 for enabling a collaboration session. The collaboration session includes a message 1562 in the message context 1522 portion of the command and control frame 354. In the illustrated embodiment, the message 1562 requests a sheet metal view of the graphic image 1512 of a secure neutral format file 604-1-*f*. To generate a sheet metal view, the user selects the sheet metal tab 1564 in the item structure pane 1206 with the command and control frame 354 and under the specific item 1566 in the item tree 1218 selects flat view 1568. Those skilled in the art will appreciate a sheet metal view of a three dimensional model of a physical item is a flattened version of the item and, in a stamping application, for example, represents the flat stamped sheet metal flat pattern with the proper bend allowance.

FIG. 15C is a graphical user interface 1580 of one embodiment of one instance of the application framework 348, 349 for displaying a sheet metal flat pattern of the graphic image 1512 of a secure neutral format file 604-1-*f*. The sheet metal flat pattern includes the proper flat dimensions such as the flat length, flat width, thickness, bend radius, and K-factor. These dimensions are displayed in the sheet metal properties portion 1588 of the item properties pane 1204.

Collaboration Module 430

With reference to the figures above, in various embodiments, the EEC module 400 may include a collaboration 430 module to enable the collaboration of multiple resources at the first and second client nodes 110-1 and 120-1 throughout the extended enterprise network 300. As previously discussed, the EEC module 400 may include the converter module 410 to convert media information to a secure neutral file format viewable by all authorized resources throughout the extended enterprise network 300 with the application framework 348, 349 to enable collaboration. In one embodiment, collaborative communication between resources at the first and second client nodes 110-1 and 120-1 may be enabled by real-time communication services implemented with Visual C++ and Win 32 SDK provided by Microsoft®. In one embodiment, the real-time communication service enables real-time collaboration capabilities such as presence, instant messaging, real-time redline markup, and voice chat.

The collaboration module 430 can be arranged to effectively process project templates; collect data via secure templates in offline mode; secure file exchange for native file formats; supports 2-D and 3-D design file formats for items, components, and assemblies; manage workflow XML forms that function online or offline to collect data; batch support for upload, download, and printing of documents; deploy workflow packages that provide data collection and document collaboration; collaborate and access project message threads from a standard e-mail client; collaborate with multi-constituents and multi-documents; and maintain a collaboration journal throughout the entire life cycle of a product, where the journal may include individual issues and their resolution.

In various embodiments, the collaboration module 430 may be arranged to provide the functionality to enable collaboration across the extended enterprise network 300 between users at the first client node 110-1 and users at the second client node 120-1. In one embodiment, the collaboration functionality provided by the EEC module 400 and the converter module 410 enables organizations to share media information including engineering mechanical graphic images and descriptive data of the mechanical designs. With the viewer module 420, a user can display the graphic images and the descriptive data of the design without using run the native CAD software application used to create the electronic files. Through the collaboration module 430, the EEC module 400 may be arranged to manage entire projects online with record retention of design revisions and a journal of decisions and agreements amongst the collaborating parties at the first and second client nodes 110-1 and 120-1.

In various embodiments, the EEC module 400 including the converter module 410, the viewer module 420, and the collaboration module 430 may be arranged to perform near real-time project collaboration between resources at the first client node 110-1 and resources at the second client node 120-1. In the early stages of new product design and development, near real-time project collaboration enables the resources throughout the extended enterprise network 300 to collaborate and share their expertise in the product design and manufacturing phases. Many design and manufacturing errors may be identified by collaboratively reviewing the product design specification and manufacturing requirements. In one embodiment, the collaboration module 430 may be arranged to communicate and correct these errors in a systematic and near real-time manner.

In various embodiments, the collaboration module 430 may be arranged to provide a paperless electronic based engineering change process with online collaboration to improve product accuracy and reduce the cycle time to implement product design changes. Using both online and offline workflow, resources at the first client node 110-1 can collect data from resources at second client node 120-1 using XML based electronic forms, for example. These XML based electronic forms are a documentation package which may include all necessary project documents including: drawings, standards specifications, process instructions, quality process plans, among others.

Figure 16:
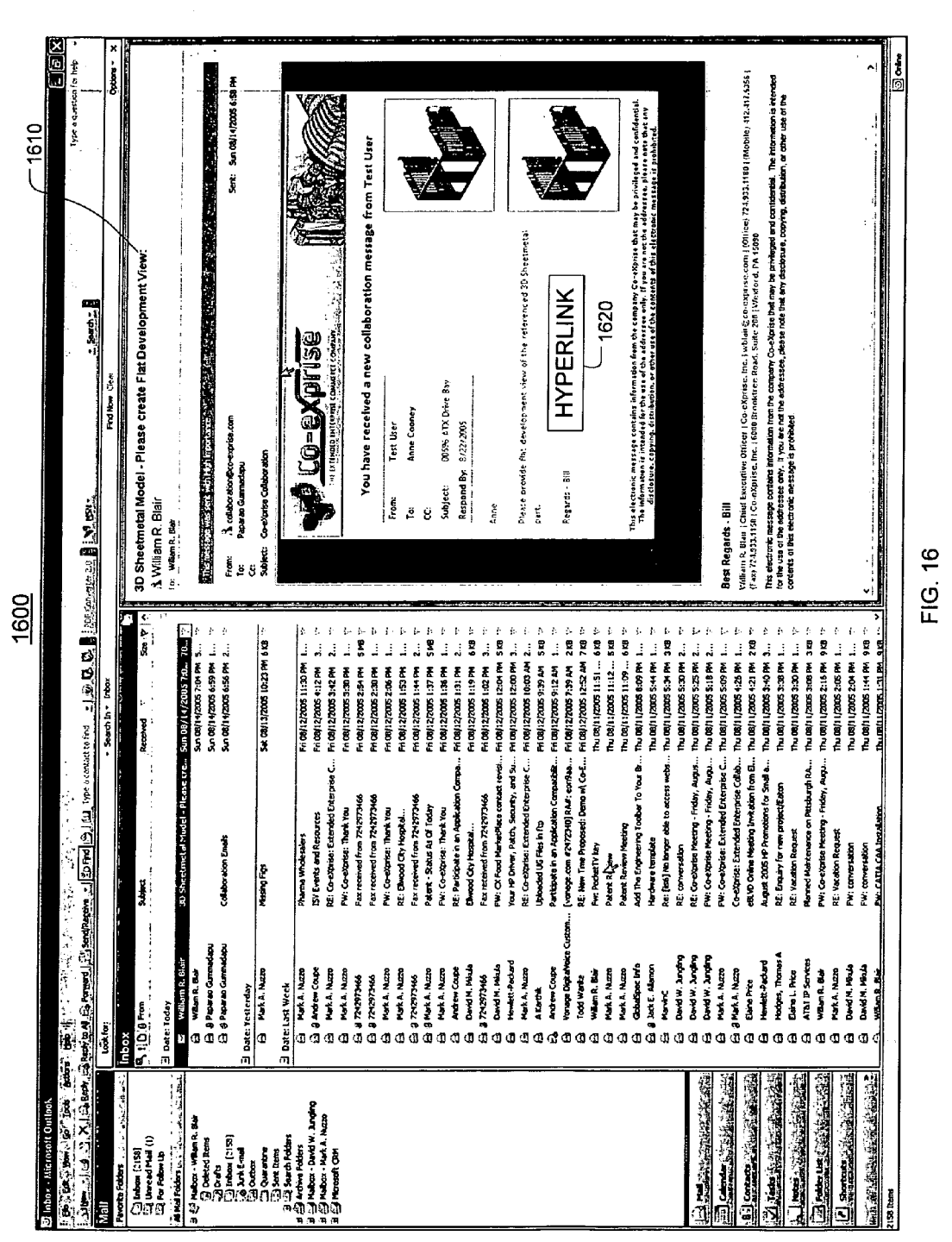

FIG. 16 is a graphical user interface 1600 of one embodiment of a user's e-mail. In one embodiment, the e-mail client receives a collaboration message 1610 from the application framework 348, 349 in conjunction with the host processing node 140. As previously discussed, the application framework 348, 349 may include one or more navigation frames 352, one or more command and control frames 354, and one or more tool bar frames 356. The control module 318 manages the inter-process communication and synchronizes the events between the navigation frames 352, the command and control frames 354, and the tool bar frames 356. Although collaboration is described as communication between resources at the first and second client nodes 110-1, 120-1, embodiments may enable communication, collaboration, and/or negotiation between multiple internal resources within the first or second client nodes 110-1, 120-1, for example.

In other embodiments, the collaboration module 430 may be arranged to deliver a collaboration message 1610 between resources at the first and second client nodes 110-1-a, 120-1-b via e-mail. In one embodiment, the application server 170-1 may comprise a dispatch service module that provides reliable asynchronous delivery of email collaboration messages. According to this embodiment, the dispatch service module provides a queuing framework for all collaboration emails to be transmitted. In one embodiment, email messages may be dispatched to recipients using a simple mail transfer protocol SMTP relay. In one embodiment, the e-mail may contain a hyperlink that launches the application framework 348, 349. Upon a resource receiving the e-mail, the resource may select the hyperlink 1620 to launch the application framework 348, 349 and access the collaboration/negotiation system 100, 300, for example. In one embodiment, the resources may respond to the collaboration message 1610 that initiated the e-mail and/or employ other modules of collaboration and negotiation system 100, 300 described herein.

Project Management Module 440

With reference to the above figures, in various embodiments, the EEC module 400 includes a project management module 440 arranged to provide project management, communications, and media information sharing internal to the first client node 110-1 (e.g., an OEM buyer) or internal to the second client node 120-1 (e.g., the strategic partners and/or suppliers) and between the first client node 110-1 and the second client node 120-1. In one embodiment, the project management module 440 is arranged to facilitate project management related action on enterprise related tasks. In one embodiment, the project management module 440 provides a re-useable project plan and/or standard processes, which may be stored in a repository. The project management module 440 manages a variety of processes including but not limited to, item sourcing and negotiation preparations, production part approval, new product introduction, and equipment installations. The project management module 440 may be arranged to prompt users of virtual project team tasks due, to store and retrieve message thread history, and to annotate or redline project related media information.

In various embodiments, programs, projects, processes, tasks, and/or subtasks created with the project management module 440 are used in a collaboration context throughout the enterprise network 300. The project management module 440 provides a role based project management tool with reusable role based projects. The roles may be defined within an organizational context. The role based functionality of the project management module 440 provides multipurpose contextual roles that enable the user to set up generic project plans. The generic role based projects are reusable because they are not tied to specific resources. To support collaboration, the project management module 440 compresses and encrypts native format files 602-1-$f$ upon upload to the host processing node 140. The converted secure neutral format files 604-1-$f$ are made available to projects for collaboration. To track project related or collaboration related communication, the project management module 440 provides collaborative message threads. Project related items are structured in a tree format where the addition of a sub-item including one or more objects of the same type within a tree automatically generates a group node.

Figure 17A:
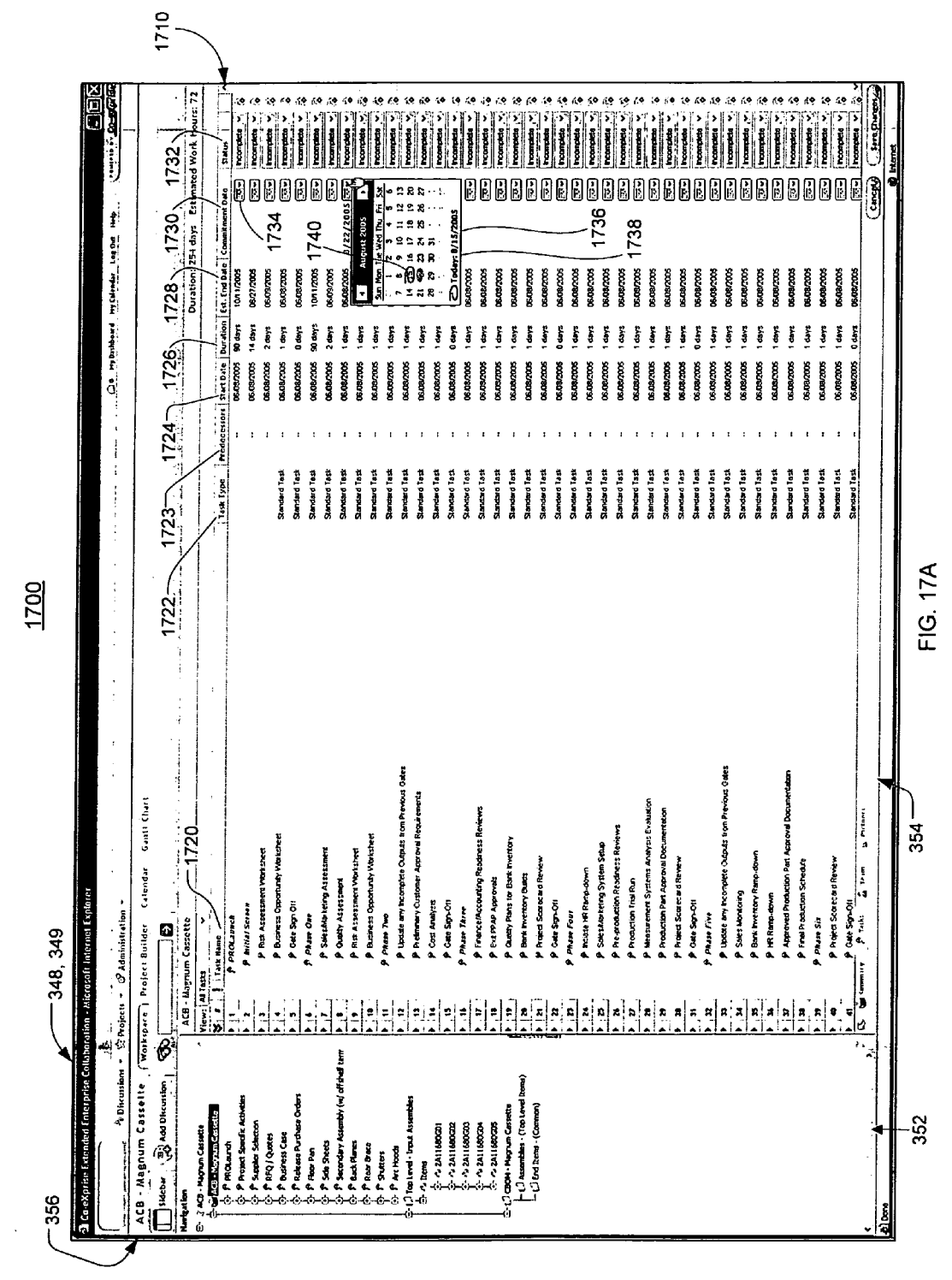

FIG. 17A is a graphical user interface 1700 of one embodiment of one instance of the application framework 348, 349 to enable project management. As previously discussed, the application framework 348, 349 may include one or more navigation frames 352, one or more command and control frames 354, and one or more tool bar frames 356. The control module 318 manages the inter-process communication and synchronizes the events between the navigation frames 352, the command and control frames 354, and the tool bar frames 356. The navigation frame 352 may comprise one or more message threads. The message threads may comprise one or more message nodes 386 between a user at the first or second nodes 110-1, 120-1 that initiated the message and respondents at the first or second nodes 110-1, 120-1 that replied to the initial message. The message nodes 386 are organized in a chronological sequence of discussions.

In the illustrated embodiment, the graphical user interface 1700 includes a project display pane 1710 within the command and control frame 354. In one embodiment, the image display pane 1710 includes a task name tab 1720, task type tab 1722 predecessor 1723, start date tab 1724, duration tab 1726, estimated end date tab 1728, commitment date tab 1730 and a status tab 1732, each of which, when selected, initiate the execution of a module. The commitment date portion includes a plurality of commitment specific buttons 1734 associated with each task name. Selecting the commitment specific button 1734 displays a calendar box 1736 associated with that task and indicates the current date 1738 and the commitment date 1740.

The navigation frame 352 may comprise programs, projects, processes, tasks, and/or subtasks. The command and control frame 354 may comprise task names and functional resources. The navigation frame 352 and the command and control frames 352 may include tree nodes and tree control of hierarchical tree node objects. In one embodiment, each tree node is user definable and extensible. Each tree node includes a graphical representation and a programmed behavior such as, for example, expand/minimize sub nodes, present the tree node contents in the navigation frame 352 and/or the command and control frame 354, initiate communication between the frames of the application framework 348, 349 and/or enable/disable an application 370, application view 372, and/or application component 374 in the toolbar frame 356.

In one embodiment, the functional modules 172 that include the EEC module 400, DRM module 500, CN module 600, and the DCM module 700 may enable a user at the first and second client nodes 110-1-$a$, 120-1-$b$ to publish a program, project, process, task, subtask, and/or media information. The publication is accessible to all authorized functional resources throughout the extended enterprise 300 by selecting a publish tab within the application framework 348, 349.

In one embodiment, publishing comprises sending an e-mail notification to one or more functional resources at the first and second client nodes 110-1-$a$, 120-1-$b$ inviting them to participate in a specific program, project, process, task, and/or subtask. If a functional resource accepts the invitation, they are provided a user identification (ID) number and password if the functional resource is not currently in possession of a user ID and password. If the functional resource has a user ID and password, the user ID and password are updated to provide access rights to the specific program, project, process, task, and/or subtask in which the resource was invited to participate. The access to a specific program, project, process, task, and/or subtask enables the functional resource to gain access to all media information associated with the specific program, project, process, task, and/or subtask. In one embodiment, this may include access to design documents such as, for example, the secure neutral format files 604-1-$f$. In one embodiment, the resource may access the application framework 348, 349, the host processing node 140 host computing platform 150 resources, and one or more of the functional modules 172 contained therein.

The project management module 440 enables users (e.g., functional resources) located at the first and second client nodes 110-1-$a$, 120-1-$b$ with project management capabilities. The project management capabilities may include, but are not limited to: (1) assigning tasks to functional resources; (2) identifying tasks as predecessors and/or successors to other tasks; and/or (3) enabling functional resources to enter start date, end date, task durations, commitment dates, and the status of a given task. The project management module 440 also may include the capability to automatically calculate start dates, end dates, and/or task durations as well as the capability to import/export external project plans that are configured in various file formats such as, for example, Microsoft® Project.

Figure 17B:
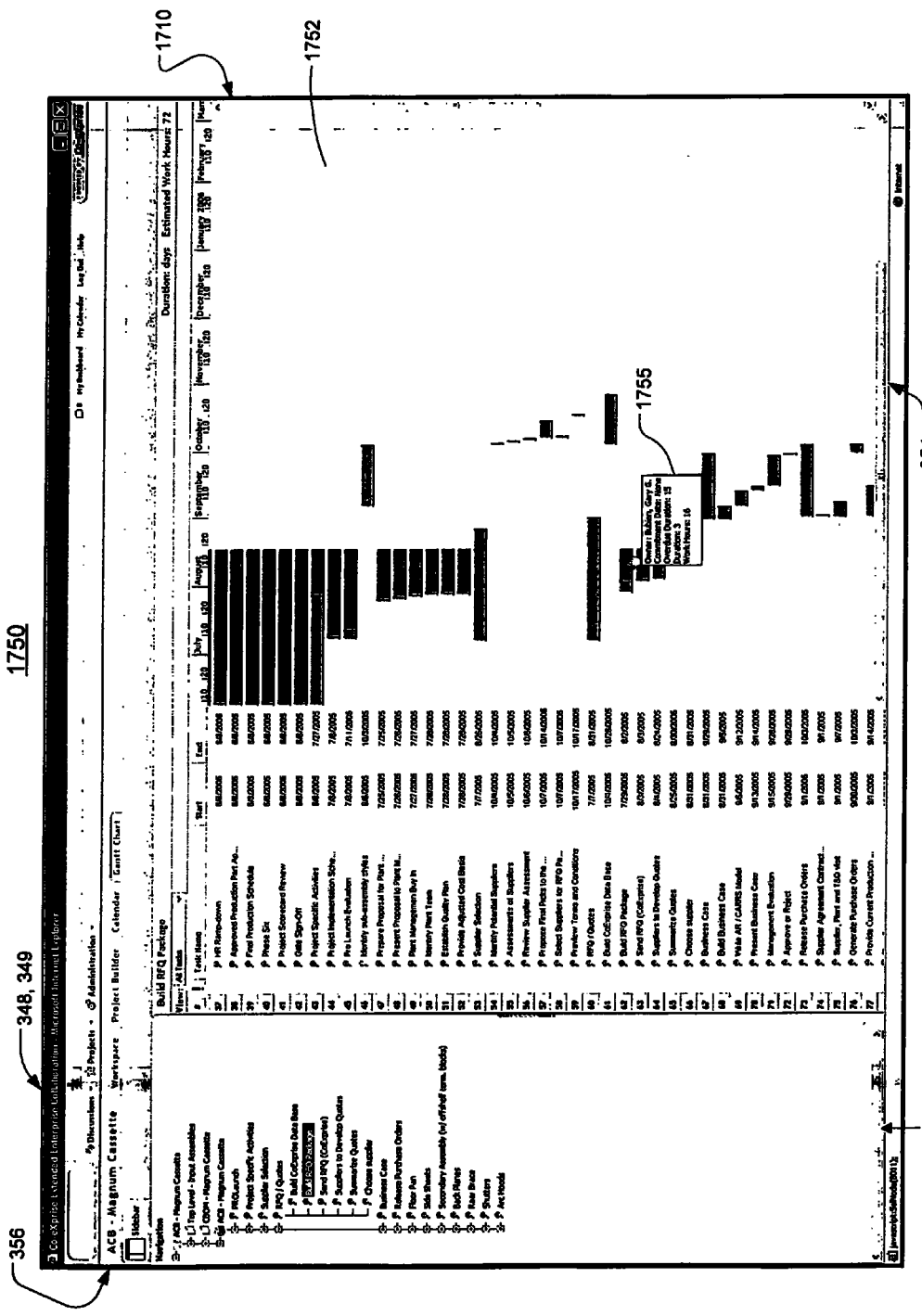
FIG. 17B is a graphical user interface of one embodiment of one instance of an application framework.

FIG. 17B is a graphical user interface 1750 of one embodiment of one instance of the project display pane 1710 for displaying a GANNT chart 1752 associated with a particular program, project, process, task, and/or subtask. According to this embodiment, a user may position the pointing device 202 over the GANNT chart and the application framework 348, 349 will cause a dialogue box 1755 to appear. In one embodiment, the dialogue box comprises information regarding a specific task such as, for example, commitment date and person responsible for completing the task.

Digital Rights Management (DRM) Module 500

Figure 18:
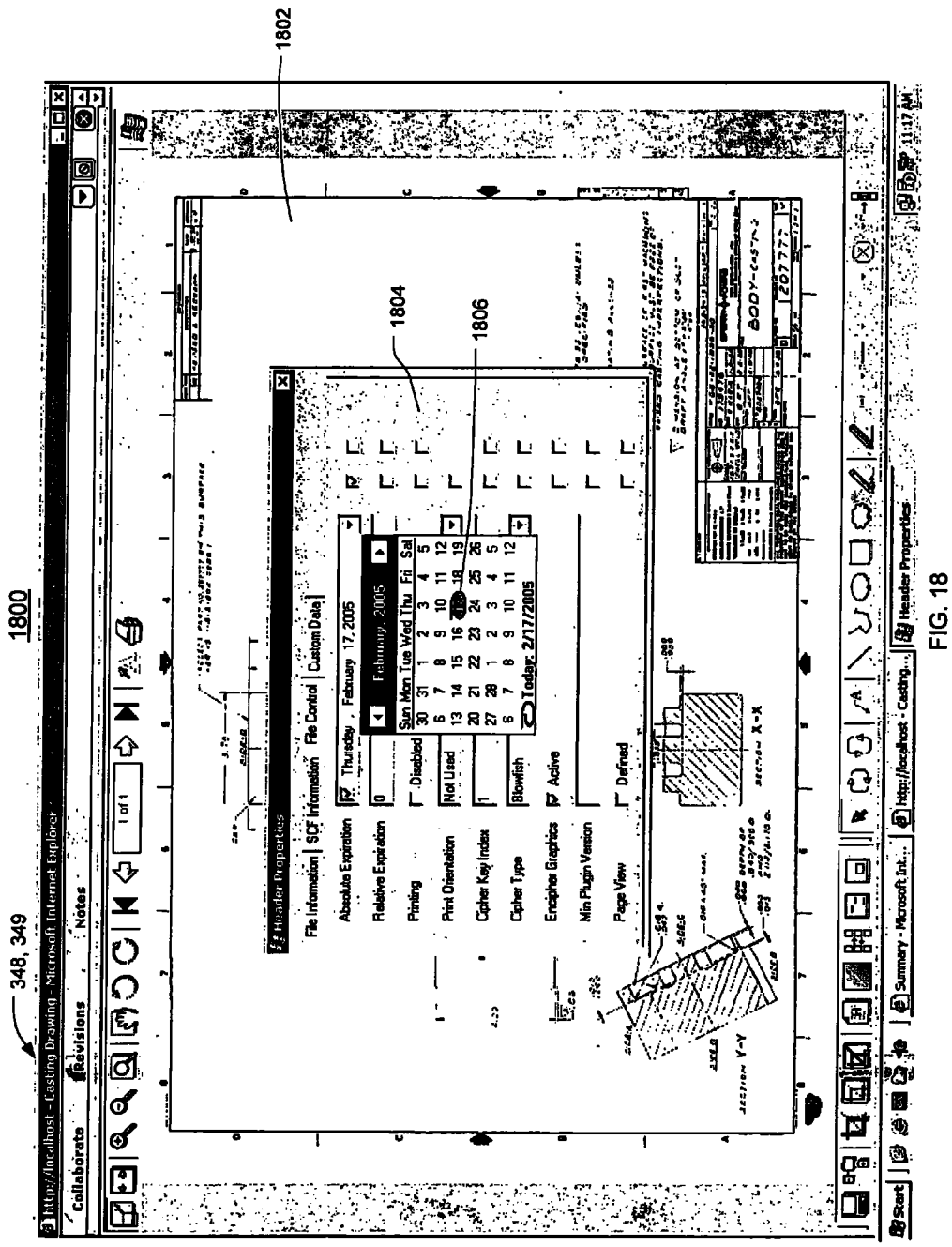
FIG. 18 is a graphical user interface of one embodiment of one instance of an application framework.

FIG. 18 is a graphical user interface 1800 of one embodiment of one instance of the application framework 348, 349 to enable a collaboration session in a secure collaboration environment throughout the extended enterprise network 300. In one embodiment, the secure collaboration session may be implemented with the application framework 348, 349 including an embedded DRM module 500. In one embodiment, the DRM module 500 may include three components: (1) a document encryption engine, (2) a viewer designed to view the document, and (3) an encryption key that enables the viewer to view the document. As discussed previously, a secure collaboration environment may comprise utilizing the DRM module 500 to encrypt, authenticate, authorize, and audit of content of media information shared by the participants in the collaboration session. In addition, throughout the extended enterprise network 300, the DRM module 500 may provide secure transport of the media information; secure storage of the media information; sender authentication; recipient authentication; authorization; sender non-repudiation; tamper-proofing of the original media information; time-stamping; tracking and archiving transmissions of the media information between the participants; restricted authorization privileges to access the media information; and audit trails of transmissions of the media information.

In the illustrated embodiment, the document may comprise media information. The document security functionality is provided by the DRM module 500. The graphical user interface 1800 illustrates one embodiment of secure media information such as, for example, a design document 1802 including AES/FIPS-197 with 512 binary key codes security protection that is about to expire. The design document 1802 represents any document including sensitive confidential and proprietary information that may be used for collaboration outside of the organization (e.g., first or second client node 110-1-a, 120-1-b organizations) that originally published the document 1802. Security is applied to these documents to prevent the unauthorized distribution of their confidential and proprietary contents when a program, project, process, task, and/or subtask is completed and/or if the functional resource is not granted access to such content. Dialog window 1804 shows an absolute expiration date 1806 at which time the document 1802 disables the viewing privileges of predetermined resources. Thus, after the expiration date 1806, these unauthorized users will no longer have access to the document 1802.

In one embodiment, the DRM module 500 provides control to all document 1802 privileges such as viewing, printing, and forwarding. In one embodiment, the DRM module 500 can revoke document 1802 privileges in real-time in situations where a user is no longer functions as a member of a project team, or a supplier gets canceled, or a purchase order expires. In one embodiment, the DRM module 500 automatically notifies and updates subscribers when a new revision or supercedure of the document 1802 is available. In one embodiment, the DRM module 500 provides both online and offline protection. In one embodiment, the DRM module 500 pre-notifies the user that the document 1802 is near the subscription expiration. In one embodiment, to highlight that the document is being replaced with a new revision, the DRM module 500 temporarily revokes access or annotates such documents with a watermark. In one embodiment, the DRM module 500 provides protection for documents located on servers and desktops whether or not they are connected to the Internet. In one embodiment, the DRM module 500 enables access to a document for a predetermined time period and/or controls the number of times a document can be viewed by a specific user.

The DRM module 500 enables functional resources who publish media information within the collaboration and negotiation system 100, 300 (publishers) to protect, control, track, and audit digital content in native format files 602-1-f uploaded to the host processing node 140 and/or secure neutral format files 604-1-f used in collaboration throughout the extended enterprise network 300. In one embodiment, the DRM module 500 limits viewing of electronic copies of sensitive documents to licensed subscribers and prevents these files from being republished or redistributed to non-subscribers. In one embodiment, the DRM module 500 also provides granular control and tracking of any unauthorized distribution by identifying for the publisher all unauthorized users, who attempted to view an illegally distributed copy, and all licensed users that illegally forwarded the document.

In one embodiment, the DRM module 500 assures effective compliance for publishers even when content is resold and re-distributed by licensed users. In one embodiment, the DRM module 500 manages the number of copies that can be viewed and distributed in large volume based subscriptions and/or single subscriber applications. Accordingly, the DRM module 500 enables an organization to securely share and collaborate on media information such as, for example, engineering designs and business documents without disrupting their current business process. For example, often a publisher's document is packaged with other documents and then forwarded to a user (e.g., an RFQ package sent from a buyer to a supplier, wherein the RFQ package includes drawings, material specifications and process specifications). Using the DRM module 500, the forwarded user is able to view any encrypted document within a given business application (e.g., an RFQ package) once the user becomes authorized to access the document.

In one embodiment, the DRM module 500 captures the distribution route of a document from the publisher to the recipient and may provide an audit trail of all attempts to defeat compliance. In one embodiment, the DRM module 500 adds watermarks to the viewed or printed copy of a document. In one embodiment, the DRM module 500 encrypts documents with U.S. Government Advanced Encryption Standard (AES FIPS-197).

The application framework 348, 349 may access the DRM module 500 to provide secure 2-D and 3-D engineering and office document viewing, collaboration, and XML data input capabilities. The DRM module 500 accepts native format files 602-1-f including document, image, and native CAD formats such as the file formats discussed above with reference to the examples illustrated in Tables 1-5. The DRM module 500 protects a wide range of engineering design and office document formats used in collaboration throughout the extended enterprise 300 (e.g., as illustrated in the examples Tables 1-5). The secure neutral format files 604-1-f may be secured with the DRM module 500. The secure neutral format files 604-1-f include an XML header 962 that includes metadata, cached permissions, and document routing tags that (1) can be utilized to track the secure neutral format files 604-1-f throughout the extended enterprise network 300; and (2) assign and/or revoke policy based permissions to each user at the first and second client nodes 110-1-a, 120-1-b. In one embodiment, the policy based permission may include, for example, printing, viewing, transmitting, and/or mark-up capabilities. Because such policy based permissions are embedded in the secure neutral format file 604-1-f, the application framework 348, 349 in conjunction with the processing node 140, is capable of not permitting a user to view, for example, a secure neutral format file 604-1-f despite the user having access to the application framework 348, 349. For example, if a supplier located at client node 120-1 supplies items to two different buying entities (Buyer 1 and Buyer 2). In one embodiment, Buyer 1 & Buyer 2 are competitors and Buyer 2 terminates the supplier's view permissions to Buyer 2's media information, supplier, who still has access to the application framework 348, 349 (via Buyer 1's authorization) cannot view Buyer 2's media information despite supplier having access to the application framework 349. Likewise, Buyer 2 would not be able to view Buyer 1's media information if such media information was forwarded to Buyer 1 by supplier because the secure neutral format file 604-1-f comprising Buyer 1's media information would not enable Buyer 2 to view Buyer 1's secure neutral format file 604-1-f.

In one embodiment, the DRM module 500 inserts document routing tags in the XML header 962 of the secure neutral format files 604-1-f. This feature enables a publisher to granularly track the distribution of a secure neutral format files 604-1-f document within an organization and throughout the extended enterprise network 300. In one embodiment, the DRM 500 inserts a publisher point back link embedded in the XML header 962 of the secure neutral format files 604-1-*f* where a publisher subscription server that may be part of the host computing platform 150 can manage and track the viewing rights of the document each time a user attempts to open the document in the extended enterprise network 300. In one embodiment, the publisher point back link is a web link that operates in conjunction with the subscription server and is embedded in the secure neutral format files 604-1-*f* to provide an unauthorized user the opportunity to obtain a subscription by directing the unauthorized user to a publisher website. One embodiment provides a compliance mechanism for the unauthorized user and the existing subscribers of the publisher who forward the document to the unauthorized user. In one embodiment, the DRM module 500 provides bulk subscription tracking capability. In one embodiment, the bulk subscription tracking capability may be implemented as a block of subscriber viewer addresses contained in the encrypted XML file header 962 of the secure neutral format file 604-1-*f*. One embodiment provides granular subscription management by allocating a number of viewer modules 420 licensed to an organization and decrementing the number as each viewer module 420 is downloaded to user. Once the viewer count reaches zero, the publisher is notified that the bulk subscription has been exhausted.

The DRM module 500 also provides revision notification that informs subscribers of any document revision change or document supercedure. This revision notification feature functions both a stand-alone document and when a document is included in a kitted information package. This method of revision control works for both online and offline documents. In one embodiment, the DRM module 500 provides revision notifications of the secure neutral format files 640-1-*f*.

In one embodiment, the DRM module 500 protects documents with high security using the advance encryption standards (AES)/FIPS-197 with 512 binary key codes. The DRM module 500 enables encryption and secure distribution of the native format files 602-1-*f* and the secure neutral format files 604-1-*f* throughout the extended enterprise network 300. In one embodiment, the DRM module 500 functionality may be implemented using .NET technology and Visual C++ software development tools provided by Microsoft®. In one embodiment, the DRM module 500 may be implemented using a web presentation framework embedded into ASP-.NET also provided by Microsoft®. In one embodiment, the DRM module 500 may be embedded within the viewer module 420 using Visual C++, for example. In addition, the DRM module 500 communicates with the other functional modules 172 defined herein using .NET XML Web services.

Collaborative Negotiation Module 600

In one embodiment, the systems 100, 300 described above and the functional modules 172 provided by the host processing node 140 such as the EEC module 400, sub-modules such as the converter module 410, viewer module 420, collaboration module 430, and project management module 440, the DRM module 500, the design cost management module 700 (DCM), and the application framework 348, 349 may be coupled with the collaborative negotiation module 600 to form a collaborative negotiation framework that may be implemented throughout the extended enterprise networks 100, 300. The collaborative negotiation module 600 enables organizations represented by first and second client nodes 110-1, 120-1 to use the host processing node 140 to implement a total spend negotiation technique that addresses multiple factors such as price inventory ownership, order frequency, lead-time, and warranty negotiation for total cost negotiation. For example, in one embodiment, the collaborative negotiation module 600 may leverage the functionality of the EEC module 400 and the DRM module 500 to provide a secure collaborative environment for buyers at the first client node 110-1 to manage item sourcing activities with their globally dispersed suppliers at the second client nodes 120-1-*b*.

Using conventional sourcing and/or auction tools, many buyer organizations (buyers) cannot openly bid their total item spend volume due to the inability of securely distributing throughout the extended enterprise 300 media information that describes an item that which a buyer desires to source. For example, conventional reverse auctions deliver only price discovery with potential savings do not provide a complete sourcing solution that includes total cost negotiation for a given spend volume. Conventional auctions, for example, do not account for the total operating costs arising from a buyer/supplier relationship. Because of these limitations in current sourcing capabilities, buyers can bid only on a small percentage of their annual contractible spend volume. Much of the spend volume in a buyer organization cannot be competitively quoted because of limited supply base, inability to cost-effectively and securely distribute media information that describes the spend, proprietary nature of competitive designs, and/or long term relationships with existing suppliers. In addition buyers have not fully exploited the benefits of the Internet or WAN technology to manage the sourcing function in their business. Thus, in one embodiment, the collaborative negotiation module 600 provides the functionality to deliver a detailed spend analysis and negotiation tool to enable buyers to evaluate a greater percentage of their spend volume and target high leverage opportunities with supplier organizations (suppliers).

In one embodiment, the collaborative negotiation module 600 enables the conversion of buyer and supplier design and specification documents from a native format (native format files 602-1-*f*) to a neutral format (secure neutral format files 604-1*f*) using the converter module 410. In addition, the DRM module 500 adds security to the electronic transactions of the native format files 602-1-*f* and the secure neutral format files 604-1-*f* and enables the buyer and supplier to collaborate over secure extended enterprise networks 100, 300. Thus, design and specification documents that support a variety of RFQ, RFP, and/or RFI (RFx) documents can be exchanged securely between the first client node 110-1 (buyer) and the one or more second client nodes 120-1-*b* (suppliers). Once the design, specification, and RFx documents (collectively represented by native format files 602-1-*f*) are uploaded to the host processing node 140 and are converted to secure neutral format files 604-1-*f* with embedded security, the collaborative negotiation module 600 may extract metadata from the secure neutral format files 604-1-*f* to automatically populate a RFx document with the applicable extracted information. In addition, the collaborative negotiation module 600 can process the extracted metadata to automatically match an engineered item to an appropriate supply base for that item. For example, the collaborative negotiation module 600 can extract metadata such as the thickness, length, width, and height of an item that represents a stamped component and automatically calculate the press tonnage required to manufacture the item. The collaborative negotiation module 600 can then utilize the tonnage calculation to narrow the bid participants to include only suppliers that are capable of producing the item.

Collaborative Negotiation Framework

In one embodiment, a collaborative negotiation module 600 provides a framework to implement collaborative negotiation throughout the extended enterprise network 300. A collaborative negotiation framework is a negotiations platform that enables sourcing professionals (e.g., buyers) to design custom negotiations formats. To provide for different negotiation implementations, embodiments of the collaborative negotiation framework enable sourcing professionals to choose among various negotiation parameters and negotiation methods. In one embodiment, the collaborative negotiation platform provides the capability to take pre-bid data and automatically transport data to an implementation system. In one embodiment, the collaborative negotiation platform provides multi-variant active negotiation terms where suppliers can bid and buyers can award contracts based on price and non-price related negotiation terms. Accordingly, the collaborative negotiation platform enables suppliers to differentiate themselves on non-price related active negotiation terms as well as total price to influence a buyer decision to award the contract. Generally, electronic competitive negotiations require multiple successive rounds of bidding before a contract award decision is made by the buyer.

Figure 19:
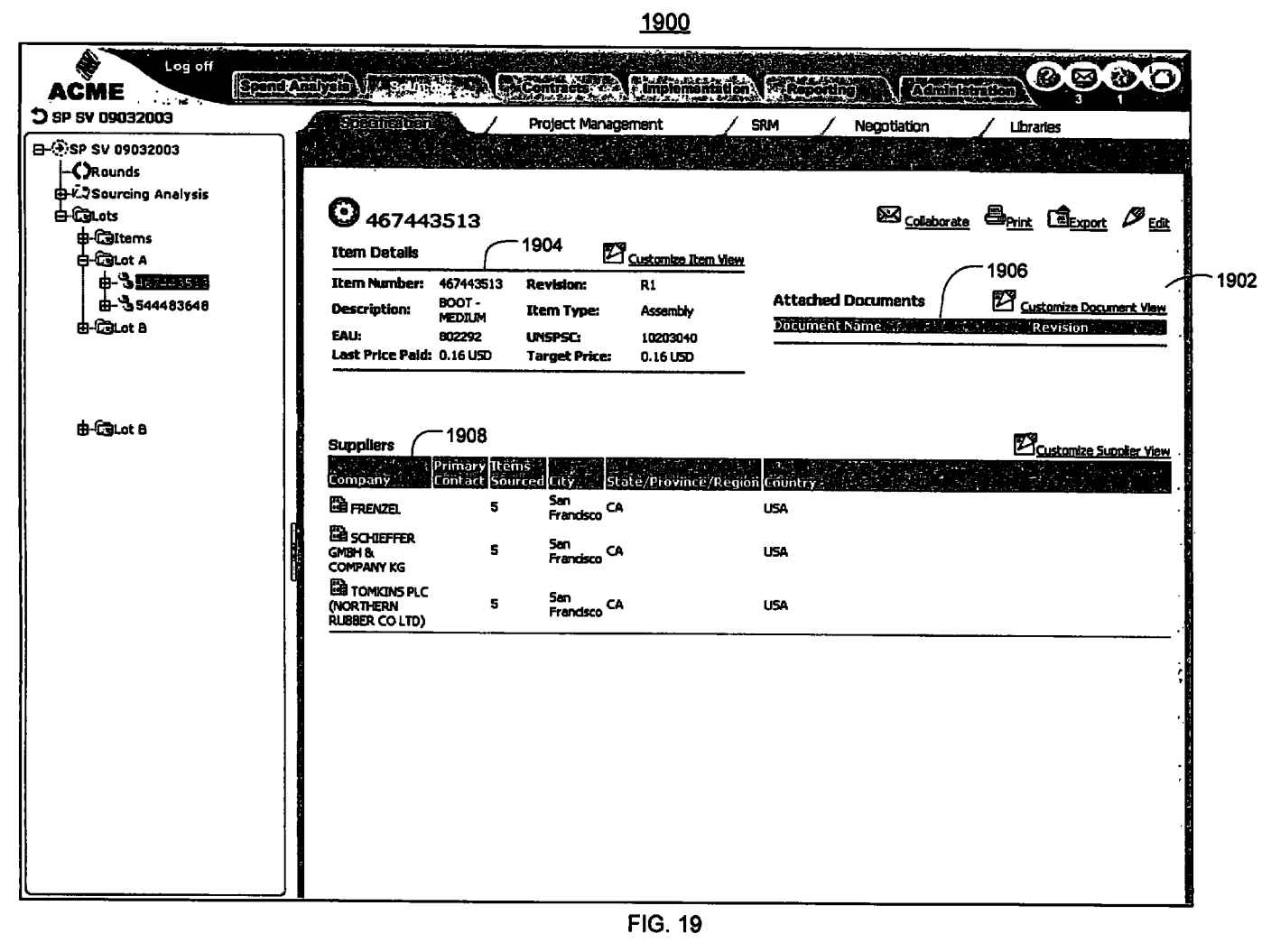

FIG. 19 is a graphical user interface 1900 of one embodiment of one instance of the application framework 348, 349 to enable a collaborative negotiation event to bid for an item. The graphical user interface 1900 includes a specification pane 1902 to display the item details 1904, attached documents 1906, and participating suppliers 1908. The item details 1904 describe the item up for bid. Prior to the negotiation event, there may be several rounds of collaborative pre-bid data information gathering and exchange between the buyer and the various suppliers. For example, the buyer may issue a RFI, RFP, RFQ, and Auction. These documents as well as other media information such as, for example, technical engineering and manufacturing specifications are listed in the attached documents 1906 section. As previously discussed, these documents may be uploaded to the host processing node 140 as native format files 602-1-$f$ where they are converted to the neutral file format and are distributed throughout the extended enterprise network 300 as secure neutral format files 604-1-$f$. During the RFI phase, the buyer may ask suppliers (bidders) to submit information to determine if they are qualified to provide the items that will be subject to the negotiation. In the RFP phase the buyer determines the suitability of each potential supplier and defines around the supplier offering. In the RFQ phase the buyer has a codified view of the item to be purchased and defines the terms and conditions of the negotiation and purchase. During the price negotiation phase, the focus is generally on price and volume. In addition, the collaborative negotiation module 600 may extract metadata from the secure neutral format files 604-1-$f$ to reduce RFQ and market making labor costs.

Embodiments of the collaborative negotiation framework utilize price and non-price active negotiation terms. The collaborative negotiation module 600 monetizes the impact of non-price active negotiation terms on the total cost value of the bid offering. The monetized values of the non-price active negotiation terms may be fixed or variable and may be locked at any time during the collaborative negotiation event. Additional or fewer active negotiation terms may be utilized based on the specific implementation. The embodiments are not limited in this context.

An active negotiation term refers to a single atomic unit of a negotiation such as "payment term," "lead time," and others described herein. An active negotiation term may include values that are processed by a formula that is then monetarily factored into the bid price (basis) to define the best offer. The total cost value is the adjusted basis price in accordance with the monetized active negotiation terms.

For example, if the issue is price variance of a purchased commodity over a period of time, one goal of the negotiation for a buyer may be to engage into a long-term fixed price contract with a supplier. If the issue is timely delivery, one goal of the negotiation for the buyer may be to select a supplier with a compliant lead time. Thus, non-price active negotiation terms such as, for example, "term" and "lead time" may have considerable impact on the total cost value of the negotiation rather than bottom line bid price alone.

Active negotiation terms may be divided into two categories. Those that translate non-price factors into economic impact and those that have a result set that can be optimized by a negotiations object. Active negotiation terms may be chosen from a library containing common negotiation terms and custom negotiation terms that may be defined by the buyer. Custom active negotiation terms may be submitted by the supplier in predefined fields in order to make their bid. A formula translates these custom active negotiation terms into their economic impact to arrive at the total cost value.

Figure 20:
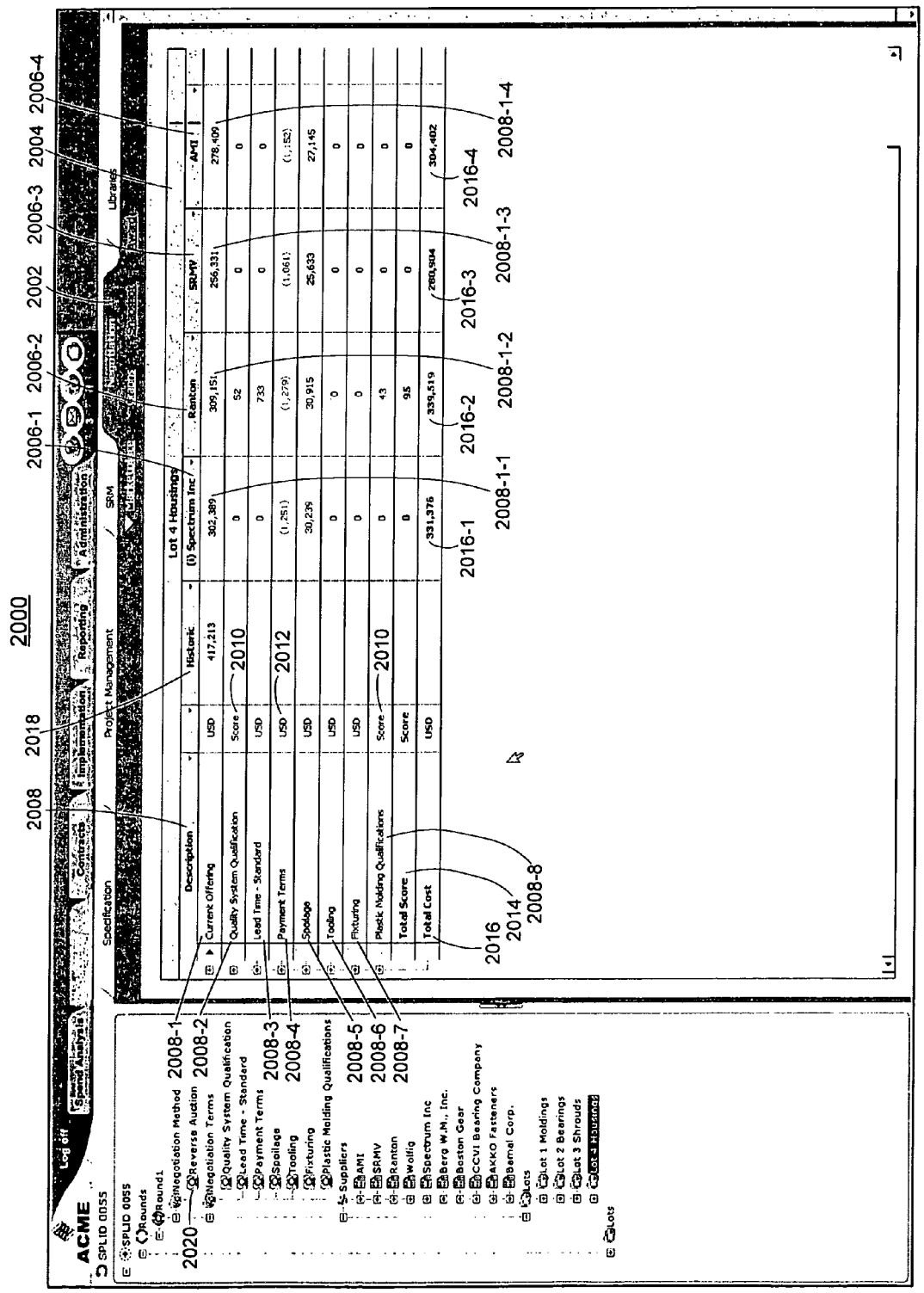
FIG. 20 is a graphical user interface of one embodiment of one instance of an application framework.

FIG. 20 is a graphical user interface 2000 of one embodiment of one instance of the application framework 348 as viewed at the buyer side client node 110-1 computer 310. Accordingly, the negotiation pane 2002 is displayed at the buyer side client node 110-1 computer 310. A marketplace pane 2004 is provided within the negotiation pane 2002. At the buyer side, the marketplace pane 2004 shows the bid standings for all the suppliers participating in a negotiation event. In the illustrated embodiment, the marketplace pane 2004 shows the standings between four suppliers 2006-1-4 (from left to right) submitting bids in a negotiation event for an item referred to as "Lot 4 Housings," for example. The marketplace pane 2004 also shows the current offering 2008-1, which may be referred to herein as the basis bid, and active negotiation terms 2008-2-8 (price and non-price factors) used in the negotiation event. As shown, the active negotiation terms 2008-2-8 include: quality system qualification 2008-2, lead time 2008-3, payment 2008-4, terms 2008-5, spoilage 2008-5, tooling 2008-6, fixturing 2008-7, and plastic molding qualifications 2008-8. A score 2010 is provided for quality system qualifications 2008-2 and plastic molding qualifications 2008-8 based on previously submitted queries entered by each of the suppliers 2006-1-4. Other active negotiation terms may be assigned monetized values 2012 in United States Dollars (USD), for example. A total score 2014 and a total cost 2016 is provided for each supplier 2006-1-4. The current offering 2008-1 compares the historic cost 2018 against the bid price entered by each supplier 2006-1-4. In one embodiment, the historic cost may represent a price that the buyer is currently paying for the items up for bid, for example.

As shown, the supplier 2006-1 bid can be analyzed with respect to the current offering 2008-1-1 basis price of $302,389 and active negotiation terms payment terms 2008-4 of ($1,252) and spoilage 2008-5 of $30,239. When the active negotiation terms (2008-4, 2008-5) are considered, the total cost value 2016-1 of the bid submitted by supplier 2006-1 is $331,376, which is greater than the current offering 2008-1 basis price of $302,389. A similar analysis applies to supplier 2006-3 with a current offering 2008-1-3 basis price of $256,331 and a total cost value 2016-3 of $280,904. Likewise, supplier 2006-4 submitted a current offering 2008-1-4 basis price of $278,409 which translates to a total cost value 2016-4 of $304,402.

The bid submitted by supplier 2006-2 may be analyzed in terms of a current offering basis price 2008-1-2 of $309,151 and active negotiation terms such as quality system qualification 2008-2 score of 52, lead time 2008-3 of $733, payment term 2008-4 of ($1,279), spoilage factor 2008-5 of $30,915, and plastic molding qualification 2008-8 score of 95. When the active negotiation terms (2008-1-5 and 2008-8) are considered, the total cost value 2016-2 of the bid submitted by supplier 2006-2 is $339,519, which also is greater than the current offering basis price of $309,151.

In the illustrated embodiment, the buyer selected a reverse auction 2020 negotiation method. Other electronically facilitated negotiation methods may comprise, for example, RFQ collaboration, initial offer, reverse auction, split of business, forward auction, Dutch auction, English auction, multi attribute, bid-ask, transportation, supplier lotting, among other negotiation methods. Despite the cost savings that can be realized using these negotiation formats, electronic negotiation methods are used only for a minority of large scale purchases made by an organization. One limitation is that contracts are awarded on bid basis price alone because these negotiation methods generally do not take into account active negotiation terms.

In the illustrated embodiments of the collaborative negotiation framework, suppliers can differentiate their offerings based on price such as current offering 2008-1; objective active negotiation terms 2008-2-8 such as lead time 2008-3, payment 2008-4, terms 2008-5, spoilage 2008-5, tooling 2008-6, and fixturing 2008-7; and subjective active negotiation terms such as quality system qualifications 2008-2 and plastic molding qualifications 2008-8. Accordingly, the active negotiation terms 2008-2-8 in accordance with the embodiments described herein enable the suppliers 2006-1-4 to influence a buyer decision on more than bid basis price alone. This technique also eliminates the need for post-bid analysis by the buyer to select a supplier based on active negotiation terms.

The active negotiation terms 2008 described herein are listed as examples only. There may be additional, fewer or different active negotiation terms without limitation. The embodiments are not limited in this context.

Figure 21:
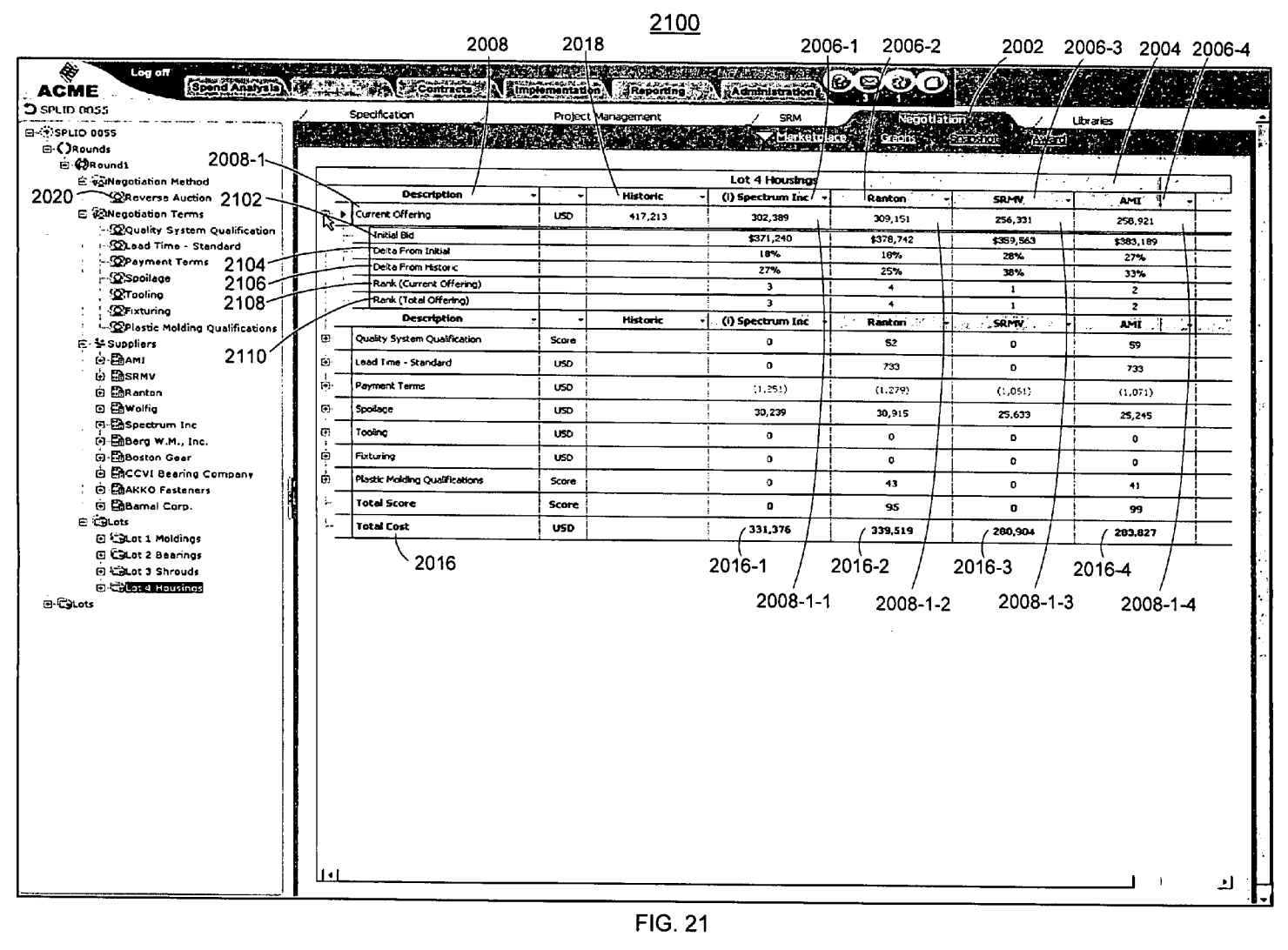

FIG. 21 is a graphical user interface 2100 of one embodiment of one instance of the application framework 348 as viewed at the buyer side client node 110-1 computer 310 with the current offering 2008-1 field expanded. In one embodiment, the current offering 2008-1 field may include the following sub-fields: initial bid 2102, difference (delta) from initial bid 2104, difference (delta) from historic bid 2106, bidder rank 2108 based on current offering 2008-1, and bidder rank 2110 based on total cost 2016 offering, among others. As shown, bidder 2006-3 established the market lead with respect to current offering 2008-1-3 basis price of $256,331 and total cost value 2016-3 of $280,904. Bidder 2006-4 is ranked second in current offering 2008-1-4 basis price of $258,921 and total cost value 2016-4 of $283,827. Bidder 2006-1 is ranked third in current offering 2008-1-1 basis price of $302,389 and total cost value 2016-1 of $331,376. Bidder 2006-2 is ranked fourth in current offering 2008-1-2 basis price of $309,151 and total cost value 2016-2 of $339,519. The current offering 2008-1 sub-fields are listed as examples only. There may be additional, fewer or different sub-fields without limitation. The embodiments are not limited in this context.

Figure 22:
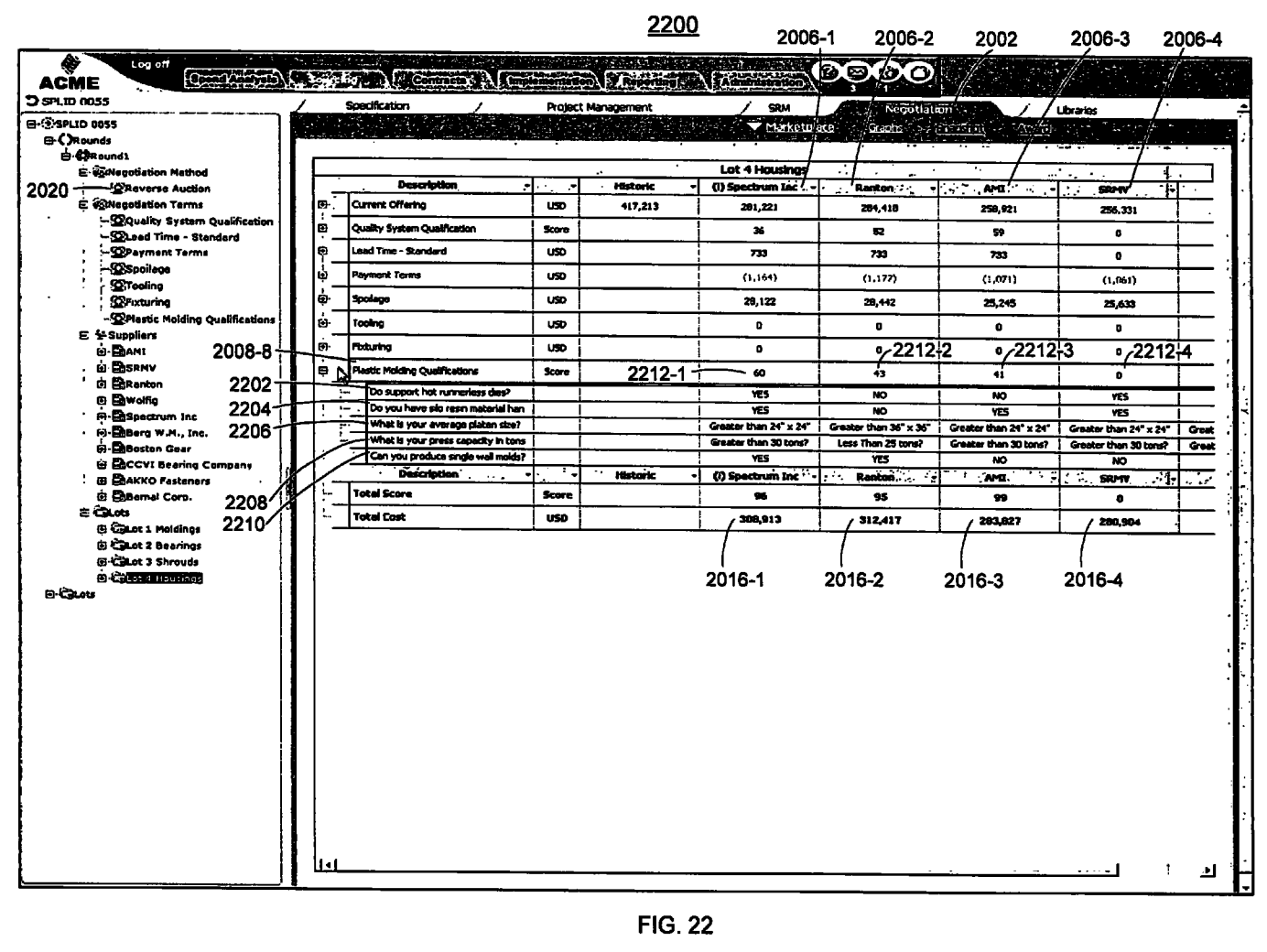

FIG. 22 is a graphical user interface 2200 of one embodiment of one instance of the application framework 348 as viewed at the buyer side client node 110-1 computer 310 with the plastic molding qualifications 2008-8 field expanded. The plastic molding qualifications 2008-8 is a subjective active negotiation term that impacts the total cost value 2016-1-4 for each bidder 2006-1-4. The plastic molding qualifications 2008-8 field includes several sub-fields that include queries posed to each of the suppliers 2006-1-4 regarding their qualifications for supplying plastic moldings, for example. Prior to a collaborative negotiation event, each supplier 2006-1-4 submits a response to the queries. A score is assigned based on the given response. In one embodiment, the subfield queries may include sub-field 2202 query: "Do you support hot runnerless dies?"; sub-field 2204 query: "Do you have silo resin material handling?"; sub-field 2206 query: "What is your average platen size?"; sub-filed 2208 query: "What is your press capacity in tons?"; and sub-field 2210 query: "Can you produce single wall molds?" for example. Once the suppliers 2006-1-4 submit responses to the queries, a score is calculated based on the responses. As shown, supplier 2006-1 received a score 2212-1 of 60, supplier 2006-2 received a score 2212-2 of 43, supplier 2006-3 received a score 2212-3 of 41, and supplier 2006-4 received a score 2212-4 of 0. These queries are listed as examples only. There may be additional, fewer or different queries submitted to the bidders 2006-1-4 without limitation. The embodiments are not limited in this context.

Figure 23:
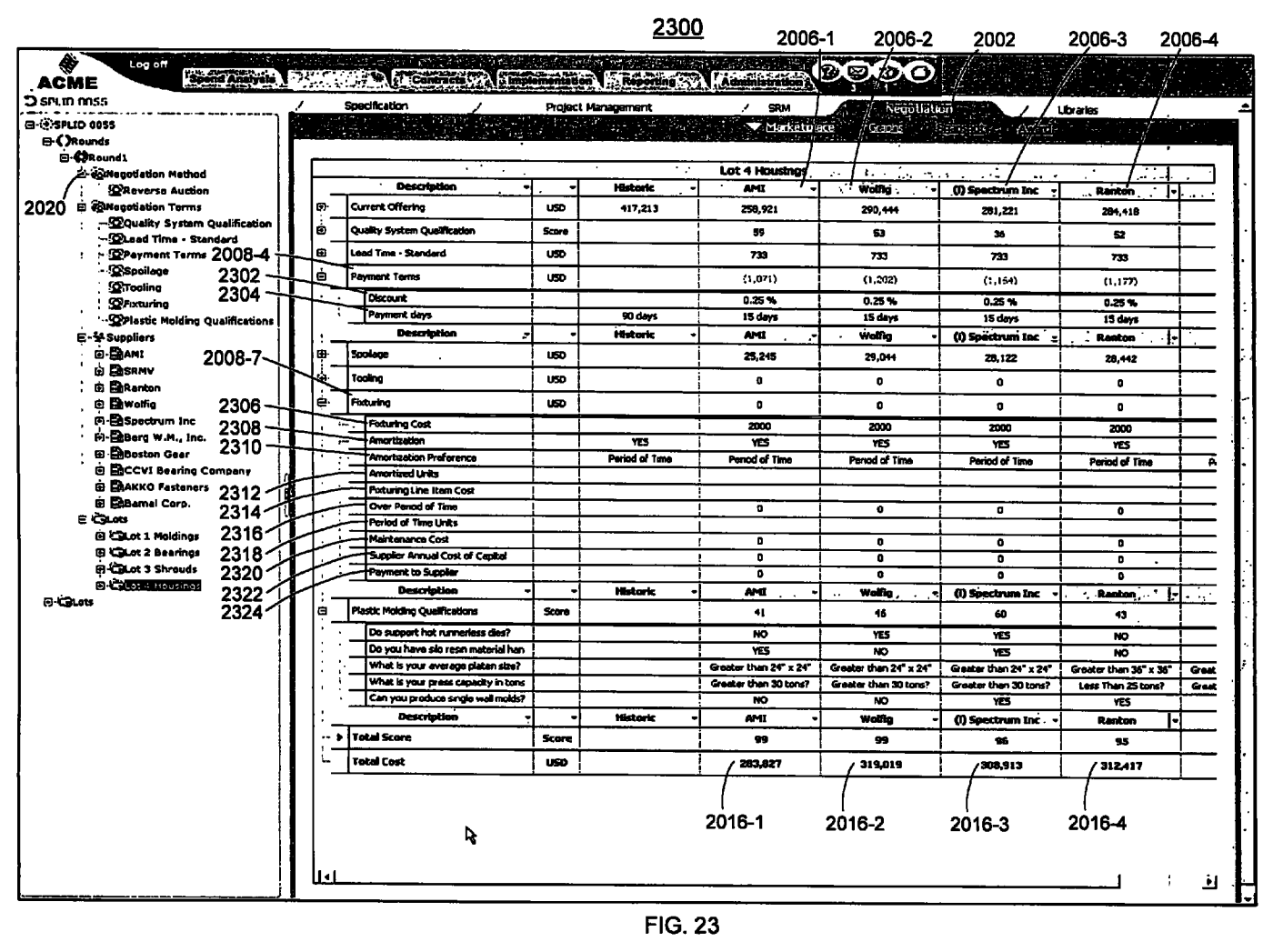

FIG. 23 is a graphical user interface 2300 of one embodiment of one instance of the application framework 348 as viewed at the buyer side client node 110-1 computer 310 with the payment 2008-4 and the fixturing 2008-7 fields expanded. The payment 2008-4 and fixturing 2008-7 are non-price objective active negotiation terms that have an impact on the total cost value 2016-1-4 of the bids submitted by each supplier 2006-1-4. As shown, the payment 2008-4 includes a discount 2302 sub-field and a payment days 2304 (e.g., the discount applies if payment is made within the number of days) sub-field. Responses to the discount 2302 are in terms of percentage (%) and responses to payment days 2304 are in terms of days. Percentage discount 2302 has a direct effect on the total cost value while payment days 2304 are based on net present value of money, which reflects the time cost of money. This active negotiation term may impact the buyer and each of the suppliers 2006-1-4 in a different way. For example, the net present value of money may be different for each the buyer and suppliers 2006-1-4. The fixturing 2008-7 includes fixturing cost 2306, amortization 2308, amortization preference 2310, amortized units 2312, fixturing line item cost 2314, over period of time 2316, period of time units 2318, maintenance cost 2320, supplier annual cost of capital 2322, and payment to supplier 2324 sub-fields. The answers to each of the queries in the payment 2008-4 sub-fields 2302 and 2304 and the fixturing 2008-7 sub-fields 2306-2324 may be provided by each supplier 2006-1-4 prior to the negotiation event. The answers form a portion of the active negotiation terms and affect the total cost values 2016-1-4 of each bid. These queries are listed as examples only. There may be additional, fewer or different queries submitted by the buyer to the suppliers 2006-1-4 without limitation. The embodiments are not limited in this context.

Figure 24:
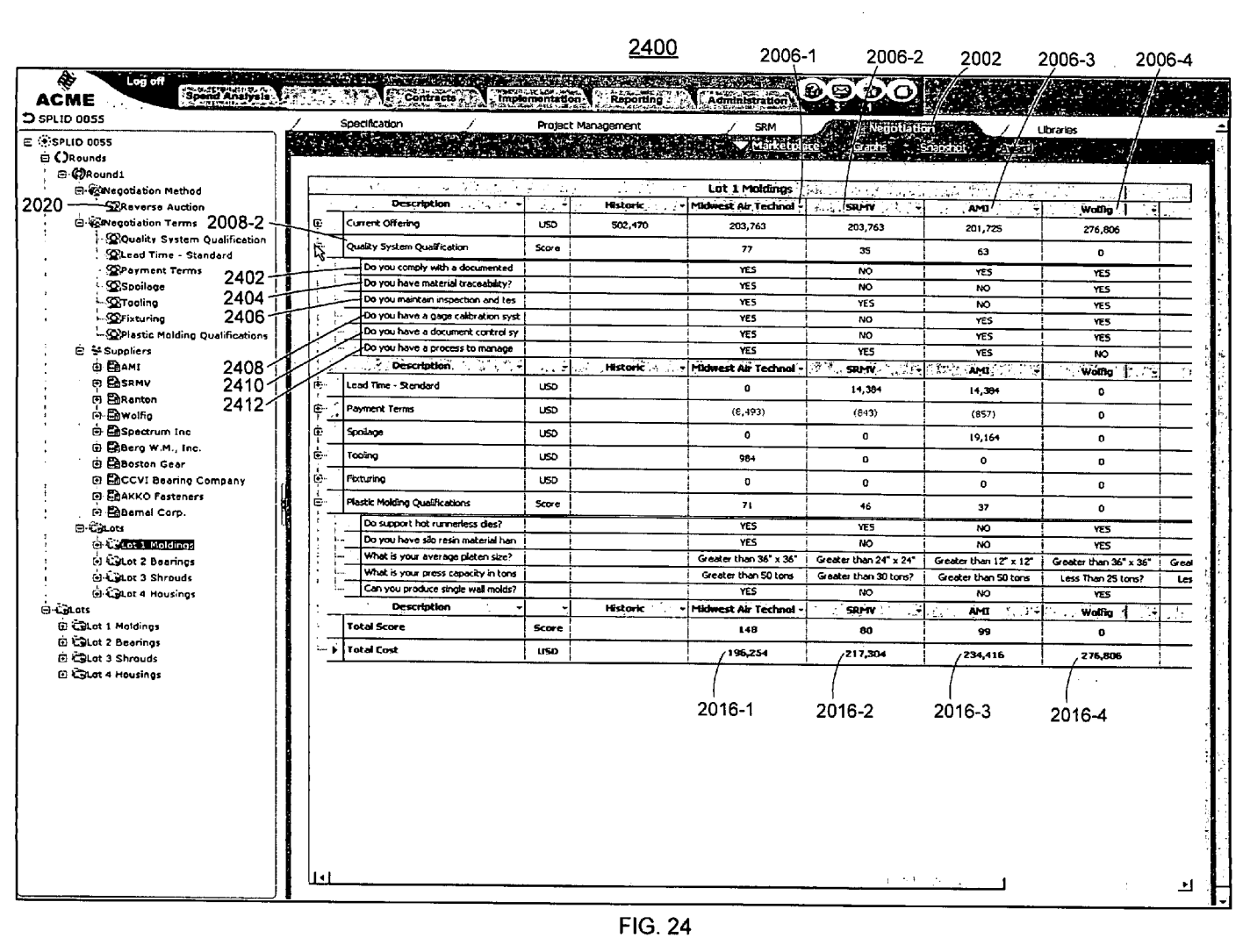

FIG. 24 is a graphical user interface 2400 of one embodiment of one instance of the application framework 348 as viewed at the buyer side client node 110-1 computer 310 with the quality system qualification 2008-2 field expanded. The quality system qualification 2008-2 is a non-price subjective active negotiation term that has an impact on the total cost value 2016-1-4 of the bids submitted by each supplier 2006-1-4. As shown, quality system qualification 2008-2 includes several queries concerning the quality capabilities of the suppliers 2006-1-4. Sub-field 2402 includes the query "Do you comply with a documented quality system?" Sub-field 2404 includes the query "Do you have material traceability?" Sub-field 2406 includes the query "Do you maintain inspection and test records?" Sub-field 2408 includes the query "Do you have a gage calibration system?" Sub-field 2410 includes the query "Do you have a document control system?" Sub-field 2412 includes the query "Do you have a process to manage non-conforming material?" The answers to each of the queries may be provided by each supplier 2006-1-4 prior to the negotiation event and each affects the total cost values 2016-1-4 of their bids. These queries are listed as examples only. There may be additional, fewer or different queries submitted to the bidders 2006-1-4 without limitation. The embodiments are not limited in this context.

Figure 25:
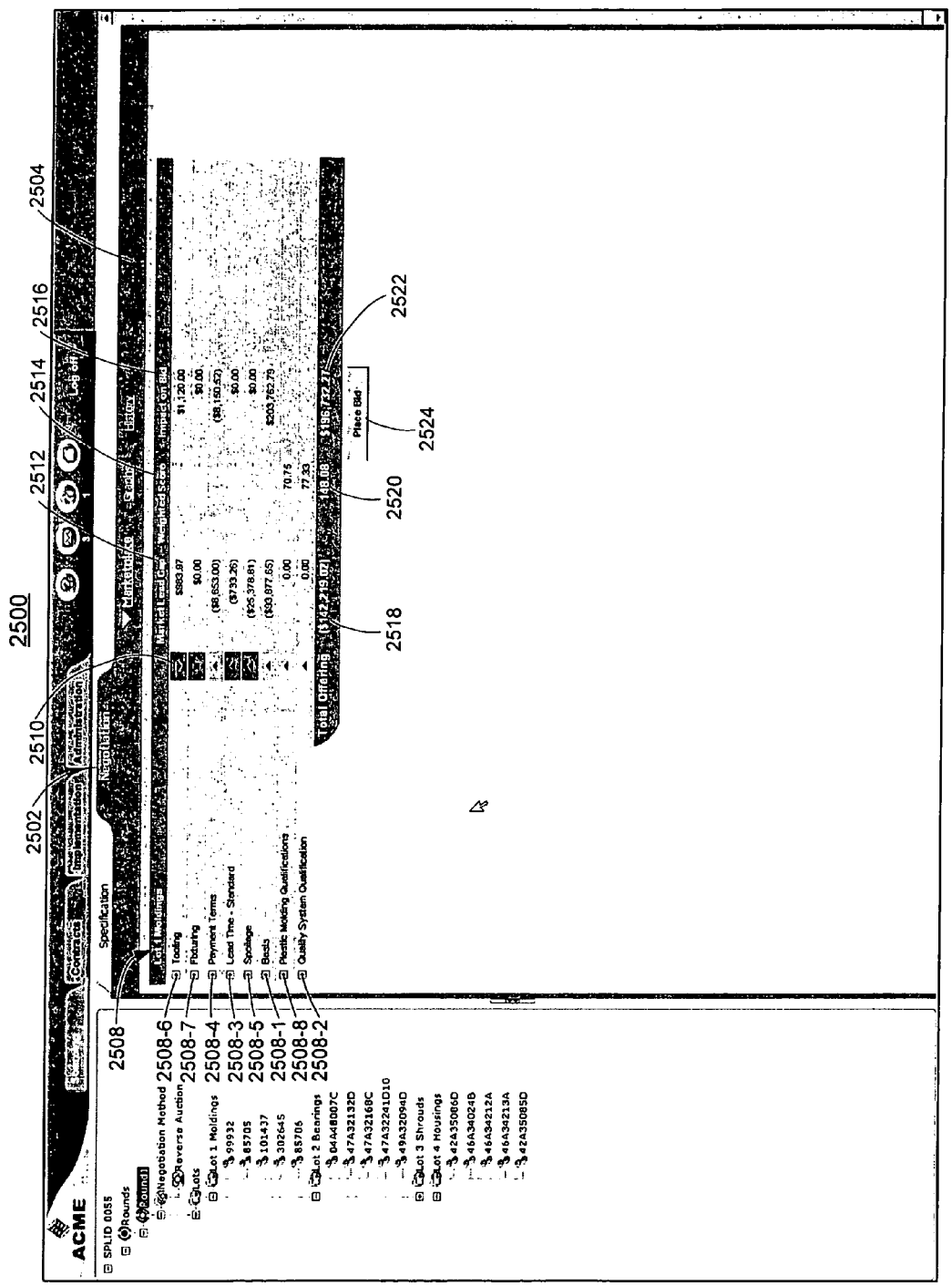
FIG. 25 is a graphical user interface of one embodiment of one instance of an application framework.

FIG. 25 is a graphical user interface 2500 of one embodiment of one instance of the application framework 349 as viewed at the supplier (bidder) side client node 120-1 computer 320. A marketplace pane 2504 is provided within the negotiation pane 2502. At the supplier side, the marketplace pane 2504 shows only the bid standings of the supplier 2006-1 submitting the bids. The information on all other bids is not shown except for the market position of the supplier relative to the other suppliers 2006-2, 2006-3, and 2006-4 participating in the negotiation event. The marketplace pane 2504 on the supplier side displays the supplier negotiation parameters 2508 of the supplier 2006-1. The supplier negotiation parameters 2508 are ranked in the order from market leading to market lagging relative to the bids submitted by the other suppliers 2006-2, 2006-3, and 2006-4.

The marketplace pane 2504 also displays feedback elements 2510 to indicate the market position of the supplier 2006-1 relative to the market for the negotiation event. A market lead gap 2512 provides the supplier 2006-1 an indication on terms of the actual amount by which his bid leads or lags the market. A weighted score 2514 based on the subjective active negotiation terms 2008-2-8 is displayed. The overall impact on the bid 2516 also is displayed to the supplier 2006-1. In the illustrated example, the supplier 2006-1 leads the market with respect to tooling 2508-6 by $83.07. The supplier 2006-1 is even with the market based on fixturing 2508-7. With respect to the payment 2508-4 the supplier lags the market by ($6,653.00). With respect to the lead time 2508-3 the supplier lags the market by ($733.25). With respect to spoilage 2508-5 the supplier lags the market by ($25,376.81). With respect to the basis bid 2508-1 the supplier lags the market by ($93,877.65). With respect to the plastic molding qualifications 2508-8 the supplier has a weighted score 2514 of 70.75. Finally, with respect to quality system qualification 2508-2 the supplier 2006-1 received a weighted score of 77.33. The total offering with respect to market lead gap 2518 is displayed along with the total weighted score 2520 and the total impact 2522 on the basis bid. The impact on the basis bid 2516 is displayed for each supplier negotiation parameter 2508. Feedback with respect the impact of a supplier negotiation parameter 2508 is provided to the supplier 2006-1 if a supplier negotiation parameter 2508 is revised. Furthermore, the bidder 2006-1 can revise the values for each of the supplier negotiation parameters 2508 and immediately see the impact it makes on the basis bid prior to actually submitting the revised to the market by selecting place bid button 2524.

In one embodiment, the collaborative negotiation module 600 provides a feedback mechanism to the supplier 2006-1 (e.g., supplier) based on any individual supplier negotiation parameter 2508 previously submitted to the buyer by the supplier 2006-1. After a bid is submitted (bid basis 2508-1), the collaborative negotiation module 600 adjusts the bid based on active negotiation factors 2008, which operate on the supplier negotiation parameters 2508 submitted by the supplier 2006-1. The supplier 2006-1 receives feedback of the adjusted bid relative to the most recently submitted supplier negotiation parameters 2508. In one embodiment, the collaborative negotiation framework displays its formulas to the supplier 2006-1 and provides the supplier 2006-1 with an opportunity to adjust the supplier negotiation parameters 2508 based upon the cost structure and cost impact to the supplier 2006-1. Feedback can be in the form of a display on the computer 320 showing the market position, price impact, and market equilibrium of the supplier (bidder) relative to the market leading adjusted bid position.

Market position feedback informs the supplier 2006-1 of his market position relative to the other bidders 2006-2, 2006-3, 2006-4 based on the supplier negotiation parameters 2508. In one embodiment, a feedback mechanism includes a graphical user interface element 2510 to indicate to the supplier 2006-1 the basis bid offering adjusted based on the supplier negotiation parameters 2005. The supplier 2006-1 may be indicated by the element 2510 based on color, icon, graphics, sound, and/or any combination thereof. In one embodiment, for example, the leading supplier would see a different manifestation of the element 2510 from the lagging suppliers. For example, the leading bidder may see a green element 2510 to indicate that the bidder has the greatest cost impact for a supplier negotiation parameter while the other suppliers may see the element in various other colors based on their relative position with respect to that supplier negotiation parameter. For example, the lagging bidders may see the element 2510 in a different color (e.g., red) to indicate that they do not have the best offering on that individual factor. An element may be provided for each supplier negotiation parameter 2508. The embodiments are not limited in this context.

Price impact on bid 2516 feedback is the ability to view the monetized impact of each individual supplier negotiation parameter 2508 on his basis bid. Price impact on bid 2516 feedback may assist the supplier 2006-1 in modifying their bid or modifying one or more supplier negotiation parameters 2508 in a manner that would make the greatest impact on the total cost value 2518 of the basis bid.

In one embodiment, the collaboration negotiation module 600 may include market equilibrium feedback in the form of a graph. In one embodiment, one dimension of the graph may contain cost impact and the other N dimensions may contain the supplier negotiation parameters. Two lines are plotted; one line shows the cost impact on total offering and the other shows the cost impact to the bidder provide the total offering. This shows to the bidder the optimal terms that can provide the greatest impact for the buyer within the bidder's and/or buyer's own constraints.

In one embodiment, the collaborative negotiation module 600 provides the suppliers 2006-1-4 with tools to conduct real-time negotiations throughout the extended enterprise 300. In one embodiment, these tools include: supplier cost; bid test; objective focus; and calculation transparency. A supplier cost tool provides the supplier 2006-1 with the ability to see in real time the cost impact of changing a supplier negotiation parameter 2508 against the cost to the supplier 2006-1 for providing the supplier negotiation parameter 2508. The bidder 2006-1 also may see the impact of changing any one of the supplier negotiation factors 2508 from the buyer perspective.

The supplier 2006-1 may prepare a local bid on the client computer 320 prior to submitting the bid to the market. A bid test tool compares the local bid to a market committed bid. The bid test tool enables the supplier 2006-1 to modify the basis or modify any of the supplier negotiation parameters 2005 to see the impact of the modifications to the total cost value 2518 relative to the marketplace before committing that bid to the market during the negotiation event. To submit the local bid to the market, the supplier 2006-1 selects the place bid button 2524. At which time the local bid may be transferred to the buyer, and the impact of the bid would be viewable by the other suppliers 2006-2-4 and the buyer, for example.

The collaboration negotiation module 600 enables the supplier 2006-1 to automatically sort all supplier negotiation parameters 2508 based on those parameters that have the greatest impact difference between the supplier 2006-1 offering and the market shown at the top of the list. This enables the supplier 2006-1 to focus on the negotiation parameters that have the greatest opportunity to close the market lead gap 2512.

The collaboration negotiation module 600 enables the supplier 2006-1 to see the exact formula used to calculate the impact of an individual supplier negotiation parameter 2508 on the total cost value 2518.

In one embodiment, the collaborative negotiation module 600 enables several interchangeable negotiation methods. An interchangeable negotiation method provides the capability to change negotiation methods in and out of a framework while keeping all other elements the same. In one embodiment, the collaborative negotiation module 600 may be arranged to provide an interchangeable architecture capable of handling any negotiations format and to provide normalized outputs for all negotiation formats. In one embodiment, the bids are ranked ordered from best to worst and certain bids can be marked as being in a "winning" position. In a reverse auction negotiation, the lowest price is placed at the top of the list and marked as the winner. In a split of business negotiation there may be multiple winners. The collaboration negotiation module 600 negotiation templates provide the ability for a buyer to create their own negotiation formats and store them in a reusable library.

Figure 26:
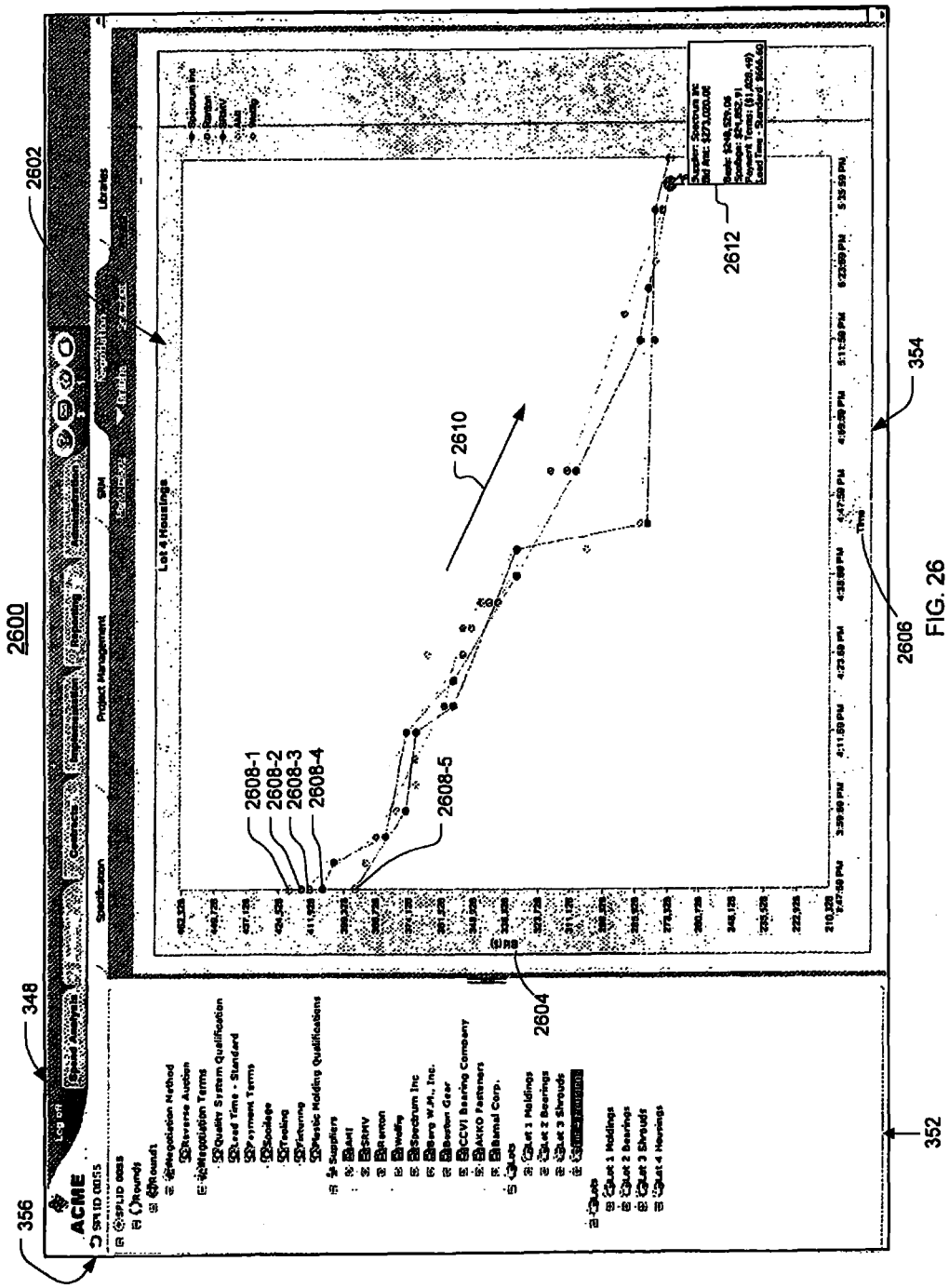
FIG. 26 is a graphical user interface of one embodiment of one instance of an application framework.

FIG. 26 is a graphical user interface 2600 of one embodiment of one instance of the application framework 348 for displaying a live auction as viewed at the buyer side client node 110-1 computer 310 and the supplier side client node computers 320. A display pane 2602 shows the bids 2604 (in U.S. Dollars) versus time 2606 approximately on a real-time basis as the bids are entered by five participating suppliers 2608-1, 2608-2, 2608-3, 2608-4, and 2608-5 bidding at the negotiation event. The display pane 2602 may be viewed by all the participating suppliers 2608-1, 2608-2, 2608-3, 2608-4, and 2608-5 bidding at the negotiation event at the respective second client nodes 120-1-5, for example, and is viewed by the buyer at the first client node 110-1, for example. In the illustrated embodiment, there is a downward trend 2610 in the bid amount as the bids 2604 are submitted over time 2606. At anytime during the auction, the summary information may be displayed in box 2612. In one embodiment, the box 2612 identifies the winning bidder 2606-1, the bid amount, the basis, and supplier negotiation parameters such as the spoilage, payment terms, and lead time, for example. In one embodiment, the collaborative negotiation module 600 may be configured to replay the auction event on buyer and/or supplier client node computers 310, 320.

Figure 27:
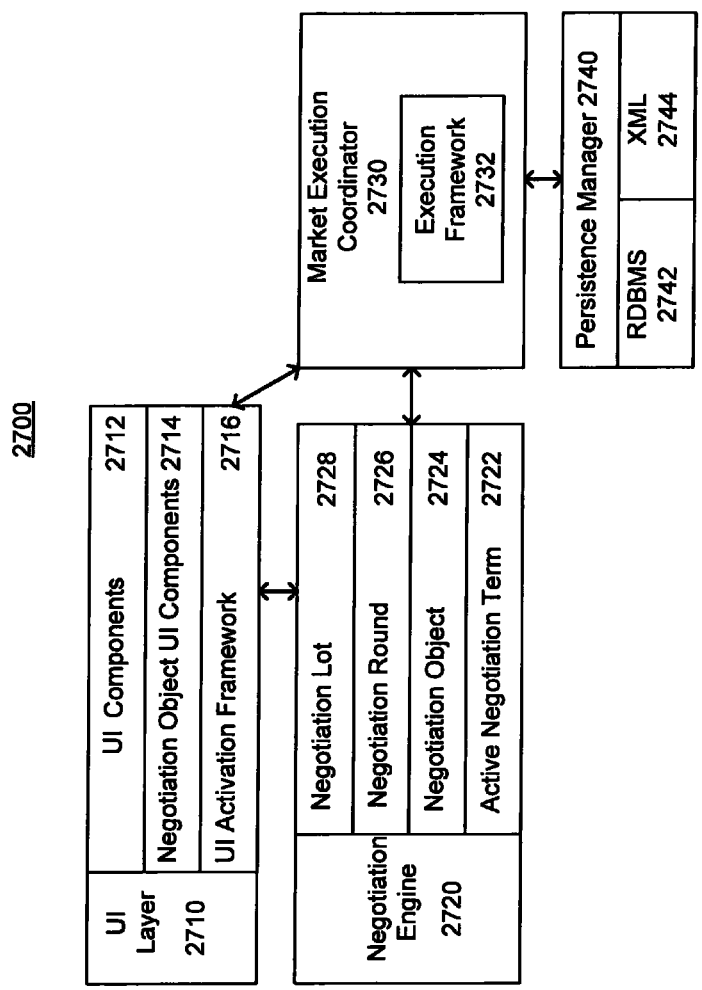
FIG. 27 is a block diagram of one embodiment of a collaborative negotiation framework.

FIG. 27 is a block diagram of one embodiment of a collaborative negotiation framework 2700. In one embodiment, the collaborative negotiation framework 2700 includes interchangeable components. These components include a user interface (UI) 2710, a negotiation engine 2720, a market execution coordinator 2730, and a persistence manager 2740. The collaborative negotiation framework 2700 provides a negotiations framework to implement custom negotiations. In one embodiment, the collaborative negotiation framework 2700 enables an active negotiation term implementation where all active negotiation terms bearing on a contract award decision can be monetized. This implementation can eliminate subjective analysis, provide immediate feedback to the supply base, and provides proper comparisons in a normalized price negotiation. In one embodiment, the collaborative negotiation framework 2700 provides an extensible framework to construct custom tailored parametric negotiations incorporating multiple aspects of negotiation including both bid price and non-price active negotiation terms in a real-time or asynchronous manner. In one embodiment, the collaborative negotiation framework 2700 provides a reusable, generic, and distributed load balanced negotiations framework that operates independently of price negotiation methods, non-price active negotiation terms, and user interface.

In one embodiment, the UI 2710 includes UI components 2712 for the active negotiation terms 2722, UI components 2714 for negotiation objects 2724, and a UI activation framework 2716. The UI 2710 displays inputs to the negotiation engine 2720 and displays outputs from the negotiation engine 2720. The UI 2710 presents the market state of the negotiation to the end user (e.g., supplier/bidder, buyer) and provides resources for manipulating the active negotiation terms 2722 and how they relate to the market. The UI 2710 interacts with both the negotiation engine 2720 and the market execution coordinator 2730. The UI 2710 includes the visual components to support the negotiation engine 2720. In one embodiment, the UI activation framework 2716 is a rich client application that can be run in any standard web browser. The UI 2710 calls the peer to peer dispatcher to load the negotiation engine 2720 for the bid being accessed.

In one embodiment, the negotiation engine 2720 includes one or more active negotiation terms 2722 and negotiation objects 2724 and processes one or more negotiation rounds 2726 and negotiation lots 2728 in a given negotiation event. The UI 2710 includes the visual components for all the active negotiation terms 2722 and the negotiation objects 2724. The negotiation engine 2720 receives input data, performs calculations on it, and returns favorable targeted market positioning information. In one embodiment, the negotiation engine 2720 processes bids into a ranked and ordered list of suppliers based on their current market position. It accepts buyer and supplier negotiation parameters and bid basis adjustments and performs bid specific calculations to arrive at its result. The active negotiation term 2722 operates on one or more of the negotiation terms such as, for example, if a bidder changes one negotiation term that change may affect other negotiation terms. The active negotiation terms 2722 calculate and return a result set to be optimized. The negotiation objects 2724 execute the active negotiation terms 2722 in a predetermined order as they are received from the bidders and rank orders all bidders relative to current market position. The negotiation engine 2720 executes the same and produces the same results regardless of whether the bid events are online and/or offline events and may be replayed offline.

In one embodiment, the active negotiation term 2722 creates reusable elements that contain formulas to calculate a value to enable the buyer to see the best offering for the negotiation in real-time. This technique enables buyers to understand the total cost value associated with each bidder and simultaneously enables the bidders to see how the factors impact the total cost value of their bid. Each item in an RFI, RFP, or RFQ that requires supplier response has a modeled negotiation factor corresponding to an item of that type. Each active negotiation term 2722 has a defined group of buyer and supplier negotiation factor parameters and calculates these parameter inputs into a monetized impact on the bid basis for the price portion of the negotiation. Normalizing the RFI, RFP, and RFQ inputs into a monetary impact on the price bid basis provides an objective analysis for the buyer to make an effective contract award decision. Also, the objective analysis of prior rounds of the negotiation can be carried as an input into the analysis of subsequent negotiation rounds.

The active negotiation terms 2722 may be grouped into a monetized impact on basis and requirements in relation to other negotiation terms. In one embodiment, in a monetized impact on basis approach, the monetized calculations can be broken into quantitative and qualitative terms. Quantitative active negotiation terms can be considered easily as there is a clear quantifiable cost associated with elements of this type. Qualitative active negotiation terms such as risk can have codified formulas created to quantify a value for each type of risk. These calculations account for the cost of the risk event occurring divided by the probability of its occurrence. Quantitative active negotiation terms may include discount terms (e.g., discount given for paying within a given time frame) and quality (e.g., percentage of product that is non-conformant). Active negotiation terms of this type have one set of formulas associated with understanding their dollar cost impact.

The active negotiation term 2722 relates both quantitative and qualitative negotiation terms to a bid basis. This provides the flexibility to take all negotiation terms to be considered when making a contract award decision based on the outcome of the negotiation in a normalized format. By normalizing the quantitative and qualitative negotiation terms, a buyer can give a supplier better and more immediate feedback as to how the negotiation factors can affect the buyer decision.

The quantitative negotiation terms include: (1) volume discounts; (2) standard terms and conditions; (3) quality; (4) warranty; (5) deadlines; (6) location; (7) pricing method; (8) performance specifications; (9) previous relationships with suppliers; (10) demurrage; (11) spoilage; (12) pre-payments (e.g., partial and down payments); (13) tooling; (14) fixturing; and (15) consignment inventory. There may me additional or fewer quantitative negotiation factors. The embodiments are not limited in this context.

The qualitative negotiation terms include: (1) optimally allocating business among the supply base; (2) delivery time, requirements; (3) quota restraints; (4) customer service; (5) ramp to volume; (6) sole supplier-split of business; (7) and minority/DBE companies. There may me additional or fewer qualitative negotiation factors. The embodiments are not limited in this context.

Qualitative negotiation terms may be more difficult to conceptualize within cost terms. Nevertheless, qualitative negotiation terms can be monetized based on their importance to the buyer or discomfort to the supplier. One example of a qualitative negotiation factor is the risk of switching suppliers. Different risk negotiation factors may be assigned for new suppliers within the country versus new suppliers outside the country. One way that risk can be monetized is by associating the risk to the cost of an undesirable event happening divided by the percentage chance (or probability) that it might happen.

In one embodiment, the active negotiation term 2722 supports customizable terms to define custom negotiation parameters and a formula that operates on those custom parameters. Thus, any desired parameter may have an impact on the negotiation. The flexible architecture of the collaborative negotiation framework 2700 enables buyers to design custom negotiations with specific active negotiation terms properly weighted into the negotiations process. Qualitative risk negotiation terms include: (1) financial viability; (2) transportation delay; and (3) previous relationships with suppliers. There may me additional or fewer qualitative risk negotiation factors. The embodiments are not limited in this context.

Within a negotiations process, there may be dependencies between active negotiation terms where certain active negotiation terms can influence other active negotiation terms or may require the presence of certain active negotiation terms to be defined. For example, if the cost of a supplier failing to supply what is required is determined and other active negotiation terms are present that add or subtract from the probability of that occurrence, then these other active negotiation terms can influence each other and are dependent on each other. For example, geography, quality process, and incumbency are all three risk influencing active negotiation factors. If geography is a risky location where there may be a 5% chance of failing to deliver attributed, and the quality process in use is ISO 9002 (e.g., a −5% chance of failing to deliver attributed) and the supplier is not the incumbent (10% chance of failing to deliver attributed) then overall, the probability that the supplier will fail to deliver is 10%. The buyer enters a value showing the cost of the supplier being able to deliver and the total monetized value may be concluded.

The negotiation object 2724 coordinates the execution of the active negotiation terms 2722 and places the bidding suppliers in a ranked order. The negotiation object 2724 is extended for each new bidding format to be created, for example, allocation based items, split of business, reverse auction, and others.

The active negotiation terms 2722 or negotiation objects 2724 defined as collaboration server only, are executed on a server at the host processing node 140.

In one embodiment, the market execution coordinator 2730 includes an execution framework 2732. The market execution coordinator 2730 communicates between instances of the negotiation engine 2720 to create a market state. Because there can be many running instances of the negotiation engine 2720 on the first and second client nodes 110-1-*a*, 120-1-*b* and on bidding servers at the host processing node 140, the market execution coordinator 2730 executes the completed bids in the proper order and communicates back to all running instances of the negotiation engine 2720. The market execution coordinator 2730 ensures that all calculations have integrity and are executed on the best available computers.

In one embodiment, the market execution coordinator 2730 manages the movement and execution of the negotiation object 2724 and the active negotiation term 2722 parameters. When a user prepares a bid, it is executed on its local client computer 310, 320. When the user submits the bid to the market, the bid data is transmitted to any one of the web servers 160-1-*c*, abstracted, and transmitted to the least loaded bidding server (i.e., load balanced). That bidding server executes the bid and submits it back to the web server 160-1-*c*. The bid results are pushed from the web server 160-1-*c* to the client computers 310, 320 to show the changes in the negotiation market equilibrium.

In one embodiment, the persistence manager 2740 includes a Relational Database Management System (RDBMS) layer 2742 and an XML layer 2744. The persistence manager 2740 is a storage abstraction component to load and save buyer and supplier parameters and data throughout the collaborative negotiation framework 2700 system. There may be two implementations of a generic persistence manager 2740, one that writes to a SQL Server database and the other that creates XML data that is saved to the local disk at each supplier bidding client and buyer bidding console. The persistence manager 2740 stores the state of all parts of the executing run time and restores them from this persisted state. This abstraction layer enables the market execution coordinator 2730 to request storage of the state of the negotiation engine 2720, and then at a later time the market execution coordinator 2730 can restore the state of the negotiation engine 2720 within that state. Two persistence managers may be necessary to ensure that the state of the negotiation can be saved either at the first and second client nodes 110-1-a, 120-1-b for preparation of offline bids or server side at the host processing node 140 for online bidding.

In operation, the negotiation engine 2720 receives input negotiation parameters in terms of buyer negotiation parameters defined by the buyer and supplier negotiation parameters defined by the supplier to create a bid. The negotiation engine 2720 then compares that bid to other competitive bids in the marketplace to return an ordered list of suppliers ranked in accordance with their bids. This list may be ordered in terms of most competitive to least competitive bid and may be tagged in terms of bidders that are currently within an optimal or "winning" set.

The negotiation engine 2720 executes the active negotiation terms 2722 and bid ranking logic on all bids in the marketplace presented to it. To facilitate scalable distributed processing of bids and active negotiation terms 2722, the multiple instances of the negotiation engine 2720 are coordinated.

Figure 28:
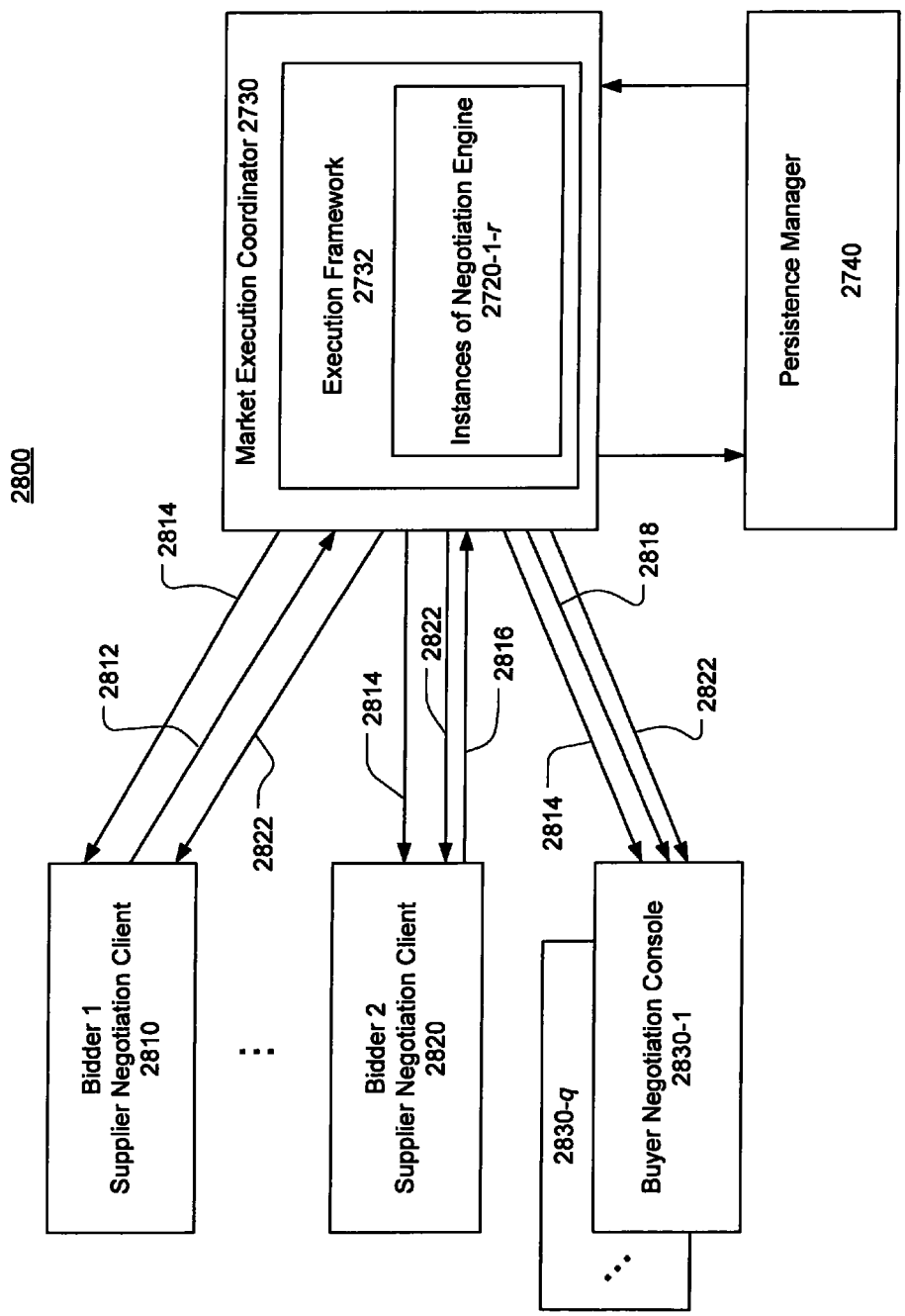
FIG. 28 is a diagram of one embodiment of a collaborative negotiation event.

FIG. 28 is a diagram of one embodiment of a collaborative negotiation event 2800 in accordance with the collaborative negotiation framework 2700. The collaborative negotiation event 2800 diagram illustrates the coordination of different negotiation components. In one embodiment, the negotiation components may comprise one or more instances of supplier negotiation clients 2810, 2820, one or more buyer negotiation consoles 2820-1-q (where q is any number), and one or more instances of the negotiation engine 2720-1-r (where r is any number) as may be required to support negotiation bid volume. The components communicate with the market execution coordinator 2730. In the illustrated embodiment the market execution coordinator 2730 synchronizes the different instances of the negotiation engine 2720-1-r.

In the illustrated embodiment, in a first instance of the supplier negotiation client 2810, bidder-1 enters the first bid of the negotiation event 2800. The bidder-1 instance of the supplier negotiation client 2810 calculates the impact of the active negotiation terms 2722 on the bid basis and determines a total cost value. Based on the total cost value and a set of negotiation rules, which may be selected in accordance with negotiation practice, the bid is either accepted or rejected. If the bid is accepted, because there are no other bids at this time, the bid from bidder-1 establishes the market leading position. The bid from bidder-1 and the results from the active negotiation term 2722 calculations are transmitted 2812 to the market execution coordinator 2730. The market execution coordinator 2730 passes the work to be performed to the execution framework 2732. The execution framework 2732 provides input values to an instance of the negotiation engine 2720-1 regarding basis/adjusted basis, and then the instance of the negotiation engine 2720-1 establishes the initial market position. Based on buyer/supplier negotiation parameters, market negotiation position information is transmitted 2814 to selected supplier negotiation clients 2810, 2820 and buyer negotiation consoles 2830-1-q. The execution framework 2732 records the results of the first bid submitted by bidder-1 through the persistence manager 2740.

The supplier negotiation clients 2810, 2820 and the buyer negotiation consoles 2830-1-q are updated to include the calculated total cost value, thus far, of the bid submitted by bidder-1. Then, bidder-2 submits 2816 his first bid. The instance of the negotiation engine 2720-1 computes the total cost value and determines a new market position relative to the previous bid. The information associated with the new market position is then transmitted 2818 to all the supplier negotiation clients 2810, 2820 and the buyer negotiation consoles 2830-1-q.

When a bidder submits a second bid, the instance of the negotiation engine 2720-1 first determines if that bid creates a market advantage compared to the previous bid submitted by the same bidder. If it does not, the bid is rejected. If the bid does create a market advantage over the previous bid, then the current bid is processed in accordance with the method previously described. For example, the instance of the negotiation engine 2720-1 computes the total cost value associated with the current bid and determines a new market position relative to the previous bid. The information associated with the new market position is then transmitted 2822 to all the supplier negotiation clients 2810, 2820 and the buyer negotiation consoles 2830-1-q, and so forth.

Figure 29:
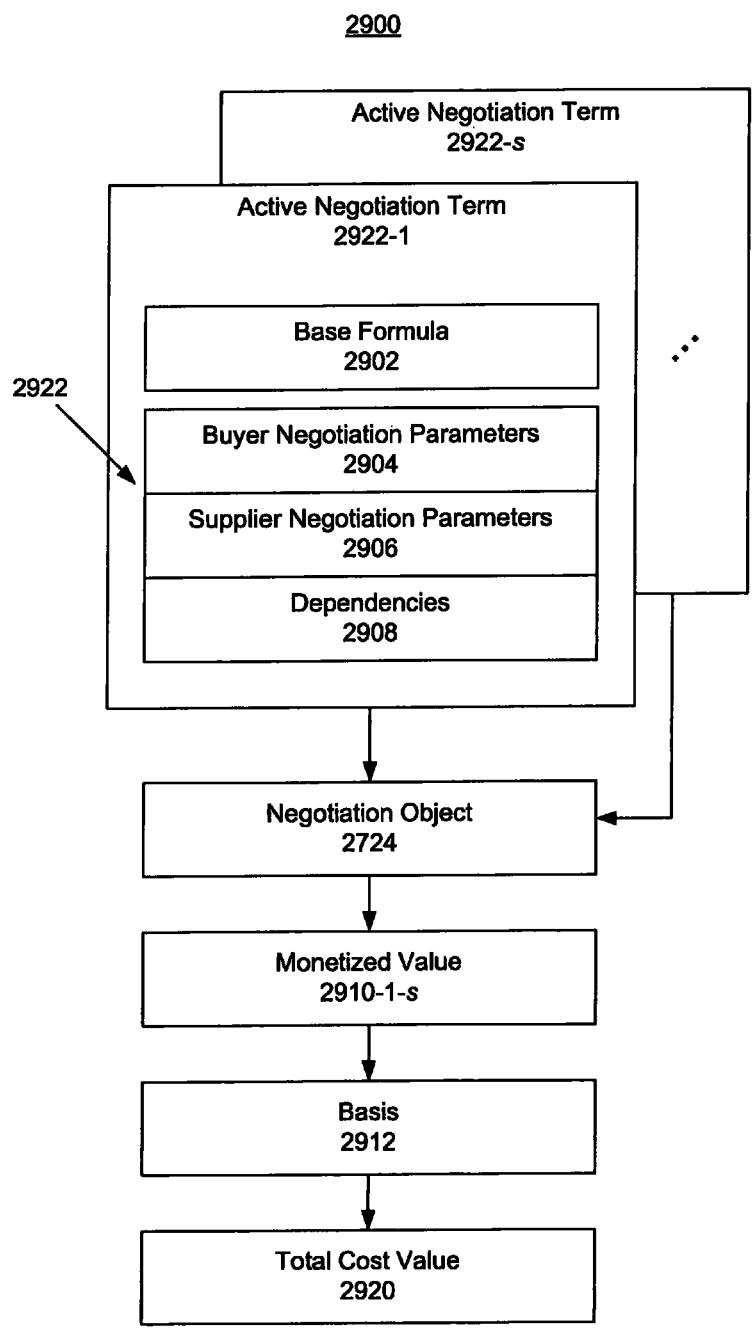
FIG. 29 is a diagram of one embodiment of a structure of the active negotiation terms.

FIG. 29 is a diagram 2900 of one embodiment of a structure of the active negotiation terms 2722-1-s (where s is any number) and their relationship to the total cost value 2920. In one embodiment, each active negotiation term 2722-1-s comprises a base formula 2902, one or more negotiation parameters 2922, and one or more quantitative or qualitative negotiation term dependencies 2908. In one embodiment, the negotiation parameters 2922 may comprise one or more buyer negotiation parameters 2904 and one or more supplier negotiation parameters 2906. The active negotiation term dependencies 2908 are a collection of negotiation parameters that a particular active negotiation term 2722-1-s is dependent on. The negotiation object 2724 processes each of the active negotiation terms 2722-1-s to arrive at monetized values 2910-1-s that modify the basis bid 2912 and arrive at the total cost value 2920. The negotiation object 2724 enforces the constraints placed on the active negotiation terms 2722-1-s. In operation, the negotiation object 2724 queries the active negotiation terms 2722-1-s and determines if they have a valid state, enforces scope rules relating to global versus local parameters, and tracks ownership between the active negotiation terms 2722-1-s and the negotiation parameters 2922. In one embodiment, the active negotiation terms 2722-1-s maintain and enforce state information of the negotiation parameters 2922 stored or manipulated therein.

The negotiation parameters 2922 support: editable states, locked states, global versus local states, factor owner states, and constraints. The editable states property manages the states that a negotiation parameter 2922 can be manipulated in. In one embodiment, there may be setup and run-time supplier and buyer states. The locked states property is set if a negotiation parameter 2922 can be updated in a current context. Internally, the active negotiation term 2722-1-s can log the date and time that a negotiation parameter 2922 was changed to track the user-ID of an entity that manipulated the negotiation parameter 2922. A negotiation parameter 2922 may be defined to be shared with other active negotiation terms 2722-1-s or may be explicitly reserved for use with a particular active negotiation term 2722-1-s.

The following quantitative active negotiation term 2722 example illustrates the parameterization associated with differing buyer and supplier parameters for determining monetized cost. For example, two negotiation parameters 2922 of an active negotiation term 2722 associated with a bid may include "Discount" and "Paid Within" such as, for example, the supplier would give the buyer a 1% discount on the basis if the buyer pays within net 30 days. Translation of these two supplier bid parameters into monetized cost is relative to the buyer and supplier because the cost of capital may be different for each entity. For example, the cost of capital for a buyer may be 0.15% per month, whereas the supplier may not track cost of capital depending on his size. From this perspective, the buyer may realize an advantage in the position granted to the supplier in the marketplace while the supplier may not see an impact on his bid cost.

Following is an example of a buyer's total cost value 2920 of a basis 2912 bid of $1,000,000 if an active negotiation term 2722 discount of 1% given to the buyer if the buyer pays within 30 days. The total cost value 2920 is related to the buyer's net present value of the basis 2912 minus the supplier's 1% discount. In this example, the "BASIS" 2912 is $1,000,000.00. The supplier parameter 2906 is a 1% "DISCOUNT" if "PAID WITHIN" 30 days. "Payment (after discount)=BASIS×(1−DISCOUNT)" and the total cost value 2920 is the "buyer's net present value," which is related to the "Payment (after discount)/Buyer's Cost of Capital for 30 Days."

Figure 30:
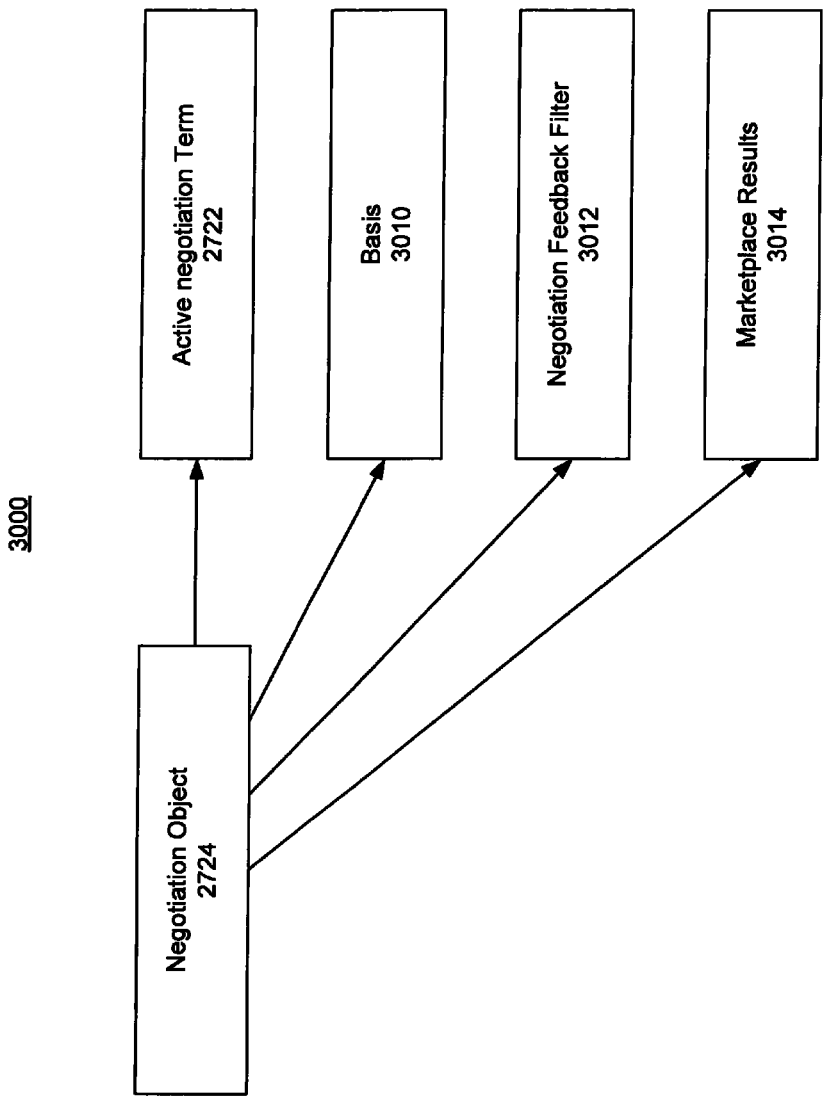
FIG. 30 is a diagram of one embodiment of a relationship between a negotiation object and an active negotiation term.

FIG. 30 is a diagram 3000 of one embodiment of a relationship between the negotiation object 2724 and the active negotiation term 2722, basis 3010, negotiation feedback filter 3012, and marketplace results 3014. The negotiation object 2724 coordinates the proper execution of the active negotiation term 2722 in a predetermined order and calculates marketplace position. Marketplace results 3014 can be the primary output of the negotiation object 2724. In one embodiment, this may be a collection of bid outputs in a ranked order. In one embodiment, each bid output includes the negotiation object 2724 representing the composite bid submitted by a supplier bid (including both bid basis 3010 and active negotiation term 2722), a number defining the rank order of the bid output relative to other bids, the bidder company name, the bidder globally unique identifier (GUID), and a flag that defines the bid was a market leading bid or not (e.g., in reverse auctions, there is only one market leading bid, but in a split of business there can be multiple leading bids as in may other negotiation formats).

The negotiation feedback filter 3012 operates on the marketplace results 3014 and returns a processed version of the marketplace results 3014 object that properly reflects what feedback should be supplied to supplier negotiation clients 2810, 2820. Each negotiation feedback filter 3012 can transform market result data according marketplace feedback rules compliant to the selected negotiation format. The negotiation object 2724 maintains a collection of filters that can be executed in a "daisy chain" manner progressively filtering data to comply with the selected market feedback rules.

Figure 31:
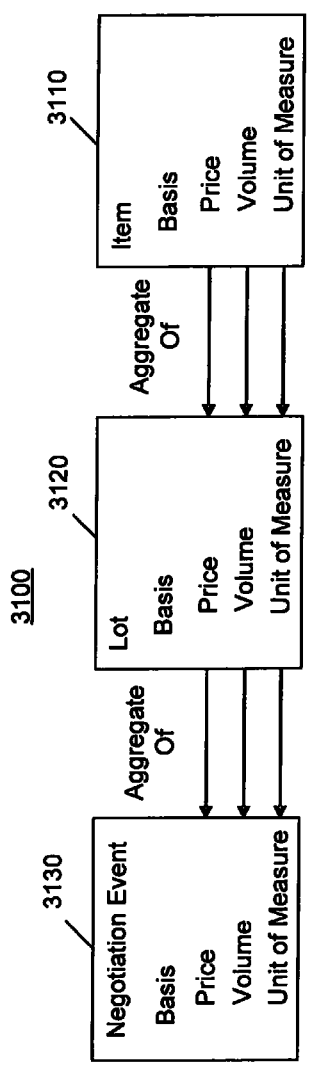
FIG. 31 is a diagram of one embodiment of an execution framework in a negotiation round.

FIG. 31 is a diagram of one embodiment of the execution framework 2732 in a negotiation round 3100. The negotiation engine 2720 calculates a set group of active negotiation terms 2722 and defines market position. The execution framework 2732 synchronizes an instance of the negotiation engine 2720-1, controls what values the negotiation engine operates on, provides input values to the negotiation engine 2720 regarding basis 3010 (or adjusted basis based on active negotiation terms), and ensures predecessor calculations are performed by the negotiation engine 2720 before forwarding results to other supplier negotiation clients 2810, 2820 and buyer negotiation consoles 2830-1-*q*.

A negotiation round 3100 has a one-to-one relationship with the negotiation object 2724. The negotiation round 3100 controls the time based aspects of the negotiation. Basis is defined differently based upon the scope of the operation of the transaction. Basis begins at an individual item 3110. A lot basis 3120 is an aggregate of the item basis 3110. The event basis 3130 is an aggregate of the lot basis 3120.

A description of a negotiation event execution of RFI, RFP, RFQ, and price negotiation relative to a collaborative negotiation framework 2800 follows. Architecturally, a collaborative negotiation framework 2800 differs from a conventional sourcing process due to the desire to support a comprehensive collaborative approach to negotiations. Generally, negotiations are set up in terms of RFI to identify appropriate suppliers, RFP to understand supplier offerings, RFQ (a formal definition of request), and price negotiation. Under the collaborative negotiation framework 2800, these areas are blurred from an application standpoint, but can still be defined using these terms by the end users.

During the RFI portion of a negotiation, exploratory questions are asked regarding supplier capability, some of which may include or exclude a supplier while others speak to a degree of capability to provide what the buyer is seeking. The questions that are inclusive or exclusive have limited applicability in the RFP round as suppliers that are not capable of meeting these requirements can be excluded from the RFP round. Those that speak to a degree of capability may impact the RFP round.

Examples of an RFI item may include quality process. If a buyer organization has strict requirements that the supplier organization must be certified for a quality process, it may be included in the RFI round. Some suppliers will be certified for better processes than others and as such is a factor that may weigh in the on the decision of the buyer organization in the RFP, price negotiation, and award portions of the negotiation. This issue may be given greater weight in the RFP round where the answers and proposals provided by the supplier organization differentiate their offering from other offerings. For this reason, the negotiation execution framework 2732 does not architecturally perceive any difference between what would normally be defined as RFI, RFP, RFQ, or price negotiation. Each of these portions of the negotiation may be viewed as a round 3100.

Figure 32:
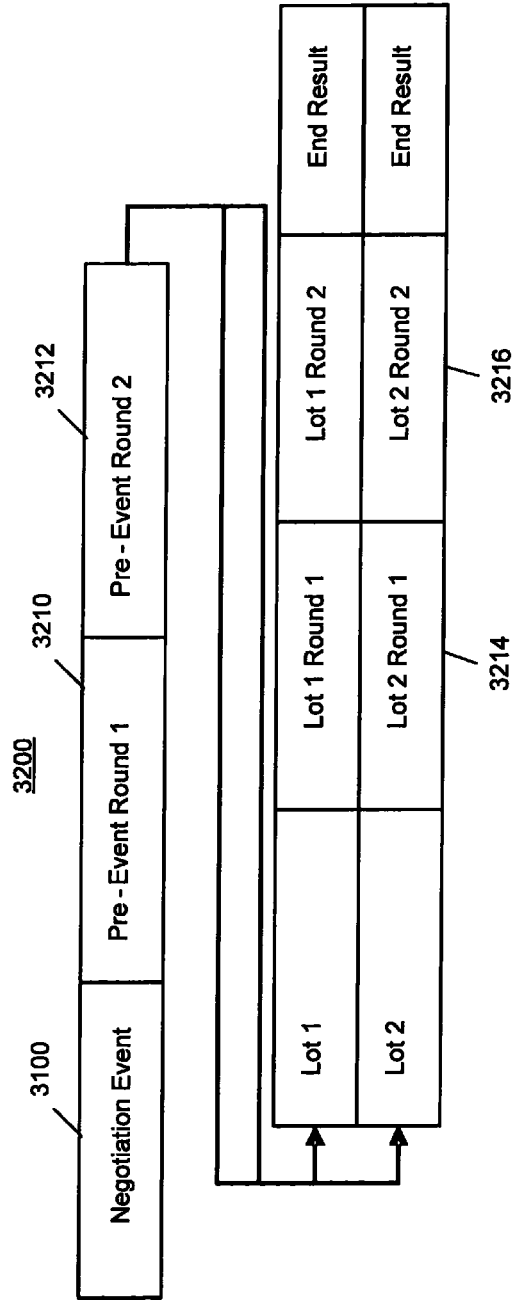
FIG. 32 is a diagram of one embodiment of a collaborative negotiation flow.

FIG. 32 is a diagram 3200 of one embodiment of a collaborative negotiation flow. The negotiation rounds 3100 may be defined within the negotiation event level 3130 and the lot level 3120. At the negotiation event level 3130, multiple rounds may be added as required to achieve desired negotiation result. For example negotiation methods such as RFI, RFP or RFQ. The rounds defined at the lot level 3120 can automatically inherit the properties and calculated execution of the negotiation event level 3130 rounds.

Ranked ordering can be calculated at the sub-branch after the branch level rounds are over. For example, Pre-Event Round 1 3210 can be executed including ranked ordering calculation. When Pre-Event Round 2 3212 is executed, the factor objects 2722 that are part of Pre-Event Round 1 3210 and Pre-Event Round 2 3212 are calculated, but the ranked ordering of the selected negotiation object in Pre-Event Round 2 3212 is executed. Extending this example, if the event has progressed to Lot 2 Round 2 3216, the execution can proceed as follows:

1. Pre-Event Round 1 3210 executes the factor 2722 calculation only;
2. Pre-Event Round 2 3212 executes the factor 2722 calculation only;
3. Lot 2 Round 1 3214 calculates the factor 2722 calculation only; and
4. Lot 2 Round 2 3216 calculates the factor 2722 calculation and the negotiation object 2724 ranked ordering.

Following is an example of a sourcing negotiation according to the various embodiments described above. To begin a negotiation a buyer logs onto the host processing node 140 and runs the collaborative negotiation module 600, builds a request for items to be purchased, and sets up a new collaborative negotiation. The buyer may choose to create a new negotiations template. The buyer initiates a first round of negotiation. In the first round, the buyer selects Negotiation Terms, Quality, and Lead Time as the buyer parameters 2904. For the first round of negotiation, the buyer selects the start and end dates for the negotiation event.

The buyer may create a second round of negotiation. The buyer then selects the negotiation method (e.g., split of business bidding format). Next, the buyer invites suppliers to bid at the negotiation event. As the suppliers are invited they are sent an e-mail informing them where the RFQ for the items is located. The supplier logs in to the host processing node 140 and enters supplier parameters 2906 into round one. The supplier may elect to test a bid before submitting it. Active negotiation terms 2722 that take into account the buyer parameters 2904 and the supplier parameters 2906 influencing the bid may be highlighted and brought to the attention of the supplier. Based on feedback, the supplier may elect to revise a bid or revise a supplier parameter 2906. The supplier then submits the bid.

At some time in the future a live split of business price/volume negotiation event occurs. The supplier enters bids with competitive dollar amounts and notes the status of the bids relative to the market position. With each price bid entered, the collaborative negotiation framework 2800 notifies the supplier of the impact that the active negotiation terms 2722 have on his bid price. The supplier can revise the bid or the supplier parameters 2906 and submit another bid until the negotiation event times out.

Design Cost Management 700 (DCM)

In one embodiment, the systems 100, 300 described above and the functional modules 172 provided by the host processing node 140 such as the EEC module 400, sub-modules such as the converter module 410, viewer module 420, collaboration module 430, and project management module 440, the DRM module 500, and the collaborative negotiation module 600 and the application framework 348, 349 may be coupled with the design cost management module 700 (DCM) to form a collaborative negotiation framework that may be implemented throughout the extended enterprise networks 100, 300. In one embodiment, the DCM module 700 explodes multiple bills of material (BOM) into end items with aggregate annual usages for quoting existing and new parts. In one embodiment, the DCM 700 module utilizes item attribute extraction for quoting parts and tooling and has the functionality to allow users (buyers and suppliers) to add cost data for parts and tooling. In one embodiment, the DCM 700 module compares historical costs and new quotes against a desired cost model.

The DCM 700 module enables an OEM to manage profit margins through the new item introduction phase as well as throughout the lifecycle of an item. An item may include multiple assemblies or may be a sub-assembly for another item. The item may include other items that may be common across the multiple assemblies or sub-assemblies manufactured by the same OEM. During different manufacturing phases the items may be purchased (sourced) from multiple suppliers or the same supplier. At each purchasing event, the items may have been quoted and sold at different prices. For a given product, OEMs generally maintain an engineering bill-of-material (BOM) and/or a manufacturing BOM that describe: (1) the item; (2) the assembly in which it is used; and (3) the quantity required for each assembly. These BOMs, however, do not directly address the sourcing concern where the same item is quoted and/or sold at difference prices from one or more suppliers because it was quoted multiple times in different assemblies or in different products that include the item during multiple purchasing events. In one embodiment, the DCM 700 module enables both buyers and suppliers to manage a single view of an item that may be common to one or more assemblies. The DCM 700 module provides a sourcing BOM that captures the cost history of an item, the target cost of the item, and/or a quote for the item. In one embodiment, the quote may be entered by one or more suppliers. The DCM 700 module can establish a desired cost model for an item and track the actual cost of the item from its introduction and throughout the lifecycle of the item.

In one embodiment, the DCM 700 module reduces multiple items and/or their assemblies or sub-assemblies to an end-item list of common and unique items and presents the end item list to suppliers via a WAN (e.g., the Internet) to quote total item quantities. In one embodiment, this ability to receive quotes from suppliers (at second client nodes 120-1-b) located throughout the extended enterprise network 300 provides a method for the buyer (at first client nodes 110-1-a) to obtain market pricing for an item and/or assemblies with more than one item that may be aggregated for quoting and purchase.

In one embodiment, the DCM 700 module can be used to develop a "should cost model" by leveraging multiple supplier views of item cost data collected over time. This provides a direct comparison of what each supplier quoted for the same item in an assembly over time. The "should cost models" developed in this manner support uniform material pricing from previously quoted items.

In addition, the DCM 700 module may be integrated with the EEC module 400 and DRM 500 module to enable suppliers to receive secure documents and technical specifications required for quoting without downloading native software to view the information. Suppliers will also be able to collaborate with the OEM on any commercial and/or technical questions they may have in preparing their quote. The DCM 700 module also communicates to the supplier and the OEM latest revision status of all items being managed and alerts the parties of any pending revision change.

In one embodiment, the DCM 700 module provides Internet based extended enterprise project management process for each item cost requirement. The process may be initiated via an e-mail link that is sent to one or more suppliers for a given BOM to be quoted. All suppliers can be tracked to schedule and alerted when their assigned quotes are at risk of being over due. This extended enterprise project management capability frees the buyer to intervene on an exception basis. For example, when one or more suppliers are at risk of missing a due date. In addition, the DCM 700 module contains the information that a supplier needs to provide their quote on the BOM. In one embodiment, the DCM module 700 may comprise a sub-module 702 to implement a collaborative BOM (CBOM). Prior to initiating CBOM, a user, according to one embodiment, may be employ the application framework 348, 349 and one or more functional modules 172 and the host computing platform 150 to upload one or more BOMs from the first and second client nodes 110-1-a and 120-1-b to the host processing node 140.

Figure 3C:
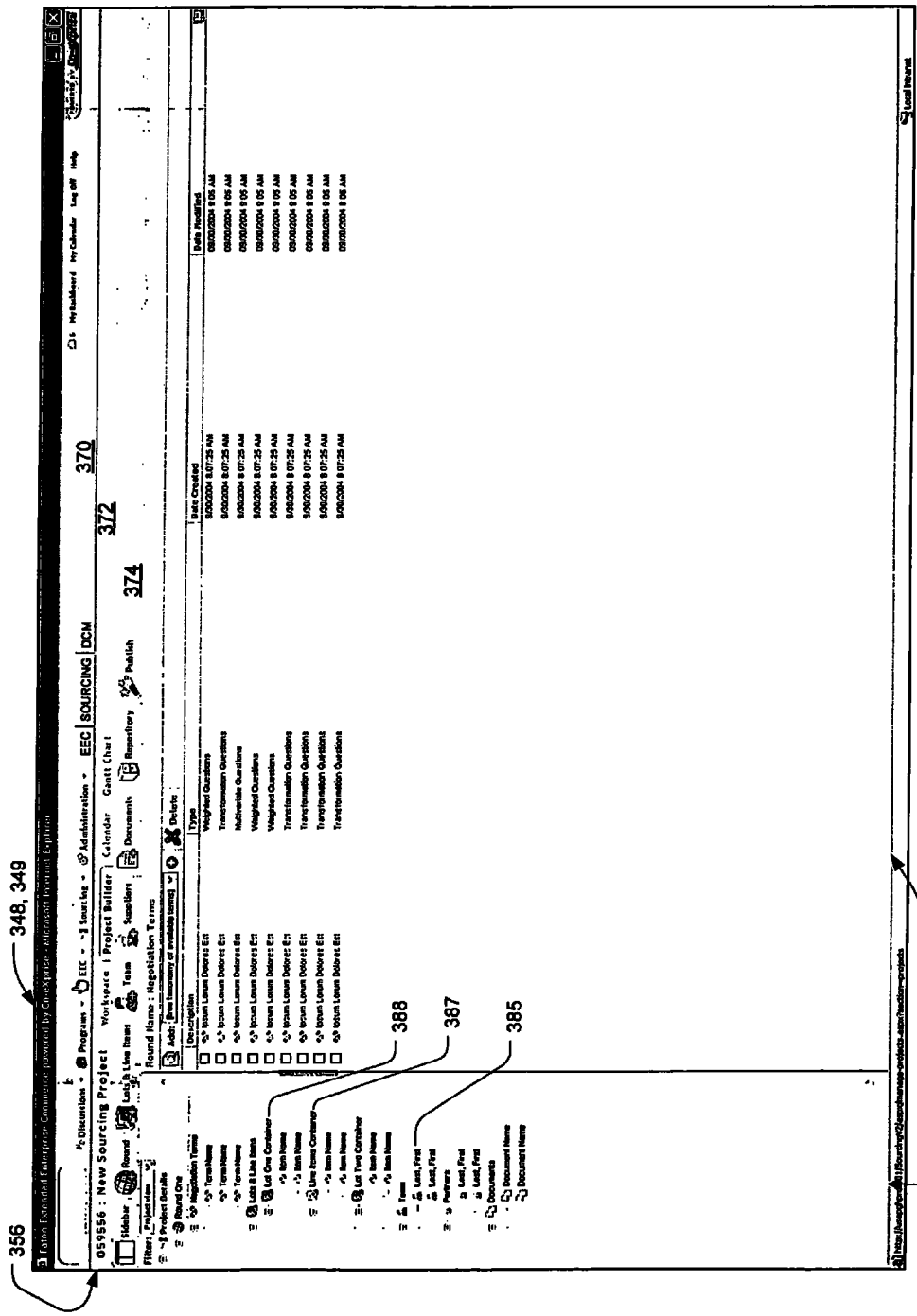
Figure 3D:
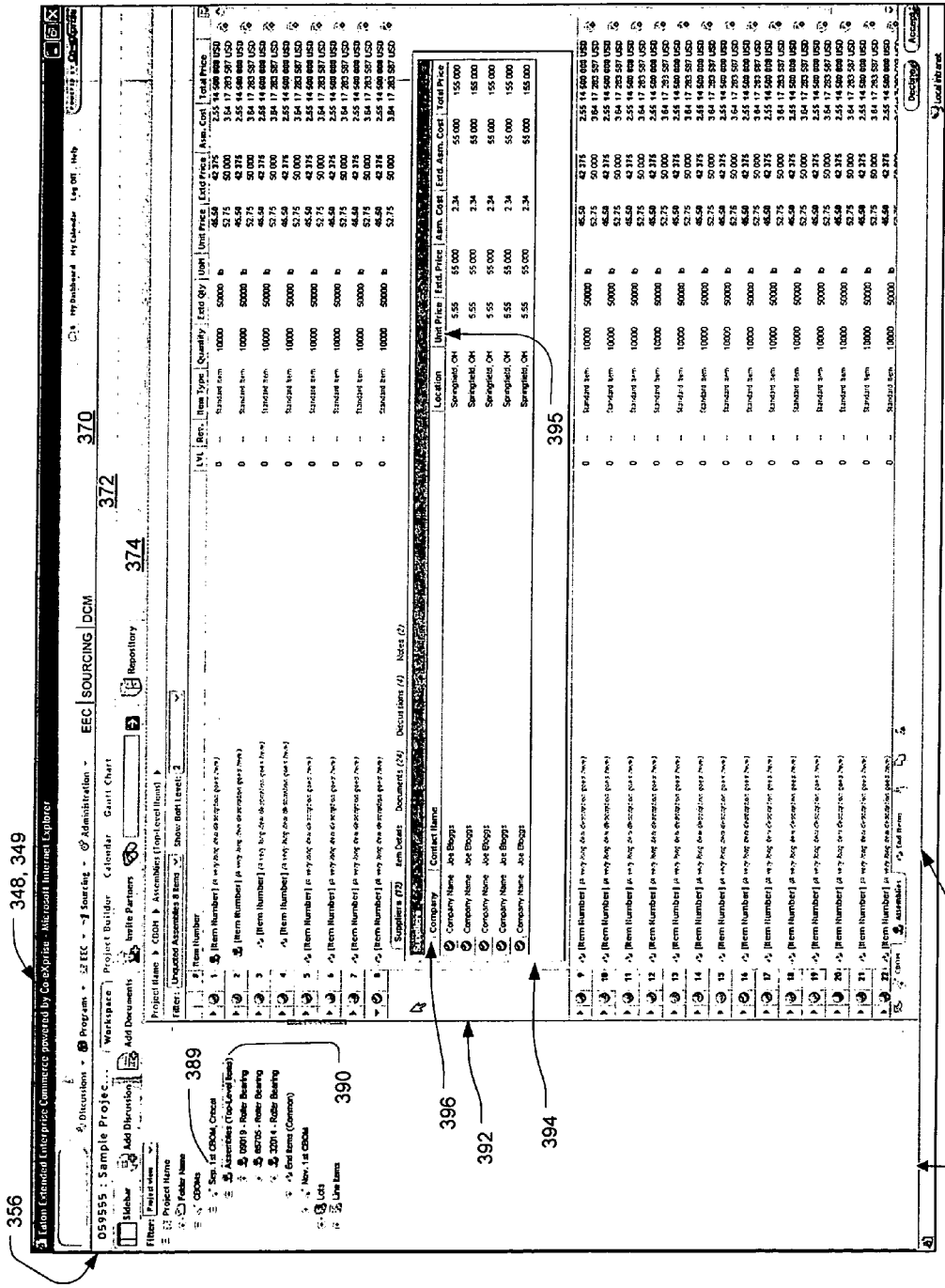
Figure 3E:
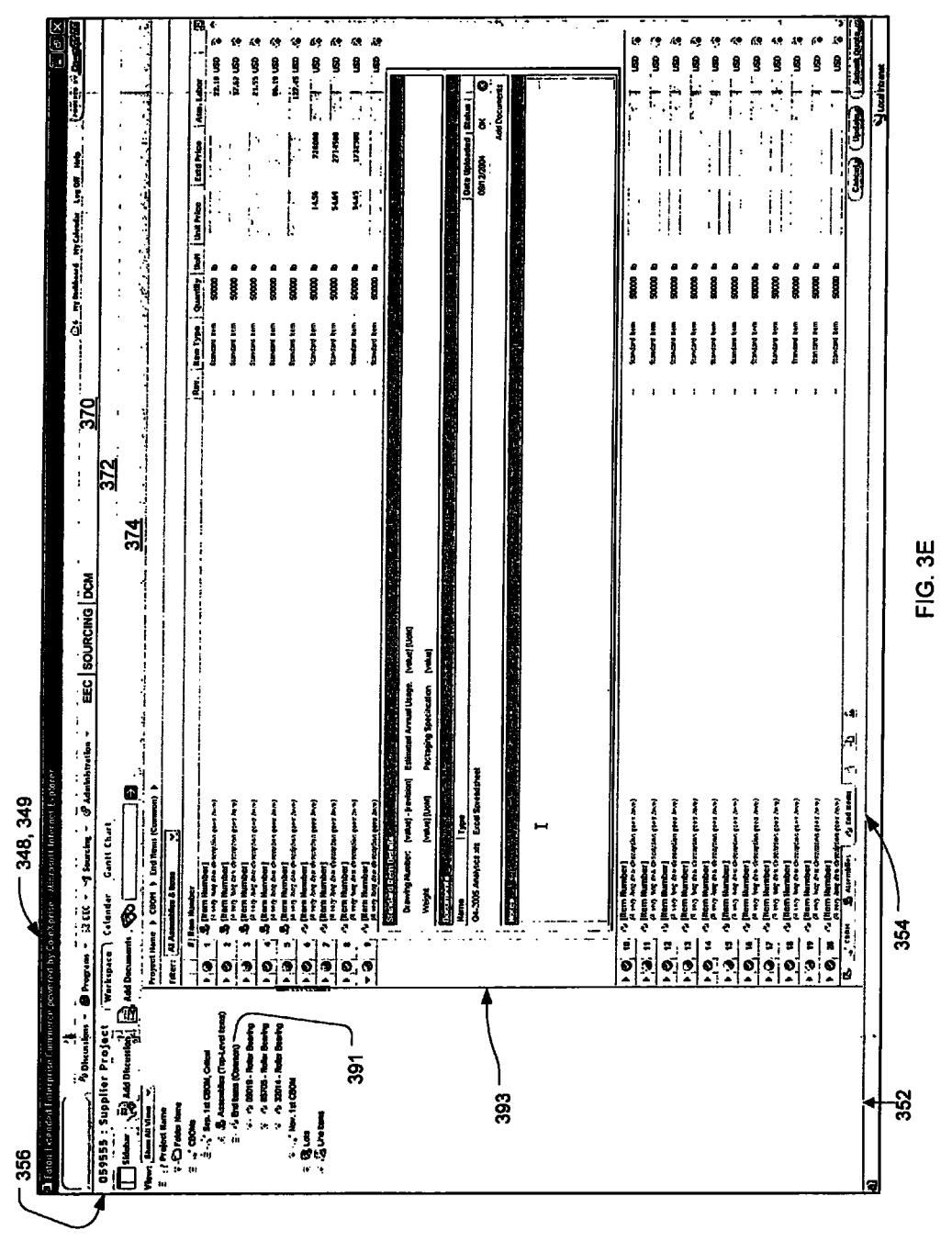
Figure 3F:
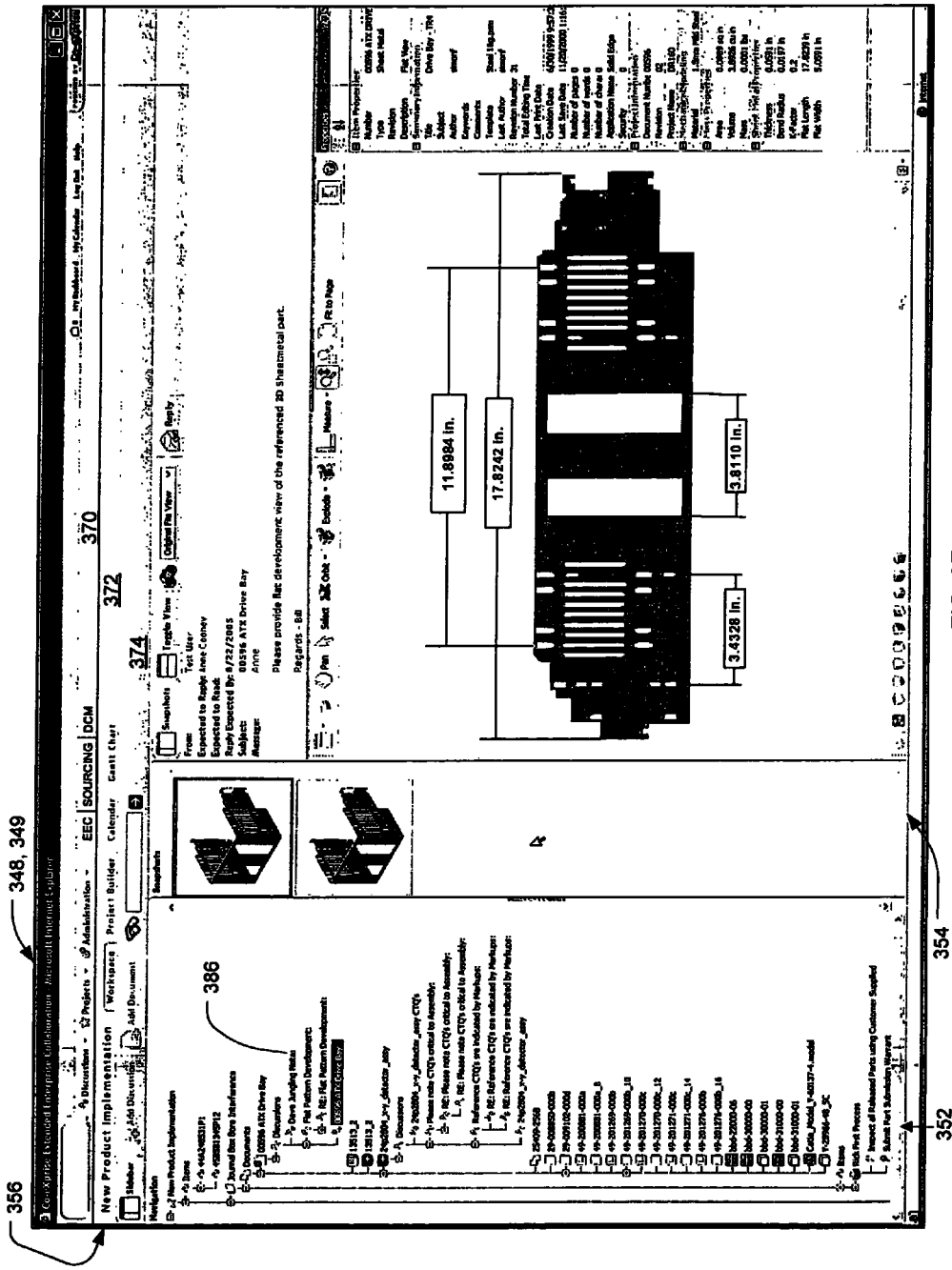

With reference now back to FIGS. 3C, 3D, and 3E, in one embodiment, the line item node 387 the node is automatically created based on a user selection of items and/or assemblies he/she desires to quote. The user may select such items and/or assemblies in the command and control frame 354. The line item node 387 is a node that includes item pricing information. The users throughout the extended enterprise network 300 (e.g., external suppliers at second client nodes 120-1-*b*) submit pricing information for each item (line item price bid). The line item price bid is summarized at the line item node 387 for purposes of collaborating and/or negotiating a collection of items. The lot node 388 is a node that is automatically created based on a user selection of items and/or assemblies he/she desires to quote. The user may select such items and/or assemblies in the command and control frame 354. The lot node 388 is a node that includes the contents and/or behavior of the line item node 387, including: (1) the ability to receive an initial single price at a lot level (lot price bid) from users throughout the extended enterprise, wherein the lot level includes two or more line items; (2) the ability to subsequently receive line item price bids from users throughout the extended enterprise 300; and (3) the ability to receive extended enterprise user inputs that adjust line item price bids until the summation of all line item prices included in the lot equals the lot price bid. The CBOM node 389 is a node that is automatically created based on a user selection of items and/or assemblies he/she desires to quote. In one embodiment, the user may select such items and/or assemblies in the command and control frame 354. The CBOM node 389 contains two sub-nodes: (1) the first sub-node (top level items) 390 contains top level items and/or assemblies that the user selected and the items that are part of the product structure in which the top level items and/or assemblies call out; and (2) the second sub-node (end items) 391 contains an automatically generated list of only the end items that are to be quoted (omitting intermediate product structure levels that a buyer does not wish to quote); such end items are required to construct the top level items and/or assemblies that the user selected (e.g., the end items that are "called out" by the items and/or assemblies that the user selected). The CBOM node 389 also includes the contents and/or behavior of the lot node such as, for example, an end item sub-node 391 may be organized into lots and line items and quoted accordingly. After users throughout the extended enterprise network 300 submit pricing at the end item sub-node 391, the top level items sub-node 390 automatically calculates and rolls up the price inputs to arrive at a total price for the top level items and/or assemblies contained therein.

The command and control frame 354 may display the CBOM. The CBOM provides several views. In one embodiment, the CBOM provides an assembly view 392 and an end items view 393 as described below. In one embodiment, the CBOM may comprise a price comparison frame 394 for the assembly view 392 and/or end items view 393. In one embodiment, the price comparison frame 394 includes one or more quotes 395 entered by one or more suppliers 396 (from the second client nodes 120-1-*b*) for a single item and/or assembly. In another embodiment, the price comparison frame 394 may include a cost rollup of prices resulting from quotes entered by suppliers associated with line items and assembly labor. Using the assembly view 392 and/or the end items view 393, one or more buyers (at first client nodes 110-1-*a*) can view and compare quoting information, wherein the quoting information is directly entered into the application framework 349 by one or more suppliers (120-1-*b*).

FIG. 33A is a graphical user interface 3300 of one embodiment of a CBOM assembly view 392 that may be displayed in the command and control frame 354 as shown in FIG. 3D. FIG. 33B is a graphical user interface 3500 of one embodiment of a CBOM end items view 393 that may be displayed in the command and control frame 354 as shown in FIG. 3E. In one embodiment, the CBOM enables users to manage pricing in terms of unit cost and assembly labor for one or more top level items. In one embodiment, the CBOM displays an item and a price associated with the item once and calculates a final rolled up price or cost for a final assembly and/or sub-assembly based on a unit price for each item, even if it is used in multiple part instances in a BOM structure. In one embodiment, a BOM may comprise a hierarchical multilevel item structure comprising one or more items. An item at a given level may be referenced by one or more items at one or more levels within the BOM structure. In one embodiment, a BOM may comprise a flat item structure comprising a single item. In one embodiment, a BOM may comprise multiple BOMs comprising multiple multilevel and/or flat item structures. The CBOM also enables multiple suppliers to provide item pricing to the buyer prior to or during a negotiation event.

With respect to the CBOM, the term "item" may comprise any entity that either may be manufactured or purchased. An item may be referenced according to a corresponding item number or may be referenced in accordance with a drawing number. In one embodiment, there are two basic item types: (1) a part or (2) an assembly. Accordingly, an item may be referenced as a part or an assembly. In one embodiment, a "part" may comprise a single entity type of item with a single cost referred to as a unit price. Generally, a BOM is not required for a part because it is a single entity with no sub-parts or sub-components. In one embodiment, an "assembly" may comprise a type of item that contains other items. Accordingly, in one embodiment, an assembly may comprise other parts or assemblies, for example. Assemblies are categorized and referenced with a BOM. In one embodiment, a BOM may comprise a list of items that make up a particular assembly. When costing or rolling up an item that is an assembly, the price may comprise two components: (1) the price of all the parts plus (2) the cost to fabricate/assemble the parts into the final assembly. In one embodiment, an end level assembly is used to reference the highest level assembly, which may be referred to as a final and/or end assembly. An assembly that forms a portion of another assembly, which may or may not be a final assembly, may be referenced as a sub-assembly.

As previously discussed, the CBOM provides several views. In one embodiment, the CBOM provides the assembly view 392 and the end items view 393. In one embodiment, the assembly view 392 displays the structure associated with a BOM for a top level assembly TopAssembly1. The top level assembly may comprise multiple items including, for example, parts and assemblies and each of the parts and assemblies may comprise unique parts, or parts that are common to two or more items up to the top level assembly. Accordingly, the assembly view 392 may be arranged into one or more levels 3304. In one embodiment a top level assembly may be referenced as a level-0 item 3306. Items that form a portion of the level-0 item 3306 may be referenced as level-1 items 3308. Items that form a portion of the level-1 items may be referenced as level-2 items 3310, and so forth for as many levels that the top level assembly may comprise. In the illustrated embodiment, the top level assembly TopAssembly1 comprises five sub-assemblies SubAsm1, SubAsm2, SubAsm3, SubAsm4, and SubAsm5 (SubAsm-1-5). In the illustrated embodiment, each one of the SubAsm-1-5 comprises a part CommonPart1 that is common to all the subassemblies SubAsm-1-5. Further, each of the SubAsm-1-5 comprises a unique part UniquePart-1-5, respectively.

In one embodiment, the end item view 393 displays a single instance of all the items provided in the assembly view 392. As previously discussed, there may be multiple occurrences of the same item referenced in a BOM structure. In the illustrated embodiment, for example, the top level assembly TopAssembly1 comprises five sub-assemblies SubAsm-1-5 and each of the SubAsm-1-5 comprises a common part CommonPart1 and a unique part UniquePart-1-5. The CommonPart1 is listed five times in the assembly view 392 and is listed only once in the end item view 393. The CBOM summarizes the total quantity of the common part CommonPart1 across all the sub-assemblies SubAsm-1-5 for the single top level assembly item TopAssembly1. In the illustrated embodiment, as shown in the quantity portion 3316, each of the five sub-assemblies SubAsm-1-5 contains a quantity of two common parts CommonPart1. Thus each of the top level assembly item TopAssembly1 contains a total quantity of ten common parts CommonPart1. As shown in the extended quantity 3318 portion, a total of 1,000 top level assembly items TopAssembly1 are required. Therefore, as shown at entry 3322 of total quantity portion 3320 of the end item view 393, a total quantity of 10,000 common parts CommonPart1 are needed to meet the requirements for the top level assembly items TopAssembly1.

In one embodiment, the CBOM accumulates and aggregates items across a one or more BOMs and it accumulates and aggregates items and their quantities across multiple top level assemblies. Accordingly, if there is another top level assembly item TopAssembly1 that requires additional common parts CommonPart1, the total quantity needed is aggregated.

Using the CBOM, a buyer can choose multiple items for sourcing or pricing from a single supplier. The CBOM automatically finds all common parts such as, for example, CommonPart1 and accumulates the common item quantities, so that a supplier can enter a single cost for each common item at the quantities required to produce all top level assemblies such as, for example, TopAssembly1, and so forth.

In one embodiment, the CBOM provides lotting. As defined herein, lotting refers to the condition where a buyer purchases more than one type of part from a single supplier. Lotting enables the buyer to source all items in a CBOM or lot from a single supplier. By grouping items that have similar attributes (meaning that suppliers can provide every item in a lot e.g., stamping, casting, machining, and so forth), the buyer can negotiate price per item based on the total volume of items to leverage a better price from the supplier. Suppliers may negotiate or bid against each other at the lot level. The lot price bid comprises each individual item price.

Lotting may be implemented as follows. In one embodiment, lotting may be used if there are too many items to effectively rollup pricing in a negotiation event (e.g., auction). For example, lots may contain hundreds or even thousands of individual part types. Accordingly, it would be more practical to have each supplier break down their pricing after they make the final cut in the negotiations. A negotiation event may be conducted so that each supplier can bid only at the rolled up lot cost. Once a supplier is selected as one of a few potential suppliers based on the outcome of the negotiation event, the supplier may provide a cost break down of each item in the lot which should be reconciled with respect to the total lot price, which was bid by the supplier.

In one embodiment, lotting may be used if a buyer needs a cost break down for an item in order to make an initial offer. For example, the initial price may be broken down prior to the negotiation event, but the price is still based on the total lot rolled up lot price. At the conclusion of the negotiation event, the suppliers can adjust their final break down pricing to reconcile it with the total lot price.

In one embodiment, lotting may be used when the lots are small and may be managed during the negotiation event. In one embodiment, the supplier enters individual item pricing in a supplier user interface 3324 and the CBOM calculates the final submitted rolled up lot price. The CBOM enables the user to reduce the final bid price by a certain percentage or amount. The CBOM then automatically reduces the individual price of each item by that percentage so that the sum of all the line items equals the desired lot rolled up price. In one embodiment, the suppliers also may reduce each line item individually to see the effect on the final submitted lot rolled up price.

Line items may be defined as multiple lots with a single line item in each of the lots. In one embodiment, the buyer may award each line item to a different supplier. Accordingly, each supplier may not be required to bid on every item. In one embodiment, each item comprising the line items may be treated as a single entity. A user may create a line items group with multiple items rather than creating multiple lots with a single line item for each lot. This provides one user interface for suppliers to review and submit their bids.

Operations for the above system and subsystem may be further described with reference to the following figures and accompanying examples. Some of the figures may include programming logic. Although such figures presented herein may include a particular programming logic, it can be appreciated that the programming logic merely provides an example of how the general functionality described herein can be implemented. Further, the given programming logic does not necessarily have to be executed in the order presented unless otherwise indicated. In addition, the given programming logic may be implemented by a hardware element, a software element executed by a processor, or any combination thereof. The embodiments are not limited in this context.

Figure 34:
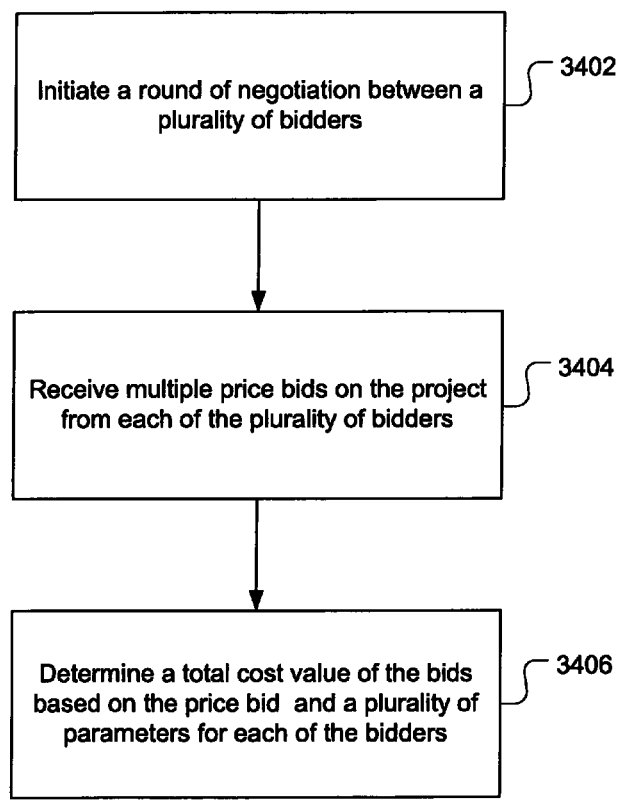
FIG. 34 is a logic flow of one embodiment of a collaborative negotiation.

FIG. 34 is a logic flow 3400 of one embodiment of a collaborative negotiation 3400. The collaborative negotiation module 600 initiates (3402) a round of negotiation for a project between a plurality of bidders at a plurality of the second client nodes 120-1-b and the host processing node 140. The collaborative negotiation module 600 receives (3404) multiple price bids on the project from each of the plurality of bidders at the client nodes 120-1-b. The collaborative negotiation module 600 determines (3406) a total cost value of the bids based on the price bid and a plurality of parameters for each of the bidders.

The project may include providing an item or a service. The parties may select a negotiation technique and provide the selection to the collaborative negotiation module 600. The negotiation technique may include any one of the following negotiation techniques: request for quote collaboration; initial offer; reverse auction; split of business; forward auction; Dutch auction; English auction; multi-attribute; bid-ask; transportation; and supplier lotting. The total cost value may be determined based on a plurality of active negotiation terms from the plurality of parameters for each of the bidders. The active negotiation terms take into account a proportional relevance of each of the parameters, rather than treating each of them equally. At the host processing node 140, the collaborative negotiation module 600 receives information including the plurality of parameters from each of the bidders. The plurality parameters are associated with the project. The collaborative negotiation module 600 assigns a weight to each of the multiple parameters and determines the active negotiation terms based on the weights. The collaborative negotiation module 600 determines a score based on at least one of the plurality of active negotiation terms. The information received by the collaborative negotiation module 600 during the round of negotiation includes multiple negotiation variants: quality system qualification; lead time; payment terms; spoilage; tooling; fixturing; and plastic molding qualifications. The buyer awards the project based on the total cost value.

During the round of collaborative negotiation, at a first time event the application framework displays the total cost value for each of the bidders. In one embodiment, aspects of the application framework may be accessible only to the buyer and is not accessible by each of the bidders. The collaborative negotiation module 600 provides a bid summary through the application framework, which includes at least one of the plurality of bid prices, parameters, and active negotiation terms. At subsequent time events within the round, the collaborative negotiation module 600 receives supplemental price bids and/or supplemental information including at least one variable that is different from a previously submitted variable from each of the bidders. The revised total cost value for each of the plurality of bidders are displayed by the application framework. The collaborative negotiation module 600 updates the active negotiation terms in near-real time as the supplemental information is received. The collaborative negotiation module 600 also displays a hierarchy of the plurality of bidders based on the total cost value of the negotiation. The application framework displays the bid price and a plurality of parameters; a relative gap between the bid price and a market leading bid; and the impact of the plurality of parameters on the bid price. Aspects of the application framework provide views that are accessible only to the bidder that submitted the bid price and the plurality of parameters.

In one embodiment, the collaborative negotiation module 600 provides supplier relationship management capabilities that enables automated matching of item attributes to the process or production capabilities of a supplier. In addition, supplier relationship management capabilities can provide advanced notification "alerts" to manage risk of supplier insolvency, late delivery, and poor quality.

Figure 35:
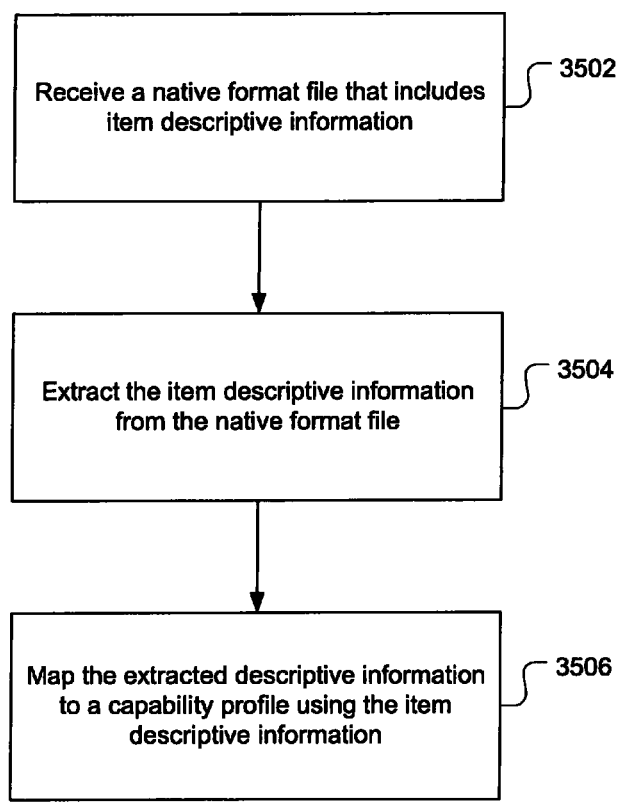
FIG. 35 is a logic flow of one embodiment of a process to match a supplier capability profile to an item.

FIG. 35 is a logic flow 3500 of one embodiment of a process to match a supplier capability profile to an item. In order to match a supplier capability to an item, a supplier capability profile is stored and registered in any one of the databases 190-1-e. Once the supplier capability is stored in the database 190-1-e the collaborative negotiation module 600 receives (3502) a native format file 602-1, which includes descriptive information associated with an item to be sourced. The collaborative negotiation module 600 then utilizes the converter module 340 to extract (3504) the item descriptive information. Prior to extraction, the converter module 340 determines the format of the native format file 602-1, selects a converter service module 130-1-j based on the native format, and translates the native format file 602-1 to a secure neutral format file 604-1. The item descriptive information is extracted from the secure neutral format file 604-1. The collaborative negotiation module 600 then maps (3506) the extracted descriptive information to the capability profile stored in the database 190-1-e using the descriptive information. If there are one or more supplier capability profile matches in the database 190-1-e, the collaborative negotiation module 600 selects a supplier based on the capability profile.

The item descriptive information associated with the item may include, for example, an attribute that defines a physical property of the item and a feature that defines a material property of the item. The collaborative negotiation module 600 determines a process specification based on the extracted descriptive information that defines the manufacture of the item based on any one of the item attributes and features. The collaborative negotiation module 600 then associates the process specification with the supplier capability profile.

Figure 36:
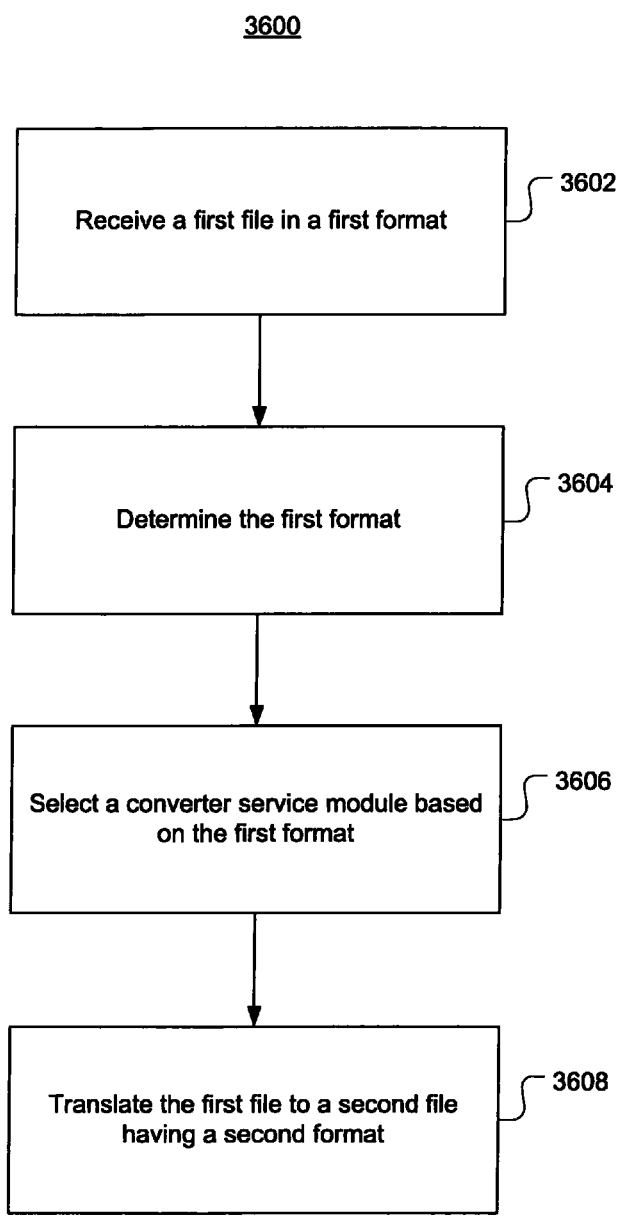
FIG. 36 is a logic flow of one embodiment of a process to translate native format files to secure neutral format files.

FIG. 36 is a logic flow 3600 of one embodiment of a process to translate native format files 602-1-f to secure neutral format files 604-1-f. The converter module 410 receives (3602) a first file in a first format. The file interrogation module 740 determines (3604) the first format and selects (3606) a converter service module 730 based on the first format. The converter service module 730 translates (3608) the first file to at least one second file having a second format.

In one embodiment, the first file is received by a processor at the host processing node 140. To determine the first format a rule engine is applied to the first file to compare the first format to a plurality of file formats. The rule engine may match the information contained in the first file to a byte pattern, a string patterns, Boolean logic or file content identifier. In one embodiment, the rule engine may comprise an XML template. In one embodiment, the file interrogation module 740 identifies a file extension of the first file and applies a set of rule engines based on the file extension to the first file to compare it to a plurality of file formats based on the file extension. Once the file format is identified, the file is translated by invoking a converter based on the first format; invoking an application programming interface (API) associated with said first format; and extracting information associated with a content of said first file based on said API. In one embodiment, extracting information associated with a content of the first file, comprises extracting features associated with the manufacture of a structure defined by the content. In one embodiment, extracting information associated with a content of the first file, comprises extracting attributes associated with a structure defined by the content. The second file in the second format may be hosted at the at the host processing node 140.

Figure 37:
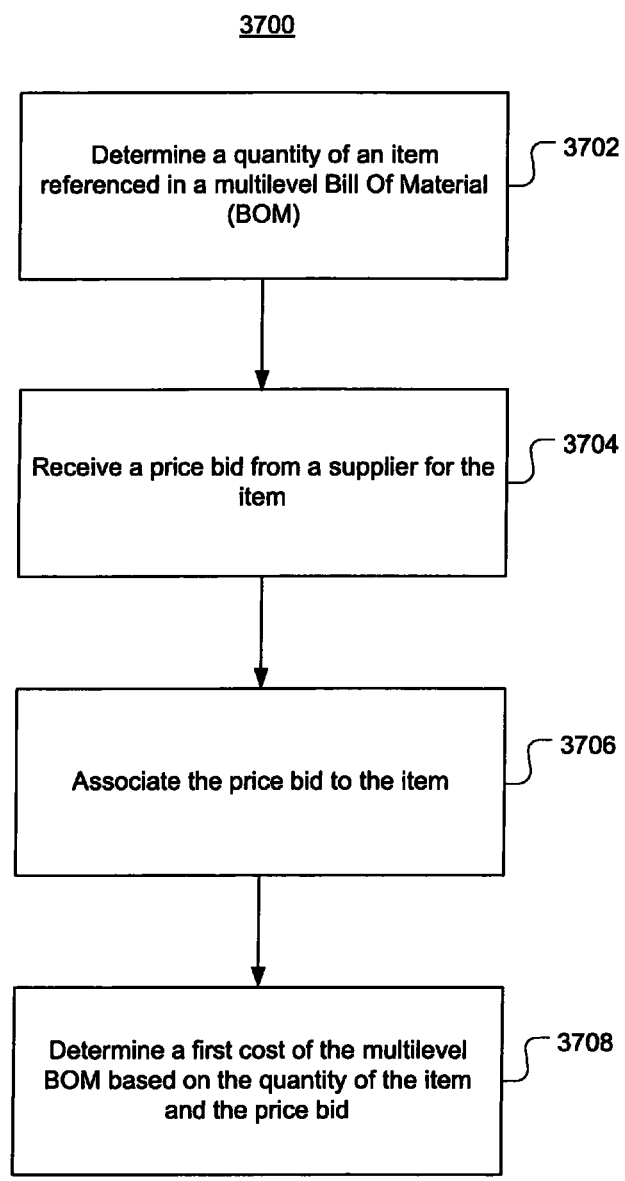
FIG. 37 is a logic flow of one embodiment of a process to provide quotes based on items, BOMs, and documents defining the items.

FIG. 37 is a logic flow 3700 of one embodiment of a process to provide quotes based on items, BOMs, and documents defining the items. The DCM module 700 and CN module 600 coordinate the underlying functionality to implement the logic flow 3700. The sub-module 702 determines (3702) a quantity of at least one item referenced within at least one multilevel bill of material (BOM). The application framework 349 receives (3704) at least one price bid from at least one supplier at second client node 120-1 for the item. The sub-module 702 associates (3706) the price bid to the item. The sub-module 702 determines (3708) a first cost of the multilevel BOM based on the quantity of the item and the price bid. The sub-module may partition the multilevel BOM into an assembly structure and one end item structure. In one embodiment, the assembly structure includes the one end item structure and the one price bid may be received for the one end item structure.

Any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. A computer-implemented method, the method performed on at least one computer system including at least one processor, the method comprising:
receiving a first file in a first format, said first file comprising information associated with an item, the information associated with the item including graphical information representing a two-dimensional or three-dimensional design or model of at least a portion of the item;
determining the first format of the first file;
translating the first file to a second file having a second format using a converter based on the first format, wherein the second format comprises a neutral file format, and wherein the content of the second file is viewable without using a native software application used to generate the content in the first file;
automatically determining, by the at least one processor, descriptive data comprising at least one of the following: an item attribute, an item physical property, an item feature, an item entity, or any combination thereof, based at least in part upon the graphical information representing the two-dimensional or three-dimensional design or model of the at least a portion of the item;
automatically determining, by the at least one processor, data associated with at least one manufacturing process required to produce the item based at least in part upon the descriptive data;
establishing at least one capability profile associated with at least one supplier in a database, wherein the at least one capability profile associated with the at least one supplier includes data associated with at least one manufacturing process; and
automatically mapping, by the at least one processor, the item to the at least one capability profile associated with the at least one supplier if the at least one capability profile of the at least one supplier includes the data associated with the at least one manufacturing process required to produce the item.

2. The method of claim 1, further comprising:
selecting a supplier based on said mapping.

3. The method of claim 1, wherein said information comprises:
at least one of an attribute that defines a physical property of said item; and
a feature that defines a material property of said item.

4. The method of claim 3,
wherein the determination of the data associated with the at least one manufacturing process is based on any one of said attribute and said feature.

5. The method of claim 1, wherein the first file comprises at least one of the following: a computer-assisted design (CAD) file, a three-dimensional vector graphics file, or any combination thereof, and wherein the item comprises at least one of the following: a device, an instrument, a machine, an assembly, a sub-assembly, or any combination thereof.

6. The method of claim 1, wherein the at least one manufacturing process comprises at least one of the following: stamping, casting, machining, molding, welding, circuit board fabrication, or any combination thereof.

7. An apparatus, including at least one computer having at least one computer readable medium having stored thereon instructions, which, when executed by at least one processor of the at least one computer, causes the at least one processor to:
receive a first file in a first format, said first file comprising information associated with an item, the information associated with the item including at least one three-dimensional or two-dimensional model or design of the item;
determine the first format;
translate the first file to a second file having a second format using a converter, wherein the second format comprises a neutral file format viewable without a software application used to generate the first file in the first format;

automatically determine descriptive data comprising at least one of the following: an item attribute, an item physical property, an item feature, an item entity, or any combination thereof, based at least in part upon the at least one three-dimensional or two-dimensional model or design of the item;

automatically determine data associated with at least one manufacturing process required to produce the item based at least in part upon the descriptive data;

establish at least one capability profile associated with at least one supplier in a database, wherein the at least one capability profile associated with the at least one supplier includes data associated with at least one manufacturing process; and automatically map the item to the at least one capability profile associated with the at least one supplier if the at least one capability profile of the at least one supplier includes the data associated with the at least one manufacturing process required to produce the item.

8. The apparatus of claim 7, wherein said processor is to select a supplier based on said mapping.

9. The apparatus of claim 7, where said processor is to retrieve at least one of an attribute that defines a physical property of said item; and a feature that defines a material property of said item.

10. The apparatus of claim 9, wherein the determination of the data associated with the at least one manufacturing process is based on any one of said attribute and said feature.

11. An article comprising a non-transitory machine-readable storage medium containing instructions that if executed enable a processor to receive a first file in a first format, said first file comprising a computer-aided design file including graphical data representing the item; translate the first file to a second format by using a converter, the second format comprising a neutral file format viewable without a native software application used to generate content of the first file; automatically determine descriptive data comprising at least one of the following: an item attribute, an item physical property, an item feature, an item entity, or any combination thereof, based at least in part upon the graphical data representing the item; automatically determine, based at least in part upon the descriptive data, data associated with at least one manufacturing process required to produce the item; establish at least one capability profile associated with at least one supplier in a database, wherein the at least one capability profile associated with the at least one supplier includes data associated with at least one manufacturing process; and automatically map the item to the at least one capability profile associated with the at least one supplier if the at least one capability profile of the at least one supplier includes the data associated with the at least one manufacturing process required to produce the item.

12. The article of claim 11, comprising instructions that if executed enable said processor to select a supplier based on said mapping.

13. The article of claim 11, comprising instructions that if executed enable said processor to retrieve at least one of an attribute that defines a physical property of said item; and a feature that defines a material property of said item.

14. The article of claim 13, wherein the determination of the data associated with the at least one manufacturing process is based on any one of said attribute and said feature.

* * * * *